United States Patent
Nawamoto et al.

(10) Patent No.: US 6,623,251 B2
(45) Date of Patent: Sep. 23, 2003

(54) SPINDLE APPARATUS

(75) Inventors: Taikou Nawamoto, Kanagawa (JP); Kenichi Sugiyama, Kanagawa (JP); Satoshi Dairokuno, Kanagawa (JP); Yukiyoshi Okazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/939,578

(22) Filed: Aug. 28, 2001

(65) Prior Publication Data

US 2002/0048517 A1 Apr. 25, 2002

Related U.S. Application Data

(63) Continuation-in-part of application No. 09/522,909, filed on Mar. 10, 2000.

(30) Foreign Application Priority Data

| Aug. 4, 1999 | (JP) | 11-221435 |
| Jun. 21, 1999 | (JP) | 11-174305 |
| Oct. 13, 2000 | (JP) | 2000-313844 |
| Oct. 24, 2000 | (JP) | 2000-324113 |
| Oct. 24, 2000 | (JP) | 2000-324202 |
| Oct. 24, 2000 | (JP) | 2000-324213 |
| Oct. 26, 2000 | (JP) | 2000-327252 |
| Feb. 29, 2000 | (JP) | 2000-054539 |

(51) Int. Cl.$^7$ ............................ F04B 49/00
(52) U.S. Cl. .............. 417/290; 417/410.1; 417/322; 184/6.14; 310/26
(58) Field of Search ................ 417/290, 410.1, 417/322; 184/6.14; 310/26

(56) References Cited

U.S. PATENT DOCUMENTS

| 3,555,962 A | * | 1/1971 | Wolf et al. ............. 184/401.1 |
| 4,137,997 A | | 2/1979 | Ando |
| 4,738,336 A | * | 4/1988 | Smith et al. ............. 184/6.4 |
| 4,759,427 A | * | 7/1988 | Onose et al. ............ 184/6.26 |
| 4,785,913 A | * | 11/1988 | Maurer et al. ............ 184/6.26 |
| 5,020,635 A | * | 6/1991 | Lunn ......................... 184/6.12 |
| 5,848,845 A | * | 12/1998 | Jeng et al. ................ 184/6.26 |
| 5,971,107 A | * | 10/1999 | Stitz et al. ................ 184/108 |
| 6,357,922 B1 | | 3/2002 | Harbottle et al. |

FOREIGN PATENT DOCUMENTS

| EP | 0 854 314 A | 7/1998 |
| JP | 59073728 A | 4/1984 |
| JP | 62-150020 | 7/1987 |
| JP | 1-41997 B2 | 12/1989 |
| JP | 2-15003 B2 | 4/1990 |
| JP | 03009179 A | 1/1991 |
| JP | 5-248350 | 9/1993 |
| JP | 6-101631 A | 4/1994 |
| JP | 6-197573 A | 7/1994 |
| JP | 7-217532 A | 5/1995 |
| JP | 2651876 B2 | 5/1997 |
| JP | 09-166282 | 6/1997 |
| JP | 10-009490 | 1/1998 |
| JP | 10-196519 | 7/1998 |
| JP | 10-196520 A | 7/1998 |
| JP | 200110711 A | 4/2000 |

* cited by examiner

Primary Examiner—Charles G. Freay
Assistant Examiner—Michael K. Gray
(74) Attorney, Agent, or Firm—Sughrue Mion, PLLC

(57) ABSTRACT

A rod body (30) is formed of magnetostrictive material and includes one end portion (30a) fixed, and a piston (35) is fixed to the other end portion (35b) of the rod body (30). The piston (35) is slidably disposed within a cylinder (36) in which there is formed a pump chamber (37). A suction port (39) for sucking lubricating oil into the pump chamber (37) is formed in the cylinder (36), while a suction valve (40) for preventing the lubricating oil from flowing out from the suction port (39) is disposed in the suction port (39). In the cylinder (36), there is disposed a nozzle (20) which communicates with the pump chamber (37) and has a sectional area smaller than the lubricating oil passage sectional area of the suction valve (40). There is disposed a coil (43) outside the rod body (30) and, to the coil (43), there is connected a control device (6) for controlling the supply of a current to be supplied to the coil (43).

29 Claims, 72 Drawing Sheets dcl : RETAINER INSIDE DIAMETER
Dil : INNER RACE OUTSIDE DIAMETER
H : OIL SUPPLY TARGET POSITION
$H = (dcl + Dil) / 2$ RELATIONSHIP BETWEEN
$L/d^4$ AND DISCHARGE SPEED RELATIONSHIP BETWEEN
L/d⁴ AND DISCHARGE OIL QUANTITY

RELATIONSHIP BETWEEN SHAFT ROTATION
SPEED AND BEARING TORQUE

RELASIONSHIP BETWEEN SHAFT ROTATION SPEED AND OUTER RACE TEMPERATURE INCREASE

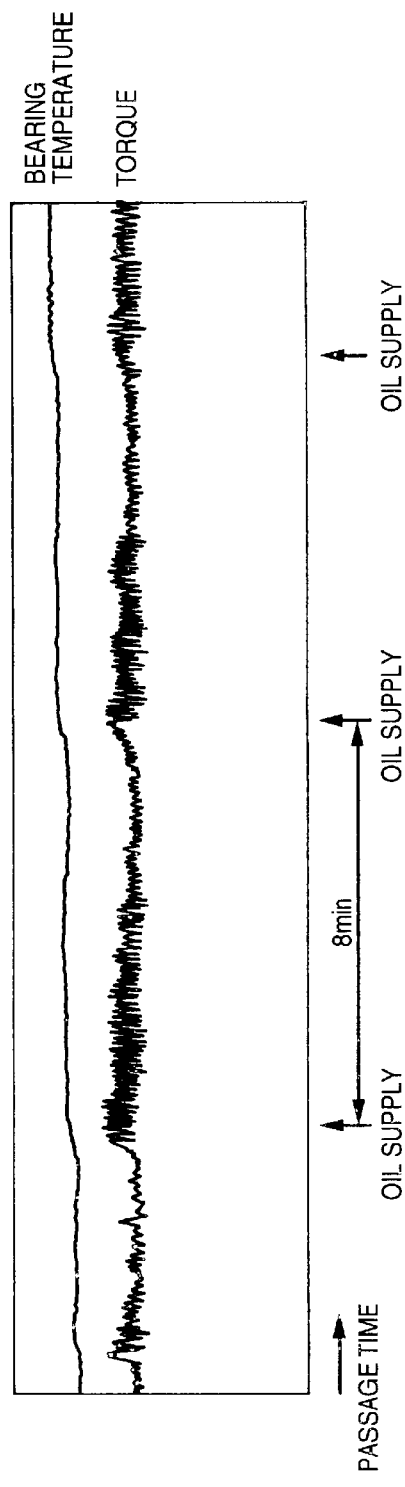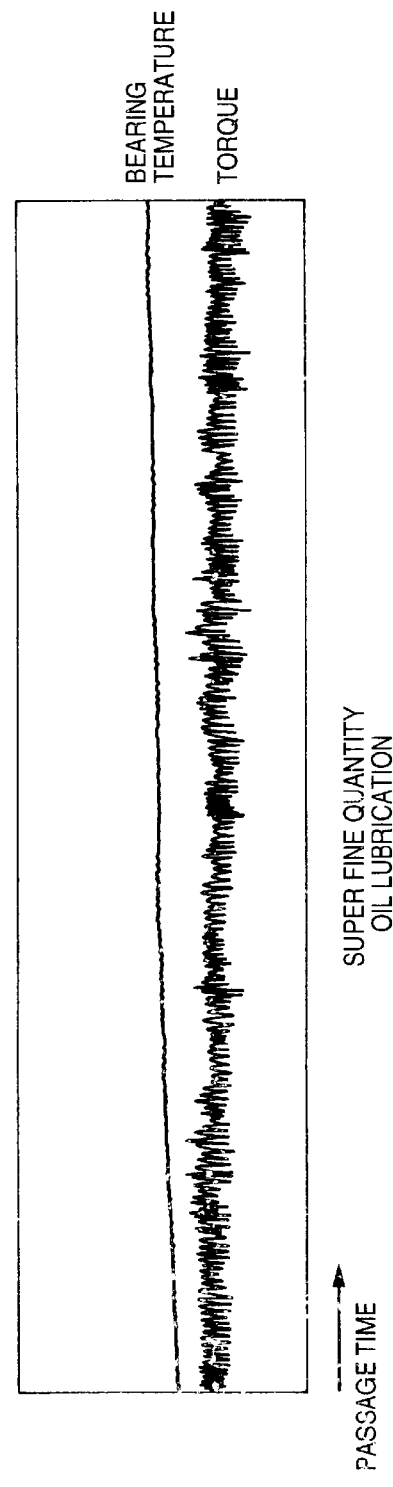
FIG. 26A
FIG. 26B

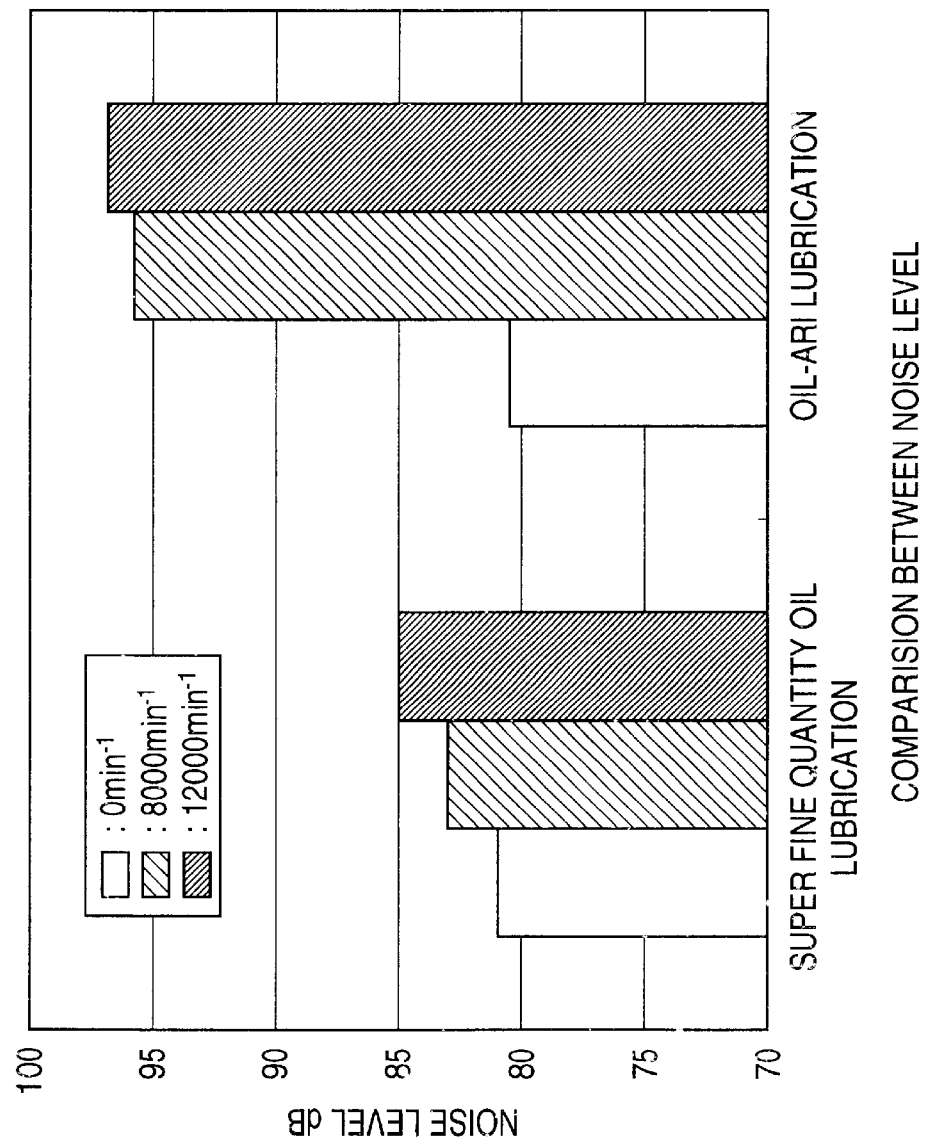

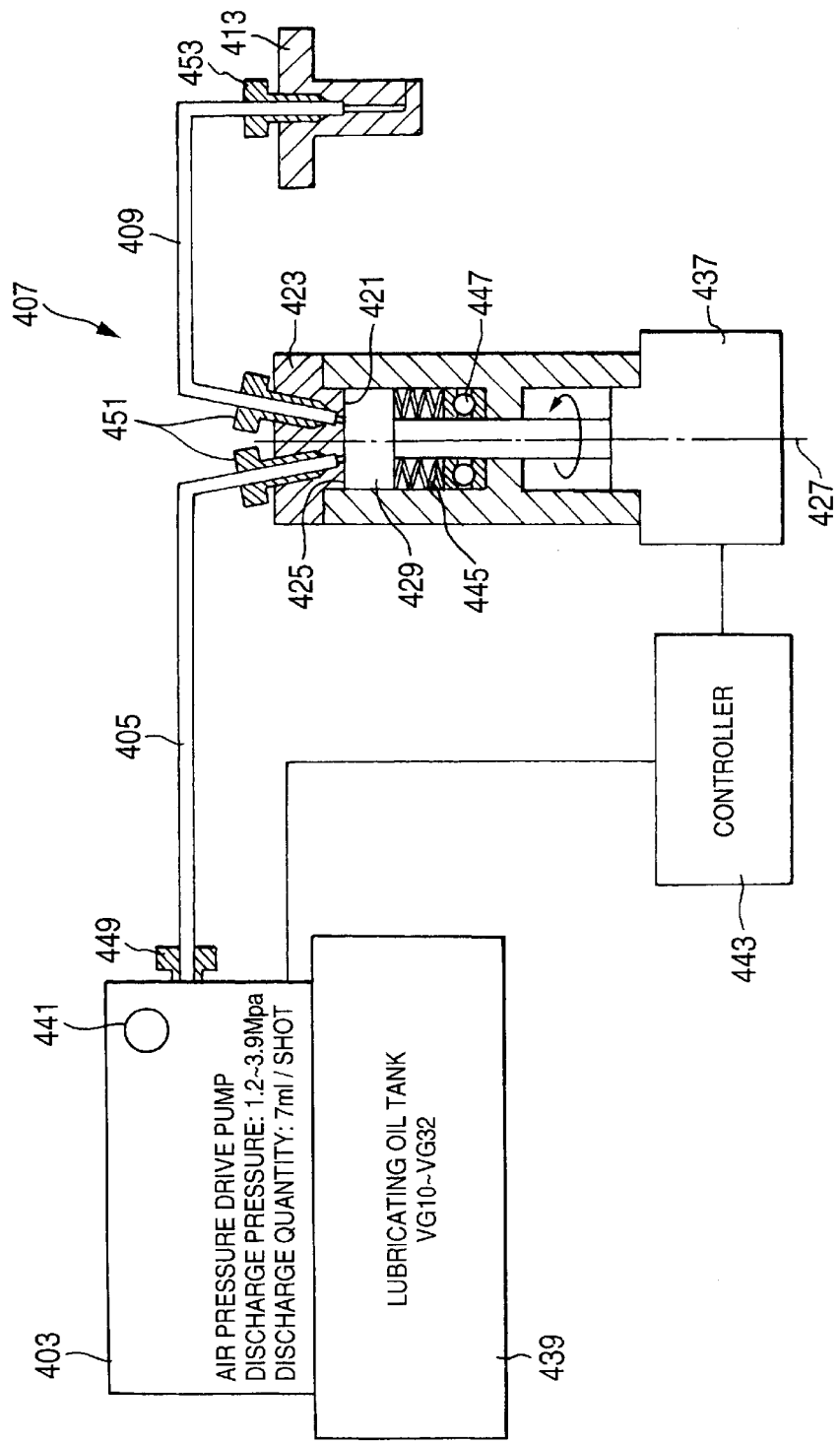

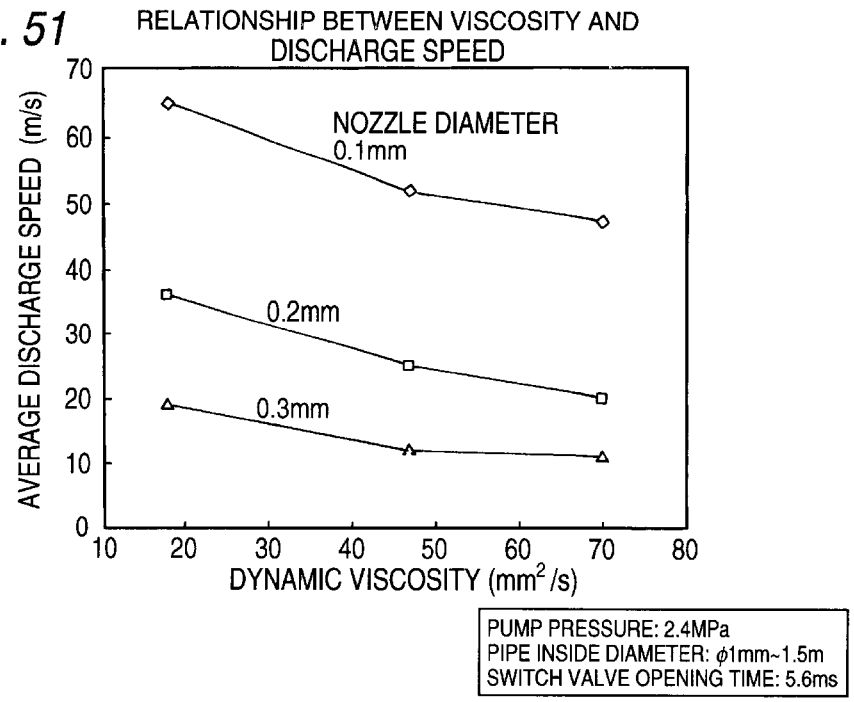
FIG. 51 RELATIONSHIP BETWEEN VISCOSITY AND DISCHARGE SPEED
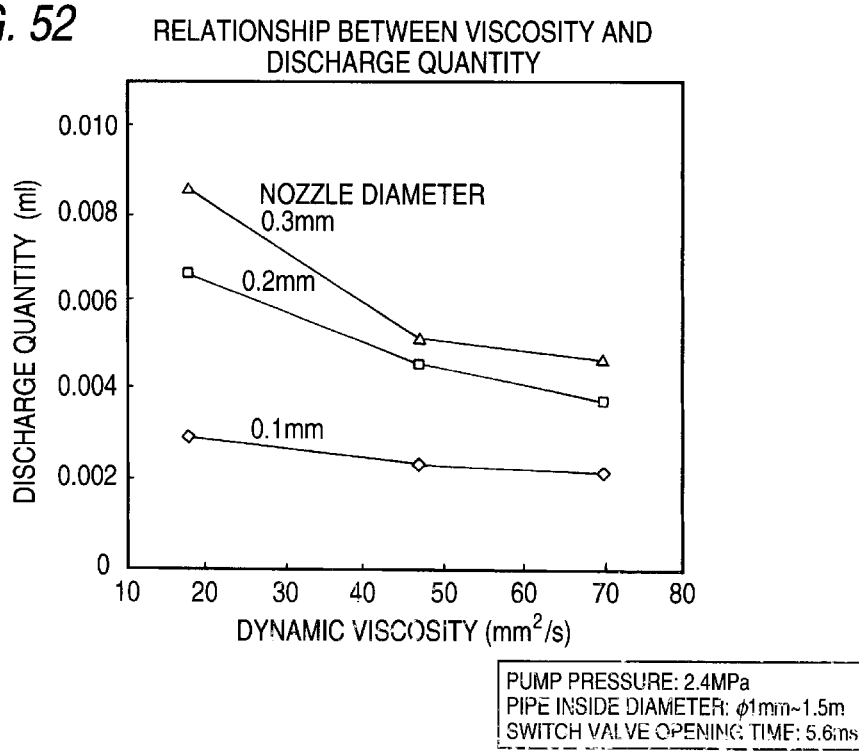
FIG. 52 RELATIONSHIP BETWEEN VISCOSITY AND DISCHARGE QUANTITY

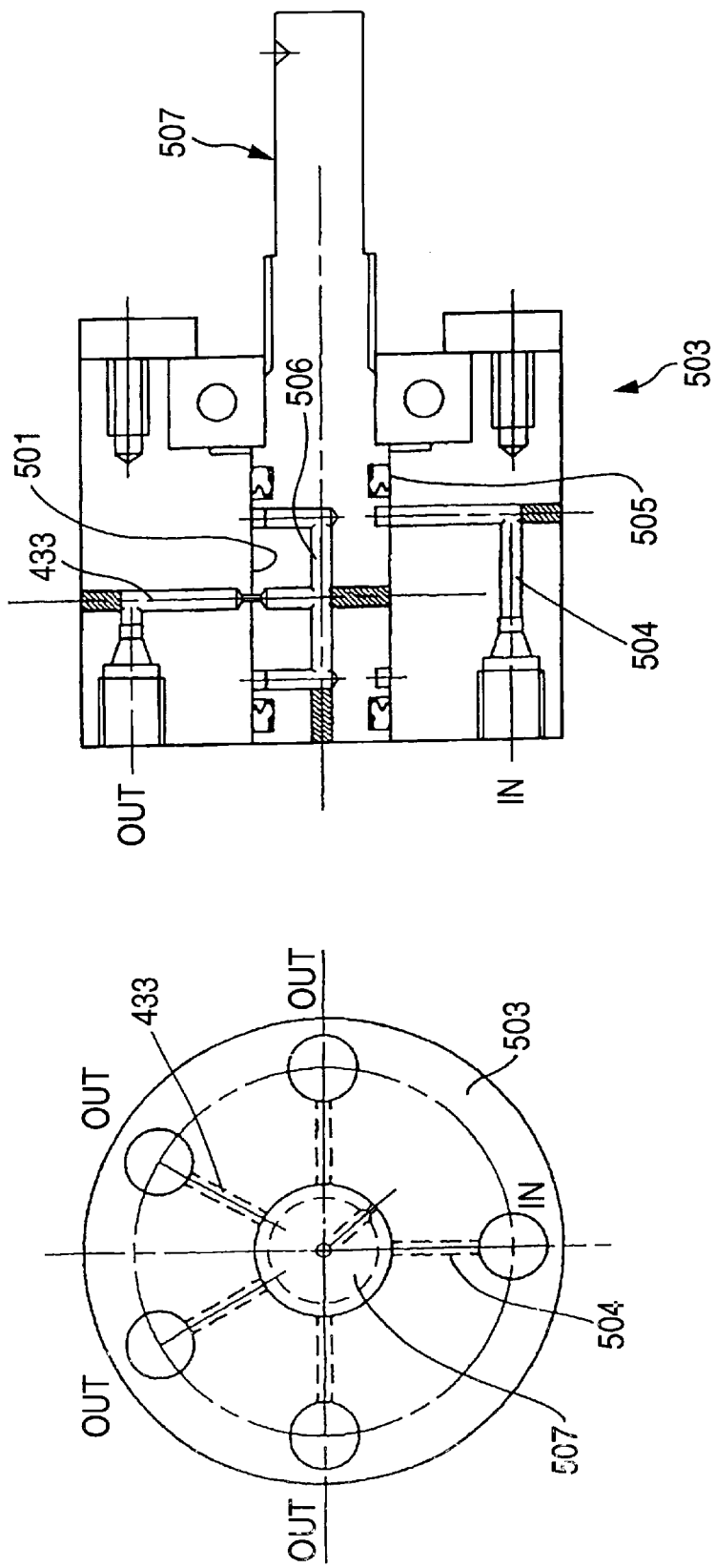

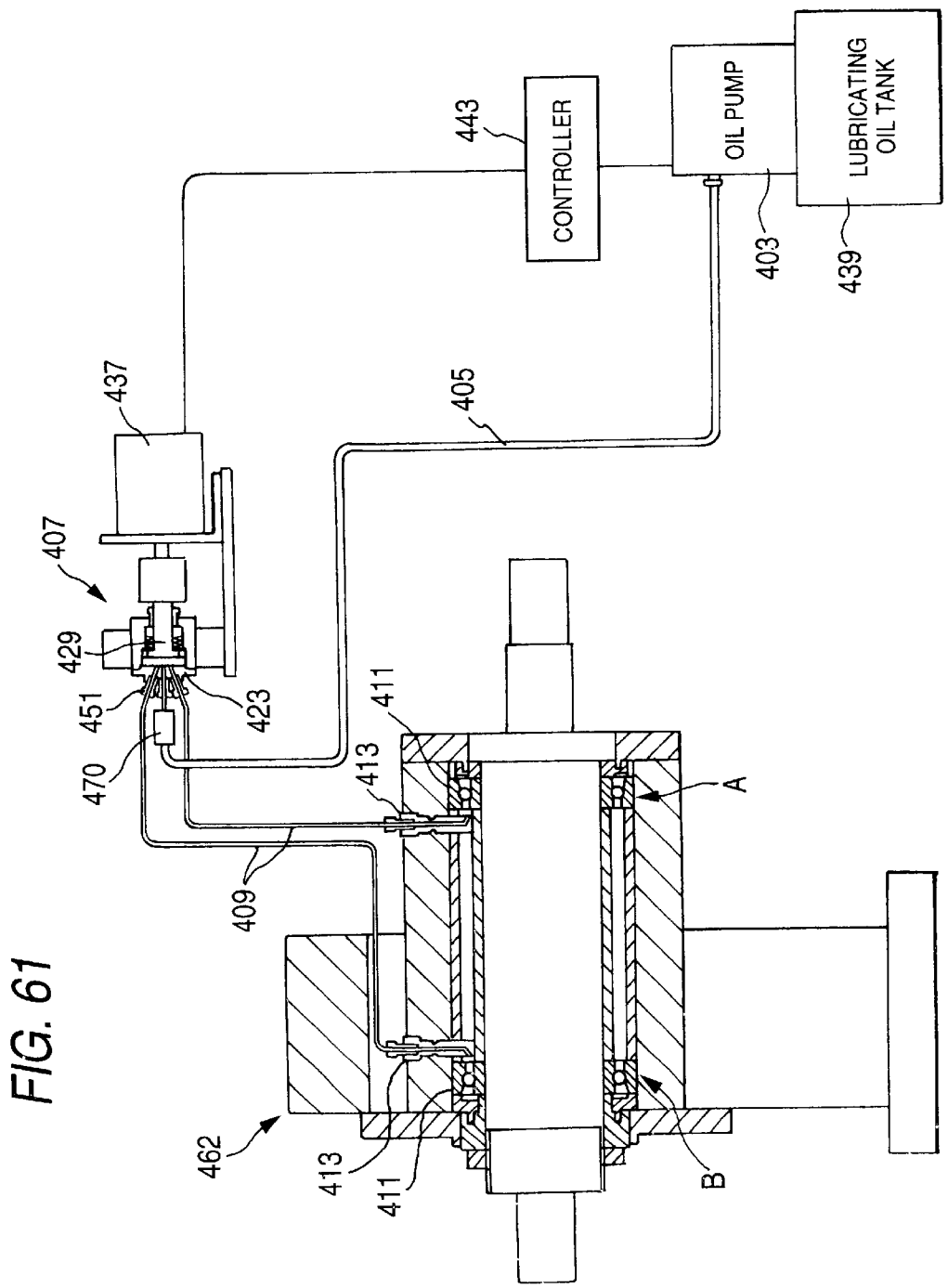

SPINDLE APPARATUS

BACKGROUND OF THE INVENTION

This application is a Continuation-in-Part of U.S. patent application Ser. No. 09/522,909, filed on Mar. 10, 2000.

FIELD OF THE INVENTION

The present intention relates to a lubricating device which discharges lubricating oil to a spindle apparatus provided in various high-speed rotary machines such as a machine tool and, especially, to the bearing of the spindle.

DESCRIPTION OF THE RELATED ART

Conventionally, in lubricating the bearing of a high-speed rotary spindle, normally, there are used lubricating devices of various types such as an oil mist type, an oil-air type, and a jet type.

The lubricating device of an oil mist type comprises an oil tank, a pump, a plunger, a pressure divider, compressed air, an electromagnetic valve, and a nozzle; and, in this device, lubricating oil is turned into a fine mist-like form, it is delivered through an air pipe using the compressed air, and it is jetted out to the interior portion of the bearing.

The lubricating device of an oil-air type comprises an oil tank, a pump, a distributor, a compressed air source, a plunger, and a nozzle; and, in this device, lubricating oil drops (0.01–0.03 ml) adjusted to a given quantity by the mechanical mechanism of the plunger is discharged into an air pipe, is delivered up to the nozzle by the compressed air, and is jetted out to the interior portion of the bearing.

The lubricating device of a jet type is a device which does not use the air source but turns lubricating oil into high pressure one using a high-pressure pump and jets out the high-pressure lubricating oil at a high speed into the interior portion of the bearing from a nozzle of which discharge diameter is narrowed.

By the way, while a current trend requests an increase in the rotation speed of the spindle device, in the lubricating devices of various types used for lubrication of the spindle device, there are found the following problems:

Firstly, in the lubricating device of an oil mist type, due to use of the compressed air, not only there arises a noise problem but also the mist-like lubricating oil scatters into the air to worsen an operation environment. Also, because of the scattering of the mist-like lubricating oil into the air, the quantity of lubricating oil to be supplied to the interior portion of the bearing is indefinite. Especially, in case where the bearing is rotated at a high speed, due to the effect of an air curtain, when dm·N is equal to or larger than 2000000 (dm expresses the pitch circle diameter of the bearing (mm), and N expresses the rotation speed ($min^{-1}$) of the bearing), the lubricating oil can be little supplied to the interior portion of the bearing, thereby raising a fear that the bearing can cause seizure.

In the lubricating device of an oil-air type, similarly to the above-mentioned oil mist type lubricating device, since the compressed air is used, not only there arises a noise problem but also the mist-like lubricating oil scatters into the air to thereby worsen the operation environment. Also, in the high-speed rotation of the bearing, as the result of the rotation of the spindle, there is produced an air curtain. Therefore, similarly, the lubricating oil can be little supplied to the interior portion of the bearing, thereby raising a fear that the bearing can cause seizure.

Also, in the lubricating device of an oil-air type, because it is difficult to supply a fine amount of lubricating oil continuously and stably, the lubricating oil must be supplied intermittently and thus the lubricating oil is supplied at a given quantity (normally, in the range of 0.01–0.03 ml) every given interval time (normally, in the rage of 8–16 min.) into the air pipe. Therefore, since the quantity of lubricating oil to be supplied to the interior portion of the bearing varies every given time, the lubricating condition of the interior portion of the bearing varies all the time and, especially, just after the lubricating oil is supplied, a large quantity of lubricating oil enters the interior portion of the bearing, thereby causing a phenomenon that the torque of the bearing and the temperature of the bearing can vary. There is a fear that this phenomenon can have ill effects on the working precision of a machine tool.

On the other hand, in a lubricating device of a jet type, when compared with the above lubricating devices of oil mist and oil-air types, there is little found the effect of the above-mentioned air curtain but, not only because there is required an attendant device such as a high-pressure pump but also because the quantity of lubricating oil to be supplied to the bearing increases to thereby increase drag resistance, there is necessary a large motor which is used to drive the spindle, which results in the increased cost.

As a device which has solved the difficulty in the above-mentioned fine quantity adjustment of a lubricant, there are known devices which are respectively disclosed in the following patent publications.

That is, in Japanese Patent Examined Publication No. 2-15003 of Heisei, there is disclosed a device for supplying a fine fixed quantity of liquid. In this supply device, a piezo-electric element is used to allow the fine quantity adjustment of the liquid and a lubricant is delivered to a nozzle by compressed air.

In a flow control valve disclosed in Japanese Patent Examined Publication No. 7-65695, a diaphragm is disposed in one end of a magnetostrictive element and an orifice is adjusted by the expansion and contraction of the magnetostrictive element to thereby adjust the flow quantity and pressure of fluid.

In a giant magnetostrictive material pump disclosed in Japanese Patent Unexamined Publication No. 3-222877 of Heisei, the displacement of a giant magnetostrictive material is enlarged by a lever, and a diaphragm is driven by the lever to turn the pressure of the interior portion of the pump into a negative pressure or a positive pressure, thereby sucking or discharging a fluid.

In a magnetic precision pump (Magnetostrictive Pump) disclosed in U.S. Pat. Nos. 4,795,318 and 4,804,314, in the interior portion of a cylinder, there is disposed a piston which is formed of a magnetostrictive material and a voltage is applied to a coil, which is disposed in such a manner that it encloses the piston, to thereby expand and contract the piston so as to discharge a fluid in the interior portion of the cylinder.

In a giant magnetostrictive material type injection-pump disclosed in Japanese Patent Unexamined Publication No. 4-81565 of Heisei, a needle valve is opened and closed by a giant magnetostrictive material to thereby inject a fixed quantity of high-pressure liquid.

However, in the above-mentioned pump using a giant magnetostrictive material or flow control valve, there are found the following problems.

The fine fixed quantity liquid supply device disclosed in Japanese Patent Examined Publication No. 2-15003 of Heisei has not solved yet a drawback caused by delivering the lubricant to the nozzle using the high-pressure air.

In the flow control valve disclosed in Japanese Patent Examined Publication No. 7-65695, the diaphragm area, to which the pressure of the liquid is applied, is larger than the sectional area of the giant magnetostrictive material and the liquid pressure is smaller than the pressure of the giant magnetostrictive material.

In the giant magnetostrictive material pump disclosed in Japanese Patent Unexamined Publication No. 3-222877 of Heisei, since the displacement is enlarged by the lever, the liquid pressure is smaller than the pressure of the giant magnetostrictive material. The output of the giant magnetostrictive material increases as a magnetic field by a coil is increased. However, in case where the coil magnetic field is increased, the required volume of the coil increases accordingly. As a result of this, a device using such coil increases in size.

In the magnetic precision pump disclosed in U.S. Pat. Nos. 4,795,318 and 4,804,314, since the piston itself is made of a drive element, the pressure of the lubricant cannot be made larger than the pressure of the giant magnetostrictive material.

The giant magnetostrictive material type injection pump disclosed in Japanese Patent Unexamined Publication No. 4-81565 of Heisei does not have a function to turn the pressure of the liquid into high pressure.

Further, in the oil-air lubricating method, there is used a fixed-quantity valve which is capable of mixing lubricating oil of the order of 0.01–0.03 ml per shot with air at given time intervals. As an example of the fixed-quantity valve, for example, there is known a valve which is disclosed in JP-B-8-2578U. This type of fixed-quantity valve is conventionally structured such that a fixed quantity of lubricating oil can be stored therein and can be discharged therefrom by making use of the reciprocating motion of a piston; specifically, the lubricating oil is stored in a cylinder disposed on one side of the piston and the lubricating oil is discharged on the opposite side of the piston. To reduce the oil discharge quantity, there can be expected a technique of reducing the diameter and stroke of the piston. However, in the conventional oil-air lubricating method, there are dimensional limits, for example, the sizes of sealing parts such as an O-ring and the size of a return spring, which makes it difficult to reduce the diameter and stroke of the piston. For this reason, it has been believed difficult to discharge a quantity of less than 0.01 ml of lubricating oil.

In addition, since the conventional lubricating apparatus employing the above-mentioned oil-air lubricating method is structured such that a given quantity of lubricating oil is stored therein and is discharged therefrom by use of the reciprocating motion of a single piston, a supply oil quantity per shot is normally large, that is, of the order of 0.03 ml and the lubricating oil is discharged at time intervals of approx. 15 min., thereby raising a problem that the temperature of the constantly rotating bearing can pulsate at the oil shot intervals. Also, in some cases, there are generated whizzing sounds between the rolling bodies and the mixed oil-air. The whizzing sounds between the rolling bodies and the mixed oil-air, when their frequencies are in the range of 2–3 KHz or less, in most cases, provide harsh noises. This raises a problem even in the case of a spindle which does not rotate at a very high speed, that is, when the product (dm·N) of the shaft diameter [mm] and the shaft rotation speed [$min^{-1}$] is 1500000 or less.

On the other hand, regarding a pipe structure for supply of a fine quantity of lubricating oil, FIG. 4 shows a lubricating apparatus of an oil-air type using an air flow as a medium. As the state of connection of the end faces of two housings is shown in FIG. 85A, a pipe passage 902 serving as an oil flow passage formed in a housing is sealed by O-rings 904 which are disposed on the housing end faces. Also, as the state of connection between the nozzle frame 906 and pipe passage 902 is shown in FIG. 85B, oil-air is supplied to the nozzle frame 106 through the pipe passage 902. However, in the case of a fine quantity of lubricating oil being supplied, in a pipe arrangement structure using such O-rings 104, when the lubricating oil is jetted out, the volume of the interior portion of the pipe passage is caused to vary due to the elastic deformation of the O-rings 904, which makes it impossible to supply a given quantity of lubricating oil.

SUMMARY OF THE INVENTION

The present invention airs at eliminating the drawbacks found in the above-mentioned circumstances. Accordingly, it is an object of the invention to provide a lubricating device which injects a high-precision set fine quantity of lubricant onto the lubricating surface of a rotary body at a high speed to thereby minimize an increase in torque and bearing temperature so as to be able not only to provide high torque stability and reduce the generation of noises but also to reduce the size and cost thereof, and a spindle apparatus using such lubricating device.

In attaining the above object, according to the invention, there is provided a spindle apparatus comprising a shaft, at least two bearings disposed spaced apart from the shaft in the axial direction of the shaft, each of the bearings having an inner race fitted with the shaft, and a housing fitted with the outer races of the bearings, with the inner races and outer races of the bearings being rotatable with respect to each other with rolling elements between them, the spindle apparatus further including: a lubricating device for supplying lubricating oil to the bearings at a discharge speed in the range of 10 m/sec.–100 m/sec. and in a fine discharge oil quantity in the range of 0.0005 ml/shot–0.01 ml/shot.

According to the above structure, since the discharge speed of the lubricating oil to be discharged from the nozzle is high, that is, 10 m/sec–100 m/sec., the lubricating oil can be supplied to the interior portion of the bearing positively without being influenced by an air curtain which can occur in the high-speed rotation. Also, because the discharge quantity of the lubricating oil is fine, that is, in the range of 0.0005 ml/shot–0.01 ml/shot, an increase in the temperatures of the bearings can be controlled down to a low level. Further, since there are not used attendant devices including a high-pressure pump such as a jet type, there is eliminated an increase in drag resistance which could be caused due to an increase in the quantity of the oil supplied to the bearings, so that, as a motor for driving the spindle, there can be used a motor which is inexpensive and compact.

Also, in addition to the above structure, there may be disposed a shaft rotation speed detector (tachometer) for detecting the shaft rotation speed. In this case, by controlling the supply interval and supply quantity of the lubricating oil discharged from the lubricating device based on the detect results of the shaft rotation speed detector (tachometer), a proper oil quantity of lubrication is possible with respect to the spindle rotation regardless of the spindle rotation speed, so that an ideal lubricating condition can be always obtained in the interior portion of the bearing. Also, the increase in the bearing temperature can also be controlled down to a further lower level. Further, since the lubricating oil is supplied to the interior portion of the bearing positively, a lubricating oil supply efficiency can be enhanced and the lubricating oil consumption can be reduced. Moreover, since compressed air supplied by a compressor is not used as in the lubricating device of an oil mist system or an oil-air system, the noise level is low and the oil mist can be little produced.

And, in addition to the above structure, there may be disposed a lubricating oil filter, an air bleeding sensor, and a clogging detect pressure sensor. In this case, there can be avoided troubles such as a clogged condition.

Further, in addition to the above structure, there may be disposed a multi-branch piping device (a multi-distribution mechanism) between a superfine quantity oil lubricating pump and the nozzle, for distributively supplying lubricating oil from the superfine quantity oil lubricating pump to the plurality of bearings, so that the lubricating oil is supplied to each bearing from the multi-branch piping device.

With this structure, the lubricating oil supplied from the superfine quantity oil lubricating pump is distributively supplied to each bearing stably without reducing the discharge speed and the discharge quantity, and without causing vibrations of the discharge speed and the discharge quantity. Further, this structure provides a supply of the lubricating oil for the spindle apparatus having a plurality of bearings with only a lubricating apparatus.

That is, according to the present spindle lubricating apparatus, thanks to the multi-distribution mechanism, not only a fine quantity of lubricating oil can be distributively supplied to the plurality of bearings at the discharge speed of 10 m/sec.–100 m/sec. in a discharge quantity of 0.0005 ml/shot–0.01 ml/shot accurately and stably, but also the structure of the spindle lubricating apparatus can be made simple and compact. Therefore, an ideal lubricating state can be always obtained in each of the bearings, the stability of the bearing torque can be enhanced, and an increase in the bearing temperature can be controlled down to a low level.

Also, the multi-distribution mechanism includes a distribution housing having such a number of lubricating oil supply holes as to corresponds to the number of distribution of the lubricating oil, a rotor valve which can be rotatably contacted with the distribution housing to thereby bring a flow passage into communication with the lubricating oil supply holes sequentially, and a motor for rotating the rotor valve.

More specifically, in the distribution housing, the lubricating oil supply holes are disposed in a circular ring manner, and a center flow passage is formed in the center of this circular ring. The rotor valve has a groove serving as a flow passage in such a manner that it extends from the center of rotation thereof up to a diameter position larger than a pitch circle diameter (PCD) at the positions of the lubricating oil supply holes.

According to this structure, in case where the rotor valve is rotated, the center flow passage and lubricating oil supply holes of the distribution housing are allowed to communicate with each other by the groove of the rotor valve sequentially, so that the lubricating oil can be supplied to the respective lubricating oil supply holes.

Also, the distribution housing may also be structured such that such a number of longitudinal holes as to corresponds to the number of bearings (number of distributions) are formed in the radial direction thereof and lubricating oil supply holes are formed so as to extend from the thrust direction thereof as well as be in phase with and penetrate through the longitudinal holes.

According to this structure, when the center flow passage and lubricating oil supply holes of the distribution housing are made to communicate with each other, the lubricating oil can be supplied to the radial-direction longitudinal holes.

Further, the distribution housing may also be structured in the following manner: that is, such a number of lubricating oil supply holes as to corresponds to the number of bearings (number of distributions) are formed such that they can be made to communicate with the groove formed in the rotor valve from a direction oblique with respect to the axial direction of the distribution housing.

According to this structure, since the lubricating oil supply holes are formed in the oblique direction with respect to the axial direction of the distribution housing, the projecting amount of the distribution housing in the radial direction is reduced, thereby being able to provide a structure which is excellent in space efficiency.

And, the multi-distribution mechanism may also be composed of a distribution housing having such a number of lubricating oil supply holes as corresponds to the number of distributions, a rotor valve which can be rotatably contacted with the distribution housing to thereby bring a flow passage into communication with the lubricating oil supply holes sequentially, a shaft for rotationally driving the rotor valve, a spring member for energizing the shaft toward the rotor valve side, and a thrust bearing for supporting the shaft in a freely rotatable manner.

According to this structure, while reducing the rotation resistance by the thrust bearing, the elastic compression force of the spring member can prevent the lubricating oil from leaking from the contact portions between the rotor valve and distribution housing, so that the lubricating oil can be positively supplied from the groove of the rotor valve to the lubricating oil supply holes of the distribution housing.

By the way, the oil supply quantity to the interior portion of the bearing, in case where $d_m \cdot N$ is equal to or larger than 1000000, preferably, may be in the range of 0.0005 ml/min.–0.12 ml/min., and, more preferably, in the range of 0.003 ml/min.–0.12 ml/min.

Also, the inside diameter of the nozzle outlet, preferably, may be in the range of 0.08 mm–0.6 mm and, more preferably, in the range of 0.1 mm–0.5 mm.

Further, a ratio of the length L (mm) of the pipe up to the nozzle to the pipe diameter d (mm), preferably, may be $5 \leq L/d^4 \leq 12000$ mm$^{-3}$, and, more preferably, $5 \leq L/d^4 \leq 10000$ mm$^{-3}$.

Still further, according to another aspect of the invention, there is provided a lubricating device which uses a magnetostrictive pump including a pump chamber for pressurizing lubricant by means of the expanding and contracting operations of a rod body formed of magnetostrictive material to be executed by applying a magnetic field to the rod body and removing the magnetic field therefrom, thereby discharging the pressurized lubricant, the lubricating device comprising: a check valve disposed in the intermediate portion of a flow passage for supplying the lubricant to the magnetostrictive pump to prevent the lubricant from flowing out from the magnetostrictive pump, and a nozzle disposed on the lubricating discharge side of the magnetostrictive pump and having a flow passage sectional area smaller than the lubricant flow passage sectional area of the check valve.

According to the present lubricating device, the rod body can be expanded due to the application of the magnetic field, and the lubricant within the magnetostrictive pump can be thereby compressed. Due to the compression of the lubricant, the pressure of the flow passage for supplying the lubricant is increased, the check valve is closed, and the lubricant is discharged externally at a high speed from the nozzle. In case where the magnetic field application is cut off, the rod body is contracted to thereby increase the internal capacity of the pump, so that the lubricant is supplied into the pump through the check valve. In this operation, the air also flows in from the leading end of the nozzle. However, since the flow-in quantity ratio of the lubricant to the air is proportional to the square of the flow passage sectional area ratio of the check valve to the nozzle, the flow-in quantity of the lubricant becomes larger than that of the air, so that, in the next operation as well, the lubricant can be discharged similarly.

Further, according to the above lubricating device, the one end side of the rod body is fixed, a piston is connected to the other end side of the rod body, and the piston is slidably disposed within a cylinder to thereby form a pump chamber, while the cross sectional area of the inner surface of the cylinder is set smaller than the cross sectional area of the rod body.

In the present lubricating device, due to the expansion and contraction of the rod body, the piston within the cylinder is moved to thereby form the pump. And, the pressure of the lubricant within the cylinder is higher than the pressure generated by the rod body, which makes it possible to discharge the lubricant at a high speed.

Also, in the lubricating device, the decreased area of the pump chamber due to the expansion of the rod body is set equal to the sum of the quantity of the air flowing in from the nozzle when the rod body is contracted, a decreased volume due to compression of the lubricant that is present within the internal capacity between the check valve and the outlet of the nozzle, the increased capacity of the internal capacity due to the pressure deformation of parts forming the internal capacity, and a required discharge quantity of lubricant.

In the lubricating device, the magnetic field to be applied to the rod body is controlled while correcting it using values with variable elements taken into account, while the variable elements respectively relate to the quantity of air flowing in from the nozzle, the decreased volume due to the compression of the lubricant, and the increased capacity of the internal capacity due to the pressure deformation of parts forming the internal capacity. This can avoid a discharge quantity error which could otherwise be caused by the variable elements, so that a desired discharge quantity can be obtained with high accuracy.

Further, in the lubricating device, the magnetostrictive pump includes a coil for applying a magnetic field and a control device for controlling a current to be supplied to the coil to thereby expand and contract the rod body; and, the control device, in the initial excitation stage of the coil, supplies a current until the lubricant within the pump chamber reaches such a pressure as to allow the magnetostrictive pump to obtain a desired discharge speed, after reaching this pressure, supplies a current for maintaining the pressure of the lubricant constant according to the discharge quantity of the lubricant, and further, after a desired lubricant discharge quantity is obtained, cuts off the supply current.

According to the present lubricating device, when the current is supplied to the coil from the control device, the rod body is expanded to thereby allow the piston to compress the lubricant within the pump chamber. As a result of this, the pressure within the cylinder is increased, the suction valve is closed, and the lubricant is thereby discharged externally at a high speed from the nozzle. At the then time, the control device, for example, in the initial excitation stage of the coil, supplies a current to the coil until the current reaches such a current value for the magnetostrictive pump as to be able to obtain a desired discharge speed, that is, the control device raises the current up to this current value quickly. During this, a high voltage is applied to the coil to thereby raise the current quickly against the time constant of the coil. And, after reaching the current value to be able to obtain the desired discharge speed, in order to maintain the pressure of the lubricant which decreases according to the discharge quantity of the lubricant constant, the control device supplies the current in such a manner that the capacity of the cylinder decreases by a capacity equal to the discharge quantity of the lubricant. During this, due to the time constant of the coil, the voltage is switched over to a voltage which can obtain a desired current increasing speed. Next, after the desired lubricant discharge quantity is obtained, the supply current to the coil is cut off. Thanks to this, a required lubricant pressure can be obtained in and from the early discharge stage of the lubricant and, after the start of discharge of the lubricant, the discharge speed can be maintained constant, so that the discharge of the lubricant can be carried out accurately and stably. Also, when the current is cut off, the rod body is contracted to thereby increase the internal capacity of the pump chamber, so that the lubricant can be supplied into the pump chamber through the suction valve.

Also, the above lubricating device further includes a measuring device for measuring any one of the value of a current to be supplied to the coil, a voltage value proportional to this current, and the value of a magnetic flux caused by this current; and, an abnormal condition judging device for comparing a measured value with respect to an elapsed time measured by the measuring device with a measured value in a normal condition time to thereby judge whether an abnormal condition has occurred or not, whereby, when the abnormal condition judging device judges that an abnormal condition has occurred, the lubricating device issues an abnormal signal.

According to the present lubricant device, for example, assuming that a target to be measured is a current value, in case where a current value measured at the time when a certain time has passed after the start of the supply of a current is larger than a current value (a design value) in a normal operation time, that is, in case where a time required for a current to increase up to a certain current value is shorter than a design value, it can be judged that an abnormal condition such as the clogged condition of the nozzle has occurred. On the other hand, in case where the current value measured at the time when a certain time has passed after the start of the supply of the current is smaller than the design value, that is, in case where the time required for the current to increase up to a certain current value is longer than the design value, it can be judged that an abnormal condition such as lubricant leakage has occurred. Also, assuming that the target to be measured is a voltage value or a magnetic flux value, an abnormal condition can be judged similarly. And, by issuing the abnormal signal at the time when the abnormal condition occurs, feedback control can be carried out, for example, the operation of the supply target of the lubricant can be stopped.

Further, the above-mentioned lubricating device further includes a measuring device for measuring any one of the value of a current to be supplied to the coil, a voltage value proportional to this current, and the value of a magnetic flux caused by this current; and, an air mixture judging device for comparing a measured value with respect to an elapsed time measured by the measuring device with a measured value in an air non-mixture time to thereby judge whether the air is mixed or not, whereby, in the start of the operation of the lubricant device, until the air mixture judging device judges that the air is not mixed, the lubricant device increases the current to be supplied to the coil or increases the supply frequency of the current.

According to the present lubricating device, assuming that the target to be measured is a currents in case where the air is mixed into the lubricant, the rising time of the current to be measured is long, which makes it possible to judge the presence or absence of the mixed air. Also, assuming that the target to be measured is a voltage value or a magnetic flux value, an abnormal condition can be judged similarly. And, in the start of the operation of the lubricating device, until it is judged that the mixed air is not present, by increasing the current to be supplied to the coil or by increasing the supply frequency of the current, or by increasing both the current and the supply frequency of the current, the discharge quantity and discharge cycle of the magnetostrictive pump can be increased, so that the lubricant can be quickly sucked into the pump from the tank and the air bleed can be completed in a short time.

To sum up the above facts, by using the super fine quantity oil lubricating system, a lubricating oil forced circulating device, a heat exchanger, a lubricating oil collecting device, and other attendant devices such as compressed air, which are used in the conventional lubricating systems such as a lubricating system of an oil mist, a lubricating system of an oil-air type and a lubricating system of a jet type, can be simplified; the noise level can be controlled down to a low level, which can be consideration for environment. And, the consumption of the lubricating oil can be reduced, the bearing torque can be enhanced in stability, and the bearing temperature increase can be controlled down to a low level, thereby being able to enhance the rotation accuracy of the spindle. Therefore, according to the present invention, there can be provided a spindle apparatus which is more advantageous than the conventional spindle apparatus using the related lubricating methods.

Further, the lubricating apparatus for discharging a fine quantity of lubricating oil from a nozzle directly to the interior portion of a bearing at given time intervals at a high speed, may includes: a pump having a larger discharge quantity than that from the nozzle; and, a switch valve interposed between oil pipes for connecting together the pump and nozzle and structured such that, in case where a discharge oil pressure from the pump is less than a given pressure, it shuts off the oil pipes to thereby stop the discharging of the lubricating oil from the nozzle, in case where the discharge oil pressure from the pump is equal to or more than the given pressure, it opens the oil pipes to thereby allow the lubricating oil supplied from the pump to be discharged from the nozzle for a given period of time, and it is capable of repeating the execution of this series of operations.

According to the present lubricating apparatus, in case where a discharge oil pressure from the pump is less than a given pressure, the switch valve shuts of f the oil pipes to thereby stop the discharging of the lubricating oil from the nozzle and, on the other hand, in case where the discharge oil pressure from the pump is equal to or more than the given pressure, the switch valve opens the oil pipes to thereby allow the lubricating oil supplied from the pump to be discharged from the nozzle for a given period of time. Therefore, without using an expensive fine quantity lubricating pump using an electromagnet or a giant-magnetostrictive material, a sufficient discharge speed can be obtained using an inexpensive pump and thus, in a spindle which is rotated at a high speed, stable lubricating characteristics, that is, enhanced seizure resistance and reduced torque variations can be realized. Also, it is possible to eliminate the generation of the whizzing noises of the rolling bodies that raises a problem in the conventional oil-air and oil mist lubricating methods. Further, in the portion of the pipe that extends up to the switch valve, there can be used a resin-made pressure resisting tube, which can enhance the design freedom of the pipe arrangement.

And, in the lubricating apparatus, preferably, the discharge quantity of lubricating oil to be discharged from the nozzle per shot may be in the range of 0.0001–0.01 ml.

In the lubricating apparatus, since the discharge quantity of lubricating oil to be discharged from the nozzle per shot is set larger than 0.0001 ml, it is possible to prevent the lowered flow speed of the lubricating oil which could be caused under the great influence of the compression characteristic of the lubricating oil, the pressure deformation of the pipes, and the response characteristic of the switch valve; that is, a sufficient flow speed can be obtained. Also, since the discharge quantity of lubricating oil to be discharged from the nozzle per shot is set smaller than 0.01 ml, torque variations occurring in the bearing can be prevented.

Also, the discharge speed of the lubricating oil to be discharged from the nozzle, preferably, may be set equal to or more than 10% of the peripheral speed of the inner ring of the bearing.

According to the thus structure, since the discharge speed of the lubricating oil to be discharged from the nozzle is set equal to or more than 10% of the peripheral speed of the inner ring of the bearing, there can be secured a discharge speed necessary for the lubricating oil to reach the interior portion of the bearing. As a practical advantage, the lubricating apparatus can use an inexpensive oil pressure pump having a pump pressure of the order of 2.5 MPa.

Further, the opening time of the switch valve may be preferably set in the range of 0.1–50 ms.

With the above structure, a required discharge quantity of 0.0001–0.01 ml can be satisfied. That is, in case where the pump pressure, lubricating oil and pipes are set according to the following expressions, the relationship between the opening time t of the switch valve and discharge quantity can be determined and thus the opening time t of the switch valve, which is requested to meet the required discharge quantity of 0.0001–0.01 ml, can be set in the range of 0.1–50 ms.

$$v=Cd \cdot (2(p-\Delta p)/\rho)^{0.5}$$

$$q=v \cdot \pi d^2 \cdot t/4$$

$$\Delta p=32 \cdot \mu \cdot L \cdot d^2 v/D^4$$

where, Cd expresses a flow coefficient, p: a pump pressure (Pa), $\Delta p$: a pressure loss (Pa), $\rho$: a lubricating oil density (kg/m$^3$), d: a nozzle diameter (m), t: the opening time (s) of the switch valve, $\mu$: a lubricating oil viscosity coefficient (Pa·s), L: a pipe length (m), and D: a pipe inside diameter (m), respectively Also, the lubricating apparatus may also be structured such that the switch valve includes a fixed member having a fixed sliding contact surface and a rotary member which has a movable sliding contact surface to be closely contactable with the fixed sliding contact surface and rotates the movable sliding contact surface in sliding contact with the fixed sliding contact surface about an axial line perpendicular to the fixed sliding contact surface. In the fixed sliding contact surface of the fixed member, more specifically, on the circumference of the fixed sliding contact surface with the axial line as the center thereof, there are opened up a discharge hole to be connected to the pump and an oil feed hole to be connected to the nozzle. And, in the movable sliding contact surface of the rotary member, more specifically, on the circumference of the movable sliding contact surface with the axial line as the center thereof, there is formed an arc-shaped slit having a center angle larger than at least a center angle formed between the discharge hole and oil feed hole.

According to the thus-structured lubricating apparatus, in case where the rotary member of the switch valve is rotated with respect to the fixed member thereof and the arc-shaped slit formed in the movable sliding contact surface of the rotary member is matched to the discharge hole and oil feed hole respectively formed in the fixed sliding contact surface of the fixed member, the discharge hole and oil feed hole are allowed to communicate with each other through the arc-shaped slit. Therefore, only while the discharge hole and oil feed hole are both matched to the arc-shaped slit at the same time, the switch valve is opened (the oil pipes are opened), so that the lubricating oil from the pump can be discharged from the nozzle for a given period of time.

Also, the lubricating apparatus may be structured such as to have: a motor for rotating the rotary member; a pressure switch for detecting the discharge oil pressure of the pump; and, a controller which sends a drive signal to the pump, on receiving a detect signal from the pressure switch issued when the discharge oil pressure is equal to or more than a given pressure, sends a one-rotation drive signal to the motor, after then, sends a drive stop signal to the pump, and is capable of repeating the execution of this series of operations at given time intervals.

According to the thus-structured lubricating apparatus, in case where the pump is switched on by the controller, the oil pressure is raised; and, in case where the controller detects through the pressure switch that the oil pressure is equal to or higher than a given pressure, the controller rotates the motor once and, after then, the controller switched off the pump. This series of operations are executed repeatedly at given time intervals by the controller, whereby the lubricating oil from the pump can be discharged from the nozzle at given time intervals.

Also, the lubricating apparatus may be structured as follows. That is, the switch valve includes a fixed member having a fixed sliding contact surface and a rotary member which has a movable sliding contact surface closely contactable with the fixed sliding contact surface and rotates the movable sliding contact surface in sliding contact with the fixed sliding contact surface about an axial line perpendicular to the fixed sliding contact surface. In the fixed sliding contact surface of the fixed member, more specifically, on the circumference of the fixed sliding contact surface with the axial line as the center thereof, there are opened up a plurality of oil feed holes to be connected to the nozzle and, at the position of the axial line, there is opened up a discharge hole connected to the pump; and, in the movable sliding contact surface of the rotary member, there is formed a slit in such a manner that it extends from the axial line position along the radial direction of the rotary member up to the position of the oil feed hole.

According to the thus-structured lubricating apparatus, in case where the rotary member of the switch valve is rotated with respect to the fixed member thereof and the slit formed in the movable sliding contact surface of the rotary member is matched to the oil feed hole formed in the fixed sliding contact surface of the fixed member, the switch valve is opened (the oil pipes are opened), with the result that the lubricating oil from the pump can be discharged from the nozzle for a given period of time. In this case, since the plurality of oil feed holes are formed on the circumference of the fixed sliding contact surface, each time the rotary member is rotated, the lubricating oil from the discharge hole is supplied to the respective oil feed holes, that is, one rotation of the rotary member can supply the lubricating oil to a plurality of portions.

And, the lubricating apparatus may be structured in the following manner. That is, the switch valve includes a fixed member having a fixed sliding contact surface and a slide member which has a movable sliding contact surface closely contactable with the fixed sliding contact surface and reciprocates the movable sliding contact surface in the linear direction in sliding contact with the fixed sliding contact surface with respect to the fixed sliding contact surface. In the fixed sliding contact surface of the fixed member, there are opened up a plurality of discharge holes to be connected to the pump in such a manner that they are spaced from each other in the linear direction; and, in the movable sliding contact surface of the slide member, there are opened up a plurality of oil feed holes to be connected to the nozzle in such a manner that they are arranged in-the linear direction at the same intervals as the discharge holes.

According to the thus-structured lubricating apparatus, in case where the fixed member and slide member are reciprocated in the linear direction in sliding contact with each other and the plurality of discharge holes formed in the fixed sliding contact surface of the fixed member and the plurality of oil feed holes formed in the movable sliding contact surface of the slide member are allowed to communicate with each other or are shut off from each other at the same time, the lubricating oil from the pump can be discharged from the nozzle for a given period of time. That is, according to this lubricating apparatus, since the slide member is reciprocated in the linear direction in a sliding contact manner, a movable member of a solenoid serving as a drive source and a linear drive device such as a cylinder can be used as they are.

Still further, the lubricating apparatus may be structured in the following manner. That is, the switch valve includes: a cylindrical-shaped stator having a fixed sliding contact surface on the inner peripheral surface thereof; and, a rotor which has a rotary sliding contact surface to be closely contacted with the fixed sliding contact surface and rotates while the rotary sliding contact surface is in sliding contact with the fixed sliding contact surface. In the fixed sliding contact surface of the stator, there are opened up a plurality of oil feed holes to be connected to the nozzle in such a manner that they are spaced from each other in the inner peripheral circle direction; and, in the rotary sliding contact surface of the rotor, there are formed a plurality of discharge holes to be connected to the pump in such a manner that they are arranged in the outer peripheral circle direction at the same intervals as the oil feed holes.

According to the thus-structured lubricating apparatus, in case where the rotor is rotated within the stator and the plurality of oil feed holes formed in the fixed sliding contact surface of the stator are matched to the plurality of discharge holes formed in the rotary sliding contact surface of the rotor, the lubricating oil from the pump can be discharged from the nozzle for a given period of time. The stator and rotor can be structured in a movable fit manner, so that high-speed switching can be realized easily using low torque. For example, a rotary solenoid using a permanent magnet and an electromagnet can be used, a high-speed response characteristic can be obtained, a drive circuit can be simplified when compared with an ordinary motor, and the reduced cost of an actuator can be realized.

Moreover, the lubricating apparatus according to the present invention may includes: a pump for switching on and off the pressure of oil to be discharged to a hydraulic main pipe; a discharge cylinder in which a discharge piston is mounted, an oil supply chamber is formed on one end side of the discharge piston in the moving direction thereof, and a hydraulic chamber to be connected to the hydraulic main pipe is formed on the other end side of the discharge piston, while the discharge piston is disposed so as to be energized toward the hydraulic chamber side by spring means; a three-way valve connected to the hydraulic main pipe, an oil supply passage to be connected to the oil supply chamber, and an oil storage passage, for allowing the hydraulic main pipe and oil storage passage to communicate with each other when the oil pressure is switched on and, on the other hand, when the oil pressure is switched off and the oil pressure from the oil storage passage is given to the three-way valve, for allowing the oil storage passage and the oil supply passage to communicate with each other; and, an oil storage cylinder in which an oil storage piston is mounted and, on one end side of the oil storage piston in the moving direction thereof, there is formed an oil storage chamber to be connected to the oil storage passage, while the oil storage piston is disposed so as to be engergized toward the oil storage chamber side by spring means.

According to the present lubricating apparatus, since the discharge cylinder and oil storage cylinder are disposed separately, when compared with the conventional lubricating apparatus in which oil is stored within a cylinder disposed on one side end of a single piston and the oil is discharged on the opposite side, the limits on the dimensions of the seal member and return spring can be reduced, which can facilitate the reduction of the diameters of the discharge cylinder and oil storage cylinder. Also, due to provision of two pistons, the oil operation area of the discharge piston can be set larger than the oil pressurizing area, so that the discharge piston can be pushed with a large force and thus a high-speed stroke can be realized. As a result of this, when compared with a lubricating apparatus using an electromagnet or a giant-magnetostrictive material, a fine quantity of the order of 0.001 ml of oil can be discharged at a high speed using a low-cost and simple structure.

And, the lubricating apparatus may also be characterized in that, when the discharge port is closed and the oil pressure of the hydraulic main pipe is on, the oil pressure of the oil supply chamber becomes larger than the oil pressure of the hydraulic chamber.

According to the present lubricating apparatus, when the discharge port is closed and the oil pressure of the hydraulic main pipe is on, the oil pressure of the oil supply chamber becomes larger than the oil pressure of the hydraulic chamber, thereby being able to discharge oil at a high speed. That is, in the conventional lubricating apparatus using a single piston, due to the influence of the return spring for energizing the piston, the oil discharge pressure depending on the restitutive force of the return spring is always lower than the oil supply pressure obtained when the return spring is compressed. However, in the present lubricating apparatus, the oil pressure of the oil supply chamber (that is, oil discharge pressure) can be increased, with the result that discharging of oil at a high speed can be realized.

Also, the lubricating apparatus may also be structured such that, on the hydraulic chamber side of the discharge cylinder, there is mounted a drive piston movable by the oil of the hydraulic chamber to thereby push and drive the discharge piston, and the oil operation area of the drive piston is larger than the oil pressurizing area of the discharge piston.

According to the present lubricating apparatus, since the oil operation area of the drive piston is larger than the oil pressurizing area of the discharge piston, in case where the oil pressure from the hydraulic main pipe is applied to the drive piston, the discharge piston can be driven with a large force. Thanks to this, the high-speed stroke of the discharge piston can be realized and thus oil can be discharged from the discharge cylinder at a high speed.

Further, the lubricating apparatus may also be structured such that, between the discharge piston and drive piston, there is formed an idling section where the drive piston can be moved in a direction to approach the discharge piston.

According to the present lubricating apparatus, in case where the oil pressure from the hydraulic main pipe is applied to the drive piston, the drive piston is allowed to move the idling section by itself with no contact with the discharge piston. That is, without a start load which is otherwise generated in the start time of the drive piston due to its contact with the discharge piston, the drive piston is able to start under small movable resistance. Thanks to this, while the drive piston is moving in the idling section, the pressure of the oil pressure pump is raised up to a sufficient level, and there is generated inertia in the drive piston, so that the discharge piston can be driven with a large and high-speed force.

And, the lubricating apparatus may also be structured such that an umbrella valve is mounted in the three-way valve; and, the umbrella valve is structured such that, when the oil pressure is switched on, the main body of the umbrella valve closes the oil supply passage and a flexible umbrella piece disposed on the outer periphery of the umbrella valve main body is reduced in diameter to thereby allow the hydraulic main pipe and oil storage passage to communicate with each other and, on the other hand, when the oil pressure is switched off and the umbrella valve receives the oil pressure from the oil storage passage, the umbrella valve main body is moved in a direction to open the oil supply passage and the flexible umbrella piece is enlarged in diameter to thereby allow only the oil storage passage and oil supply passage to communicate with each other.

According to the present lubricating apparatus, in case where the oil pressure of the hydraulic main pipe connected to the three-way valve is switched on, the umbrella valve main body closes the oil supply passage and the flexible umbrella piece disposed on the outer periphery of the umbrella valve main body is reduced in diameter due to the present oil pressure, thereby allowing the hydraulic main pipe and oil storage passage to communicate with each other. Therefore, oil from the hydraulic main pipe reaches the oil storage cylinder through the oil storage passage, moves the oil storage piston against the energizing force of spring means for energizing the oil storage piston, and then flows into the oil storage chamber of the oil storage cylinder. That is, storage of the oil into the oil storage cylinder is completed. On the other hand, in case where the oil pressure of the hydraulic main pipe is switched off, the diameter reduced state of the flexible umbrella piece due to the oil pressure is removed and thus the flexible umbrella piece is enlarged in diameter, thereby shutting off the hydraulic main pipe and oil storage passage from each other. At the same time, due to the returning energizing force of the spring means for energizing the oil storage piston, the umbrella valve main body receives the oil pressure from the oil storage passage is thereby moved in a direction to open the oil supply passage. As a result of this, only the oil storage passage and oil supply passage are allowed to communicate with each other and the oil stored in the oil storage chamber is supplied through the oil storage passage and oil supply passage and is filled into the oil supply chamber of the discharge cylinder, thereby completing the preparation for the next discharging operation.

Also, the lubricating apparatus may also be structured such that, with the three-way valve, there is threadedly engaged an air bleeding plug for moving the umbrella valve in a direction to open the oil supply passage, or a stop plug in such a manner it can be removed from the three-way valve.

According to the present lubricating apparatus, on the three-way valve, there is disposed the air bleeding plug which can move the umbrella valve in a direction to open the oil supply passage. This air bleeding plug is used to deflate air within the portion of the pipe existing upstream of the oil supply passage. In order to be able to discharge a fine quantity of oil, it is important that the air within the pipe can be deflated completely. That is, in case where the oil discharge quantity is very small, it is difficult to deflate the air within the pipe only by repeating normal oil dischargings. Therefore, in case where the air bleeding plug having a fine pin in the leading end thereof is threadedly engaged with the three-way valve and oil when the oil pressure pump is switched on due to the movement of the umbrella valve is forced to flow into the oil supply passage, the air bleeding can be achieved simply. After completion of the air bleeding, the air bleeding plug is replaced with the stop plug and a normal operation is executed.

Also, the lubricating apparatus may also be structured such that lubricating oil of 0.0005–0.01 ml per shot is directly jetted to a rolling bearing at the discharge speed of 10% or more of the peripheral speed of the inner ring of the rolling bearing.

According to the present lubricating apparatus, a quantity of 0.0005–0.01 ml per shot of lubricating oil is directly jetted to the rolling bearing at the discharge speed of 10% or more of the inner ring peripheral speed of the rolling bearing. In lubrication of the rolling bearing, the discharge speed necessary for the lubricating oil to reach the interior portion of the bearing is about 10% of the inner race peripheral speed and, therefore, the discharge speed provided by the present lubricating apparatus is enough to lubricate the interior portion of the bearing.

Additionally, in the spindle apparatus according to the present invention, a pipe for supplying the lubricating oil is set such that a pipe parameter ($L \cdot d_n^2/d^4$), which expresses the relationship between the length L of the pipe, a nozzle diameter $d_n$ (m), and a pipe inside diameter d (m), is smaller than $5 \times 10^4$ [$m^{-1}$], and also that, the sum of the quantity of pipe expansion due to the pressure of lubricating oil in the interior portion of the pipe and the compression volume of the lubricating oil is equal to or less than the discharge quantity of said lubricating oil.

According to the spindle apparatus of the invention, when supplying a fine quantity of lubricating oil to the spindle apparatus, the pipe for the lubricating oil is set so as to satisfy the given conditions. Thanks to this, even when the present invention is applied to a spindle apparatus which is narrow and limited in the space for installation of a nozzle and arrangement of the pipe, the nozzle and pipe can be disposed in a compact structure, so that a fine quantity of lubricating oil can be supplied accurately and stably and, at the same time, generation of noises due to the whizzing sounds and poor lubrication due to the air curtain, which have been problems to be solved in the conventional oil-air lubricating apparatus, can be prevented.

In more detail, the present spindle apparatus is structured such that, the nozzle frame for jetting out the lubricating oil to the given positions of the interior portion of the spindle apparatus and the lubricating apparatus are connected together by the pipe which satisfies the following conditions:

pipe outside diameter D: $1.0 \times 10^{-3} - 3.2 \times 10^{-3}$ [m]

pipe inside diameter d: $0.8 \times 10^{-3} - 2.0 \times 10^{-3}$ [m]

Young's modulus of pipe material: 3 [GPa] or more

Pipe length L:

$$L > 0.5 \text{ [m]}$$

$$L \cdot d_n^2/d^4 < 5 \times 10^4 \text{ } [m^{-1}]$$

$$L \cdot p \cdot \{\pi \cdot d^2/(4K) + \pi \cdot d^2 \cdot \{(D^2+d^2)/(D^2-d^2)+v\}/(2E)\} < q[m^3]$$

where, $d_n$: nozzle diameter ($0.08 \times 10^{-3} - 0.3 \times 10^{-3}$ [m])

K: bulk modulus [Pa] of lubricating oil v: Poisson's ratio of pipe material p: average pressure [Pa] in pipe q: discharge quantity [$m^3$].

Also, the present spindle apparatus is a spindle apparatus having a cooling function using a jacket cooling system. In the jacket cooling system, as a thermal displacement measure, cooling oil is charged into an outer housing (outer cylinder) of a bearing (outer cylinder cooling system).

According to the present spindle apparatus, even in the case of a spindle apparatus of a jacket cooling system being narrow and limited in the space for arrangement of a pipe for lubricating oil and installation of a nozzle, a fine quantity of lubricating oil can be supplied.

The present spindle apparatus may be structured such as to include a spindle shaft, a plurality of rolling bearings for supporting the spindle shaft in a freely rotatable manner, an inner housing for covering the outside of the rolling bearings, and an outer housing for covering the outside of the spindle apparatus; and, a pipe is arranged so as to extend from the lubricating apparatus up to a nozzle frame disposed within the inner housing through a communication hole for supply of lubricating oil formed in the outer housing along the axial direction thereof and also through an opening formed in the inner housing.

And, the present spindle apparatus is also structured such that the pipe is connected to the nozzle frame in the axial direction of the housing.

According to the present spindle apparatus, even in a structure which cannot provide a space for arrangement of a pipe in a direction perpendicular to the axial direction of the housing, the pipe can be installed by arranging the pipe in the axial direction of the housing.

Also, the pipe may also be connected from the lubricating apparatus to the nozzle frame through an opening formed in the inside diameter surface of the outer housing.

In this case, even in a structure which cannot provide a space for arrangement of a pipe in the axial direction of the spindle shaft, the pipe can be installed by arranging it in a direction perpendicular to the axial direction of the housing.

Further, in the present spindle apparatus, the inner housing may includes a first inner housing to which the outer races of the rolling bearings are to be fixed, and a second inner housing including an insertion portion for storing therein the first inner housing in the axial direction thereof, while the inside diameter of the inner peripheral surface of the insertion portion of the second inner housing is set larger than the outside diameter of the outer peripheral surface of the first inner housing.

According to this structure, when the first inner housing is inserted into the second inner housing in the axial direction thereof, since the pipe cannot be caught by and between them, the first inner housing can be inserted smoothly. Thanks to this, even in the deep and limited-space portion of the spindle apparatus, the pipe can be arranged while the spindle apparatus is structured so as to be easy to assemble.

Also, in case where a cut-out groove for arrangement of the pipe is formed in the insertion portion of the second inner housing, when the first housing is slid in the axial direction, the pipe can be stored in the cut-out groove, so that the pipe can be inserted smoothly.

BRIEF DESCRIPTION OF THE DRAWINGS

FIG. 26 is a graphical representation of the results obtained when the transitions of the bearing torque are checked;

FIG. 27 is a graphical representation of a comparison of noise levels between a super fine quantity lubricating oil pump according to the invention and a conventional device;

FIG. 47 is a schematic view of the structure of a lubricating apparatus according to a first example of the fourth embodiment;

FIG. 51 is a graphical representation of the relationship between the viscosity and the discharge speed with the nozzle diameter as a parameter;

FIG. 52 is a graphical representation of the relationship between the viscosity and the discharge quantity with the nozzle diameter as a parameter;

FIGS. 60A and 60B are views showing a stator and a rotor of a lubricating apparatus according to a modification of the fourth example of the fourth embodiment;

FIG. 61 is a plan view of the structure of a lubricating apparatus according to a fifth example of the fourth embodiment of the invention;

FIG. 67 is an explanatory view of the operation of the lubricating apparatus shown in FIG. 66, showing a state thereof when an oil pressure pump is on;

DETAILED DESCRIPTION OF THE PREFERRED EMBODIMENTS OF THE INVENTION

Now, a description will be given bellow in detail of the preferred embodiments of a spindle apparatus according to the invention with reference to the accompanying drawings.

First Embodiment

Figure 1:
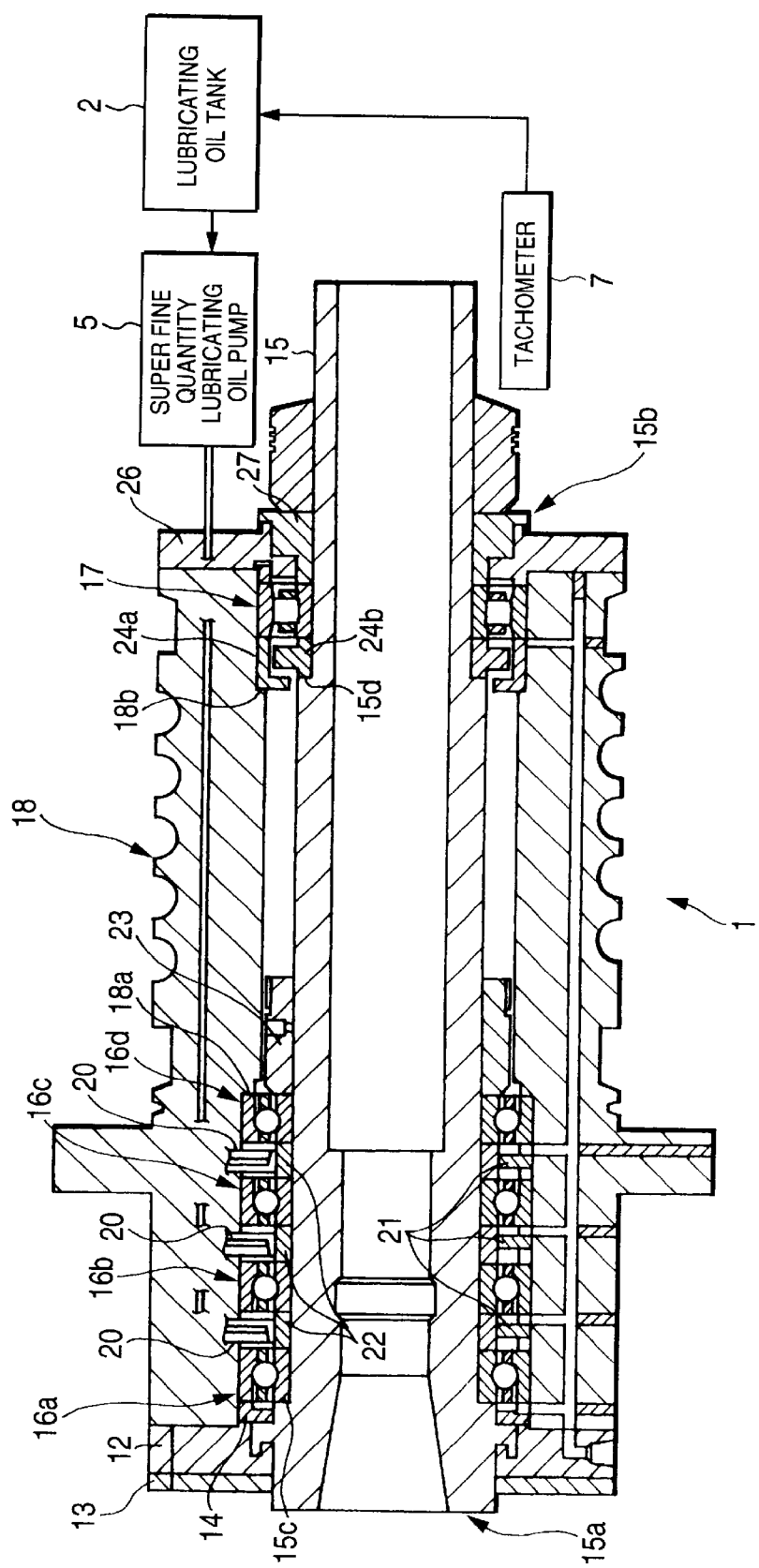
FIG. 1 is a section view of the internal structure of a spindle apparatus according to a first embodiment of the invention.
Figure 2:
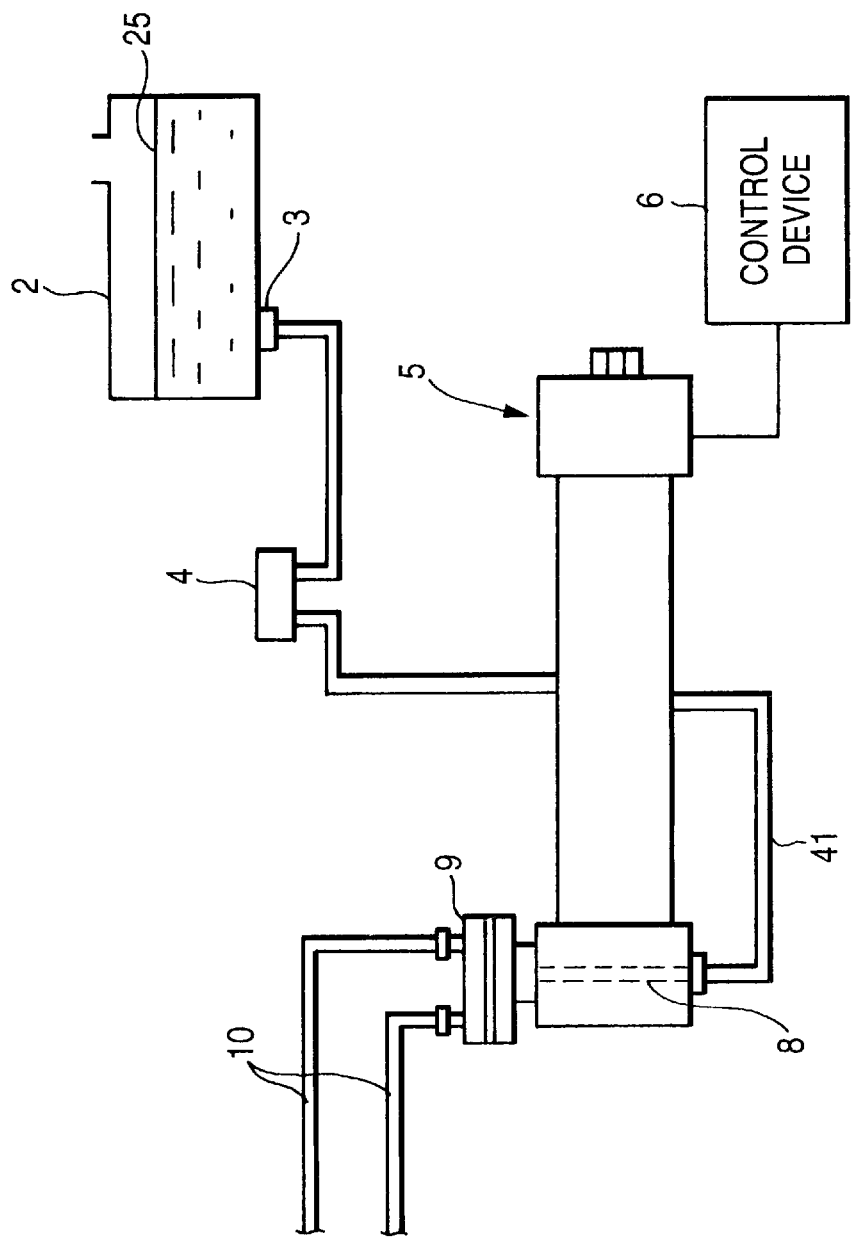
FIG. 2 is a structure view of a lubricating unit employed in the spindle apparatus.

FIGS. 1 and 2 show the structure of a spindle apparatus according to a first embodiment of the invention. The spindle apparatus 1 comprises bearings for spindle 16a, 16b, 16c, 16d and 17 respectively shown in FIG. 1 as well as a lubricating oil tank 2, a lubricating oil filter 3, an air bleed device 4, a super fine quantity lubricating oil pump 5, a control device 6 for controlling the super fine quantity lubricating oil pump 5, a clogging sensor (a pressure sensor) 8, a multi-branch piping device 9, and a pipe 10, respectively shown in FIG. 2 and a tachometer 7 (see FIG. 1).

FIG. 1 is a longitudinal section view of the internal structure of the spindle apparatus 1. As shown in FIG. 1, the spindle apparatus 1 comprises a plurality of angular ball bearings 16a, 16b, 16c and 16d respectively used to support the front portion 15a of a spindle 15 horizontally in a freely rotatable manner, a cylindrical roller bearing 17 for supporting the rear portion 15b of the spindle 15, and a housing 18 for covering the respective outside portions of these bearings 16a, 16b, 16c, 16d and 17. By the way, on a front cover 12, there is mounted a cover 13.

Of the plurality of angular ball bearings, the outer ring of the rear-most bearing 16d is secured to the inside diameter stepped portion 18a of the housing 18, while the outer ring of the front-most bearing 16a is secured to the front cover 12 through an outer ring holder 14. Also, between the respective outer rings of the angular ball bearings 16a, 16b, 16c and 16d, there are interposed cylindrical-shaped outer ring spacers 21 respectively. In this manner, the respective outer rings of the angular ball bearings 16a, 16b, 16c and 16d are fixed to the inner peripheral surface of the housing 18.

Referring now to the inner rings of the angular ball bearings 16a, 16b, 16c and 16d, the front end of the inner ring of the front-most bearing 16a is secured to the outside diameter stepped portion 15c of the spindle 15. Between the inner races of the angular ball bearings 16a, 16b, 16c and 16d, there are interposed cylindrical-shaped inner ring spacers 22 respectively, while the rear end of the inner ring of the rear-most bearing 16d is secured to a hold ring 23 fitted with the spindle 15 and is pressed forwardly (in FIG. 1, to the left) in the axial direction thereof. The respective inner rings of the angular ball bearings 16a, 16b, 16c and 16d are fixed to the outside diameter surface of the spindle 15 in such a manner that they can be rotated integrally therewith. By the way, although the spindle 15 in the present embodiment is supported horizontally, for example, when it is used in a machining center, it can be used in such a manner that it is supported vertically or inclinedly.

The front end of the outer ring of the cylindrical roller bearing 17 is secured to the inside diameter stepped portion 18b of the housing 18 through the outer ring spacer 24a, while the rear end of the outer ring is secured to a rear cover 26 and is fixed to the inner peripheral surface of the housing 18. Also, the front end of the inner ring is secured to the outside stepped portion 15d of the spindle 15 through the inner ring spacer 24b, while the rear end thereof is secured to a hold ring 27 fitted with the spindle 15 and is pressed forwardly in the axial direction thereof. The inner ring of the cylindrical roller bearing 17 is fixed to the outside diameter surface of the spindle 15 in such a manner that it can be rotated integrally therewith.

To the angular ball bearings 16a, 16b, 16c and 16d as well as to the cylindrical roller bearing 17, there is supplied lubricating oil from the super fine quantity oil lubricating pump 5 through nozzles 20 which are respectively mounted within the housing 18. The respective nozzles 20 are disposed in the interior portion of the housing 18, and are fixed in such a manner that they are inserted through mounting holes extending through the respective outer race spacers 21 from the outside diameter surface. Also, the leading ends of the respective nozzles 20 extend through the outer ring spacers 21 and project into a clearance space formed between the inner ring spacers 22 and inter-outer-ring seats 21. In the present embodiment, there are disposed three nozzles 20 for each bearing. However, the number of nozzles 20 is not limited.

Next, description will be given below of the operation of the spindle apparatus 1 with reference to FIGS. 1 and 2.

Lubricating oil 25, which is filled into the lubricating oil tank 2, flows through the lubricating oil filter 3 and the air bleed device 4 into the super fine quantity oil lubricating pump 5. The super fine quantity oil lubricating pump 5 is controlled by the control device 6 for an intermittent time adjustment, a lubricating oil quantity adjustment, and a multi-branch piping mechanism respectively for supply of the lubricating oil, so that the super fine quantity oil lubricating pump 5 allows the multi-branch piping device 9 to feed the lubricating oil 25 to the respective pipes 10. Also, the number of pipes 10 is not limited to the number of bearings. When the number of pipes is equal to the number of bearings, the control device 6 is used to control the flow quantity of the lubricating oil flowing into the individual pipes 10 and the oil discharging intervals, thereby adjusting the quantity of the lubricating oil to be supplied to the bearings. By the way, in case where the lubricating oil is supplied to five pipes 10 in a quantity of 0.002 ml/shot at 2-second intervals from the super fine quantity oil lubricating pump 5 to thereby lubricate five bearings, the lubricating oil is supplied in a quantity of 0.002 ml to each of the five bearings at 10-second intervals.

Also, the quantity of the lubricating oil to be supplied to the bearings and the oil supply intervals may also be changed for every bearings and the lubricating oil may be supplied from some or all of the pipes. Further, when the number of pipes is larger than the number of bearings, the quantity of the lubricating oil to be supplied to the bearings is set equal to the sum of the pipes that are connected to the bearings. Also, when the number of pipes is smaller than the number of bearings, the pipes are made to branch from their intermediate portions and then the lubricating oil is supplied to the bearings through the branching portions of the pipes.

The lubricating oil 25, which is fed to the respective pipes 10, is positively supplied from the nozzles 20 into the interior portions of the spindle bearings 16a, 16b, 16c, 16d, and 17. In this case, the respective nozzles 20 are adjusted to the optimum angles and positions, so that a proper quantity of the lubricating oil 25 can be supplied into the interior portions of the bearings for spindle 16a, 16b, 16c, 16d, and 17. Also, the intermittent time adjustment and lubricating oil quantity adjustment are made in accordance with the output of the tachometer 7 for detection of the rotation speed of the spindle. By the way, the lubricating oil quantity can also be adjusted using a flow sensor of a super fine quantity type.

In supplying the lubricating oil, the lubricating oil filter 3 removes dust which gives rise to a clogged condition. However, in case where dust is mixed into the lubricating oil for some reason or other to thereby cause a clogged condition, that is, in case where the lubricating oil is not supplied normally for some reason or other to thereby cause an abnormal discharge, the clogging sensor (pressure sensor) 8 is actuated to thereby avoid the occurrence of a trouble. Also, in case where the air is mixed, the air bleed device 4, which is formed of porous material, removes the mixed air.

Next, description will be given below of the super fine quantity oil lubricating pump 5.

Figure 3:
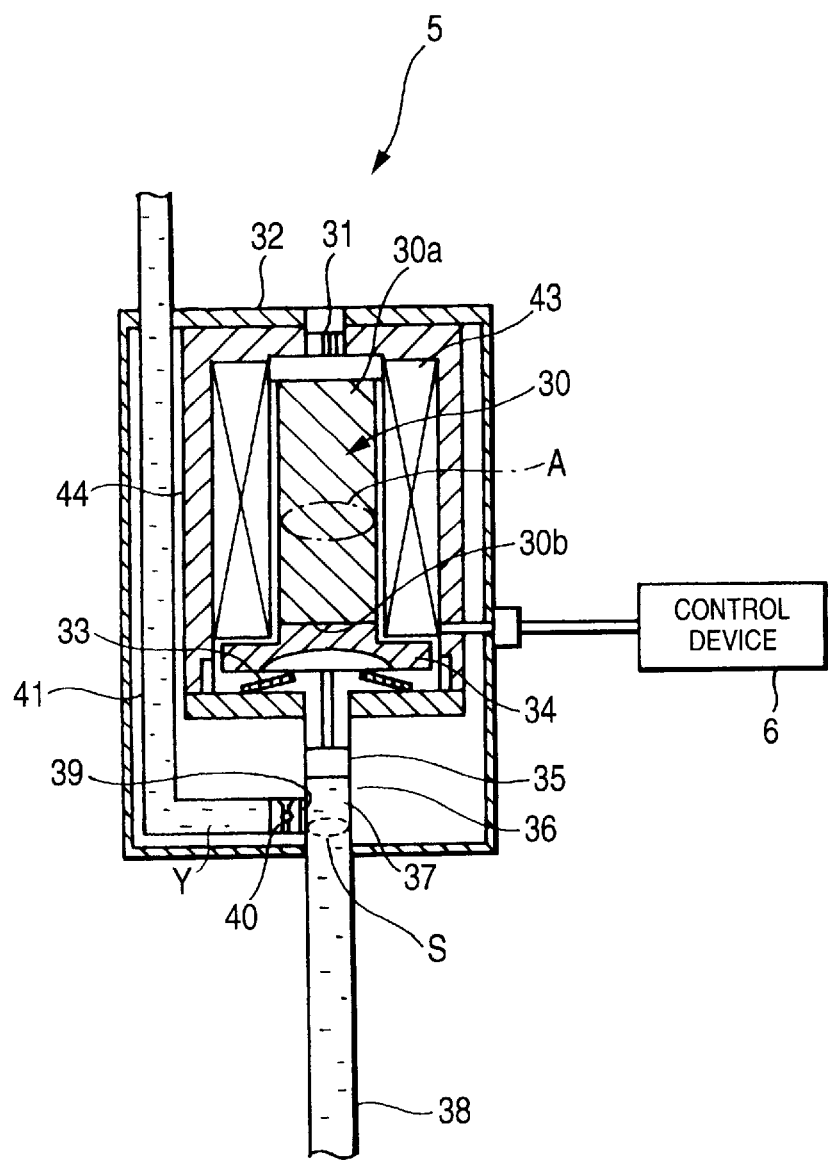
FIG. 3 is a section view showing a super fine quantity lubricating oil pump.

FIG. 3 is a section view of the super fine quantity oil lubricating pump 5. As shown in FIG. 3, there is disposed a rod body 30 which is made of giant magnetostrictive material having a positive characteristic, and one end portion 30a of the rod body 30 in the axial direction thereof is fixed to a case 32 through a preload adjust mechanism 31. As the giant magnetostrictive material of the rod body 30, for example, there can be suitably used material having a trade name Terfenol-D manufactured by Edge Technologies Co. (ET division), or magnetostrictive material manufactured by TDK Co. When a magnetic field is applied to the rod body 30 by a coil (which will be discussed later) disposed coaxially therewith, the rodbody 30 is expanded in the axial direction thereof due to a magnetostrictive phenomenon (Joule effect).

The preload adjust mechanism 31 may provide, for example, a screw mechanism which, when it is rotated, can project in the axial direction of the rod body 30 to press against one end portion 30a of the rod body 30. In the other end portion 30b of the rod body 30 in the axial direction thereof, there is disposed a pressure transmission member 34 which can energize the rod body 30 to the preload adjust mechanism 31 side by a belleville spring 33 to transmit the pressure without producing a clearance with respect to the axial direction of the rod body 30, while the rod body 30 is connected to a piston 35 through the pressure transmission member 34. The piston 35 is slidably disposed in the interior portion of a cylinder 36. The cylinder 36 is formed in such a manner that the transverse area 5 of its piston sliding space in a direction extending at right angles to the axial direction thereof is set smaller than the transverse area A of the rod body 30 in a direction extending at right angles to the axial direction thereof; and, in the interior portion of the cylinder 36, there is formed a pump chamber 37. The cylinder 36 is connected through a pipe 38 to the clogging sensor 8 (see FIG. 2). Here, although a check valve is not interposed between the pump chamber 37 and clogging sensor 8, the check valve may also be provided.

Also, in the cylinder 36, there is formed a suction port 39 which is used to suck the lubricating oil 25 into the pump chamber 37. In the suction port 39, there is disposed a suction valve 40; and, the suction valve 40 provides a check valve which prevents the lubricating oil 25 from flowing externally of the pump chamber 37. Also, the flow passage sectional area Y of the suction valve 40 is set larger than the sectional area of the discharge opening 20a of the nozzle 20 enlargedly shown in FIG. 4, while the suction port 39 is pipe-connected through a lubricating oil delivery pipe 41 to the lubricating oil tank 2. Therefore, the lubricating oil 25 can be delivered from the lubricating oil tank 2 to the pump chamber 37 through the lubricating oil delivery pipe 41, whereas the lubricating oil 25 is prevented from flowing reversely from the pump chamber 37 to the lubricating oil tank 2.

On the outer periphery of the rod body 30, there is coaxially disposed a coil 43 and, further, on the outer periphery of the coil 43, there is disposed a yoke 44 which is formed of magnetic material and forms a magnetic circuit in conjunction with the rod body 30. The yoke 44, the base end of the cylinder 36 on the rod body 30 side thereof, and part of the lubricating oil delivery pipe 41 are stored in the interior portion of the case 32.

To the coil 43, there is electrically connected the control device 6. The control device 6 outputs to the coil 43 a current which is used to generate a magnetic field. Due to application of this current to the coil 43, the rod body 30 receives the magnetic field generated from the coil 43 and is thereby expanded, so that the lubricating oil 25 within the pump chamber 37 is passed through the pipe 38 and is discharged out from the nozzle 20.

Figure 4:
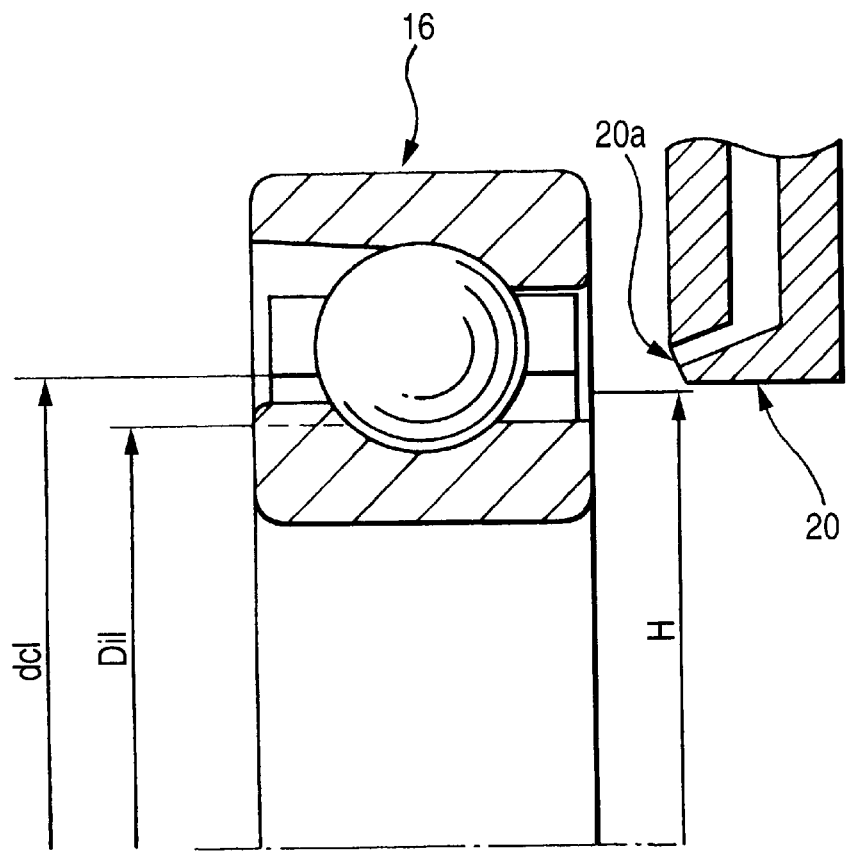
FIG. 4 is an enlarged view showing the angle and position of a nozzle.

Referring to the shape of the nozzle 20, as shown in FIG. 4, the discharge opening portion 20a of the nozzle 20 in the leading end of the flow passage is formed in an inclined manner, so that a pipe can be arranged even in a narrow space. In case where there is room in the pipe installation space, the nozzle can be forced in a straight manner and the pipe can be installed obliquely or horizontally at an oil supply target position. Referring to the lubrication in the interior portion of the bearing, since the oil supply quantity is very fine, the oil supply target position is important. As the oil supply target position, as shown in FIG. 4, the contact portion between the inner race and ball is preferred. Thanks to this, a retainer and outer raceway surface can be lubricated by the lubricating oil 25 which is allowed to flow outside due to a centrifugal force generated with respect to the inner raceway surface. For example, the diameter H of the oil supply target position can be set such that H=(dc1+ Di1)/2. Here, dc1 expresses the inside diameter of the retainer, and Di1 expresses the outside diameter of the inner race. In this manner, by designing the angle and position of the nozzle 20 optimally, the lubricating oil can be accurately supplied at a desired position in the interior portion of the bearing in a pin-spot supply manner.

Next, description will be given below of the operation of the super fine quantity oil lubricating pump 5.

Figure 5:
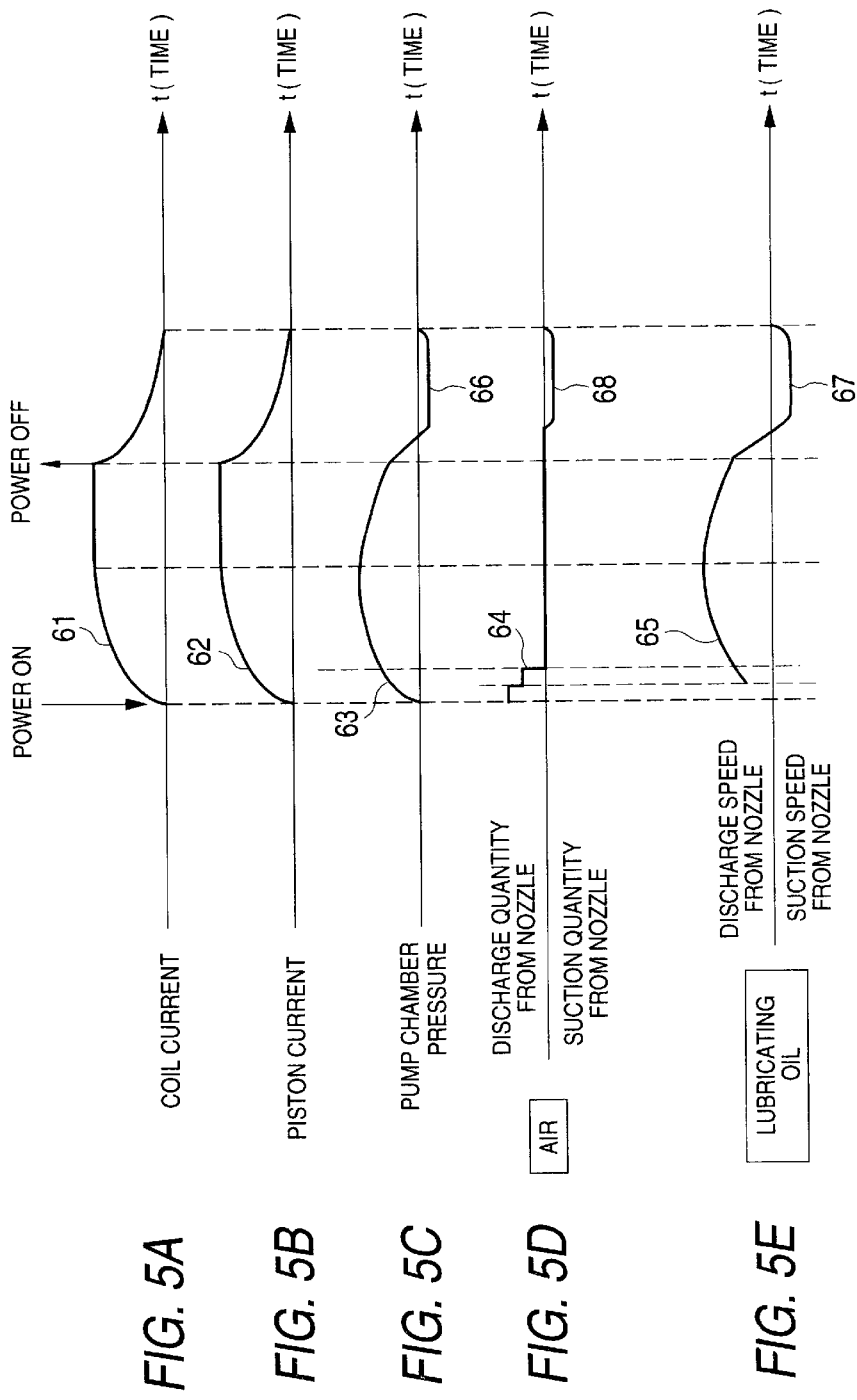
FIG. 5 a view of a time chart showing the time relationship between currents to be applied to a coil and the discharge of lubricating oil.
Figure 6:
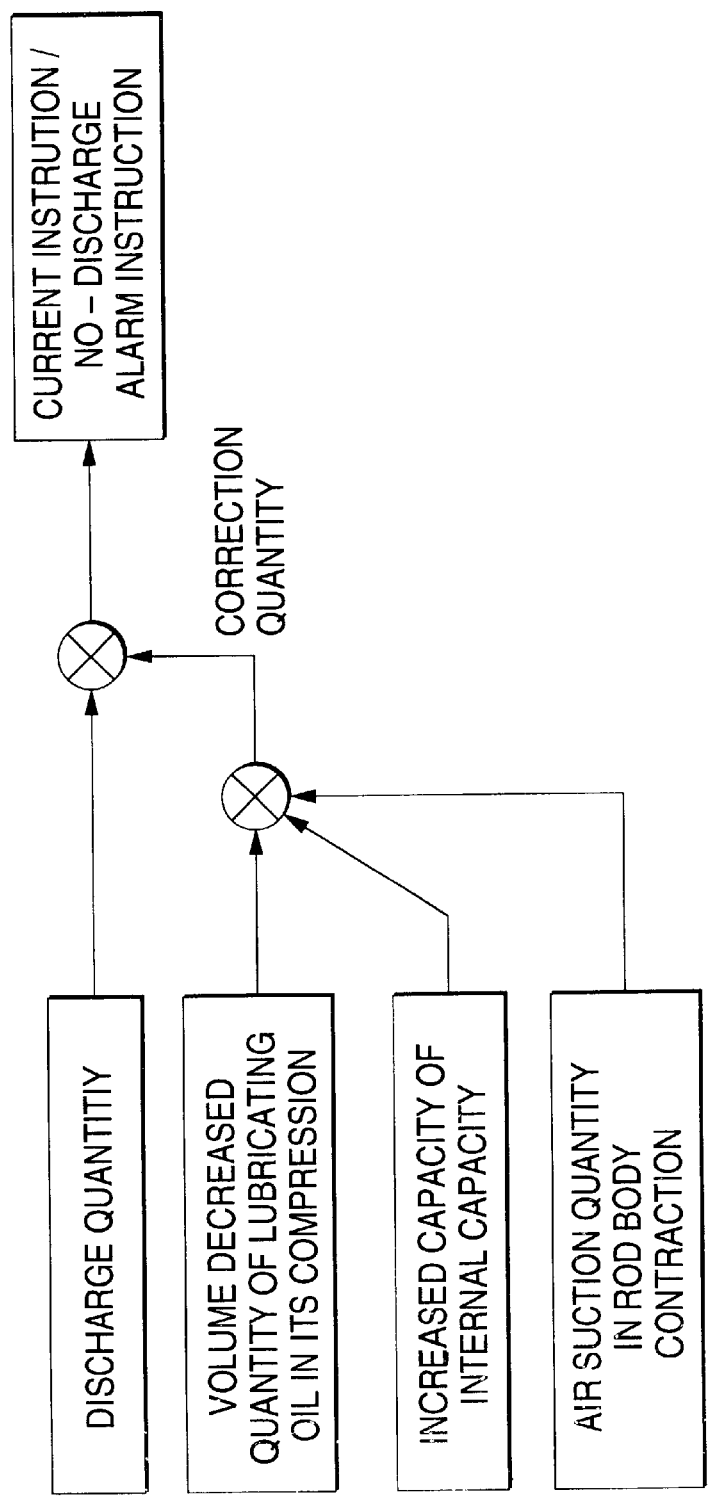
FIG. 6 is a block diagram showing a procedure for a discharge quantity correction to be operated by a control device in order to obtain a fixed discharge quantity.

FIG. 5 shows a time chart representing the time relationship between currents to be applied to the coil 43 and the discharge of the lubricating oil, and FIG. 6 shows a block diagram displaying the procedure for the discharge quantity correction to be operated by the control device 6 in order to obtain a fixed quantity of oil discharge.

In case where a current is output from the control device 6 to the coil 43 in accordance with a pattern (61) shown in (a) of FIG. 5, the coil 43 generates a magnetic field to thereby expand the rod body 30 formed of giant magnetostrictive material. Since one end portion 30a side of the rod body 30 is fixed, the rod body 30 is expanded in the axial direction thereof on the other end portion 30b side thereof; and, the piston 35 follows this expanding operation and thus moves in a pattern (62) similar to a current shown in (b) of FIG. 5.

As the piston 35 moves, the lubricating oil 25 within the pump chamber 37 is compressed and, as shown in a pressure increase pattern in (c) of FIG. 5, the pressure within the cylinder 36 is increased. Due to such increase in the pressure, the suction valve 40 in the suction port 39 is closed so that the air accumulated in the leading end portion of the nozzle 20 in the previous discharge was discharged from the nozzle 20 in such a manner as shown by a discharge pattern (64) in (d) of FIG. 5. After then, the lubricating oil 25 is discharged out to the outside from the nozzle 20 at high speed in such a discharge pattern (65) as shown in (e) of FIG. 5. And, in case where the current to the coil 43 becomes steady, the expansion of the rod body 30 is caused to stop and the pressure of the pump chamber 37 is lowered due to the discharge of the lubricating oil 25.

After then, in case where the output of the current from the control device 6 to the coil 43 is stopped, the expanded rod body 30 contracts so as to return back to its original condition, so that the internal capacity of the pump chamber 37 is increased. At the then time, as shown by a pressure pattern (66) in (c) of FIG. 5, the pump chamber 37 becomes negative in pressure, with the result that, as shown in a discharge pattern (67) in (e) of FIG. 5, the lubricating oil 25 is supplied through the suction valve 40 to the pump chamber 37. At the same time, as shown by a discharge pattern (68) in (d) of FIG. 5, a slight quantity of air also flows in from the leading end of the nozzle.

The flow-in quantity of this air is sufficiently small when compared with the supply quantity of the lubricating oil 25. Referring further to the flow-in quantity of the lubricating oil 25 and the flow-in quantity of the air, because the sectional area of the nozzle flow passage in a direction at right angles to the axial direction of the nozzle is sufficiently smaller than the sectional area of the suction valve flow passage in a direction at right angles to the axial direction of the suction valve 40, and also because the suction valve 40 is situated closer to the piston 35 than the nozzle 20, the negative pressure transmission time is shortened, with the result that the quantity of the lubricating oil from the suction valve 40 becomes larger than the flow-in quantity of the air. Therefore, in the next discharge operation time as well, similarly, the lubricating oil discharge is possible.

Preferably, the volume of the nozzle hole of the nozzle 20 may be equal to or greater than the volume of the air flowing from the nozzle hole in the above-mentioned suction step. The reason for this is as follows: that is, because the resistance of the air when the air passes through the nozzle hole is smaller than the resistance of the lubricating oil 25 when it passes through nozzle hole, in case where the nozzle hole is completely filled with the air, the fluid resistance of the nozzle hole is smaller than that of the suction side check valve, which raises a fear that the lubricating oil 25 is difficult to be sucked in from the suction side check valve.

There may also be interposed a check valve between the pump chamber 37 and the discharge side pipe. By the way, in this case as well, due to delay in the response of the discharge side check valve as well as due to the closing operation of the valve, a slight quantity of air flows in through the nozzle hole; that is, it can be expected to avoid a fear that the lubricating oil 25 can drip down from the leading end of the nozzle, but the oil dripping preventive effect is lowered.

Now, since there are present the flow-in of the air from the nozzle 20 when the rod body 30 is contracted, a decrease in the volume of the lubricating oil 25 caused by the compression of the lubricating oil 25 within the internal capacity between the suction valve 40 and the exit of the nozzle, and an increase in the internal capacity caused by the pressure deformation of parts defining the internal capacity such as a cylinder and a pipe, although they are respectively very small in quantity. In order to be able to discharge the lubricating oil 25 in a desired quantity from the nozzle 20 with accuracy, it is necessary to set the discharge quantity with these variable elements taken into account.

In view of this, the super fine quantity oil lubricating pump 5 according to the present embodiment is characterized in that a current is applied to the coil 43 from the control device 6 with these variable elements taken into account. That is, in the present embodiment, as shown in FIG. 6, "the volume decrease quantity of the lubricating oil when compressed", "increase in the internal capacity", and "air suction quantity when the rod body is contracted" are regarded as main variable elements; and, the current is set with these variable elements taken into account. The variable elements may further include other elements such as the temperature of the lubricating oil 25 and the viscous resistance of the lubricating oil 25.

A decrease in the capacity of the pump chamber 37 caused when the rod body 30 is expanded, as shown in an equation (1), is equal to the sum of the quantity of the air flowing in from the nozzle 20 when the rod body 30 is compressed, the volume decrease quantity of the lubricating oil 25 within the internal capacity between the suction valve 40 and nozzle exit when the lubricating oil 25 is compressed, an increase in the internal capacity due to the pressure deformation of the parts defining the internal capacity, and a required discharge quantity of the lubricating oil 25 to be discharged from the nozzle 20.

Decrease in the capacity of the pump chamber 37 (1)

(piston cross sectional area × piston movement length) =

(quantity of the air flowing in from the nozzle when the rod body is contracted) + (volume decrease quantity of the lubricating oil due to high pressure) +

(increase in the internal capacity due to high pressure) +

(required discharge quantity Qrf)

By controlling the current to be applied to the coil 43 in such a manner as to satisfy the equation (1), a very small quantity, that is, of the order of 0.0005–0.01 ml of the lubricating oil 25 can be discharged out intermittently at the high speeds of approx. 10 m/sec.–100 m/sec.

By the way, as the values of the respective items in the equation (1), the measured or set values can be used depending on a spindle apparatus used.

The discharge quantity of the lubricating oil 25 can be found according to an equation (2).

$$Qr = \Delta f \qquad (2)$$

Here, Qr[ml/sec.] expresses a required discharge quantity (a set discharge quantity), Δ[ml/shot] expresses a discharge quantity per operation when a rated current is supplied, and f[shot/sec.] expresses an operation frequency (a supply frequency) to be applied to the coil 43.

Figure 7:
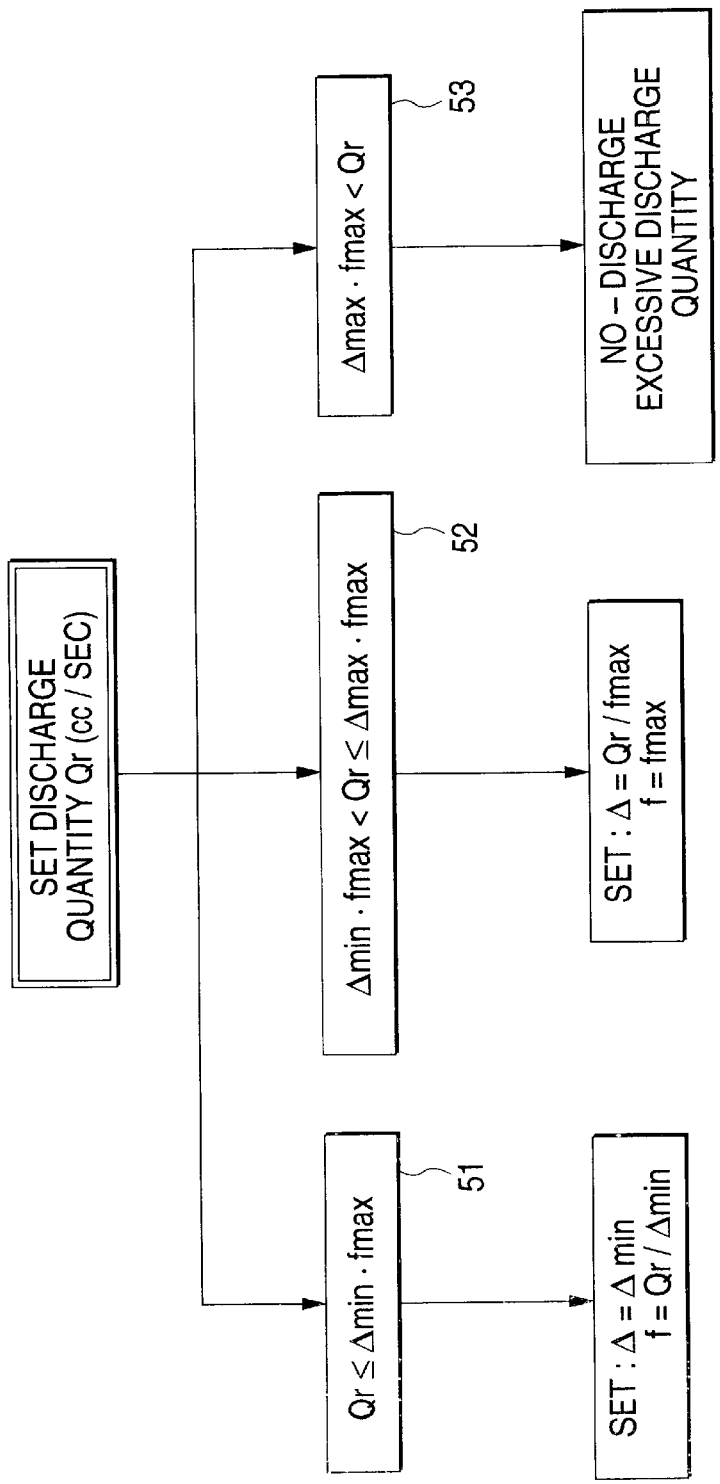
FIG. 7 is a block diagram of an example of a current control function by discharge quantity.

The set discharge quantity Or is classified to three conditions shown in FIG. 7 according to the value thereof, then can be controlled as follows.

At first, in case where the set discharge quantity Qr is equal to or smaller than a discharge quantity when the minimum shot is carried out at the highest operation frequency, that is, in the case of (51) where $Qr \leq \Delta min \cdot fmax$, a discharge quantity Δ per operation and an operation frequency f are respectively set in the following manner:

That is, Δ=Δmin, f=Qr/Δmin.

Here, Δmin[ml/shot] expresses the minimum discharge quantity per operation at the minimum current that can be controlled, in the present embodiment, it is set as 0.001 [ml/shot]. Also, fmax[shot/sec.] expresses the highest operation frequency that can be output in the present apparatus.

Therefore, a final set discharge quantity (a required discharge quantity) Qrf in this case is set according to an equation (3).

$$Qrf=\Delta min \times (Qr/\Delta min) \tag{3}$$

Also, in the case of (52) where a set discharge quantity Qr is Δmin·fmax<Qr≦Δmax·fmax (here, Δ max[ml/shot] is the maximum discharge quantity per operation at the controllable maximum current), a discharge quantity Δ per operation and an operation frequency f in a position operation are respectively set in the following manner:

That is, Δ=Qr/fmax, f=fmax.

Therefore, a final set discharge quantity (a required discharge quantity) Qrf in this case is set according to an equation (4).

$$\text{That is, } Qrf=(Qr/fmax) \times fmax \tag{4}$$

And, in the case of (53) where a set discharge quantity Qr is set such that Δmax·fmax<Qr, since this quantity is exceeds the discharge ability of the present apparatus, a discharge disapproval signal is output from the control device 6 (see FIG. 6).

As a result, according to the above-mentioned super fine quantity oil lubricating pump 5, there can be provided the following effects.

That is, in the contracted condition of the rod body 30, since the air flows in from the nozzle 20 and the leading end of the liquid surface of the lubricating oil is thereby moved to the interior portion of the nozzle, the lubricating oil can be prevented from dripping down when the present pump is out of operation.

Also, in the expanded condition of the rod body 30, during the time when the air in the leading end of the nozzle is pushed out, the pressure of the lubricating oil 25 within the cylinder 36 is increased. For this reason, there is produced a slight delay in the time necessary for the lubricating oil 25 to be discharged from the nozzle end. However, this delay time is cancelled by the time necessary for the lubricating oil 25 to be increased up to a given pressure. As a result of this, at the discharge time of the lubricating oil 25, there can be obtained a high discharge speed which is close to a given speed, which makes it possible to reduce a possibility that the lubricating oil 25 can be discharged at a speed less than the given speed.

Further, since the cross sectional area s of the cylinder 36 in a direction at right angles to the axial direction thereof is set smaller than the cross sectional area A of the rod body 30, the pressure of the lubricating oil 25 within the cylinder can be made higher than the pressure generated in the rod body 30 itself, which makes it possible to discharge the lubricating oil 25 at a higher pressure.

And, by bringing the lubricating oil 25 into direct contact with the surface to be lubricated, there is eliminated the need for provision of an air pump which is used to deliver the lubricating oil 25.

Also, when increasing the pressure of the lubricating oil 25 within the cylinder up to a high pressure, the compression of the lubricating oil 25 and the expansion of the cylinder 36 cannot be neglected; however, because the current to be applied to the coil 43 is corrected by these variable elements, a desired discharge quantity can be obtained with high accuracy.

Further, since the coil current is controlled to thereby be able to adjust the lubricating surface contact quantity of the lubricating oil 25 easily, there is no need for provision of a fixed quantity valve. This makes it possible to realize a lubricating device which is simple in structure and compact in size.

Also, the control device 6 may also be a device which detects the rotation speed of a rotary body to be lubricated, and supplies to the coil 43 a current having a current value corresponding to the detect signal and/or a current supply frequency corresponding to the detect signal, thereby adjusting a lubricating oil discharge quantity. In this case, the lubricating oil 25 can be supplied in the optimum quantity that can vary according to the rotation speed of the rotary body. This not only can prevent the excessive supply of the lubricating oil 25 but also can always provide the optimum lubricating effect.

For example, the rotation speed of a shaft (a rotary body) of a bearing, to which the lubricating oil is to be supplied, is detected by an encoder, and the thus obtained rotation speed is input to the control device 6. The control device 6 outputs a coil current while adjusting the current value and operation frequency of a drive current to be applied to the coil 43 in such a manner that, when the rotation speed is high, the lubricating oil 25 can be supplied in a large quantity and, for the slow rotation speed, the lubricating oil 25 can be supplied in a small quantity.

Figure 8:
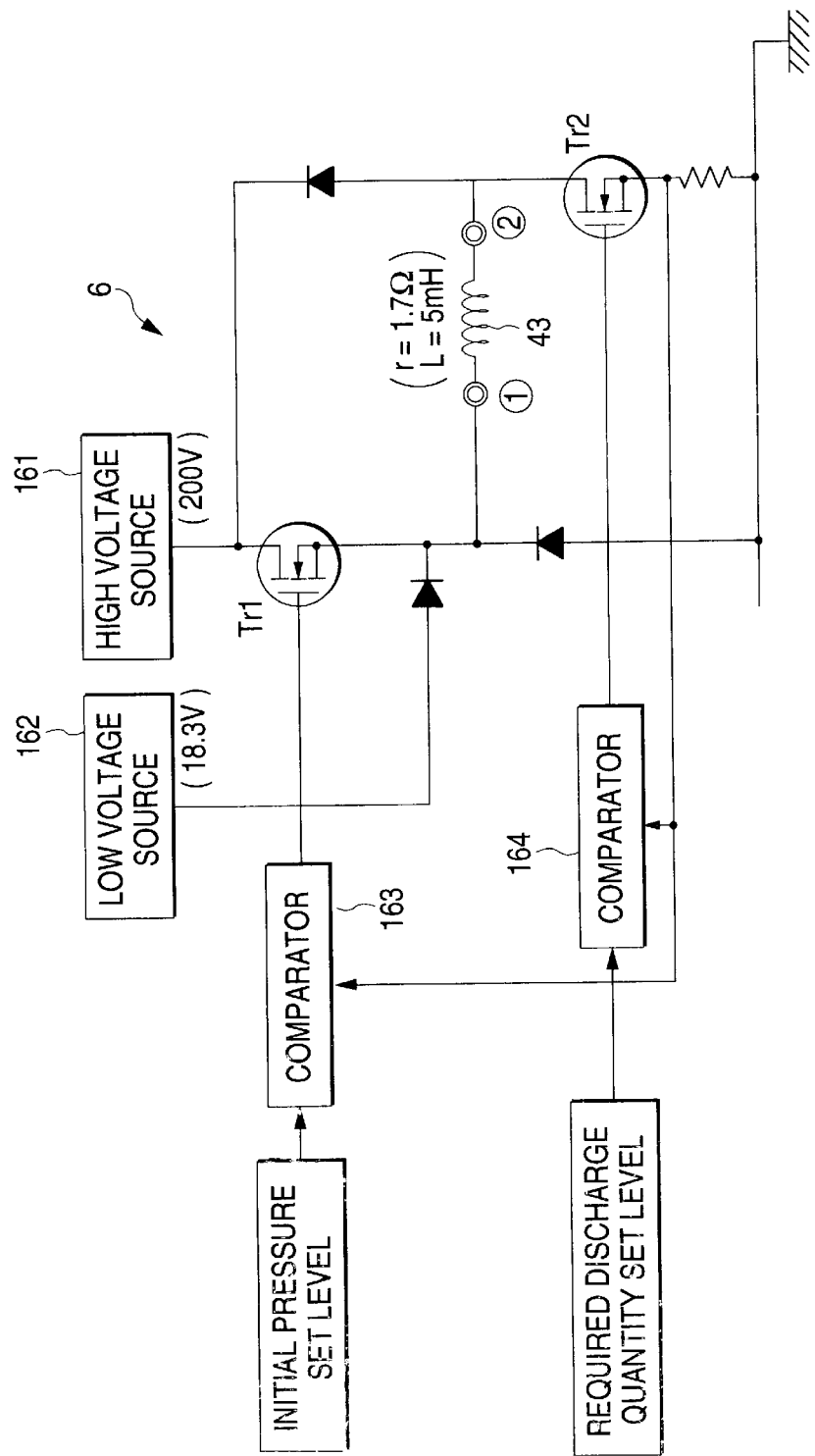
FIG. 8 is a circuit diagram of a coil control device employed in a lubricating device.

Now, FIG. 8 shows the circuit configuration of the coil control device employed in the lubricating device according to the present embodiment. The control device 6 according to the present embodiment is connected to the coil 43 which is used to expand the rod body 30 made of the giant magnetostrictive element shown in FIG. 3, and controls the application of a current to the coil 43.

As shown in FIG. 8, the control device 6 comprises a high voltage source 161 for causing an applying current to rise suddenly, a low voltage source 162 for obtaining a required lubricant discharge quantity after the rise of the applied current, and two transistors (FET) Tr1 and Tr2 which are respectively used to switch these voltage sources 161 and 162 according to the outputs of two comparators 163 and 164.

Referring now to the operation of the control device 6, in case where Tr1 and Tr2 are both firstly turned on, a current is supplied to the coil by the high voltage source 161 and low voltage source 162. At the then time, as shown by a current waveform in FIG. 9, the coil current rises suddenly up to an initial pressure set level (a first current value). The rising characteristic of the coil current is shown by an equation (5).

$$I(t)=E/r[1-\exp\{-rt/L\})] \tag{5}$$

where, I: current, E: voltage, r: resistance, and L: inductance.

For example, assuming that the coil resistance r is 1.7 [Ω], the inductance L is 5 [mH] and the voltage is 200 [V], the current I(t) reaches 5 [A] with the passage time t of 128 [μs] according to the above equation.

Figure 9:
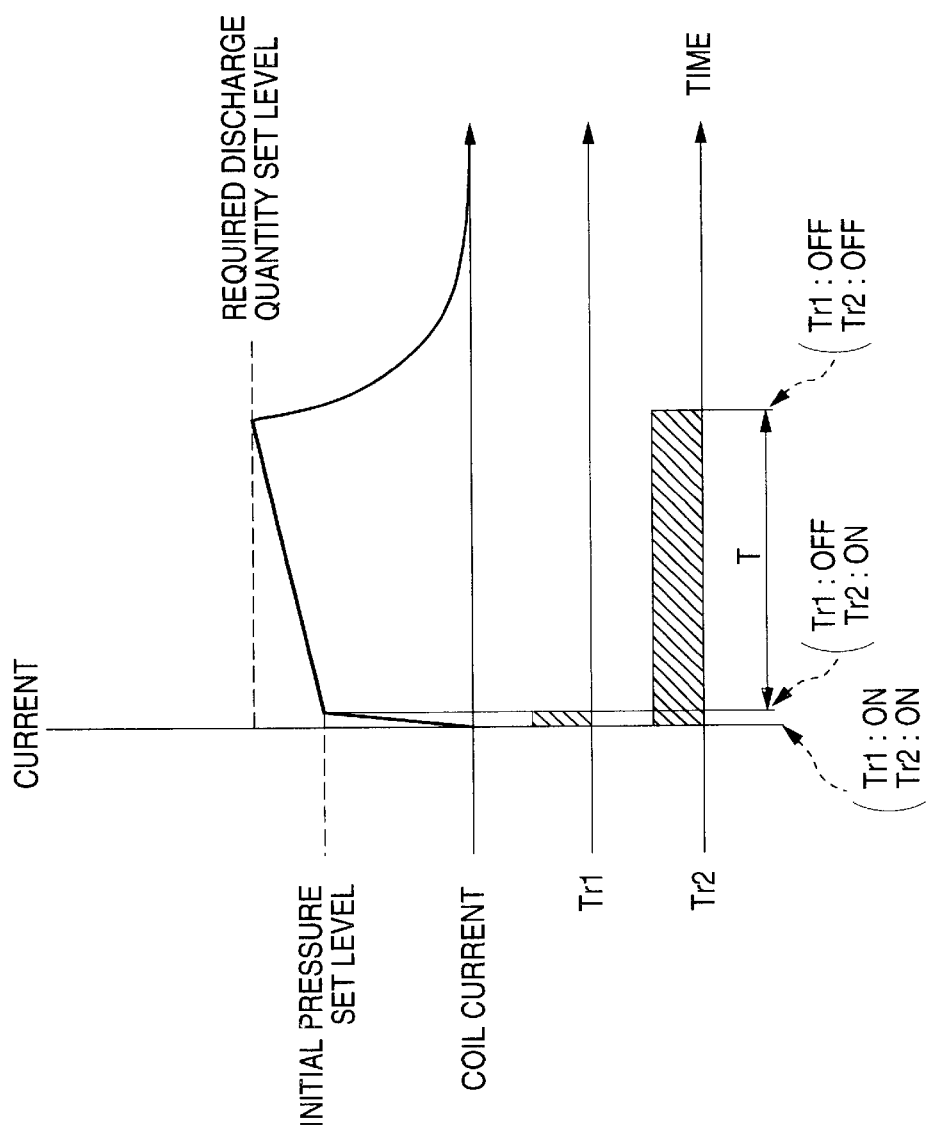
FIG. 9 is an explanatory view showing coil current waveforms in conjunction with the operation of a transistor.

As shown in FIG. 9, in case where 5 [A] is set as the initial pressure set level, the control device 6 detects that the current reaches 5 [A] and thus the control device 6 turns off Tr1. In response to this, the current is supplied to the coil only from the low voltage source side thereof The then voltage E of the low voltage source can be found in the following manner.

If the sectional area of the nozzle is expressed as Sn [mm$^2$], the cross sectional area of the cylinder internal capacity is expressed as Sc [mm$^2$] and the expansion of the giant magnetostrictive element is expressed as $\Delta$L [mm/A], then the expansion speed vm [mm/s] of the giant magnetostrictive element necessary to obtain a required discharge speed v [mm/s] can be expressed by an equation (6).

$$vm = v \cdot Sn/Sc \quad (6)$$

Also, the required increase speed I' [A/s] of the current can be expressed by an equation (7).

$$I' = vm/\Delta L \quad (7)$$

For example, assuming that the sectional area Sn of the nozzle is 0.008 [mm$^2$], a required discharge speed v is 50000 [mm/s], and the cross sectional area Sc of the cylinder internal capacity is 30 [mm$^2$], the required expansion speed vm of the giant magnetostrictive element is 13.3 [mm/s].

At the then time, assuming that the expansion $\Delta$L of the giant magnetostrictive element is 0.01 [m/A], the required increase speed $\Delta$I of the current is 1330 [A/s].

Also, assuming that the discharge quantity is 1 [mm$^3$], the required current increase $\Delta$I can be obtained in the following manner: that is, $$\Delta I = 1/(Sc \cdot \Delta L)$$
$$= 3.3 [A].$$

A required time T necessary to reach this current value can also be obtained in the following manner: that is, $$T = 3.3/1330$$
$$= 2.48 \times 10^{-3} [s].$$

If the above respective parameters are substituted into the equation (5), then the voltage E is 18.3 [V]. Therefore, under the above condition, this voltage E may be set as the voltage value of the low voltage source 162.

In this manner, by setting the voltage of the low voltage source as a voltage value to be determined according to the discharge speed, there can be obtained a desired discharge speed in a given pump. And, when the time T passes after the current value reaches an initial stress set level, that is, when a desired discharge quantity is obtained, Tr2 is also turned off to thereby cut the coil current. In case where the generation of the coil current due to the on and off operations of Tr1 and Tr2 is achieved at a given operation frequency, the lubricant can be discharged intermittently from the lubricating device.

According to the present system, when compared with a dropper system in which a current is controlled by feeding back the current, and a pulse width control system, the circuit of the control device can be configured in such a manner that power can be saved and the cost thereof can be reduced.

By the way, the circuit according to the present embodiment is a circuit in which the voltage value can be switched and turned off automatically according to the current value of the coil. However, the voltage value may also be switched and turned off by a timer.

Also, in FIG. 9, the current is turned off after the current value reaches a required discharge quantity level. In this case, preferably, the current value may be lowered little by little in order to prevent cavitation from occurring within the pump chamber.

Figure 10:
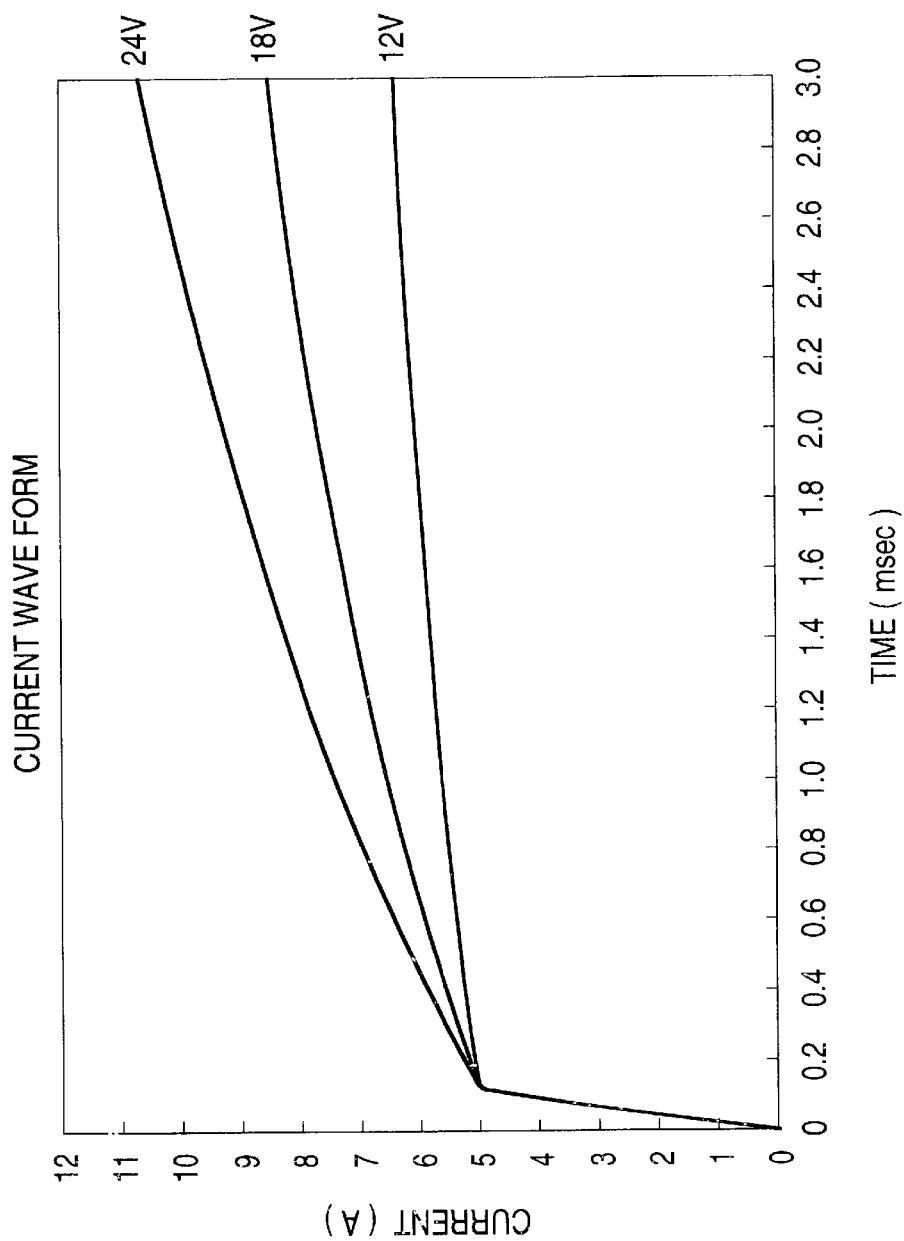
FIG. 10 is a graphical representation of an example of variations in the coil current with respect to the lapse of time.

Now, FIG. 10 is a graphical representation of an example of variations in the coil current with respect to the elapsed time. By the way, in this case as well, the inductance L of the coil is 5 [mH] and the resistance r is 1.7 [$\Omega$].

As shown in FIG. 9, by turning on both of Tr1 and Tr2 of the control device 6 to thereby apply a high voltage, the coil current is caused to rise suddenly.

Next, Tr1 is turned off to thereby discharge the lubricant at a given discharge speed only by the low voltage source. In FIG. 10, the voltage values of the low voltage source is shown in three kinds, that is, 24 [V], 18 [V], and 12 [V]; and, the voltage E in the above-mentioned calculation example, which is 18.3 [V], is almost equal to the present calculation example which is 18 [V].

Also, the lubricating device according to the present embodiment is structured in such a manner that it can detect a trouble such as lubricant leakage or a clogged condition to thereby monitor the operating condition of the pump.

At first, description will be given below of the properties of the magnetostrictive element. As the typical properties of the magnetostrictive element, there can be given the following two properties.

One of them is a property which is referred to as a Joule effect due to which the magnetostrictive element can be distorted by a magnetic field acting on the magnetostrictive element. As described above, the magnetostrictive pump is structured such that it applies a magnetic field to a magnetostrictive element using this property to thereby expand the magnetostrictive element so as to be able to drive a piston.

The other is a property which is referred to as a Villari effect. The Villari effect is an effect in which the permeability of a magnetostrictive element is changed according to stresses applied to the magnetostrictive element. When a coil for driving is disposed in a magnetostrictive element, the inductance of the coil can be varied due to the Villari effect. Generally, in giant magnetostrictive material, in case where the stress increases up to about 1 [MPa], the inductance decreases about 30% with respect to the inductance when the stress is zero.

Trouble detection is possible by using this Villari effect in the following manner. That is, assuming that when a lubricating device is in normal operation, the pressure within a cylinder is, for example, about 4 [MPa] and the cross sectional area of a piston is ¼ of the cross sectional area of a giant magnetostrictive element, the stress of the giant magnetostrictive element is about 1 [MPa]. In this case, the decrease rate of the inductance of the coil including the giant magnetostrictive element is equal to a decrease rate corresponding to the present stress, that is, about 30%.

Here, in case where a trouble occurs in the lubricating device and the nozzle is thereby clogged, the pressure within the cylinder increases up to a high pressure in the range of 30–40 [MPa], and the stress of the giant magnetostrictive element also increases correspondingly to this cylinder pressure, with the result that the decrease rate of the inductance of the coil is about 40%. On the other hand, in case where lubricant leakage occurs within the giant magnetostrictive material pump, the pressure within the cylinder and the stress of the giant magnetostrictive element are both almost zero, and the decrease rate of the inductance of the coil is also almost zero.

In this manner, in case where any trouble occurs in the operating condition of the giant magnetostrictive material pump of the lubricating device, the decrease rate of the inductance of the coil varies greatly from 0% to 40%.

By the way, the rising characteristic of a current flowing in a coil, as described above, can be expressed by the equation (5).

Figure 11:
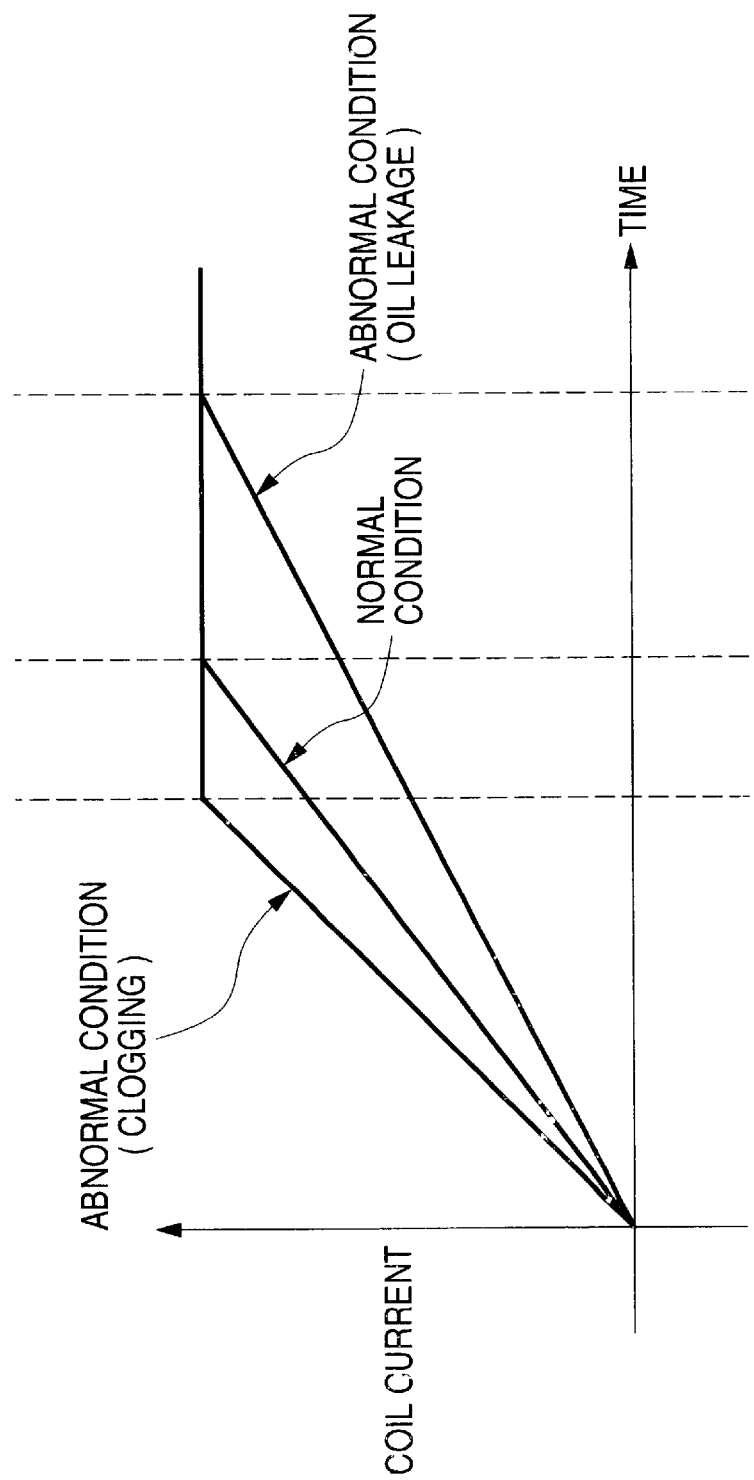
FIG. 11 is an explanatory view of the rising characteristic of the coil current in abnormal and normal conditions.

According to the equation (5), as shown in FIG. 11, when the decrease in the inductance of the coil is small, a current I flowing in the coil rises later than a design value; and, on the other hand, when the decrease in the inductance of the coil is large, the current I rises earlier than the design value.

In this manner, by detecting the rising time of the current flowing in the coil, the decrease rate of the inductance of the coil, that is, the stress of the giant magnetostrictive element can be detected.

Figure 12:
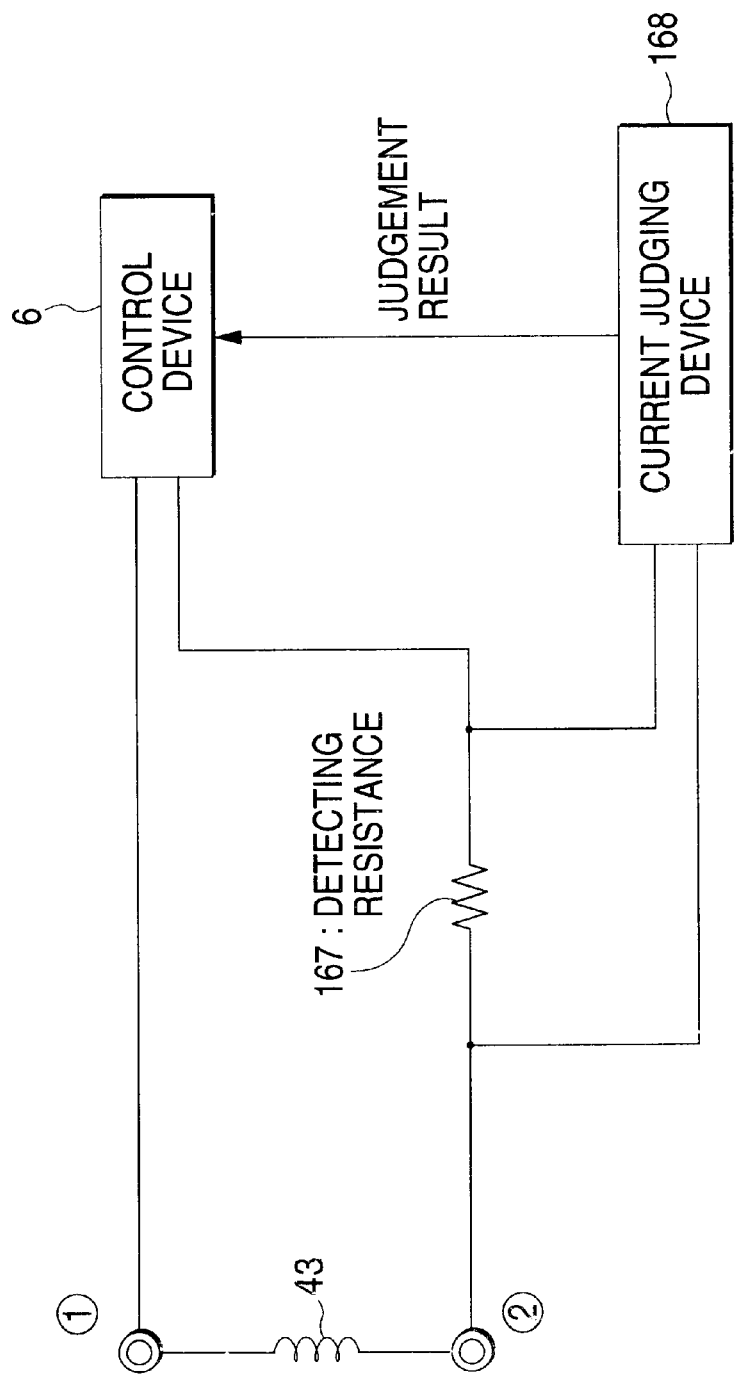
FIG. 12 is a view of a structure for detecting the coil current.

Thanks to the rising characteristic of the current, as shown in FIG. 12, by monitoring a current flowing in the coil 43 using a detecting resistance 167 and a current judging device 168, it is possible to judge whether the operating condition of the giant magnetostrictive material pump is good or not. The detecting resistance 167 and current judging device 168 respectively correspond to a current measuring device and a trouble judging device.

That is, in case where the rising time of the current flowing in the coil 43 is almost equal to the design value, it can be found that the giant magnetostrictive material pump is operating properly. In case where the rising time of the current is earlier than the design value, it can be found that the pressure within the cylinder 36 is caused to increase, for example, due to the clogged condition of the nozzle 20 and a great stress has been generated in the giant magnetostrictive element. Also, in case where the rising time of the current is later than the design value, it can be found that there has occurred a trouble such as the leakage of the lubricant form the lubricant flow passage and only a small stress has been generated in the giant magnetostrictive element.

Figure 13:
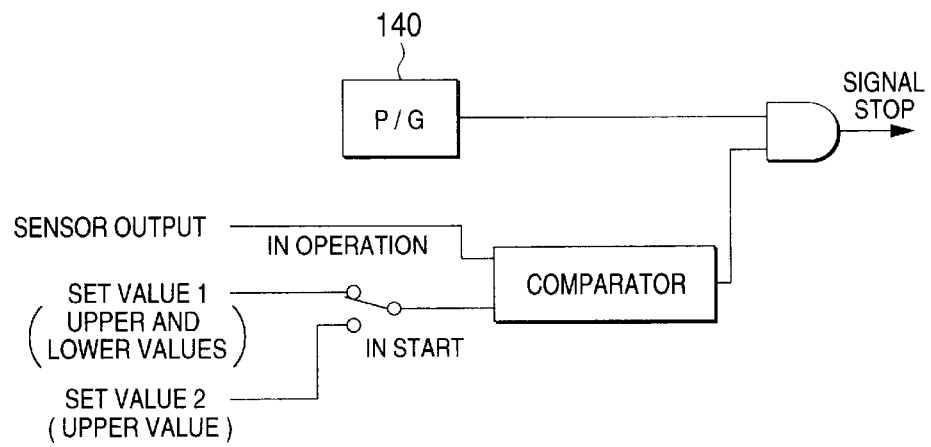
FIG. 13 is a block diagram of a schematic structure of a judging device.
Figure 14:
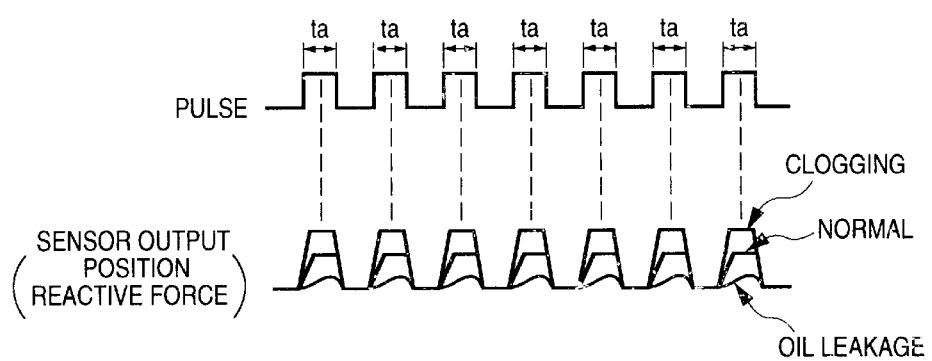
FIG. 14 is a time chart of the operation of the judging device.

Now, FIG. 13 is a block diagram of the schematic structure of the judging device 168, and FIG. 14 is a time chart showing pulse signals respectively generated in correspondence to discharge intervals as well as sensor outputs in steady and abnormal operations of the lubricating device. In this case, signals in the time when the lubricating device is in the discharging condition and detect signals are different in the normal and abnormal conditions, that is, signals in the time corresponding to the pulse issuing time ta shown in FIG. 14 are detected.

When detecting the abnormal condition occurrence during the steady operation of the lubricating device, at first, whether the present operating condition is in an air bleed condition in the start stage or not is judged by comparing the cycle number and stroke of the piston 35 with their respective set values. When it is found that the present operating condition is, not in the start stage, the output of the coil current is compared with a set value 1 which is a set value for the normal operation. In case where the output of the coil current falls within the range of the lower to upper limits of the set value 1, the current operation continues on as it is; and, on the other hand, in case where it is out of the range of the set value 1, the judging device 168 issues a stop signal for stopping the operation of the lubricating device. Due to this, the detection of the abnormal condition occurrence in the steady operation and the stop of the lubricating device are possible.

A pulse generator 140 shown in FIG. 13 links a signal for controlling the intermittent operation of the lubricating device with the judging device 168, or links such signal with a timer built in the judging device 168 or a separately provided timer to thereby be able to monitor an output signal from a sensor corresponding to the pulse issuing time ta shown in FIG. 14. Also, as the judging device 168, there can be used not only the lubricating device but also a computer which controls the operation of a machine in which the lubricating device is used.

As described above, since there is a close relationship between the pressure of the interior portion of the cylinder 36 and the discharge of the lubricant from the nozzle 20, when the rising of the current of the coil 43 is shifted from the designed target value, it is supposed that the discharge of the lubricant from the nozzle 20 is also out of order.

Here, referring to an example where the lubricating device according to the invention is used as a device for supplying the lubricant to the rolling bearing of a high-speed spindle, when it is detected that the rising characteristic of the coil current is shifted from the target value, the current judging device 168 is allowed to issue an abnormal signal to thereby be able to enforce a feed back control, for example, to stop the rotation of the high-speed spindle urgently.

Also, the present embodiment is structured such that completion of air bleed from the nozzle can be detected.

As described before, thanks to the Villari effect that is one of the main properties of a magnetostrictive element, with respect to the inductance when a stress given to a giant magnetostrictive element is zero, the inductance when the stress is 1 [MPa] decreases about 30%.

Figure 15:
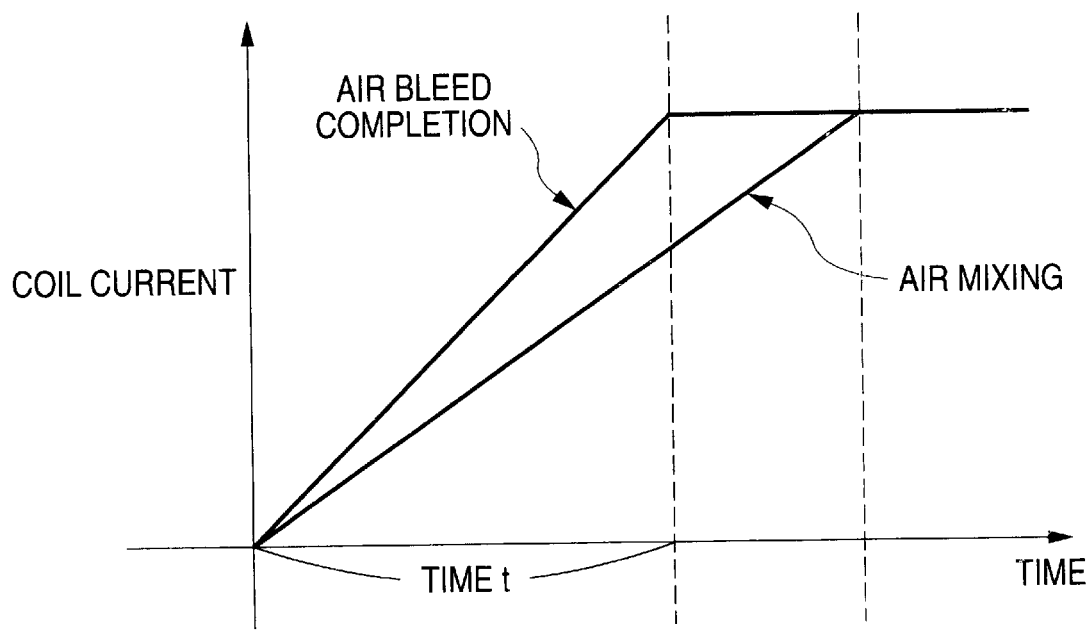
FIG. 15 is an explanatory view of the rising characteristic of the coil current in an air mixing condition and after an air bleed completed condition.
Figure 16:
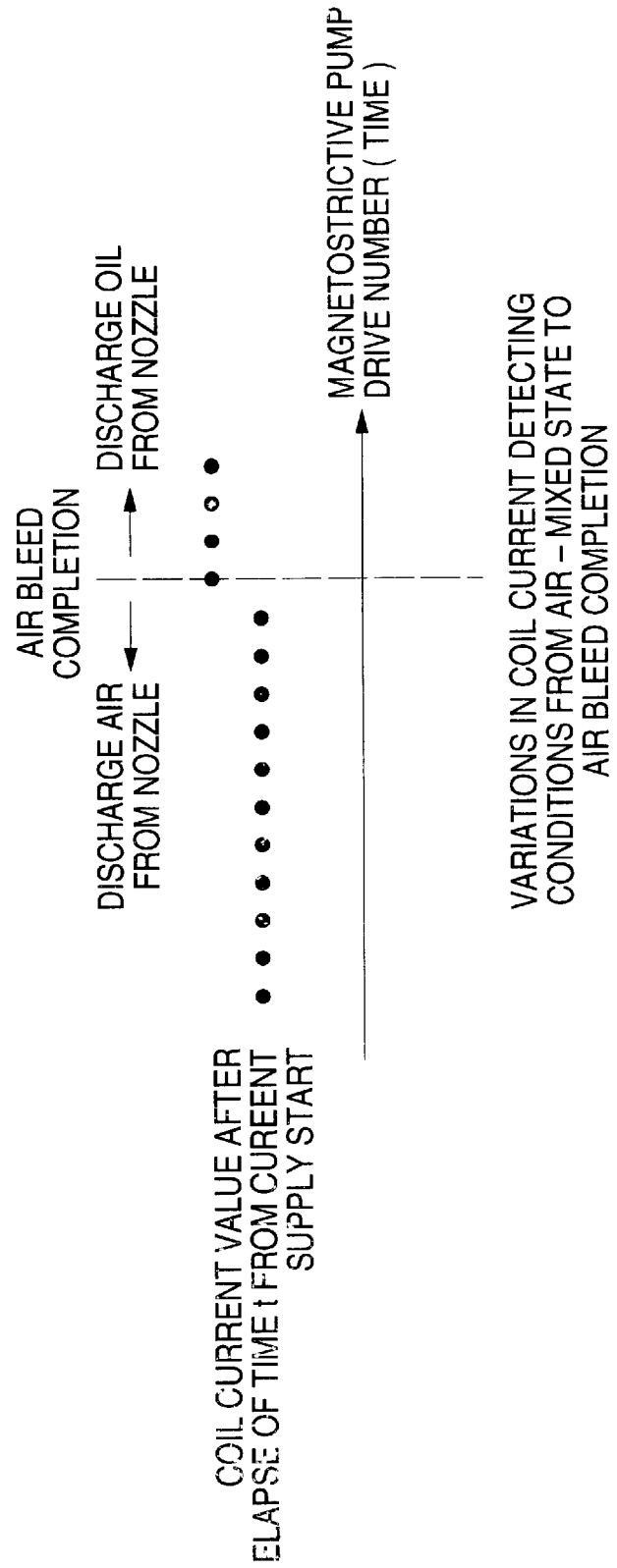
FIG. 16 is a view of a coil current detect condition from the air mixing condition to the air bleed completed condition.

Due to the above relationship, the quickness of the rising of a current flowing in a coil shown in FIG. 15 is connected with a stress which a giant magnetostrictive element receives, that is, is connected with the pressure in the interior portion-of a cylinder. Therefore, by detecting a current flowing in a coil as shown in FIG. 16 using the detecting resistance 167 and current judging device 168 (which respectively correspond to a current measuring device and an air mixture judging device) shown in FIG. 12, completion of air bleed of a giant magnetostrictive material pump can be judged.

In other words, when detecting the air bleed completion in the start time of the operation of the lubricating device, when the rising characteristic of the current is compared with the characteristic of the current in the normal state thereof, in case where the current rising time is longer than a given steady time, that is, when the current value after the time t is small, it is judged that the air remains within the cylinder 36 and within the lubricant flow passage. When the air remains still, in order to remove the air in a short time, the giant magnetostrictive material pump is operated by the control device 6 shown in FIG. 3 in such a manner that the piston 36 can be driven at a faster cycle than the steady state thereof as well as with a large stroke. After then, when the air bleed is completed, that is, when the current value becomes the steady value, the giant magnetostrictive material pump is returned back to its steady state operation.

Due to this, for example, when the lubricating device is operated for the first time or when the operation of the lubricating device is started in the morning, the airbleed can be automatically completed in a short time.

Figure 17:
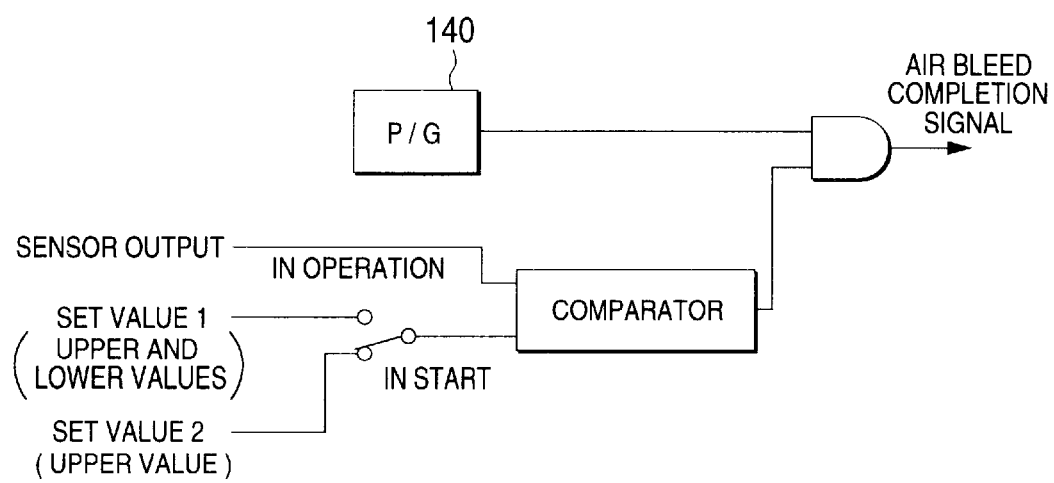
FIG. 17 is a block diagram of a schematic structure of an air bleed completion judging device.
Figure 18:
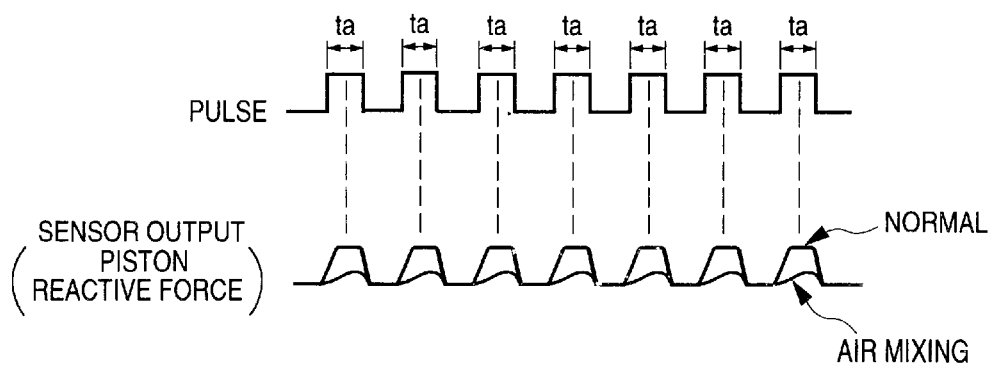
FIG. 18 is a time chart of the operation of the air bleed completion judging device.

Now, FIG. 17 is a block diagram of the schematic structure of the judging device 168 which is used to judge the air bleed completion, and FIG. 18 is a time chart pulse signals to be generated correspondingly to discharge intervals as well as sensor outputs in the air mixing time and in the air bleed completion time when the lubricating device is started. In this case, the judging device 168 detects a signal which corresponds to the time when not only the lubricating device is in the discharge state but also there is a difference in a detect signal between the normal state and the air mixed state, that is, a signal which corresponds to the pulse issuing time ta shown FIG. 18. Similarly to the above, in case of detecting the completion of air bleed, whether the present operating state is the air bleed state in the start time of the lubricating device or not is judged by comparing the number of cycles and strokes of the piston 35 with their respective set values. When the operating state is the start time, the output of the pressure sensor is compared with the set value 2 that is a set value in the normal state. In case where the output of the pressure sensor is smaller than the set value 2 and out of the set range, the current operation is allowed to continue on. On the other hand, in case where it is equal to or larger than the set value 2, there is generated a signal which shows that the operation is in the steady state.

In this manner, whether the air bleed is completed or not can be detected as well as the cycle number and stroke of the piston 5 can be switched to the steady operating state.

A pulse generator 140 shown in FIG. 17 links a signal for controlling the intermittent operation of the lubricating device with the judging device 168, or links such signal with a timer built in the judging device 168 or a separately provided timer to thereby be able to monitor an output signal from a sensor corresponding to the pulse issuing time ta shown in FIG. 18. Also, as the judging device 168, there can be used not only the present lubricating device but also a computer which controls the operation of a machine in which the lubricating device is used.

Next, description will be given below of a performance test conducted on the super fine quantity oil lubricating pump 5.

Figure 19:
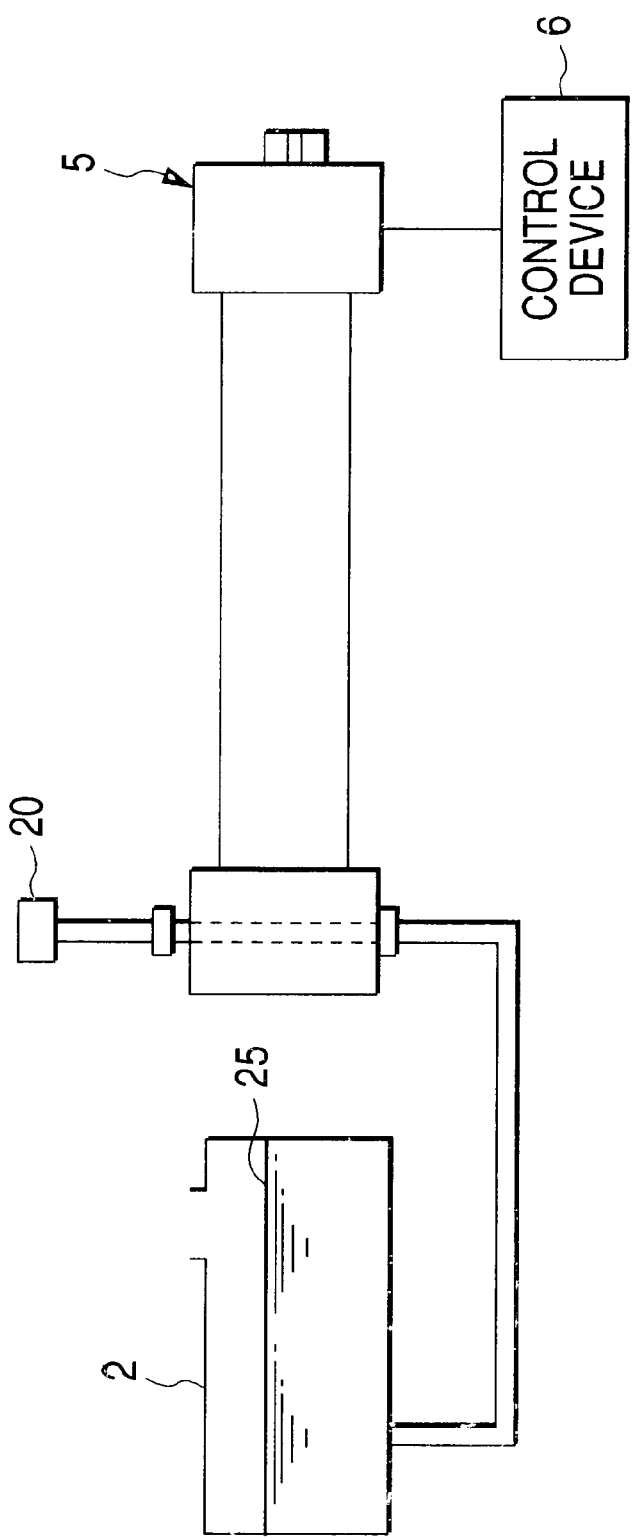
FIG. 19 is a schematic view of an embodiment in testing the performance of a super fine quantity oil lubricating pump.
Figure 20:
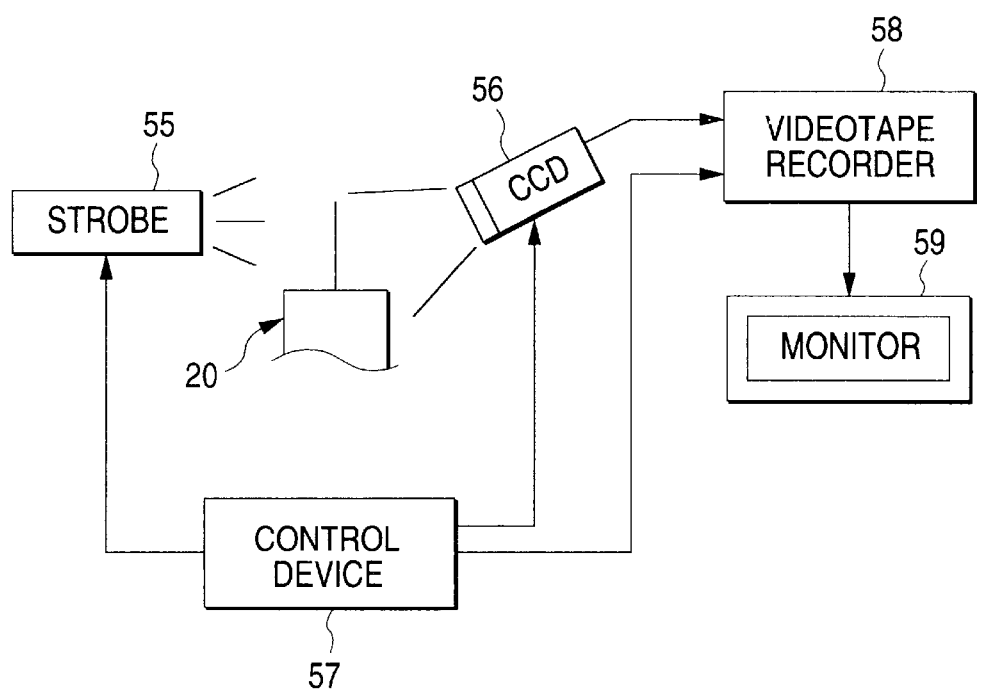
FIG. 20 is a schematic view of an embodiment of a visualizing device used when testing the performance of a super fine quantity oil lubricating pump.

FIGS. 19, and 20 are respectively schematic views of an embodiment in which the performance of the super fine quantity oil lubricating pump 5 was conducted. Here, description will be given of the results obtained by checking the influence of an air curtain on the nozzle 20 in the high-speed rotation of the spindle when the discharge state of the lubricating oil 25 was visualized by a CCD camera 56 and videotape recorded, the relationship of the pipe inside diameter and length with the discharge speed, and the relationship between the pipe inside diameter and discharge oil quantity, respectively. By the way, as the pipe material, there are used metal such as austenite stainless steel SUS 316, and plastics such as PEEK (polyether-ether-keton). However, there can also be used other material such as ordinary iron/steel material, aluminium/copper non-metallic material, plastic material, and ceramic material.

The present performance test was conducted under a severer condition (that is, under a condition that is easy to be influenced by the air curtain) by setting the distance between the nozzle leading end and the bearing as about 50 mm which is much longer than the normal distance (about 10 mm).

Supply of the lubricating oil to the interior portion of the bearing was set such that the lubricating oil can lubricate the contact portion between the inner race and rolling elements, while the lubricating oil supply state was visualized and was videotape recorded. A visualizing apparatus is composed of a strobe 55, a CCD camera 56, a control device 57 for controlling the strobe 55 and CCD camera 56, a videotape recorder 58 for recording video signals from the CCD camera 56, and a monitor 59 for displaying the images that have been recorded by the videotape recorder 58.

The visualizing apparatus was used to strobe observed the lubricating state in which the lubricating oil 25 was discharged from the nozzle 20. As the lubricating oil, there was used mineral oil VG22 (kinematic viscosity: 22 mm²/s at a temperature of 40° C.).

In this manner, the discharge state of the lubricating oil 25 was visualized and was tested under various conditions. As a result of this, it could be confirmed that the lubricating oil 25 can be supplied in a fine quantity by the super fine quantity lubricating pump 5 without being influenced by an air curtain which occurs in the interior portion of the bearing. Also, the optimum discharge condition could also be found out. Here, the discharge speed that is free from the influence of the air curtain occurring in the interior portion of the bearing was set equal to or more than 10% of the inner ring shoulder peripheral speed based on previous results. For example, in a bearing with an outer ring outside diameter of 160 mm, an inner ring inside diameter of 100 mm, and a rolling element pitch circle diameter dm=132.5 mm, a peripheral speed at a position of the rolling element pitch circle diameter dm provides 131.8 m/sec. in the case of the rotational speed N=19000 min$^{-1}$. That is, the discharge speed 13 m/sec., which is about 10% of the peripheral speed, provides a standard and, as this value is larger and the discharge quantity is larger, the discharge condition can be set more widely.

Figure 21:
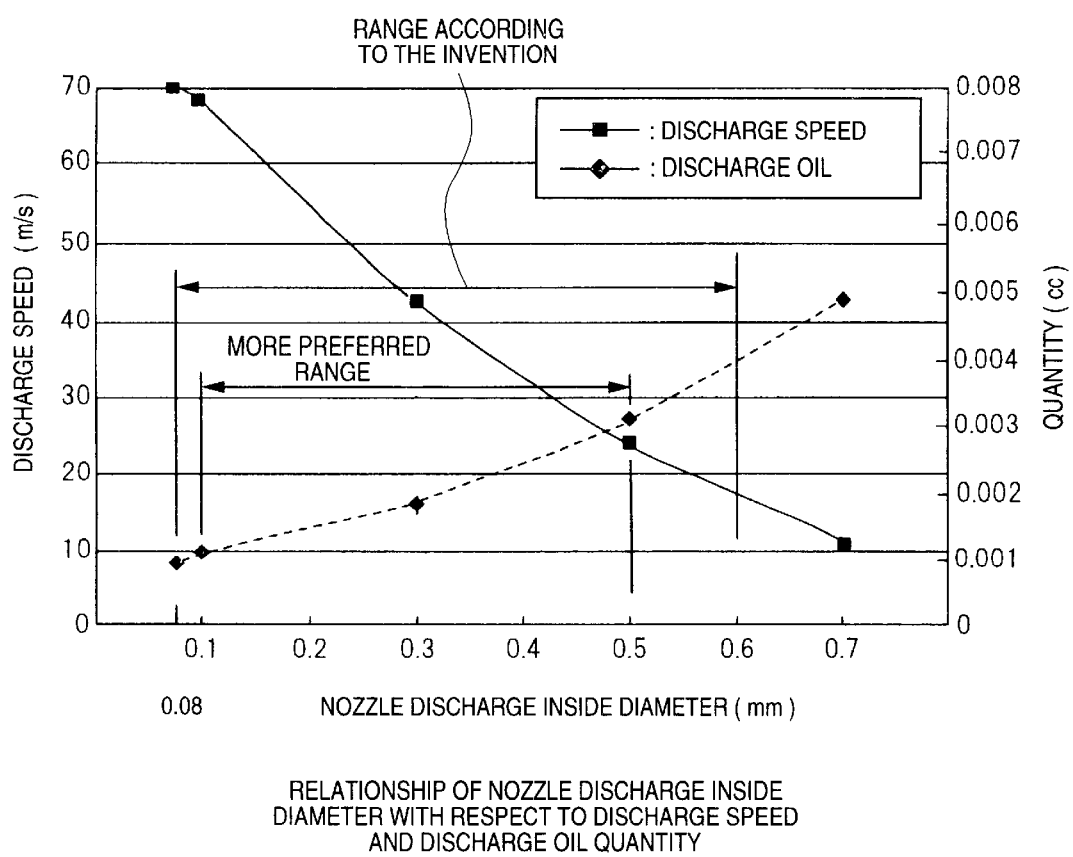
FIG. 21 is a graphical representation of the relationship between the discharge inside diameter of a nozzle outlet and discharge speed from a nozzle.
Figure 22:
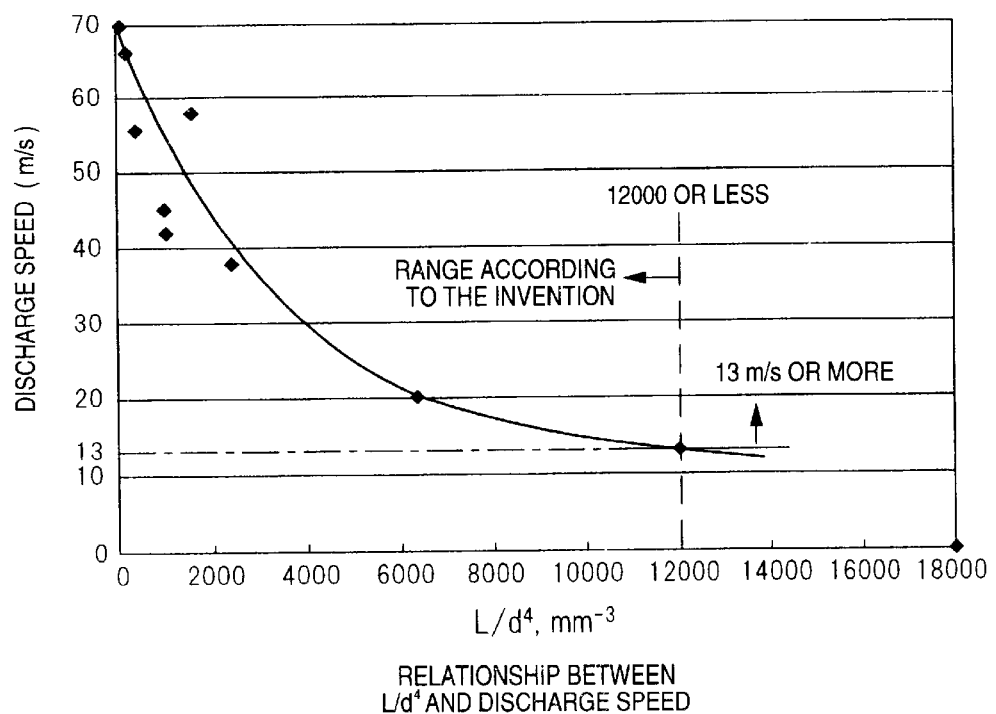
FIG. 22 is a graphical representation of the relationship between the parameter $L/d^4$ of pipe resistance and the speed of oil discharged.
Figure 23:
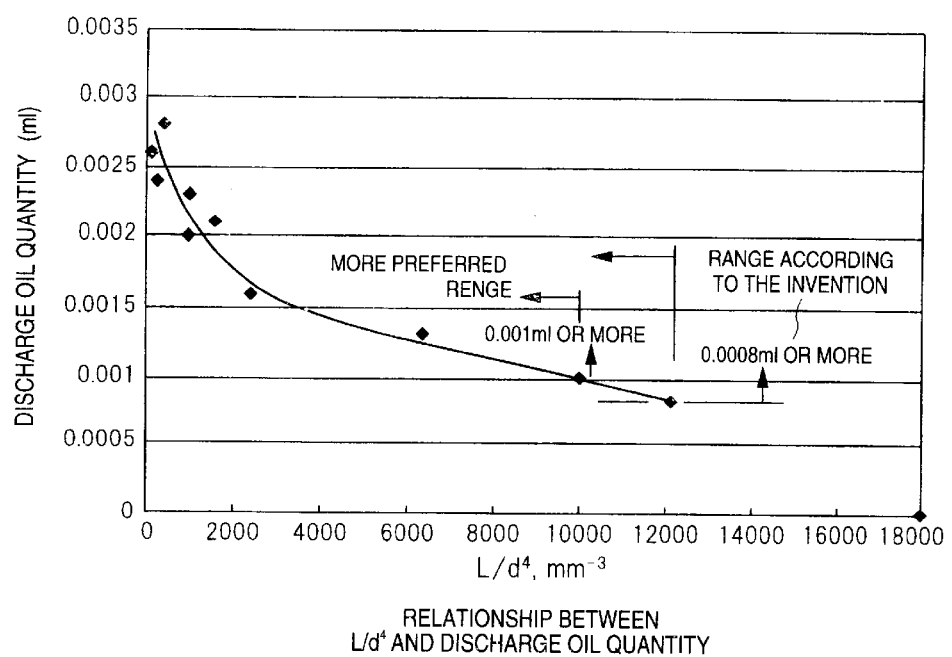
FIG. 23 is a graphical representation of the relationship between the parameter $L/d^4$ of pipe resistance and the quantity of oil discharged.

Now, FIGS. 21 to 23 respectively show the test results of the discharge state of the lubricating oil.

FIG. 21 is a graphical representation of the relationship between the discharge inside diameter of the nozzle 20 and the discharge speed, showing the results obtained by conducting the test with the discharge inside diameter of the nozzle as a parameter. As shown in FIG. 21, the smaller the discharge inside diameter of the nozzle is, the smaller the discharge quantity is and the larger the discharge speed is. And, as a result of the test, in case where the discharge diameter of the nozzle was smaller than 0.08 mm, variations in the discharge oil quantity increased; and, in the case of the nozzle discharge diameter being larger than 0.6 mm, the discharge speed showed an insufficient value which is equal to or less than 13 m/sec. Therefore, it is preferred that the effective range value of the discharge diameter of the nozzle may range from 0.08 to 0.6 mm. In this range, the lubricating oil is discharged at a discharge speed of 13–70 m/sec., and in a discharge oil quantity of 0.0008–0.004 ml per shot. Further, when balance between a discharge speed and a discharge oil quantity at a high speed is taken into account, it is especially preferred that the nozzle discharge diameter may be set in the range of 0.1–0.5 mm. In this case, the lubricating oil is discharged at a discharge speed of 25–68 m/sec., and in a discharge oil quantity of 0.001 ml–0.003 ml per shot.

Also, the discharge speed and discharge oil quantity are also influenced by the kinematic viscosity characteristic of lubricating oil; for example, in lubricating oil having a kinematic viscosity of 5 mm²/s-50 mm²/s at a temperature of 40° C., the discharge speed is in the range of 10 m/sec.–100 m/sec., while the discharge oil quantity is in the range of 0.0005 ml per shot–0.01 ml per shot.

Now, FIG. 22 show the results obtained when the discharge state of the lubricating oil 25 from the nozzle 20 was visualized and the discharge speed thereof was checked. Here, the respective discharge speeds, which were obtained when the pipe inside diameter d was set in the range of 0.5–1.5 mm and the pipe length L was set in the range of 100 mm–3000 mm, are graphically represented with the parameter L/d$^4$ of the pipe resistance as the abscissa. As can be seen from this graphical representation, in the case of L/d$^4 \leq$12000 (mm$^{-3}$), the discharge speed is equal to or more than 13 m/sec., which satisfies the required discharge speed.

FIG. 23 is a graphical representation of the relationship between the parameter L/d$^4$ of the pipe resistance and the discharge oil quantity. As can be seen from this graphical representation, in the range of $L/d^4 \leq 12000$ (mm$^{-3}$), a fine oil quantity of 0.0008 ml/shot or more can be supplied; and, in the range of $L/d^4 \leq 10000$ (mm$^{-3}$), a fine oil quantity of 0.001 ml/shot or more can be supplied. Therefore, by combining L with d in the range of $L/d^4 \leq 12000$ (mm$^{-3}$), it is possible to set the discharge speed equal to or larger than 13 m/sec. and the discharge oil quantity equal to or larger than 0.0008 ml/shot. Further, in the range of $L/d^4 \leq 10000$ (mm$^{-3}$), it is possible to set the discharge speed equal to or larger than 13 m/sec. and the discharge oil quantity equal to or larger than 0.001 ml/shot. Also, $L/d^4$ is restricted by the fact that the pipe length cannot be shortened due to the condition of the apparatus and thus $L/d^4 \geq 5$ (mm$^{-3}$) is the practical range. In case where the pipe diameter is changed on the way, as d, there is used a mean diameter for the whole pipe length.

Next, a rotation test was conducted using a spindle apparatus according to the present embodiment; and, the performance of the angular ball bearing 16a when using the super fine quantity oil lubricating pump 5 was compared with the performance thereof when using a conventional oil-air lubricating system.

As the test bearing, there was used a bearing which has the following contents: that is, outer ring outside diameter: 160 mm, inner ring inside diameter: 100 mm, rolling element pitch circle diameter $d_m$: 132.5 mm, outer/inner race groove radius of curvature: 52–56% of the ball diameter, contact angle; 20 degrees, inner/outer ring material: SUJ2, and rolling element material: $Si_3N_4$. And, under the conditions of lubricating oil; mineral oil VG22 (kinematic viscosity: 22 mm$^2$/s at a temperature of 40° C.), axial load: 980N, nozzle number per bearing: in the case of the conventional oil-air lubrication, three nozzles and, in the case of the super fine quantity oil lubricating pump, one nozzle, and 0–15000 min$^{-1}$ (in part, 19000 min$^{-1}$, $d_m \cdot N=2500000$), there were conducted tests respectively on the relationship between the spindle rotation speed and bearing torque, the relationship between the spindle rotation speed and outer ring temperature rise, a comparison of bearing torque variations, a comparison of noise levels, and observation of visualization (videotape recorded images) of the state of the super fine quantity oil lubricating pump.

Figure 24:
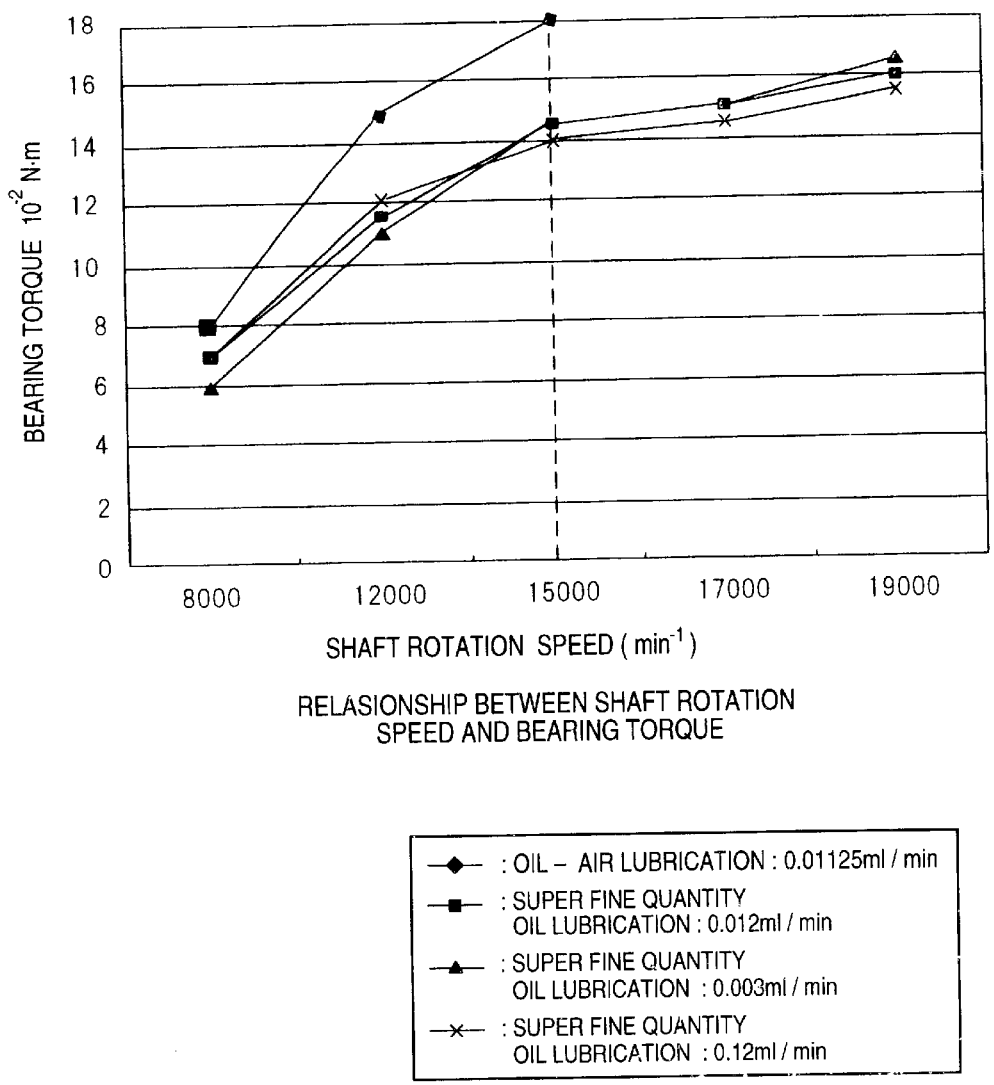
FIG. 24 is a graphical representation of the relationship between the rotation speed of the spindle and the torque of the bearing.

FIG. 24 is a graphical representation which shows the relationship between the spindle rotation speed and bearing torque. In FIG. 24, the oil-air lubricating system corresponds to the data obtained when three nozzles respectively discharge lubricating oil of 0.03 ml per shot at the interval of 8 min.; the super fine quantity oil lubricating system corresponds to the data obtained when one nozzle discharges lubricating oil of 0.002 ml per shot at the intervals of 10 sec., 40 sec., and 1 sec.; and, discharged oil quantities per unit time are respectively 0.01125 ml/min., 0.012 ml/min., 0.003 ml/min., and 0.12 ml/min.

In the conventional oil-air lubricating system, at the rotation speed of 15000 min$^{-1}$ ($d_m \cdot N=2000000$), the bearing torque is 0.18 N·m, whereas, in the super fine quantity oil lubricating system according to the invention, the bearing torque is 0.14 N·m which is lower than in the conventional system. Further, at the rotation speed of 19000 min$^{-1}$ ($d_m \cdot N=2500000$) as well, the bearing torque according to the invention is 0.16 N·m. That is, the apparatus according to the invention is lower in the bearing torque than the conventional apparatus.

From the torque characteristics shown in FIG. 24, in case where the supply oil quantity is in the range of 0.003 ml/min.–0.12 ml/min., the torque in the case of the super fine quantity oil lubrication, at a rotation speed equal to or higher than the rotation speed of 12000–15000 min$^{-1}$, becomes smaller as the supply interval is shorter, that is, as the supply oil quantity per unit time is larger. This is because, in order that the lowering of the oil film forming performance due to an increase in the temperature at a high speed can be prevented, there is required a certain degree of lubricating oil quantity. That is, for the respective rotation speeds used, there are present the optimum lubrication oil quantity, the optimum lubricating oil supply interval, and the optimum discharge oil quantity. The optimum lubrication oil quantity, lubricating oil supply interval and discharge oil quantity at the highest rotation speed can also be set according to the highest rotation speed. However, in case where the lubricating oil quantity is large, in the low speed rotation, the bearing torque can be too large. In this case, it is preferable that the control device may supply the lubricating oil in such a manner that it selects the optimum lubrication oil quantity, lubricating oil supply interval and discharge oil quantity to each of the rotation speeds.

By the way, in the case of the cylindrical roller bearing 17, not only because there is no spin as in the angular ball bearing but also because the contact surface pressure thereof is smaller than the angular ball bearing, even when the supply oil quantity is small, the bearing 17 can keep its oil film forming performance, while a range of 0.0005 ml/min.–0.12 ml/min. is the optimum condition of the supply oil quantity.

Figure 25:
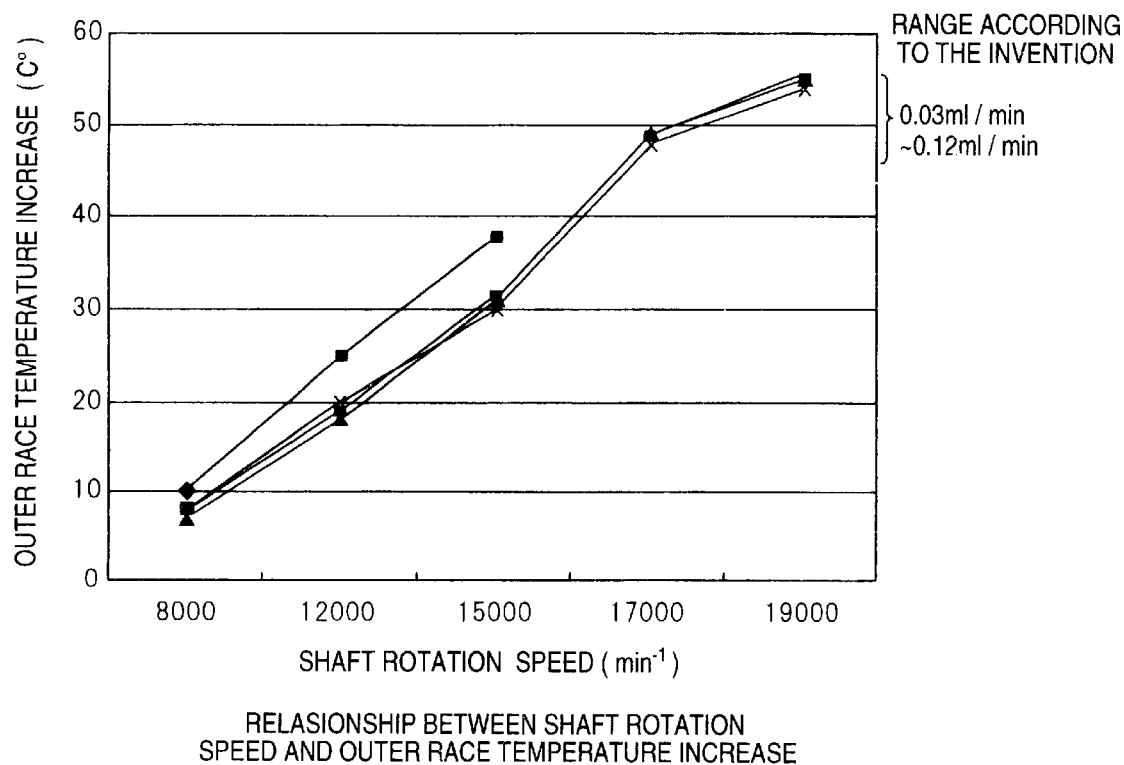
FIG. 25 is a graphical representation of the relationship between the rotation speed of the spindle and increases in the temperature in the outer race of the bearing.

Next, FIG. 25 is a graphical representation of the relationship between the spindle rotation speed and outer race temperature increase.

As can be seen from this graphical representation, with respect to the outer ring temperature rise, the super fine quantity oil lubricating system is low in temperature when compared with the conventional oil-air lubricating system. In the present FIG. 25 and in the previous FIG. 24, in the case of the oil-air lubricating system, there are shown only the data up to the rotation speed of 15000 min$^{-1}$. This is because, when the temperature was increasing into the range of 15000 min$^{-1}$–17000 min$^{-1}$, the gradient of the temperature rise was steep and the outer ring temperature rise exceeds 60° C., so that the test was interrupted. That is, when compared with the conventional oil-air lubricating system, the super fine quantity oil lubricating system produces less torque, can restrict the temperature increase, and can rotate the spindle at a high speed. By the way, in case where, in the low speed rotation, the bearing temperature and torque increase due to the excessive supply of the lubricating oil provides a problem, as a countermeasure against this, in the case of the super fine quantity lubricating oil pump 5, it is able to control lubricating oil supply quantity.

Next, FIG. 26 is a graphical representation of the results obtained by checking the changes of the bearing torque and bearing temperature when the lubricating oil is supplied. Here, in the oil-air lubricating system of FIG. 26A, there are shown data obtained when three nozzles respectively discharged the lubricating oil in a quantity of 0.03 ml per shot at the intervals of 8 min., a total of 0.01125 ml/min. And, in the super fine quantity oil lubricating system of FIG. 26B, there are shown the data obtained when a single nozzle discharged the lubricating oil in a quantity of 0.002 ml of per shot at the interval of 10 sec., a total of 0.012 ml/min.

In the conventional oil-air lubricating system, the three nozzles respectively supply the lubricating oil in a quantity of 0.03 ml per shot at the intervals of 8 min. However, as shown in FIG. 26A, after the lubricating oil is supplied, the bearing torque varies outstandingly and, in response to this, the bearing temperature increases. On the other hand, in the super fine quantity oil lubricating system, although the lubricating oil quantity per unit time is almost equal to the conventional oil-air lubricating system, the supply oil quantity per shot is extremely small and the supply interval is short, so that the bearing torque and bearing temperature vary in such a slight manner that the oil supply time cannot be distinguished.

Next, FIG. 27 is a graphical representation of the results obtained by comparing the noise levels of the super fine quantity oil lubricating pump according to the present embodiment with those of the conventional device. The lubricating conditions in this comparison are also the same as in FIG. 26. As can be seen from this graphical representation, in the spindle apparatus according to the present embodiment, since there is not used compressed air, the noise level thereof is low when compared with the conventional oil-air lubricating system.

Next, description will be given below of the results of a test conducted on the performance of the spindle apparatus a multi-branch piping device in a case where there is disposed, in a spindle apparatus including a plurality of bearings according to the invention, a multi-branch piping device for supplying the lubricating oil from the superfine quantity lubricating oil pump 5 distributively to the plurality of bearings.

Figure 28:
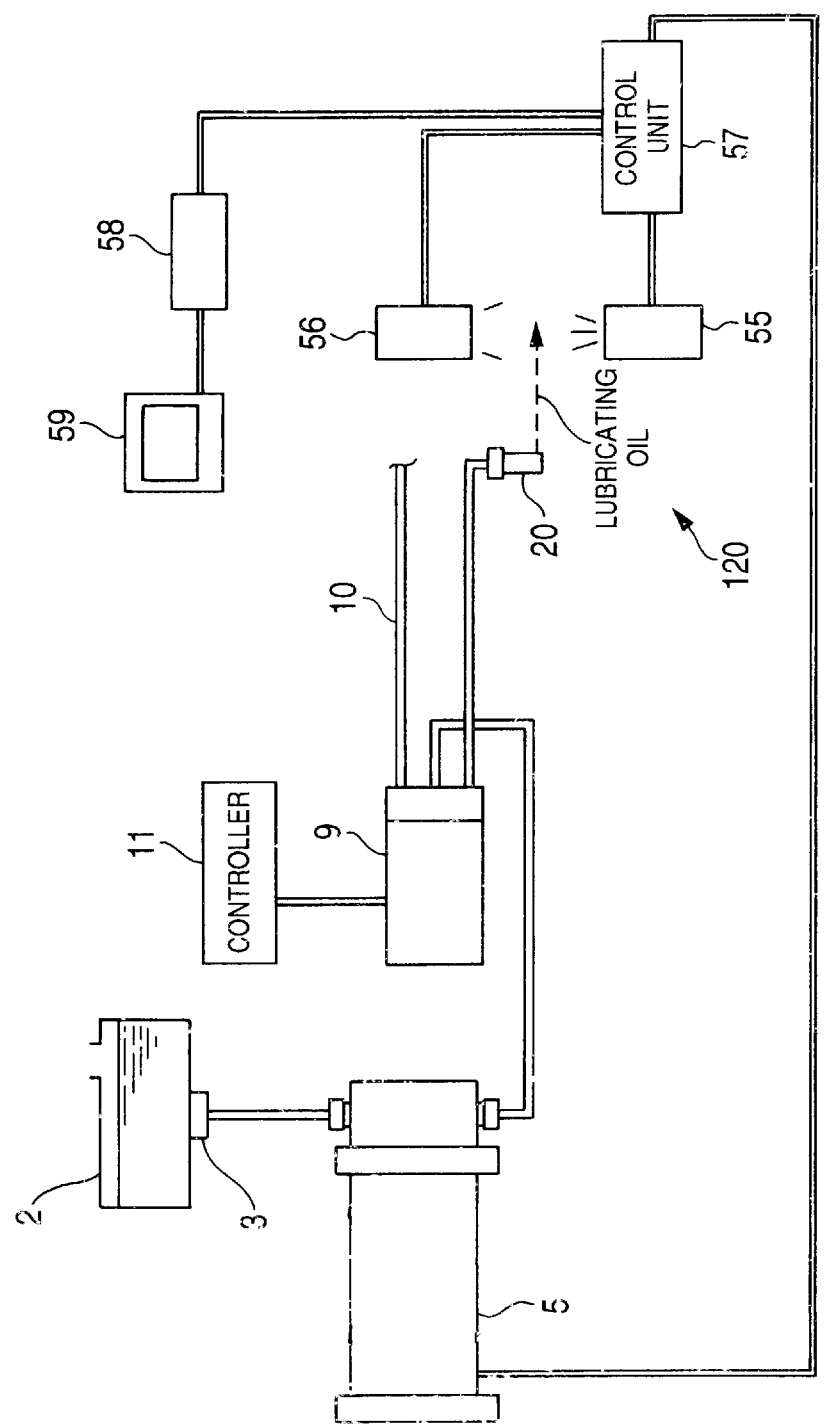
FIG. 28 is a schematic view of the superfine quantity lubricating oil pump, showing a state in which the performance test of the multi-branch piping device is executed.

Now, FIG. 28 is a schematic view of an embodiment of the superfine quantity lubricating oil pump 5 showing a state in which the performance test of the multi-branch piping device is executed. In this embodiment, there is employed a structure in which lubricating oil from the superfine quantity lubricating oil pump 5 is distributed and supplied to the plurality of bearings using a multi-branch piping device 9 interposed between the superfine quantity lubricating oil pump 5 and a nozzle 20. And, in this performance test, the discharge states of the lubricating oil were visualized and video recorded and the multi-branch piping device 9 was checked for its performance, specifically, the relationship between the pipe length and the discharge speed of the nozzle 20 as well as the relationship between the pipe length and the discharge quantity of the nozzle 20 when the spindle is rotated at a high speed.

In the present test, as the multi-branch piping device 9, there was used a six-way valve which belong to the "AUTOMATIC VALVE UNIT 401 SERIES" manufactured by LABO SYSTEM Mfg. Co. and as a pile 10, there was used a pipe which is formed of stainless steel and has an outside diameter of the order of 1.59 mm (¹/₁₆ inch) and an inside diameter of 1 mm. The multi-branch piping device 9 is structured such that six units of the pipe 10 can be connected thereto. In case where one nozzle is used for one bearing, one unit of the multi-branch piping device 9 can cope with up to six bearings. By the way, the selection of the pipes 10 used to supply lubricating oil is made by a controller 11 which is connected to the multi-branch piping device 9.

A visualizing apparatus 120 includes the electronic flash 55, the CCD camera 56, a control unit 57 for controlling the electronic flash 55 and CCD camera 56, the videotape recorder 58 for recording image signals given from the CCD camera 56, and the monitor 59 for displaying the image signals that are recorded by the videotape recorder 58.

To evaluate the performance of the multi-branch piping device 9, the lubricating oil discharge state from the nozzle 20 was visualized and the lubricating oil discharge speed and discharge quantity from the nozzle 20 were compared between a case where the multi-branch piping device 9 is used and a case where it is not used. In this comparison, as the comparison conditions, a nozzle discharge diameter was set at 0.2 mm and a pipe length was set in the range of 0.5–4.0 m.

In this comparison test, a total of six pipes were connected to the first to sixth ports (not shown) of the multi-branch piping device 9, the lengths of these six pipes were varied in the range of 0.5–4.0 mm, and the lubricating oil discharge speeds and lubricating oil quantities from the nozzle 20 connected to the pipes were measured respectively. Also, referring to the lubricating oil supply positions into the interior portions of the bearings, in this test, the contact portions between the rolling bodies and the raceways of the inner rings of the bearings were set as aiming positions.

Figure 29:
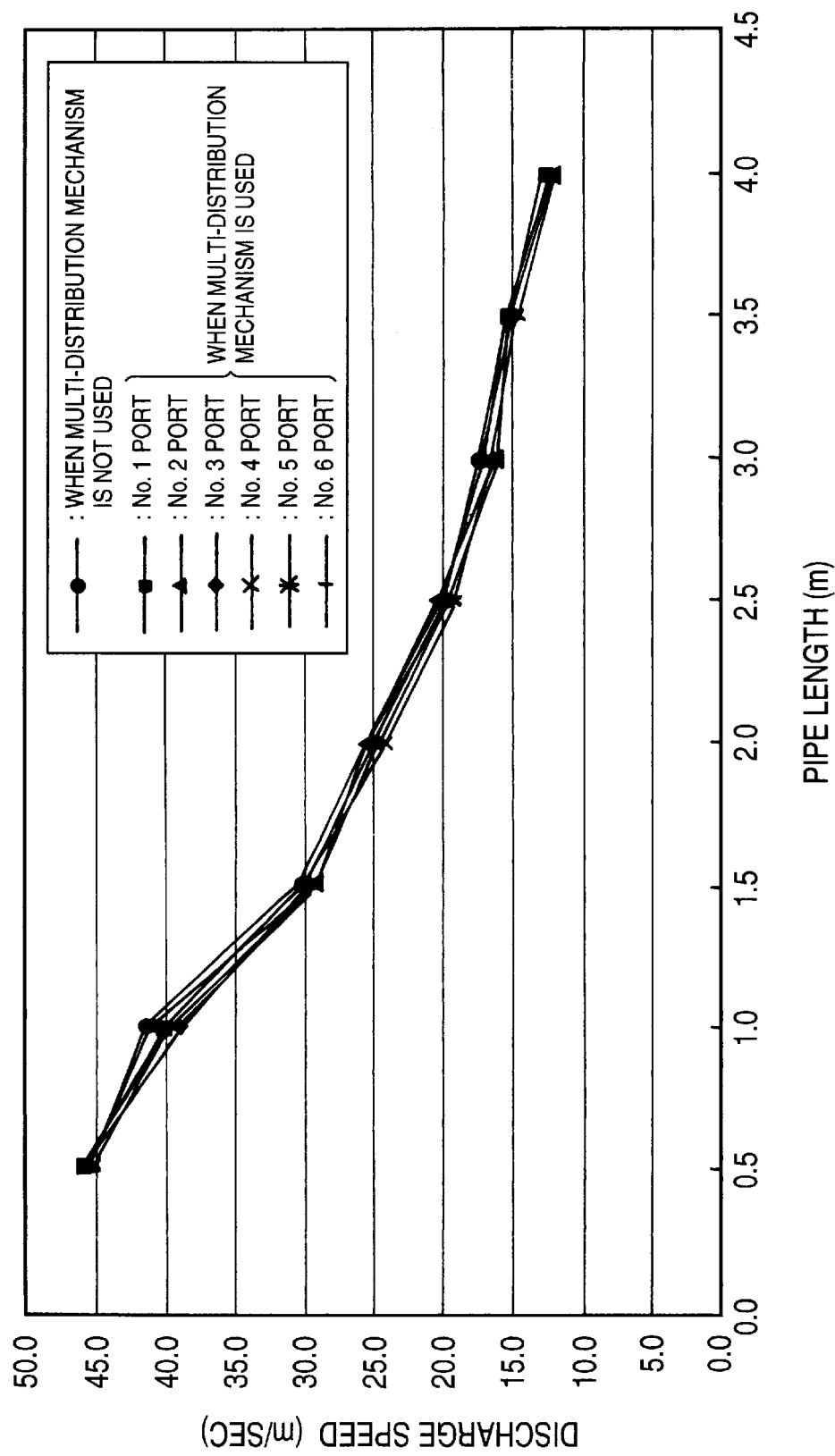
FIG. 29 is a graphical representation showing the comparison results of the lubricating oil discharge speeds between a case where the multi-branch piping device is used and a case where it is not used.

Now, FIG. 29 shows the comparison results of the lubricating oil discharge speeds between a case where the multi-branch piping device 9 is used and a case where it is not used (a pump and a nozzle are directly connected to each other using a pipe). Here, the term "pipe length" used in the abscissa axis of FIG. 29 expresses a length from the exit of the pump to the entrance of the nozzle. According to FIG. 29, it can be found that there is few difference in the lubricating oil discharge speeds between the case where the multi-branch piping device 9 is used and the case where it is not used.

Figure 30:
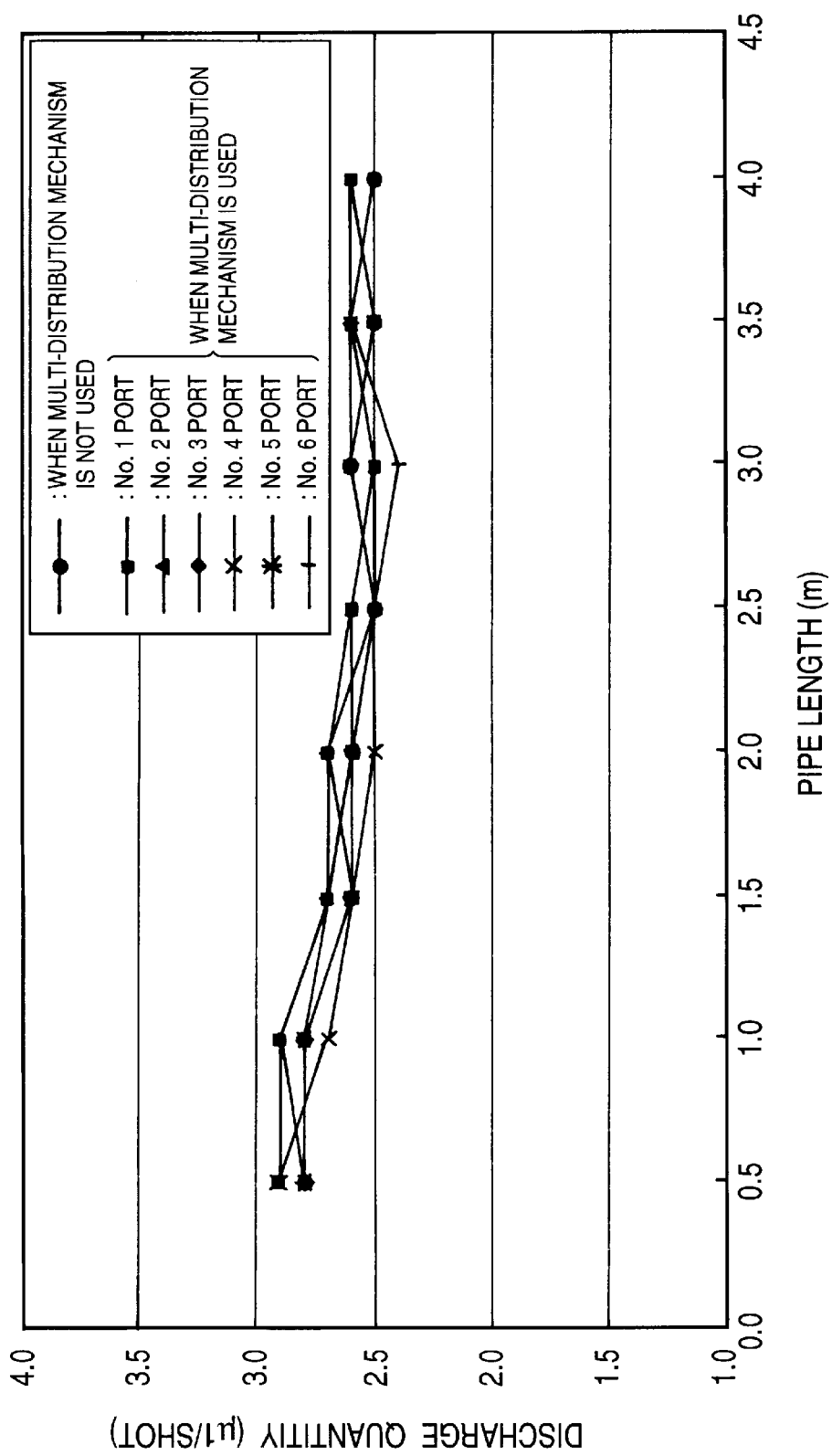
FIG. 30 is a graphical representation showing the comparison results of the lubricating oil discharge quantities between a case where the multi-branch piping device is used and a case where it is not used.

Now, FIG. 30 shows the comparison results of the lubricating oil discharge quantities between a case where the multi-branch piping device 9 is used and a case where it is not used. In this comparison, the evaluation conditions thereof were set so as to be similar to those in FIG. 29. According to FIG. 30, it can be found that there is few difference in the lubricating oil discharge quantities between the case where the multi-branch piping device 9 is used and the case where it is not used. Therefore, use of the multi-branch piping device 9 can generate little loss in supply of lubricating oil within the pipes.

The above test results show that, due to use of the multi-branch piping device 9, a single lubricating apparatus is able to supply lubricating oil sufficiently to a spindle apparatus including a plurality of bearings, and also that, even when compared with the case where the multi-branch piping device 9 is not used, there is found no difference in the lubricating oil discharge speeds from the nozzle and in the lubricating oil discharge quantities from the nozzle. That is, use of a multi-branch piping device makes it possible not only to execute stable lubricating oil distributive supply but also to provide equivalent performance to the case where the multi-branch piping device is not used.

By the way, in the above-mentioned multi-branch piping device 9 of the spindle apparatus, there is used a six-way valve which belong to the "AUTOMATIC VALVE UNIT 401 SERIES" manufactured by LABO SYSTEM Mfg. Co. However, this is not limitative but, for example, as other commercial automatic valve device, there can also be used a twelve-way valve belonging to the "AUTOMATIC VALVE UNIT 401 SERIES" manufactured by LABO SYSTEM Mfg. Co., or a valve called "LabPRO 6" and a valve called "LabPRO 10" both manufactured by SHIMAZU Mfg. Co. Also, as a multi-branch piping device, the above-mentioned multi-branch piping device 9 is not limitative but any other device may also be used, provided that it has similar mechanism and performance to the multi-branch piping device 9.

As has been described heretofore in detail, according to the spindle apparatus of the present embodiment, since there is provided the super fine quantity oil lubricating pump 5 and the angle and position of the nozzle 20 are designed optimally, the lubricating oil 25 can be pin-spot supplied in a super fine quantity (0.0005–0.01 ml/shot) directly to a desired portion within the bearing at the intervals of dozens of seconds.

Also, because the discharge speed (10–100 m/sec.) from the nozzle 20 is fast, the lubricating oil 25 can be supplied to the interior portion of the bearing accurately without being influenced by the air curtain which can occur when the spindle apparatus rotates at a high speed.

And, since the lubricating oil supply interval and lubricating oil quantity can be changed by the control device in accordance with the rotation speeds, the lubricating oil can be always supplied in a proper quantity for the rotation of the spindle regardless of the spindle rotation speed.

This can always provide an ideal lubricating condition in the interior portion of the bearing, which in turn makes it possible to provide a structure which is very excellent in torque stability. Also, an increase in the bearing temperature can also be controlled to a low level. Further, since the lubricating oil 25 is positively supplied to the interior portion of the bearing, there can be obtained a good lubricating oil supply efficiency and the quantity of consumption of the lubricating oil can be reduced. Therefore, the super fine quantity oil lubricating system allows rotation up to a higher speed area than that in the conventional oil-air lubricating system.

Also, because no compressed air is used, the noise level is low and an oil mist can occur little. And, since the lubricating oil discharge sensor and nozzle clogging sensor are built into the main body of the apparatus, the occurrence of a trouble can be avoided.

To sum up the above facts, by using the super fine quantity oil lubricating system, a lubricating oil forced lubricating device, a heat exchanger, a lubricating oil collecting device, and other attendant devices such as compressed air, which are used in the conventional lubricating systems including an oil mist lubricating system, an oil-air lubricating system and a jet lubricating system, can be simplified; the noise level can be controlled down to a low level; the consumption of the lubricating oil can be reduced to thereby be consideration for the environment; the bearing torque can be reduced down to a low torque level and can be enhanced in stability; and, the bearing temperature increase can be controlled down to a low level, thereby being able to enhance the rotation accuracy of the spindle. Therefore, according to the present super fine quantity oil lubricating system, there can be provided a spindle apparatus which is more advantageous and more compact than a spindle apparatus using the conventional lubricating methods.

By the way, in the present embodiment, in the super fine quantity lubricating oil pump 5, there is used a giant magnetostrictive element. However, the giant magnetostrictive element is not limitative but, even in other superfine quantity lubricating systems respectively using a piezo-electric element or a combination of an electromagnet and a belleville spring, provided that the lubricating oil is discharged in a fine quantity of 0.0005–0.01 ml/shot is discharged at the discharge speed of 10–100 m/sec., a spindle apparatus is able to obtain a rotation performance equivalent to the spindle apparatus using the giant magnetostrictive element.

Also, besides the giant magnetostrictive material having a positive characteristic, even magnetostrictive material having a positive and negative characteristic can also be similarly used to form a pump which uses the expansion and contraction of the rod body.

Further, the use of the above-mentioned lubricating device is not limited to the spindle apparatus shown in FIG. 1, but it can also be used in a spindle apparatus of high speed rotation which is required to be small in various torque variations and temperature increase.

Second Embodiment

Next, description will be given below of a second embodiment of a spindle apparatus including a super fine quantity lubricating oil pump composed of an electromagnet and a belleville spring according to the invention. By the way, a structure employed in the present embodiment is similar to that of the spindle apparatus according to the first embodiment except for a lubricating device, and thus the duplicate description thereof is omitted here.

In the case of a super fine quantity lubricating oil pump according to the first embodiment, as a drive source for driving a piston which is used to increase the pressure within a pressurizing chamber (pump chamber), as shown in FIG. 3, there is used the rod-shaped giant magnetostrictive material. As the material of this rod-shaped body, piezo-electric element can also be used depending on the lubricating conditions. A magnetic field or a voltage is applied to the giant magnetostrictive material or piezo-electric element which is connected to the piston 35 to thereby strain the giant magnetostrictive material or piezo-electric element, the giant magnetostrictive material or piezo-electric element is pressed against the piston 35 due to its strain to thereby increase the pressure within the pressurizing chamber (pump chamber) 37, whereby a super fine quantity of lubricating oil is discharged intermittently from the nozzle. Here, to obtain desired discharge speed and discharge oil quantity, there is required a given strain quantity of the rod body. For example, in case where the desired discharge speed and discharge oil quantity of lubricating oil discharged from a nozzle, which is connected to a pump and having an opening with an inside diameter of 0.1 mm, are respectively set approximately in the range of 10–100 mm/sec. and of the order of 0.0005–0.01 ml/shot, there is required giant magnetostrictive material which is formed in a cylindrical shape and has an outside diameter: 12 mm and a length: about 100 mm (the rod body produces a strain of about 100 $\mu$m, while the strain of the giant magnetostrictive material is about 1000 ppm).

Now, in the present embodiment, instead of the element formed of the magnetostrictive material or piezo-electric element, an electromagnet and a spring are used to drive a piston, thereby being able to provide a structure which is reduced in both size and cost.

Figure 31:
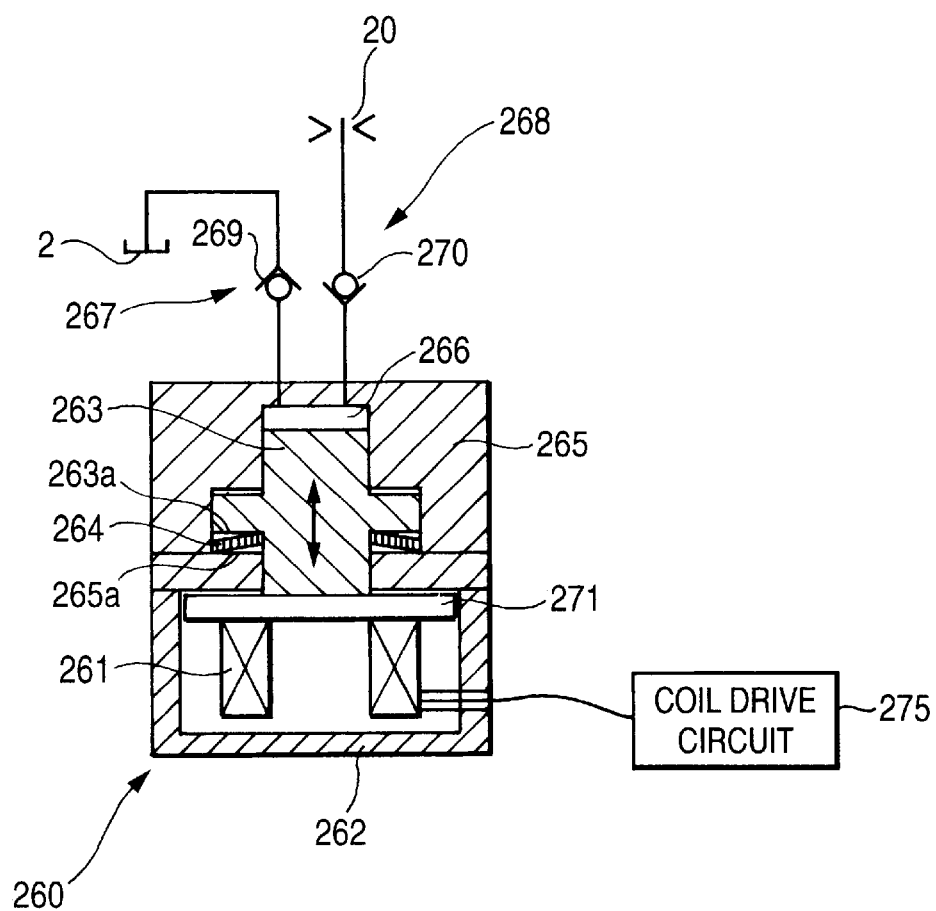
FIG. 31 is a section view of a super fine quantity lubricating oil pump employed in a spindle apparatus according to a second embodiment of the invention.

FIG. 31 is a section view of a super fine quantity lubricating oil pump 260 employed in a spindle apparatus according to the second embodiment of the invention. As shown in FIG. 31, the super fine quantity lubricating oil pump 260 comprises an electromagnet 261, a first housing 262 for storing the electromagnet 261 therein, a movable body (piston) 263 including a collar in the cylindrical-shaped intermediate portion thereof, and a second housing 265 for storing the movable body and a movable body pressing belleville spring 264 therein; and, the super fine quantity lubricating oil pump 260 further includes a pressurizing chamber 266 interposed between the movable body 263 and the second housing 265, a suction-side flow passage 267 and a discharge-side flow passage 268 respectively communicating with the pressurizing chamber 266, and check valves 269 and 270 respectively disposed on the suction-side flow passage 267 and discharge-side flow passage 268.

In the above-structured super fine quantity lubricating oil pump 260, the belleville spring 264, which is used to push out the movable body 263 to the pressurizing chamber 266 side, is interposed between the collar end face 263a of the movable body 263 and the end face 265a of the second housing 265. The movable body 263, when a current is supplied to the coil of the electromagnet 261 from a coil drive circuit 275, can be attracted toward the electromagnet 261 side and can be thereby contacted with an electromagnet portion 271 formed within the first housing 262. In this state, since the belleville spring 264 is contracted, there is generated a compression force.

After then, in case where the supply of the current from the control device 275 is cut off, the attracting force of the electromagnet 261 disappears and the movable body 263 is pushed out toward the pressurizing chamber 266 side due to the repulsive force of the belleville spring 264. As a result of this, the pressurizing chamber 266, in which the lubricating oil 25 is stored, is pressurized so that the lubricating oil 25 stored within the pressurizing chamber 266 is discharged from the nozzle 20 through the check valve 270 on the discharge-side oil passage 268. At the then time, the belleville spring 264 is adjusted in the clearance thereof in such a manner that it can be used in the 10–60% area of the whole flexing quantity of the belleville spring 264.

On the other hand, in the suction process, by supplying a current to the coil of the electromagnet 261 from the control device 275, there is generated a magnetic field in the electromagnet 261, so that the movable body 263 is attracted by the magnetic field. As a result of this, the pressurizing chamber 266 is expanded and thus the lubricating oil 25 is sucked in from the lubricating oil tank 2 through the check valve 269 on the suction-side flow passage 267. Also, as the movable body 263 is attracted, the belleville spring 264 is contracted to thereby generate a compression force which can generate such a pressuring chamber pressure as can obtain a desired discharge speed.

By repeating the above-mentioned suction and discharge operations, the lubricating oil 25 is discharged intermittently from the nozzle 20. Also, the electromagnet 261 is formed of a ferromagnetic body and, of course, the attracting force of the electromagnet 261 is set larger than the compression force that is generated by the contraction of the belleville spring 264.

In the present embodiment, assuming that, for the nozzle diameter of 0.1 mm, the discharge speed is set of the order of 60 m/sec., the discharge oil quantity is set 0.006 ml per shot, the pressure of the pressurizing chamber 266 is set on the order of 4 MPa, the outside diameter of the movable body 263 in the pressurizing chamber portion is set 10 mm, and the movable body stroke length is set 80 $\mu$m, as the belleville spring 64, there may be used a belleville spring for a heavy load which has a nominal size of 12 or larger, which is under the classification of JIS B 2706.

Also, when designing generally the electromagnet 261 suitable for this arrangement, the dimensions of the electromagnet portion thereof are set such that outside diameter: 50 mm and length: about 40 mm; and, the size of the movable portion drive mechanism portion is about 40% of that obtained when the giant magnetostrictive element according to the first embodiment is used, so that the electromagnet 261 can be made compact. Also, to drive the electromagnet 261, a small power of a direct current having 6 V and about 0.1 A may be supplied. Therefore, in case where the electromagnet 261 is designed in this manner, the present embodiment can have the same function as the first embodiment as well as can reduce the size and cost of the spindle apparatus. Also, in case where a mechanically-operated movable stopper mechanism is disposed in the spindle apparatus, the power supply to the electromagnet 261 may be executed only when contracting the movable body 263, which can save the power consumption as well.

By the way, in the present embodiment, although no pipe is connected to the spindle apparatus, in case where a pipe is connected, a pipe to be connected, provided it has an inside diameter of about 1 mm and a length of 2 m or less, is sufficiently able to fulfill such performance as about 50% of the above-mentioned discharge speed.

In this manner, the super fine quantity lubricating oil pump 260 employed in a spindle apparatus according to the present embodiment, using the compression force to be generated by compressing the belleville spring 264, drives the movable body 263 disposed within the cylinder to compress the capacity of the pressurizing chamber 266 to thereby discharge the lubricating oil 25 and, on the other hand, in order to return the movable body 263, the attracting force of the electromagnet 261 is used. Since the super fine quantity lubricating oil pump 260 does not use expensive elements such as magnetostrictive material and piezoelectric element but uses the belleville spring and electromagnet, the spindle apparatus can be manufactured at a low cost and simply, so that the size and cost thereof can be reduced.

By the way, the super fine quantity lubricating oil pumps 5 and 260 respectively employed in the spindle apparatus according to the above-mentioned first and second embodiments can also be suitably applied to, for example, a machining center of which high precision and high-speed rotation are required.

Also, in the first embodiment, by detecting the coil current, the abnormal condition and air bleed completion can be judged. However, the abnormal condition and air bleed completion can also be detected by the following methods:

(1) A voltage value proportional to a current value is detected by measuring the voltage drop of a detecting resistance using a voltage meter and the current value is detected based on the thus obtained voltage value.

(2) The intensity of a magnetic field proportional to a current value is measured using a Hall element and the current value is detected based on the thus obtained magnetic field value. In this case, the Hall element may preferably be disposed in the vicinity of the rod body, which makes it possible to detect the expansion and contraction operation of the rod body more directly, thereby being able to enhance the measuring accuracy.

(3) A pressure sensor is installed within a cylinder and the pressure of the interior portion of the cylinder is detected by the pressure sensor.

(4) Using a displacement meter for measuring the displacement of a piston, the displacement quantity is detected.

(5) Using a vibration sensor, vibrations in accordance with the reactive force of a piston are detected.

Also, as the other use of the spindle apparatus according to the first and second embodiments, for example, there is available the supply of cutting oil in semi-dry work.

According to the spindle apparatus of the invention, since it includes a super fine quantity oil lubricating pump, a lubricating oil forced circulating device, a heat exchanger, a lubricating oil collecting device, and other attendant facilities such as compressed air, which are used in the conventional lubricating systems such as an oil mist lubricating system, oil-air lubricating system and jet lubricating system, can be simplified; and, the noise level can be controlled down to a low level, the lubricating oil consumption can be reduced to thereby be consideration for the environment, the bearing torque stability can be enhanced, and the bearing temperature increase is small, thereby being able to enhance the rotation accuracy of the spindle.

Third Embodiment

Now, description will be given below in detail of a third embodiment of a spindle lubricating apparatus with reference to the accompanying drawings.

Figure 32:
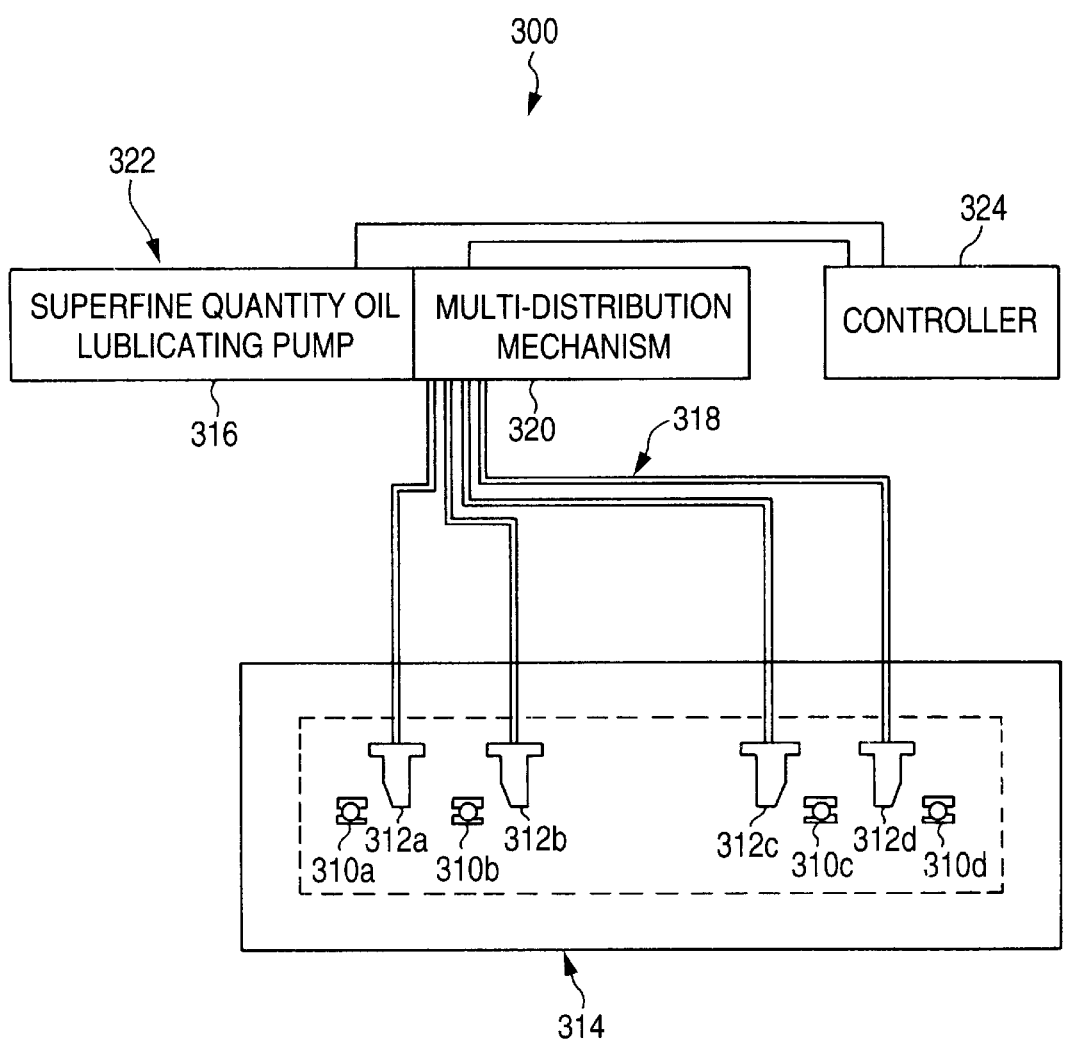
FIG. 32 is a schematic view showing a structure of a spindle lubricating apparatus according to a third embodiment of the invention.
Figure 33:
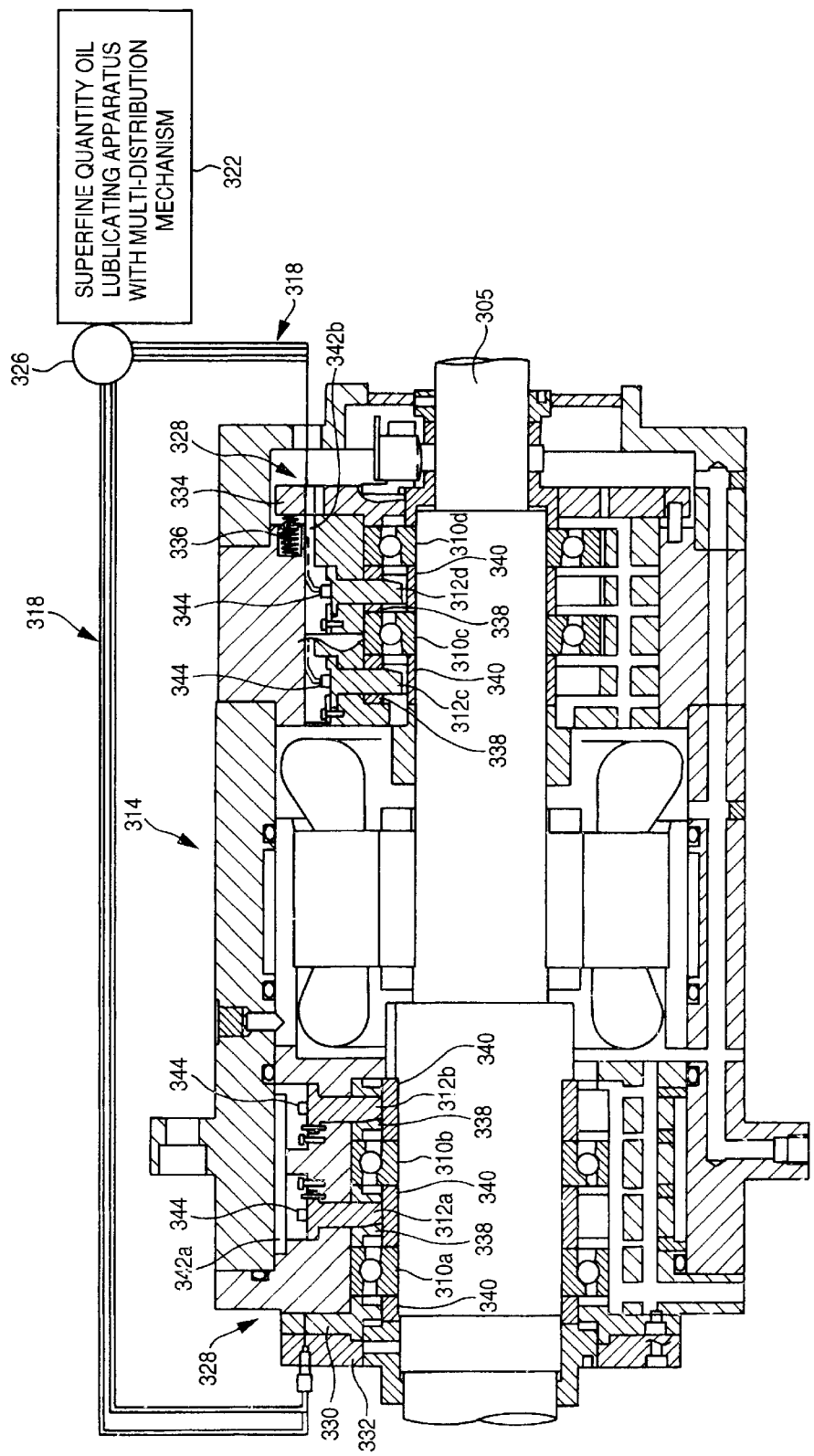
FIG. 33 is a view of a specific structure of a spindle apparatus shown in FIG. 32.

Here, FIG. 32 is a schematic view of a spindle lubricating apparatus according to a third embodiment of the invention, and FIG. 33 is a specific structure of a spindle apparatus shown in FIG. 32.

A spindle lubricating apparatus 300 according to the present embodiment includes a spindle apparatus 314, a superfine quantity oil lubricating apparatus with a multi-distribution mechanism 322 and a controller 324. The spindle apparatus 314 includes a plurality of bearings 310a, 310b, 310c, 310d for rotationally supporting a shaft 305 and a plurality of nozzles 312a, 312b, 312c, 312d respectively for discharging lubricating oil to their associated bearings 310a, 310b, 310c, 310d. The superfine quantity oil lubricating apparatus with a multi-distribution mechanism 322 includes a multi-distribution mechanism 320 for distributing lubricating oil, which is supplied from a superfine quantity oil lubricating pump (lubricating oil supply device) 316, to pipes 318 which are connected to the plurality of bearings 310a, 310b, 310c, 310d. The controller 324 controls the number of times of supply shots (intermittent times) of the lubricating oil to be supplied to the respective bearings 310a, 310b, 310c, 310d, and also selects the pipes 318 to supply the lubricating oil.

The lubricating oil discharged from a superfine quantity oil lubricating apparatus with a multi-distribution mechanism 322 flows through the pipes 318 connected to the multi-distribution mechanism 320 and is then supplied from the nozzles 312a, 312b, 312c, 312d to the respective bearings 310a, 310b, 310c, 310d within the spindle apparatus 314 in a superfine quantity (0.0005–0.01 ml/shot).

As described above, in the present embodiment, since the lubricating oil is supplied to the respective bearings 310a, 310b, 310c, 310d, there is required a lubricating apparatus which includes a multi-distribution mechanism.

As a specific example of the spindle apparatus 314, FIG. 33 shows a spindle apparatus which is employed in an ordinary machine tool. The spindle apparatus 314 includes a shaft 305, a plurality of bearings 310a, 310b, 310c, 310d (in the illustrated example, four angular ball bearings in total) for supporting the shaft 305 in a freely rotatable manner, and a housing 328 for covering the outer surfaces of the respective bearings.

The bearings 310a, 310b, 310c, 310d are disposed at given intervals in the axial direction of the shaft 305 so that they form in two sets of two bearings respectively support the front and rear sides of the shaft 305. The outer races of the respective bearings are fixed to the inner peripheral surface of the housing 328, the outer ring of the bearing 310a disposed in the front-most position is contacted with and is secured to a front cover 332 through an outer race holder 330, and the outer ring of the bearing 310d disposed in the rear-most position is secured to the housing 328 through an outer ring holder 334 while it is elastically energized in the axial direction of the shaft 305 by a spring 336. Also, between the respective bearings, there are interposed cylindrical-shaped outer ring spacers 338 which are respectively used to fix their associated bearings in the axial direction.

On the other hand, the inner rings of the respective bearings are fitted with the outer peripheral surface of the shaft 305; and, between the respective bearings, there are interposed cylindrical-shaped inner ring spacers 340 which are respectively used to fix their associated bearings in the axial direction.

The lubricating oil is supplied to the spindle apparatus 314 having the above-mentioned structure in the following manner. That is, the four pipes 318, which are connected to the superfine quantity oil lubricating apparatus with a multi-distribution mechanism 322 through a supply-side pipe fixing joint 326, are respectively penetrated through pipe guide grooves 342a, 342b formed in the housing 328 of the spindle apparatus 314 and are then connected through their associated discharge-side pipe fixing joints 344 to nozzles 312a, 312b, 312c, 312d respectively disposed in the vicinity of their associated bearings 310a, 310b, 310c, 310d. These nozzles 312a, 312b, 312c, 312d are respectively inserted through and fixed to mounting holes, which are respectively formed so as to penetrate through their associated outer ring spacers 338, from the outer peripheral surface side of the housing 328, while the leading ends of the respective nozzles are penetrated through the outer ring spacers 338 and are projected out into gap spaces existing between the outer ring spacers 338 and inner ring spacers 340.

In this case, the four nozzles are disposed for the four bearings, one to one, and thus supply of the lubricating oil is distributed to four sections by the superfine quantity oil lubricating apparatus with a multi-distribution mechanism 322. By the way, the number of distributions (the number of pipes) may be equal to or more than the number of bearings used in the spindle apparatus 314. In the present embodiment, the shaft 305 is supported in the horizontal direction but, for example, in case where the shaft 305 is used in a machining center, the shaft 305 can be used in such a manner that it is supported in the vertical direction or in an inclined manner.

Next, description will be given below of the specific structure of the superfine quantity oil lubricating apparatus with a multi-distribution mechanism 322. Here, FIG. 34 is a section view of the structure of the superfine quantity oil lubricating apparatus with a multi-distribution mechanism 322 according to the present embodiment.

Figure 34:
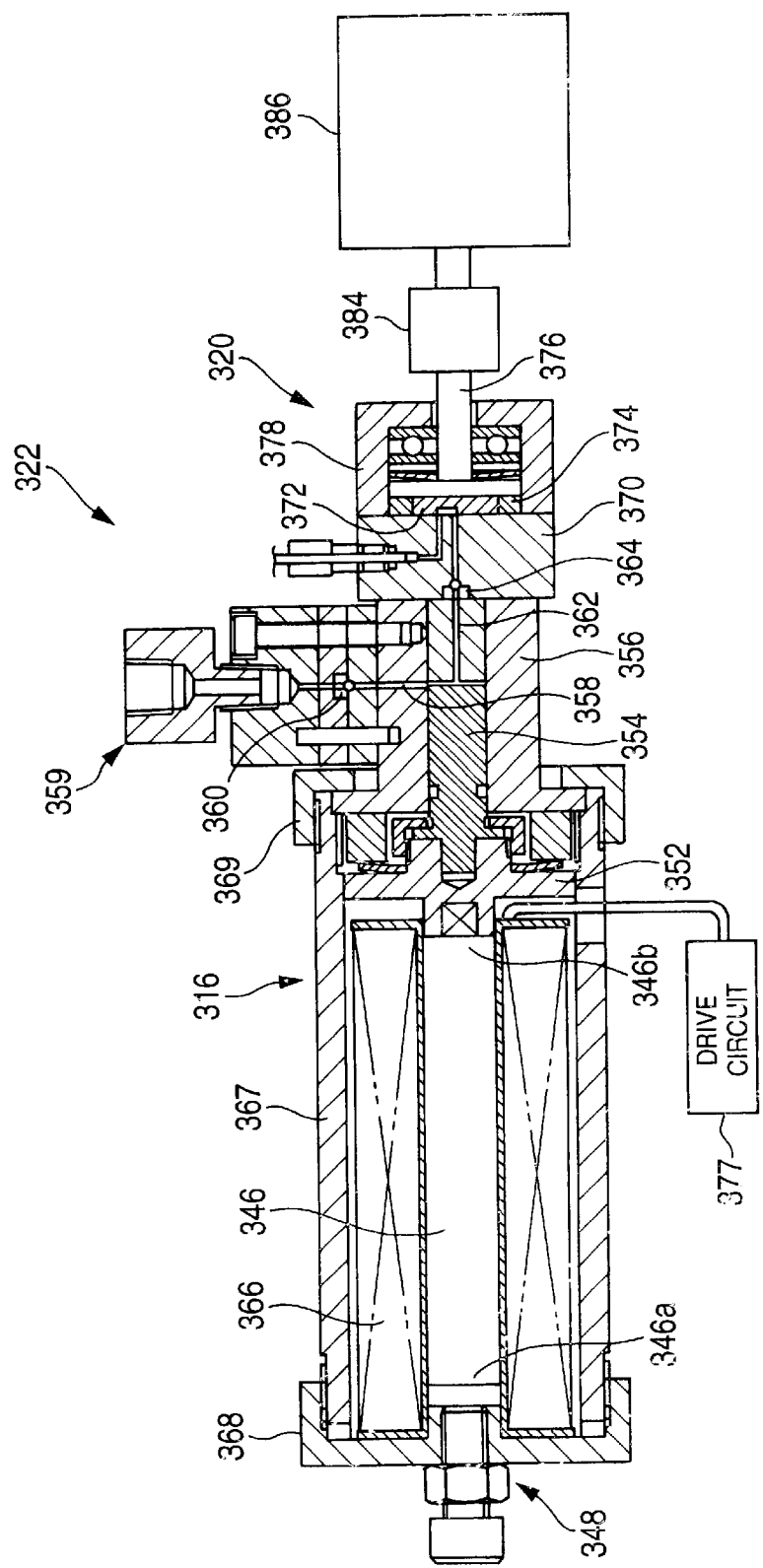
FIG. 34 is a section view showing the structure of a superfine quantity oil lubricating apparatus with a multi-distribution mechanism shown in FIG. 32.

As shown in FIG. 34, the superfine quantity oil lubricating pump 316 of the superfine quantity oil lubricating apparatus with a multi-distribution mechanism 322 includes a rod body 346 which is formed of a giant-magnetostrictive material having a positive characteristic, while one end portion 346a of this rod body 346 in the axial direction thereof is fixed through a preload adjust mechanism 348 to a case 350. In case where a magnetic field is applied to the rod body 346, the rod body 346 is expanded in the axial direction due to a magnetic strain phenomenon (Joule effect).

As the preload adjust mechanism 348, there can be used a screw mechanism which is structured such that, for example, in case where it is rotated, it is projected out in the axial direction of the rod body 346 to thereby be able to press against one end portion 346a of the rod member 346. On the other end portion 346b of the rod body 346 in the axial direction thereof, there is disposed a pressure transmission member 352 which energizes the rod body 346 toward the preload adjust mechanism 348 to thereby transmit pressure without producing a gap (play) in the axial direction of the rod body 346; and, the rod body 346 is connected to a piston 354 through the pressure transmission member 352. The piston 354 is slidably disposed in the interior portion of a cylinder 356, while the cylinder 356 and piston 354 cooperate together in defining a pump chamber.

In the cylinder 356, there is formed a suction flow passage 358 which is used to supply the lubricating oil to the pump chamber and, in the intermediate portion of the suction flow passage 358 to a suction opening 359, there is disposed a suction-side check valve 360 consisting of a check valve which prevents the lubricating oil from flowing out from the pump chamber.

Also, in the cylinder 356, there is formed a discharge flow passage 362 for discharging the lubricating oil which is discharged from the pump chamber and, in the intermediate portion of the discharge flow passage 362 to the multi-distribution mechanism 320, there is disposed a discharge check valve 364 consisting of a check valve which prevents the lubricating oil from flowing in to the pump chamber.

On the outer periphery of the rod body 346, there is disposed a coil 366 coaxially with the rod body 346 and also, on the outside of the coil 366, there is disposed a cylinder body 367 which is formed of magnetic material and cooperates with the rod body 346 in completing a magnetic circuit. The cylinder body 367 is secured by a front cover 368 and a rear cover 369. Also, to the coil 366, there is electrically connected a drive circuit 377, while the drive circuit 377 outputs a current which is used to generate a magnetic field. In case where this current is applied to the coil 366, the rod body 346 receives a magnetic field generated from the coil 366 and is thereby expanded, so that the lubricating oil within the pump chamber supplied through the suction flow passage 358 can be guided into the multi-distribution mechanism 320 through the discharge flow passage 362. In this case, the discharge quantity of the lubricating oil per shot is a fine quantity, that is, a quantity in the range of 0.0005 [ml]–0.01 [ml], and the discharge pressure of the lubricating oil is equal to or higher than 1 [MPa]; and, the lubricating oil is discharged intermittently. And, the lubricating oil discharged from the superfine quantity oil lubricating pump 316 is distributed to the respective nozzles 312a, 312b, 312c, 312d by the multi-distribution mechanism 320, and the lubricating oil is supplied from the leading ends of these nozzles to their respective bearings at a discharge speed of 10 [m/sec]-100 [m/sec].

Figure 35:
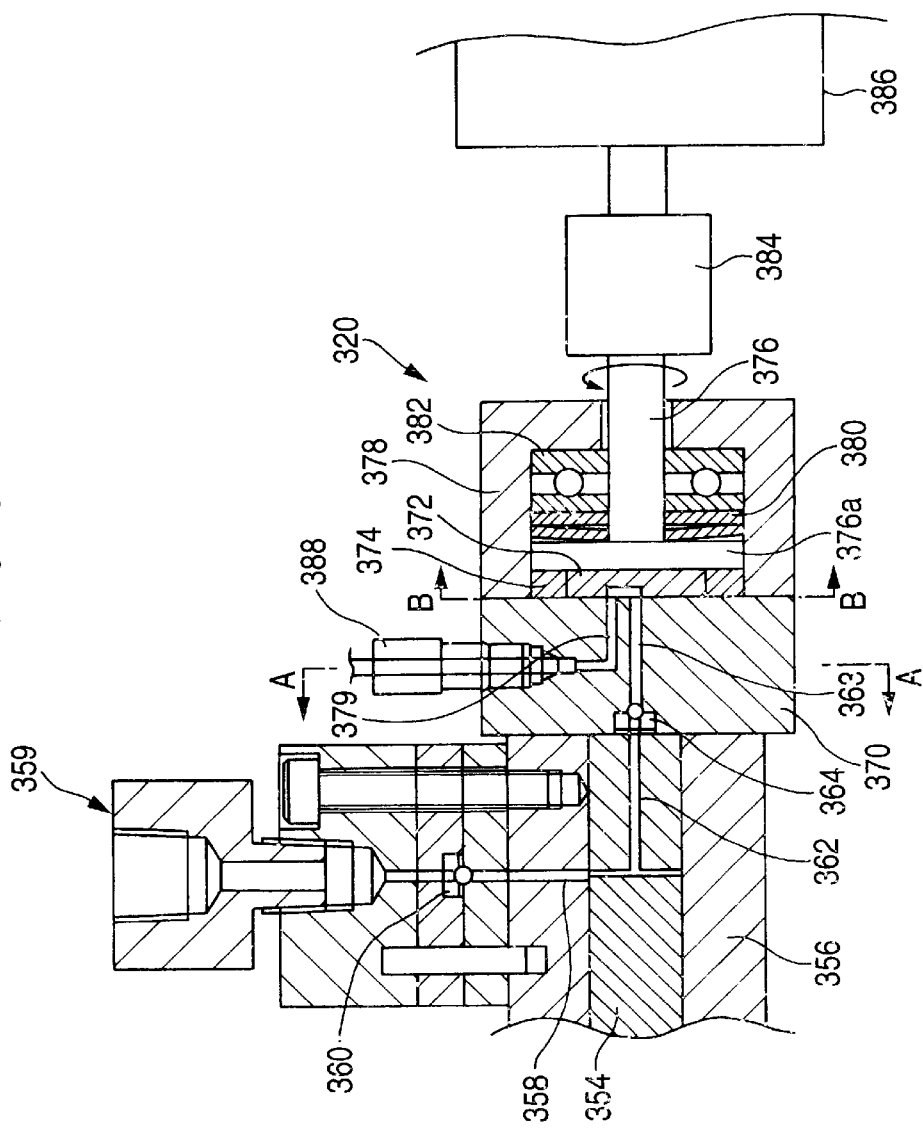
FIG. 35 is an enlarged view of the structure of a multi-distribution mechanism shown in FIG. 34.

Here, description will be given below in detail of the multi-distribution mechanism 320. FIG. 35 is an enlarged view of the structure of the multi-distribution mechanism 320 shown in FIG. 34. The multi-distribution mechanism 320 is a mechanism which is used to distribute lubricating oil discharged using a valve of a revolver type. Specifically, the multi-distribution mechanism 320 includes a distribution housing 370 in which the discharge flow passage 362 is formed, a rotor valve 372, a rotor valve fixing ring 314, a shaft 316, a shaft housing 378, a belleville spring 380 and a thrust bearing 382. The rotor valve fixing ring 374 has an inner periphery with which the rotor valve 372 can be fitted. The shaft 376 has a flange portion 376a in the leading end portion thereof and is capable of rotationally driving the rotor valve 372. The shaft housing 378 supports the shaft 376. The belleville spring 380 presses against the flange portion 376a of the shaft 376 toward the distribution housing 370. The thrust bearing 382 supports the shaft 376 in the axial direction thereof through the belleville spring 380 within the shaft housing 378 in such a manner that the shaft 376 can be rotated.

Also, the shaft 376 of the multi-distribution mechanism 320 is connected through a coupling 384 to a motor 386. As the motor 386, there can be used any type of motor, provided that it is able to control a rotation phase (rotation angle); for example, a stepping motor, a DC motor, a synchronous motor and an induction motor can be used. The motor 386 is controlled by the controller 324 (see FIG. 32) and can be indexingly rotated at an equal distribution angle (360°/number of distributions) according to the number of distributions.

Figure 36:
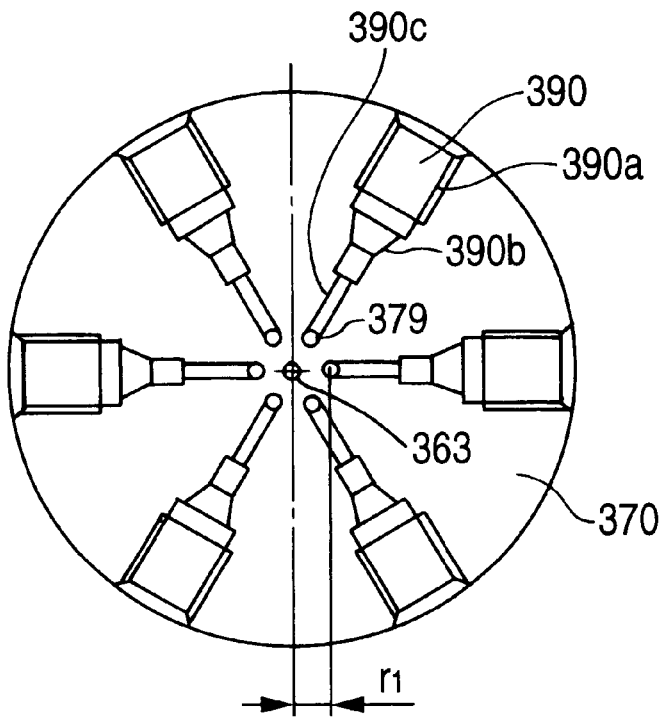
FIG. 36 is a section view taken along the arrow lines A—A shown in FIG. 35.

In the distribution housing 370, as shown in FIG. 36 which is a section view of the distribution housing 370 taken along the arrow marks A—A shown in FIG. 35, a proper number (a number equal to the number of distributions) of mounting holes 390, which are used to mount a pipe fixing joint 388, are formed in the radial direction of the distribution housing 370 according to the number of distributions of lubricating oil. In the structure shown in FIG. 36, since the lubricating oil is distributed to six bearings, six mounting holes 390 are formed. In each mounting hole 390, there are formed a screw portion 390a for tightening, a taper portion 390b and a longitudinal hole 390c in this order from the outer periphery of the distribution housing 370 to the axis thereof. Also, the longitudinal holes 390c of the respective mounting holes 390 are respectively allowed to communicate with transverse holes 379 (see FIG. 35); and, each of the transverse holes 379 is formed at a position of a radius $r_1$ from the center of the distribution housing 370 in such a manner that it extends along the thrust direction from the surface of the distribution housing 370 contacted with the rotor valve 372 in phase with the longitudinal hole 390c. On the other hand, in the center of the distribution housing 370, there is formed a center flow passage 363 which is connected to the discharge flow passage 362 from the pump chamber and extends linearly along the thrust direction.

Figure 37:
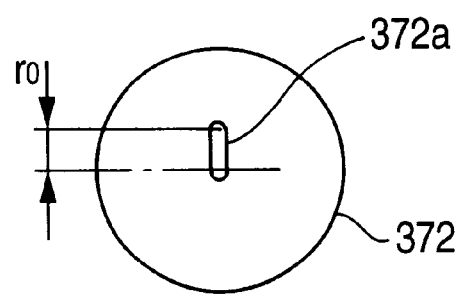
FIG. 37 is a section view taken along the arrow lines B—B shown in FIG. 35.

The rotor valve 372, as shown in FIG. 37 which is a section view of the distribution housing 370 taken along the arrow marks B—B shown in FIG. 35, is a cylindrical-shaped valve and, on the side of the rotor valve 372, which can be contacted with the distribution housing 370, there is formed a groove 372a which extends outwardly in the radial direction from the central portion of the rotor valve 372.

Here, the half value $r_1$ of the PCD (pitch circle diameter: $2r_1$) at the positions of the transverse holes 379 formed in a circle in the distribution housing 370 is set such that it is substantially equal to the length $r_0$ of the groove 372a in the radially outward direction of the rotor valve 372 ($r_0 \cong r_1$). Thanks to this, the lubricating oil exit portion of the groove 372a is substantially coincident with the transverse hole 379. That is, in the distribution housing 370, the transverse holes 379, which provide the lubricating oil supply holes, are formed in a circle and, in the center of the circle, there is formed the center flow passage 363; and, in the rotor valve 372, from the center of rotation thereof up to the diameter position which is equal to the pitch circle diameter (PCD) at the position of the lubricating oil supply hole (transverse hole 379), there is formed the groove 372a which serves as a flow passage.

Also, the contact surface of the distribution housing 370 with the rotor valve 372 is polish finished and, as the surface roughness thereof is smaller, the contact surface is more advantageous in a wetted condition; however, in case where the center line average roughness thereof is of the order of 0.4 μm or less, no problem can arise.

Figure 38:
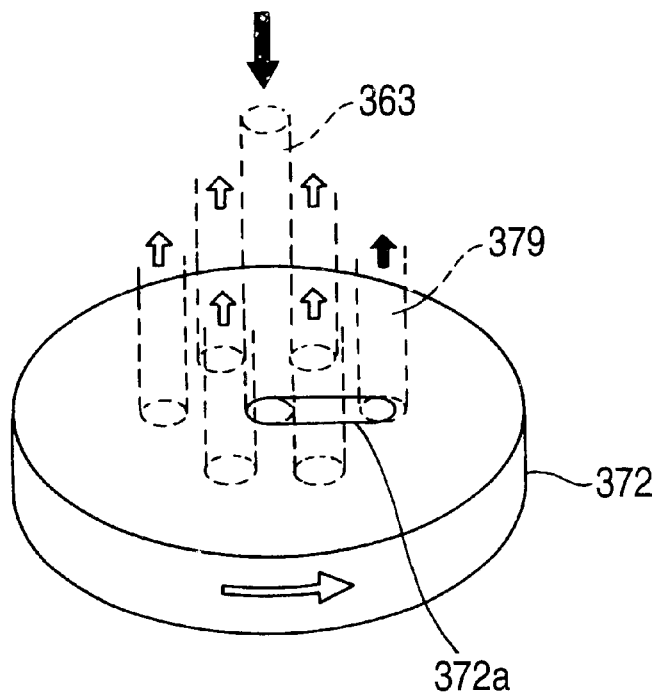
FIG. 38 is a typical view of a rotor valve, showing its operating state.

The rotor valve 372 is structured such that, as the operation state thereof is typically shown in FIG. 38, the lubricating oil is guided from the center flow passage 363 to the central portion of the groove 372 and the thus guided lubricating oil can be discharged through the transverse hole 379 from the terminal end portion of the groove 372*a* existing outside in the radial direction of the groove 372*a*. And, since the rotor valve 372 is indexingly rotated in the direction of an arrow mark shown in FIG. 38, the transverse holes 379 formed in the distribution housing 370 and communicating with the terminal portion of the groove 372*a* are sequentially switched over to one another, so that the lubricating oil can be distributed to the respective transverse holes.

Also, while the shaft 376, belleville spring 380 and thrust bearing 382 are respectively inserted into the shaft housing 378, the shaft housing 378 and distributing housing 370 are respectively fixed to a cylinder housing (not shown). Therefore, because of compression of the belleville spring 380, the rotor valve 372 and distributing housing 370 can be contacted with each other with a desired pressing pressure. This can prevent the lubricating oil from leaking from the contact portions between the rotor valve 372 and distributing housing 370. Also, the pressing pressure can be adjusted not only by the rigidity of the belleville spring 380 but also by a gap adjusting intermediate spacer and can be controlled by measuring the rotation torque of the shaft 376. Further, provision of the thrust bearing 382 reduces the rotation resistance of the shaft 376.

In the case of the present embodiment, the rotor valve 372 is formed in a cylindrical shape having an outside diameter of 15 mm and a thickness of 3 mm, on the surface of the rotor valve 372 that can be contacted with the distribution housing 370, there is formed the groove (having a key groove shape) 372*a* having a depth of 1 mm and a width of 1 mm. The lubricating oil exit portion of the groove 372*a* is set so as to coincide in position with the PCD (pitch circle diameter) of the transverse hole 379 formed in the distribution housing 370. By the way, the dimensions of the rotor valve 372 and groove 372*a* are not limited to the above-described dimensions but can be determined properly according to the size of the rotor valve 372 and the number of distributions of the lubricating oil.

Also, the rotor valve 372 is formed of PEEK (polyether ether-ketone). However, as the material of the rotor valve 372, there can be used another material, provided that it has a low coefficient of friction and is excellent in the deformation resistance, friction resistance and oil resistance. For example, polymer material such as polyamide-imide can be used.

Figure 39A:
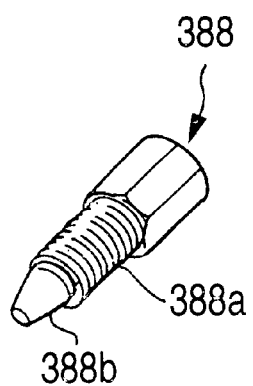
FIGS. 39A and 39B are perspective views of a pipe fixing joint.
Figure 39B:
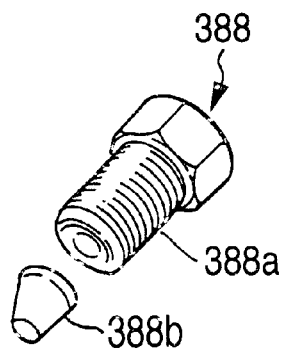

By the way, as the pipe fixing joint 388, as shown in FIG. 39A, there can be used a joint which is formed of resin material such as PEEK resin, or, as shown in FIG. 39B, there can be used a joint which is formed of stainless steel material. In the case of the PEEK resin joint 388 shown in FIG. 39A, when the male nut portion 388*a* thereof is threadedly engaged with the screw portion 390*a* of the mounting hole 390, a ferrule portion 388*b* formed in the leading end portion of the joint 388 is tightened, so that the joint 388 can be sealed. On the other hand, In the case of the stainless steel joint 388 shown in FIG. 39B, a ferrule portion 388*b* consisting of an elastic body formed of stainless steel or PEEK resin is manufactured as a separate body and is then mounted onto the leading end portion of the male nut portion 388*a* of the joint 388; and, by tightening the ferrule portion 388*b* by the male nut portion 388*a*, the joint 388 can be sealed. Thanks to this, up to the pressure of 20 MPa (200 kgf/cm$^2$), there is eliminated the fear that the lubricating oil can leak in the connecting portions between the joint 388 and mounting hole 390.

Next, description will be given below of the process for supplying the lubricating oil to the bearings 310*a*, 310*b*, 310*c*, 310*d* using the spindle lubricating apparatus 300 according to the present embodiment.

Firstly, the pipe, to which the lubricating oil is to be supplied, is selected by the controller 324. That is, the rotor valve 372 is driven or rotated by the motor 386 so that the exit portion of the groove 372*a* of the rotor valve 372 is allowed to coincide in position with the transverse hole 379 of the distribution housing 370 that communicates with the selected pipe. And, with the forward movement of the piston 354 disposed within the cylinder 356, the pressure of the lubricating oil within the cylinder 356 increases, so that the lubricating oil is guided through the discharge-side check valve 364, the center flow passage 363 of the distribution housing 370, the groove 372*a* of the rotor valve 372, the selected pipe of the distribution housing 370 (the transverse hole 379 for supply of the lubricating oil, mounting hole 390), and the pipe fixing joint 388 in this order up to the nozzles; and, the lubricating oil is supplied from the respective nozzles 312*a*, 312*b*, 312*c*, 312*d* to the target positions of the interior portions of the bearings 310*a*, 310*b*, 310*c*, 310*d* in a pin spot manner.

By the way, this series of operations is controlled by the controller 324. Also, it is also possible to control the lubricating oil discharge interval to a desired interval according to the rotation speed of the spindle apparatus 314. Therefore, the lubricating oil supply interval can be varied according to the rotation speed of the shaft 305, so that ideal supply of the lubricating oil to the interior portions of the bearings can be always realized.

As described above, according to the spindle lubricating apparatus 300 of the present embodiment, the superfine quantity oil lubricating apparatus with a multi-distribution mechanism 322 is simple and compact in structure as well as it is positively connected to the pipes so as to be free from leakage of the lubricating oil, so that the superfine quantity oil lubricating apparatus with a multi-distribution mechanism 322 is able to make full use of its ability. Also, the place to which the lubricating oil should be supplied can be selected freely by the controller 324 connected to the superfine quantity oil lubricating apparatus 322, and the lubricating oil can be supplied to the respective bearings 310*a*, 310*b*, 310*c*, 310*d* at the desired intermittent time (at the desired supply intervals) Further, the lubricating oil supply intervals can be varied according to the rotation speed of the shaft 305 and thus the interior portions of the bearings can be always kept in an ideally lubricated state. Therefore, the present spindle lubricating apparatus 300 is very excellent in the stability of the bearing torque, can control an increase in the bearing temperature down to a low level, and can reduce the noise level. And, in the spindle apparatus 314 that is actually used, when the number of bearings used is taken into consideration, a single unit of the superfine quantity oil lubricating apparatus with a multi-distribution mechanism 322 is able to sufficiently cover the lubricating oil supply that corresponds to a single unit of the spindle apparatus 314.

Next, description will be given below of a modification of the superfine quantity oil lubricating apparatus with a multi-distribution mechanism according to the present embodiment.

Figure 40:
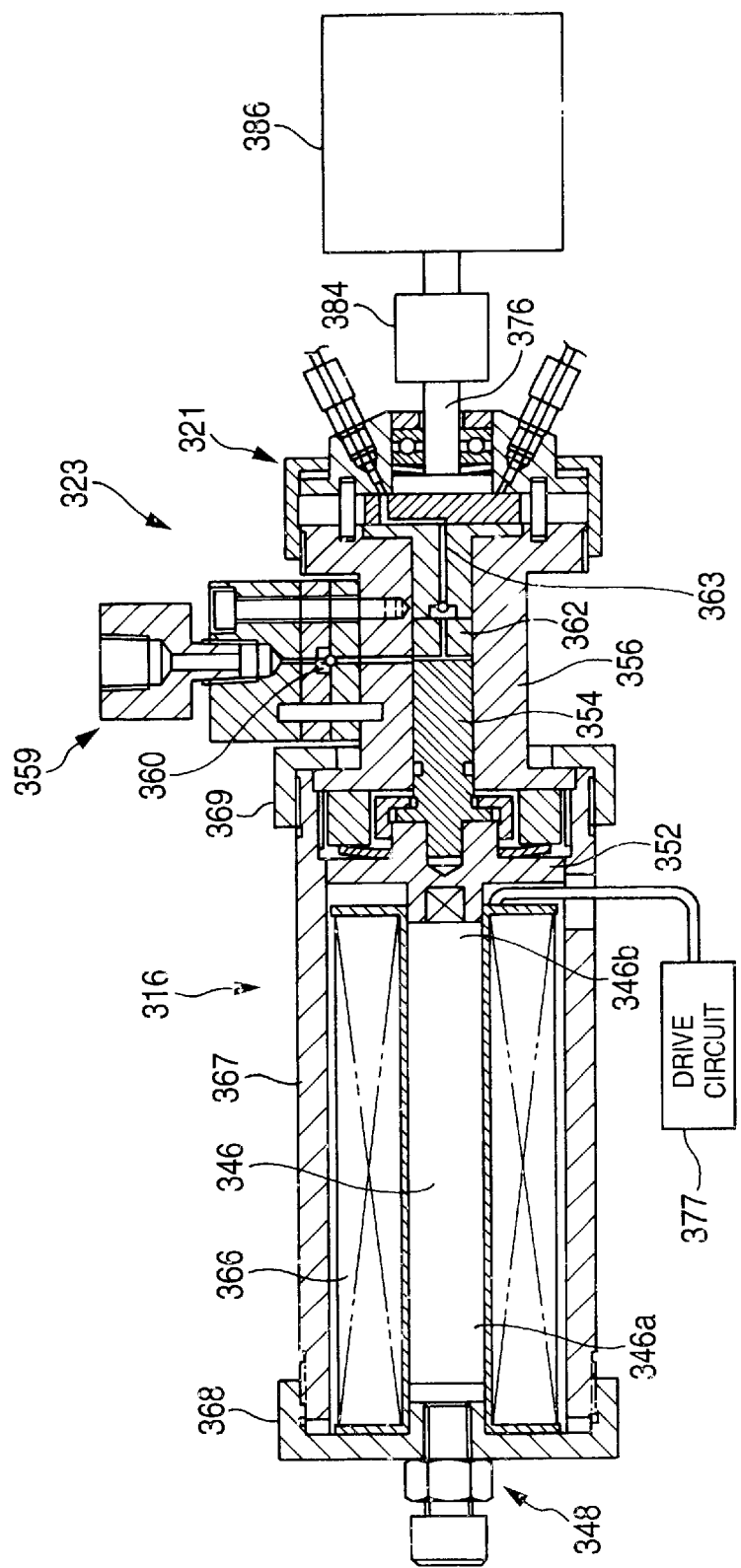
FIG. 40 is a section view showing the structure of a superfine quantity oil lubricating apparatus with a multi-distribution mechanism according to a modification of the third embodiment.
Figure 41:
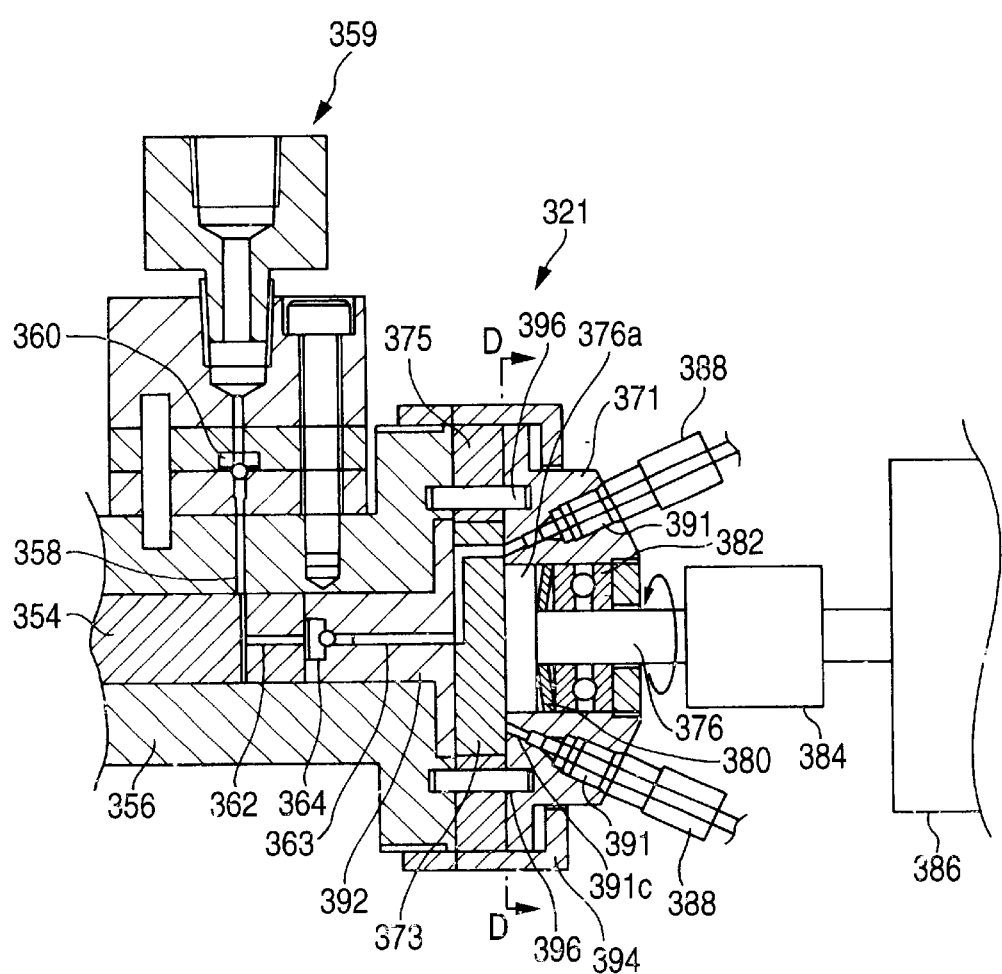
FIG. 41 is an enlarged view of the structure of a multi-distribution mechanism shown in FIG. 40.

Here, FIG. 40 is a section view of a superfine quantity oil lubricating apparatus with a multi-distribution mechanism according to the present modification, and FIG. 41 is an enlarged view of the structure of a multi-distribution mechanism shown in FIG. 40. By the way, in the present modification, parts thereof having the same functions as those described in the above embodiment shown in FIGS. 32 to 39 are given the same designations and thus the description thereof is omitted here.

The multi-distribution mechanism 321 of the superfine quantity oil lubricating apparatus with a multi-distribution mechanism 323 according to the present modification is also a mechanism which is used to distribute the lubricating oil that is discharged by a valve of a revolver type: that is, in a rotor valve 373 employed in the present modification, there are formed a groove 373a and a transverse hole 373b to be connected to the groove 373a; and, the lubricating oil guided from the front surface side of the rotor valve 373 is discharged from the opposite side, that is, the rear surface side of the rotor valve 373.

Specifically, the multi-distribution mechanism 321 includes: a discharge housing 392, the rotor valve 373, a rotor valve guide ring 375, a distribution housing 371, a distribution housing fixing ring 394 and a plurality of positioning pins 396. The discharge housing 392 is connected to a discharge flow passage 362 formed on the opposing side of a piston 354 in a pump chamber formed inside a cylinder 356 and also includes a center flow passage 363 formed at the center position of the discharge housing 392 so as to extend along the axial direction of the discharge housing 392. The rotor valve guide ring 375 has the inner periphery of which the rotor valve 373 can be fitted. The distribution housing 371 fixes a pipe fixing joint 388 obliquely with respect to the axial direction thereof and also supports a shaft 376 in the interior portion thereof. The distribution housing fixing ring 394 holds the rotor valve guide ring 375 between the cylinder 356 and distribution housing 371. The plurality of positioning pins 396 are used to position flow passages respectively formed in the discharge side housing 392 and in the distribution housing 371 and also can be inserted into holes opened up in the discharge side housing 392 and the distribution housing 371 as well as holes opened up in the rotor valve fixing ring 375. In the illustrated structure, the positioning pins 396 are disposed at two portions; however, it is also possible to employ a structure in which the positioning pins 396 are disposed at three or more portions.

Figure 42A:
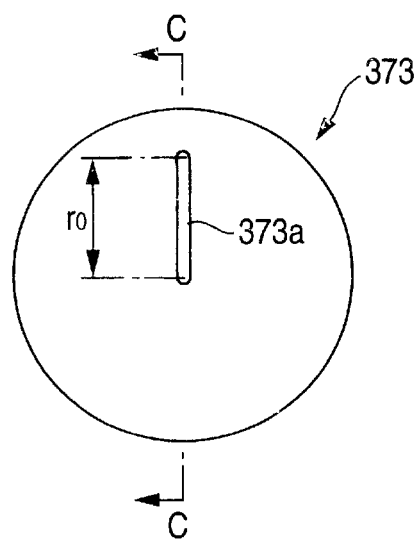
FIG. 42A is a front view of a rotor valve shown in FIG. 41.
Figure 42B:
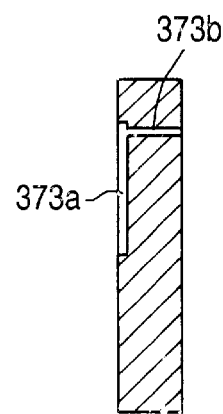
FIG. 42B is a section view of the rotor valve taken along the arrow lines C—C shown in FIG. 42A.

Here, FIG. 42A is a front view of the rotor valve 373 according to the present modification, and FIG. 42B is a section view thereof taken along the arrow marks C—C shown in FIG. 42A. As shown in FIGS. 42A and 42B, the rotor valve 373 is formed in a cylindrical shape: specifically, on the side of the rotor valve 373 that can be contacted with the discharge housing 392, there is formed a groove 373a which extends outwardly in the radial direction thereof from the central portion thereof; and, in the terminal portion of the groove 373a existing outside in the radial direction thereof, there is formed a transverse hole 373b which penetrates entirely through the cylindrical-shaped rotor valve 373 in the axial direction thereof.

Figure 43:
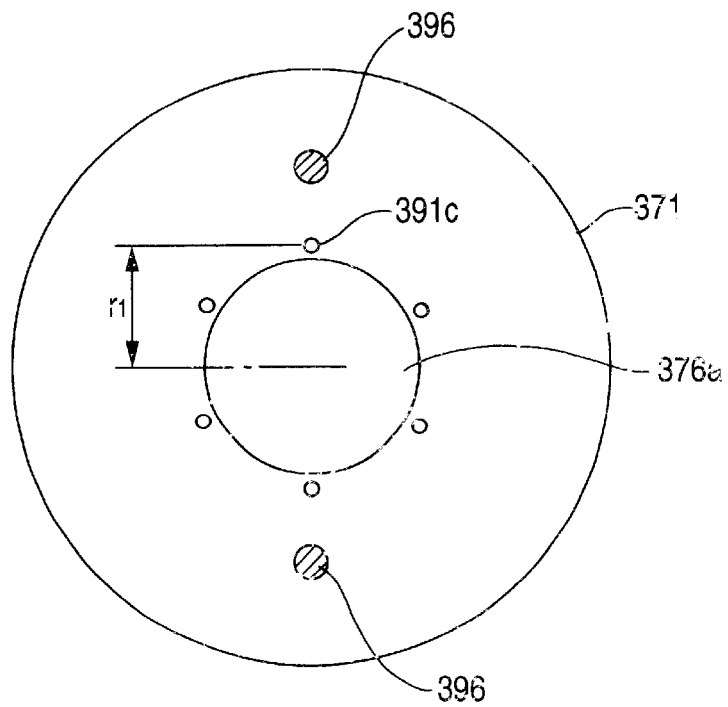
FIG. 43 is a section view of the multi-distribution mechanism taken along the arrow lines D—D shown in FIG. 41.

Now, FIG. 43 is a section view of the distribution housing 371, taken along the arrow marks D—D shown in FIG. 41. As shown in FIG. 43, in the distribution housing 371, there are formed a plurality of (in this case, a total of six) longitudinal holes 391c which can be connected to the mounting holes 391 of the pipe fixing joint 388. Also, due to the positioning pins 396, the positions of the longitudinal holes 391c of the distribution housing 371 can be matched to the positions of the transverse holes 373b of the rotor valve 373. In this case, the half value $r_1$ of the PCD ($2r_1$) at the position of each longitudinal hole 391c of the distribution housing 371 is set so as to be substantially coincident with the length $r_0$ of each transverse hole 373b of the rotor valve 373.

According to the present multi-distribution mechanism 321, since the lubricating oil discharged from the discharge flow passage 362 is introduced to the central portion of the groove 373a, the thus introduced lubricating oil can be discharged through the transverse hole 373b from the terminal portion of the groove 373a that is situated outside in the radial direction thereof. And, because the rotor valve 373 is indexingly rotated by a motor 386, the longitudinal holes 391c of the distribution housing 371 in communication with the transverse hole 373b are sequentially switched over to one another, so that the lubricating oil can be distributed to the respective longitudinal holes 391c.

In the case of the present modification, the rotor valve 373 is formed in a cylindrical shape having an outside diameter of 15 mm and a thickness of 5 mm on the surface of the rotor valve 373 that can be contacted with the discharge housing 392, there is formed the groove (having a key groove shape) 373a having a depth of 1 mm and a width of 1 mm; and, in the lubricating oil exit portion of the groove 373a, there are formed the transverse holes 373b each having an inside diameter of 1 mm in such a manner that the transverse holes 373b extend in the axial direction of the rotor valve 373. By the way, the dimensions of the rotor valve 373, groove 373a and transverse hole 373b are not limited to the above-described dimensions but can be determined properly according to the size of the distribution housing 371 and the number of distributions of the lubricating oil.

Also, the rotor valve 373 is formed of PEEK (polyether ether-ketone). However, as the material of the rotor valve 373, there can be used another material, provided that it has a low coefficient of friction and is excellent in the deformation resistance, friction resistance and oil resistance. For example, polymer material such as polyamide-imide can be used.

In the present modification as well, not only there can be obtained similar effects to those obtained in the previously described embodiment but also, because the pipe fixing joint 88 is connected from the oblique direction with respect to the axial direction, there can be supplied a structure which is excellent in space efficiency, so that the superfine quantity oil lubricating apparatus with a multi-distribution mechanism can be made more compact.

Now, description will be given below of the results of a test conducted on the rotation performance of a bearing in the case of the above-described superfine quantity oil lubricating apparatus with a multi-distribution mechanism according to the third embodiment.

In the bearing rotation performance test, firstly, a rotation test was conducted using the spindle apparatus 314 according to the present embodiment, while a lubricating method employed in the superfine quantity oil lubricating pump 316 of the spindle apparatus 314 was compared with a conventionally known oil-air lubricating method.

As a bearing to be tested, as well as the first embodiment, there was used a bearing having the following specifications; that is, an outer ring diameter of 160 mm; an inner ring bore of 100 mm; a rolling body pitch circle diameter $d_m$ of 132.5 mm; an outer/inner race groove curvature of 52–5%; a contact angle of 20°; SUJ2 as inner/outer ring material; and, $Si_3N_4$ as rolling body material. And, as lubricating oil, there was used mineral oil VG22 (kinematic viscosity: 22 mm$^2$/s at a temperature of 40° C.) and axial load was set as 980N. Referring to the number of nozzles used, in the case of the conventional oil-air lubricating method, three nozzles were used; and, in the case of the superfine quantity oil lubricating pump, there was used one nozzle. Under these conditions, while rotating the shaft at the speed of 0–15000 min$^{-1}$ (in part, 19000 min$^{-1}$d$_m$ N=2500000), there were conducted tests on the following articles: that is, relationship between shaft rotation speed and bearing torque; relationship between shaft rotation speed and outer ring temperature rise; comparison of variations in bearing torque; comparison of noise levels; and, visualized observation (observation of videotape recorded pictures) of superfine quantity lubricating oil discharge state.

In the test conducted on the rotation performance of a bearing by using the superfine quantity oil lubricating apparatus with the multi-distribution mechanism according to the third embodiment under the same conditions as the first embodiment, graphical representations showing relationship between shaft rotation speed and bearing torque; relationship between shaft rotation speed and outer ring temperature rise; comparison of variations in bearing torque; comparison of noise levels; and, visualized observation of superfine quantity lubricating oil discharge state were substantially same as the results shown in FIGS. 24 to 27.

Thus, according to the spindle apparatus 314 of the present embodiment, since there is used the superfine quantity oil lubricating pump 316 as well as the angle and position of the nozzle are designed optimally, a superfine quantity (0.0005–0.01 ml/shot) of lubricating oil can be supplied in a pin spot manner directly at the desired spot of the interior portion of the bearing at the interval of dozens of seconds.

Also, because the discharge speed (10–100 m/sec.) from the nozzle is fast, the lubricating oil can be positively supplied to the interior portion of the bearing free from the influence of the air curtain that could occur in the high speed rotation.

And, since the lubricating oil supply intervals and lubricating oil supply quantity can be varied according to the rotation speed by the control unit, a proper quantity of lubricating oil can always be supplied for the spindle rotation regardless of the spindle rotation speed.

Thanks to this, an ideal lubricating state can always be obtained in the interior portion of the bearing and, therefore, the spindle apparatus 314 can be structured such that the stability of the bearing torque is very excellent. Also, an increase in the bearing temperature can also be controlled down to a low level. Further, because the lubricating oil is positively supplied into the interior portion of the bearing, the lubricating oil supply efficiency can be enhanced and the lubricating oil consumption can be reduced. Therefore, according to the superfine quantity oil lubricating method, the shaft can be rotated up to a higher speed than the conventional oil-air lubricating method.

By the way, in the present embodiment, for the superfine quantity oil lubricating pump 316, there is used the giant-magnetostrictive material. However, the invention is not limited to the giant-magnetostrictive material as well as the first embodiment. For example, there can also be employed an electrostrictive element, a combination of an electromagnet and a belleville spring, and mechanical elastic elements. That is, even in a superfine quantity oil lubricating method using any one of them, in case where a fine quantity (0.0005–0.01 ml/shot) of lubricating oil is discharged at the speed of 10–100 m/sec., there can be obtained the same performance.

Also, in the case of not only a giant-magnetostrictive material having a forward characteristic but also a magnetostrictive material having a bi-directional characteristic, a pump can be similarly produced using the expansion and contraction action of these materials.

Further, the above-mentioned lubricating apparatus can be applied not only to the spindle apparatus shown in FIG. 32 but also to a high-speed-rotation spindle apparatus in which various kinds of torque variations can occur and an increase in the temperature must be small.

Next, description will be given below of a test conducted on the performance of the superfine quantity lubricating pump 316.

Figure 44:
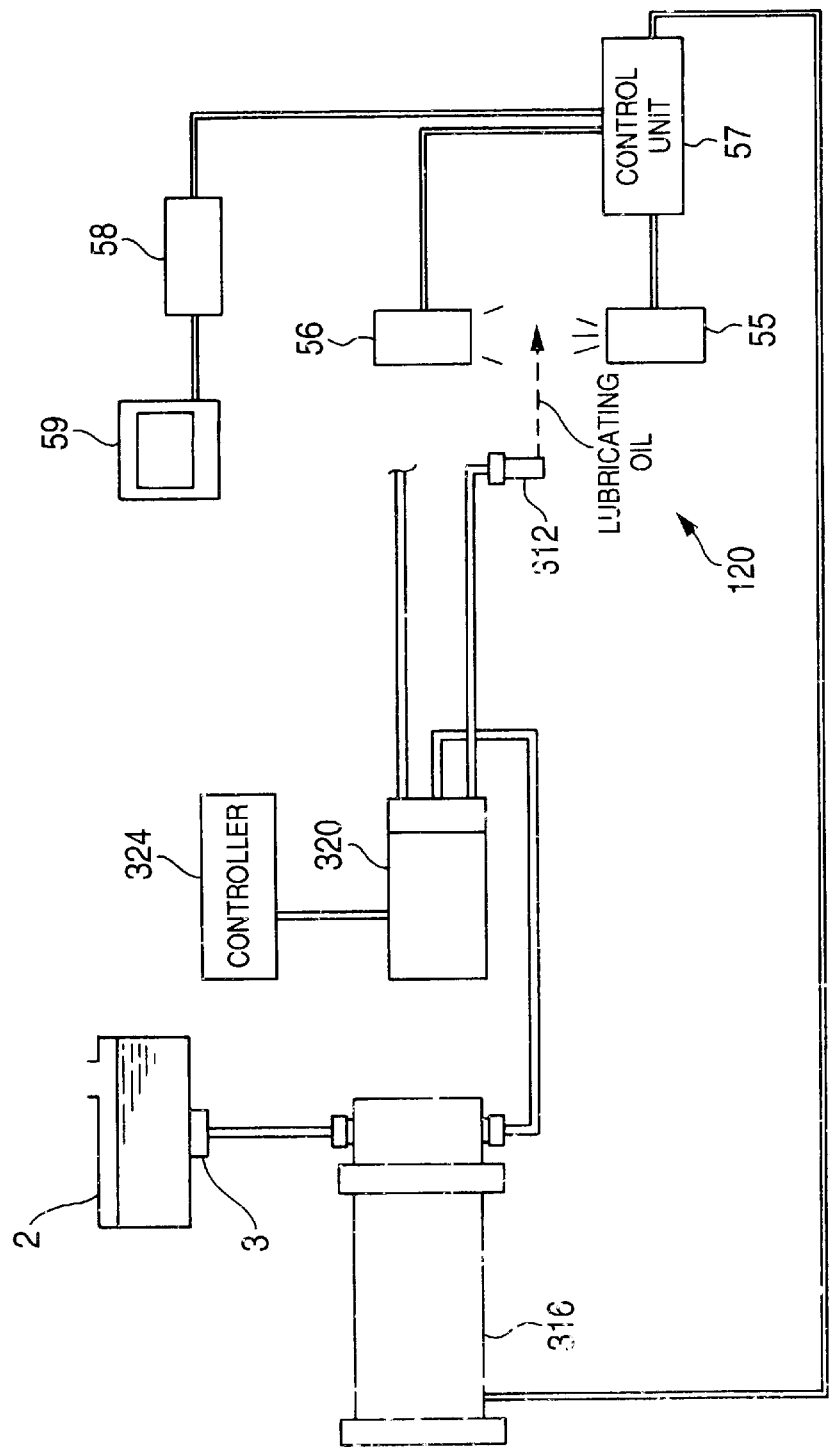
FIG. 44 is a schematic view of an embodiment of a test conducted on the performance of the superfine quantity oil lubricating pump according to the third embodiment.

FIG. 44 is a schematic view of an embodiment of the test on the performance of the superfine quantity lubricating pump 316. In the performance test, the discharge state of the lubricating oil from the nozzle 312 in the spindle high-speed rotation is visualized using a CCD camera and is then videotape recorded. Here, description will be given of the test results of the influences of the air curtain, the relationship of the pipe inside diameter and pipe length to the discharge speed, and the relationship of the pipe inside diameter to the discharge oil quantity. By the way, as the material of the pipe, there were used metal such as austenite stainless steel SUS316 and resin material such as PEEK. However, this is not limitative but, for example, ordinary iron/steel material, aluminum/copper non-iron metal material, plastic material, and ceramic material can also be used.

In the test, the distance between the nozzle leading end and bearing was set approx. 50 mm which is longer than the ordinarily employed distance (approx. 10 mm) This means that the test was conducted under a severer condition, that is, under the condition that the performance of the pump 16 can be easily influenced by the air curtain.

The lubricating oil was supplied to the interior portion of the bearing so as to be able to lubricate the contact portions of the raceway surface of the inner race of the bearing with which rolling bodies can be contacted; and the state of supply of the lubricating oil was visualized and was then videotape recorded. The visualizing apparatus 120 is disposed to have the same construction as that of FIG. 28.

Using the visualizing apparatus 120, the lubricating state when the lubricating oil was discharged from the nozzle 312 was observed with an electronic flash. As the lubricating oil, there was used mineral oil VG22 (kinematic viscosity: 22 mm$^2$/s at a temperature of 40° C.).

Figure 45:
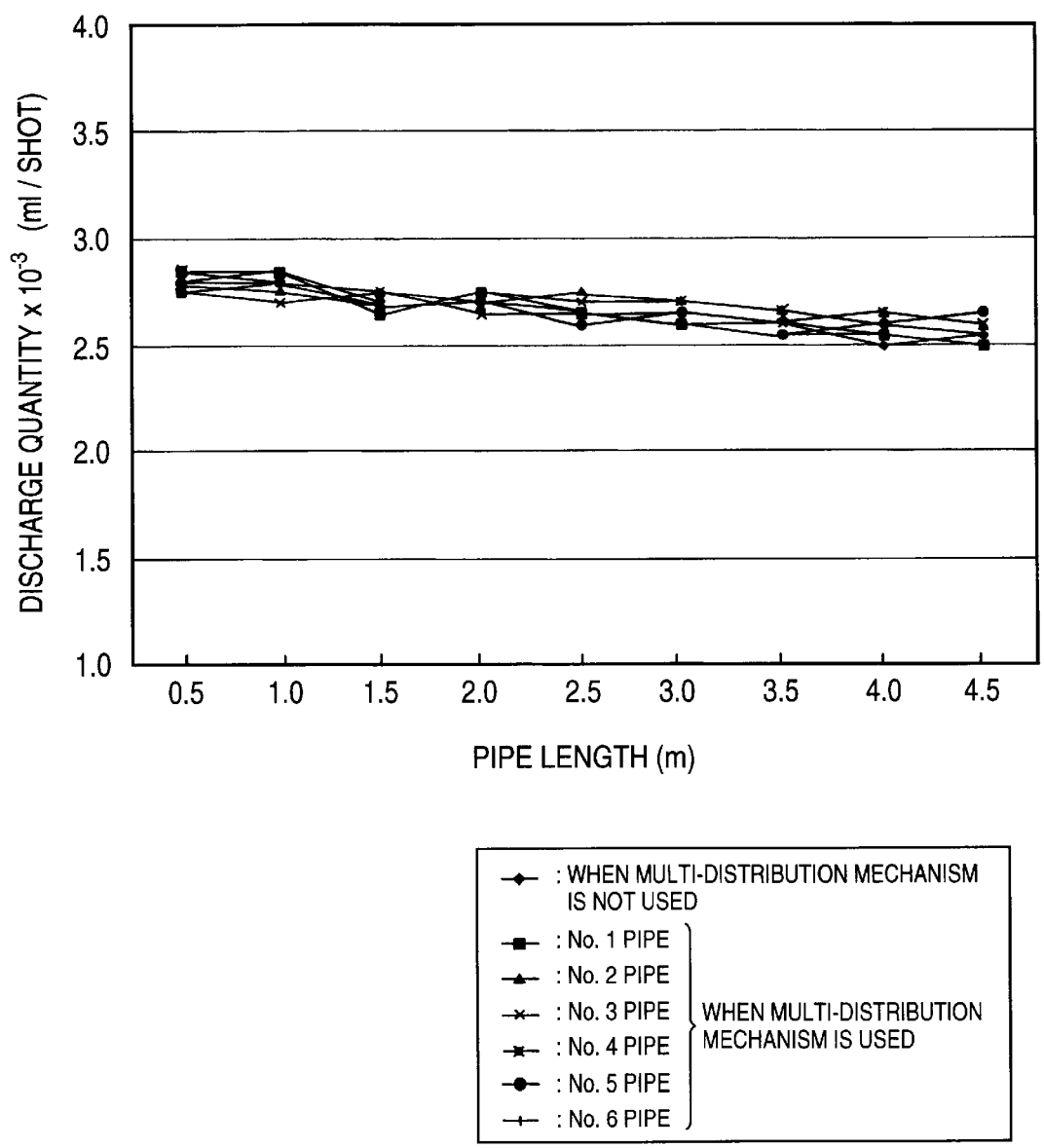
FIG. 45 is a graphical representation of variations in the oil discharging quantity with respect to the pipe length according to the third embodiment.

The results of the performance test conducted under the above environment are shown in FIG. 45. Here, FIG. 45 is a graphical representation which shows variations in the discharge oil quantity with respect to the pipe length. Specifically, FIG. 45 shows not only the variations of the discharge oil quantities with respect to the lengths of six pipes when a multi-distribution mechanism is used but also the variations of the discharge oil quantity with respect to the length of a pipe when a multi-distribution mechanism is not used.

As shown in FIG. 45, little difference is found between the case using the multi-distribution mechanism and the case not using the multi-distribution mechanism; and, similarly, little difference is found between the six pipes in the case using the multi-distribution mechanism. That is, even in case where a multi-distribution mechanism is additionally equipped, the superfine quantity lubricating pump 316 can maintain equivalent performance and also can distribute the lubricating oil to the respective pipes substantially uniformly.

The spindle lubricating apparatus according to the third embodiment includes a multi-distribution mechanism which is interposed between a lubricating oil supply unit and a nozzle and distributively supplies a fine quantity of lubricating oil to a plurality of bearings, that is, in a discharge quantity of 0.0005 ml/shot–0.01 ml/shot, at a discharge speed of 10 m/sec.–100 m/sec. Thanks to this, not only a fine quantity of lubricating oil can be distributively supplied to the plurality of bearings accurately and stably but also the structure of the lubricating apparatus can be made simple and compact. Therefore, an ideal lubricating state can always be obtained in the interior portions of the bearings, the stability of the bearing torque can be enhanced, and an increase in the bearing temperature can be controlled down to a low level.

Fourth Embodiment

Now, description will be given below in detail of a lubricating apparatus according to a fourth embodiment of the invention with reference to the accompanying drawings.

Figure 46:
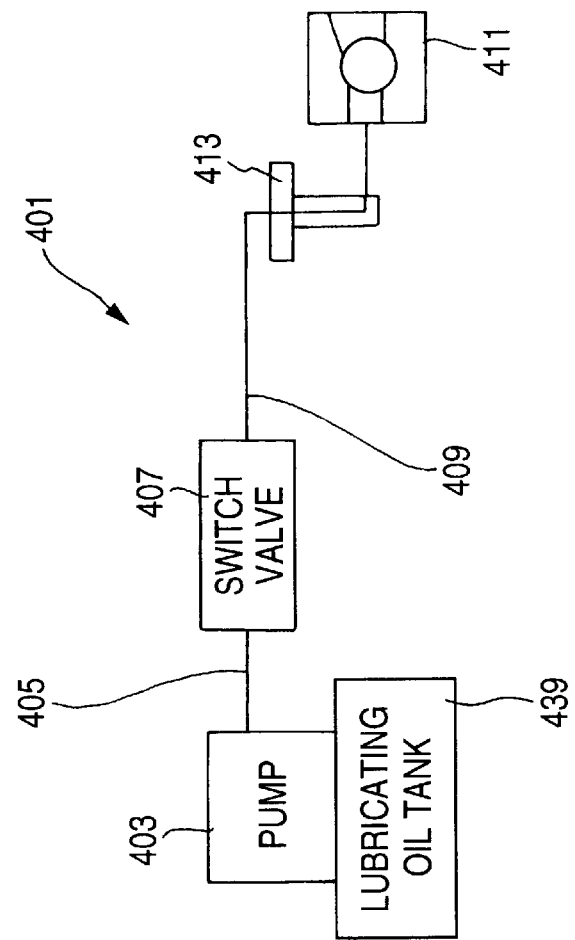
FIG. 46 is a block diagram of the principles of a lubricating apparatus according to a fourth embodiment of the invention.

FIG. 46 is a block diagram of the principles of a lubricating apparatus according to the fourth embodiment.

The lubricating apparatus 401 according to the fourth embodiment includes a pump 403 for discharging lubricating oil, a switch valve 407 connected to the lubricating oil discharge port of the pump 403 through an oil pipe (a pump-side pipe) 405, and a nozzle 413 connected to the lubricating oil discharge port of the switch valve 407 through an oil pipe (a nozzle-side pipe) 409 for discharging lubricating oil to a bearing 411.

The pump 403 may also be disposed in such a manner that it is attached to a lubricating oil tank 439. This pump 403 has a discharge quantity which is larger than the discharge quantity of the nozzle 413. As the pump 403, there can be used a pump of a piston type which can be driven using air pressure or oil pressure, and an ordinary oil pressure pump such as a gear pump.

The switch valve 407 is interposed between the oil pipes (pump-side pipe 405 and nozzle-side pipe 409), which connect together the pump 403 and nozzle 413. The switch valve 407 operates to close or open the oil pipes according to the discharge pressure of the lubricating oil from the pump 403. That is, in case where the discharge pressure of the lubricating oil from the pump 403 is less than a given pressure, the switch valve 407 closes the oil pipes to thereby stop the discharge of the lubricating oil from the nozzle 413. On the other hand, in case where the discharge pressure of the lubricating oil from the pump 403 is equal to or more than the given pressure, the switch valve 407 opens the oil pipes to thereby discharge the lubricating oil, which is supplied from the pump 403, from the nozzle 413 for a given period of time. As the switch valve 407, for example, there is used a so called rotary valve which closes and opens these oil pipes using the rotation of a rotary member and, therefore, the switch valve 407 is capable of repetitively executing a series of operations to close and open the above-mentioned oil pipes.

Next, description will be given below of the operation of the lubricating apparatus 401.

To discharge the lubricating oil to the bearing 411 using the lubricating apparatus 401, firstly, the pump 403 is driven. The pressure of the pump 403 is transmitted through the pump-side pipe 405 to the switch valve 407. Then, the oil pipes are closed (OFF) by the switch valve 407 and the pressure within the pump-side pipe 405 is increased by the pump 403.

The switch valve 407 maintains the shut-off state until the pressure within the pump-side pipe 405 increases up to a sufficiently high level. That is, the switch valve 407 maintains the shut-off state until parts such as an O-ring within the pump-side pipe 405 and pump 403, which can be deformed greatly, are deformed sufficiently. This maintaining operation is carried out by confirming an increase in the pressure using a pressure switch, or by waiting for several seconds after the start of driving of the pump 403.

After the oil pressure rise, by opening (turning on) the switch valve 407 by a short time t, the pump pressure is applied to the nozzle 413, so that the lubricating oil can be discharged into the bearing 411 at a flow speed v and in a discharge quantity q. That is, the switch valve 407 has not only the function of cutting off the oil pressure to the nozzle 413 side but also the function of transmitting the oil pressure to the nozzle 413.

In some cases, to the front side of the switch valve 407, there are connected a plurality of oil pipes and nozzles. In such case, oil pressure may be applied to the plurality of nozzles at a time but, preferably, in case where the oil pressure is switchingly applied to the nozzles one after another, the oil supply quantities of the respective nozzles can be stabilized. As the downstream-side parts (the switch valve 407 itself, nozzle-side pipe 409, nozzle 413, and connecting parts such as a joint for connecting them together) of the switch valve 407, there are used parts which are hard to deform against the pressure because a fine quantity of lubricating oil flows through these parts in a short time.

Next, description will be given below of the relationship between the discharge quantity from the nozzle 413 and the opening time t of the switch valve 407. The flow speed v·(m/s) and discharge quantity q (m³/S shot) of the lubricating oil to be discharged from the nozzle 13 are expressed by the following expressions.

$$v = Cd \cdot (2(p - \Delta p)/\rho)^{0.5} \tag{8}$$

$$q = v \cdot \pi d^2 \cdot t / 4 \tag{9}$$

where, Cd expresses a flow coefficient, p: a pump pressure (Pa), Δp: a pressure loss (Pa), ρ: a lubricating oil density (kg/m³), d: a nozzle diameter (m), and t: the opening time (s) of the switch valve, respectively.

Here, Cd is a flow coefficient, that is, a constant which is determined by the shape of the nozzle and the viscosity of the lubricating oil. In the case of a nozzle which is used to lubricate a spindle, Cd is a constant which can be substantially determined by the diameter of the nozzle, and it takes a value of 0.9–0.5. And, Δp is a pressure loss consisting mostly of the pressure loss of the oil pipe, whereas the pressure loss of the switch valve 407 is normally small. The pressure loss of the oil pipe, according to the experimental results, corresponds well to an expression (10) relating to the pipe friction of a laminar-flow viscous fluid.

$$\Delta p = 32 \cdot \mu \cdot L \cdot d^2 \cdot v / D^4 \tag{10}$$

where μ expresses a lubricating oil viscosity coefficient (Pa·s), L: a pipe length (m), and D: a pipe inside diameter (m), respectively.

In case where the pump pressure, lubricating oil (lubricating oil density, lubricating oil viscosity coefficient) and pipe (length, inside diameter) are set according to the above expressions (8)–(10), the relationship between the opening time t of the switch valve 407 and the discharge quantity from the nozzle 413 is determined.

Normally, the opening time t of the switch valve 407 is assumed to be constant. The reason for this is as follows. That is, in the operating condition of a spindle used in a machine tool, the ambient temperature varies little and the influence of variations in the viscosity of the lubricating oil can almost be neglected and, therefore, the flow speed and the oil supply quantity do not vary greatly and thus stable lubrication is possible.

Also, the nozzle diameter, most preferably, may be in the range of 0.08–0.3 mm. That is, in case where the nozzle diameter is less than 0.08 mm, there is a possibility that the nozzle 413 can be clogged with foreign objects; and, in case where the nozzle diameter is equal to or more than 0.3 mm, it is difficult to secure the flow quantity of the switch valve 407 and also the discharge quantity is caused to vary greatly due to the influences of the oil pipe and lubricating oil viscosity, which makes it difficult to secure stable lubrication.

And, in order for the discharged lubricating oil to be able to reach the interior portion of the bearing, the flow speed v must be approximately 10–20% or more of the inner ring peripheral speed of the bearing 411. In this case, the higher the flow speed is, the better the lubricating condition is. The pump pressure depends on the necessary flow speed. Practically, use of an inexpensive oil pressure pump having a pump pressure of approx. 2.5 MPa can provide a sufficient discharge speed.

While the oil supply quantity necessary for the bearing 411 varies greatly according to the conditions, the necessary oil supply quantity Q is approximately in the range of 0.01–10 ml/hour (Q=0.01–10 ml/hour). Here, the oil supply quantity per shot, preferably, may be in the range of 0.0001–0.01 ml. The reason for this is as follows: that is, in case where the oil supply quantity is 0.01 ml or less, the torque variations of the bearing 411 in one oil supply shot do not raise any problem; and, in case where the oil supply quantity is less than 0.0001 ml, there is a possibility that a sufficient flow speed cannot be obtained due to the compressibility of the lubricating oil, the pressure deformation of the oil pipe and the response characteristic of the switch valve 407.

Also, the opening time t of the switch valve 407, which is requested from the necessary discharge quantity, is 0.1–50 ms. For a valve which allows a fine quantity of lubricating oil to flow therethrough, this opening time t is an opening time which can be sufficiently realized.

Therefore, in case where the above-mentioned operations, that is, the actuation of the pump 403, the increase of the pressure within the pump-side pipe 405 due to the closure of the switch valve 407, the opening of the switch valve 407, and the deactuation of the pump 403 are repeated at the time intervals satisfying the necessary oil supply quantity Q (0.01–10 ml/hour) in accordance with the opening time t of the switch valve 407 (0.1–50 ms) and the discharge quantity q (0.01–0.0001 ml) per shot, stable lubrication can be realized.

As described above, according to the lubricating apparatus 401, in case where the discharge oil pressure from the pump 403 is less than a given pressure, the oil pipe is shut by the switch valve 407. On the other hand, in case where the discharge oil pressure from the pump 403 is equal to or more than the given pressure, the oil pipe is opened by the switch valve 407, so that the lubricating oil from the pump 403 can be discharged from the nozzle 413 for a given time. For this reason, an expensive fine quantity lubricating pump using an electromagnet or giant-magnetostrictive material is not used but the inexpensive pump 403 is used to be able to obtain a sufficient discharge speed. Thanks to this, in a spindle which rotates at a high speed, stable lubricating characteristics, that is, enhanced seizure resistance and torque variation reduction can be realized. Also, the generation of the whizzing sounds of the rolling bodies, which raises a problem in the oil-air lubricating apparatus and in the oil mist lubricating apparatus, can be prevented. Further, for the portion of the pump-side pipe 405 up to the switch valve 407, there can be used a resin-made pressure-resistant tube, which can enhance the design freedom of the pipe arrangement.

Next, description will be given below of a first example of the fourth embodiment, in which, using a lubricating apparatus manufactured so as to have a similar structure to the basic structure of the lubricating apparatus 401, the discharge of the lubricating oil is confirmed.

Figure 48A:
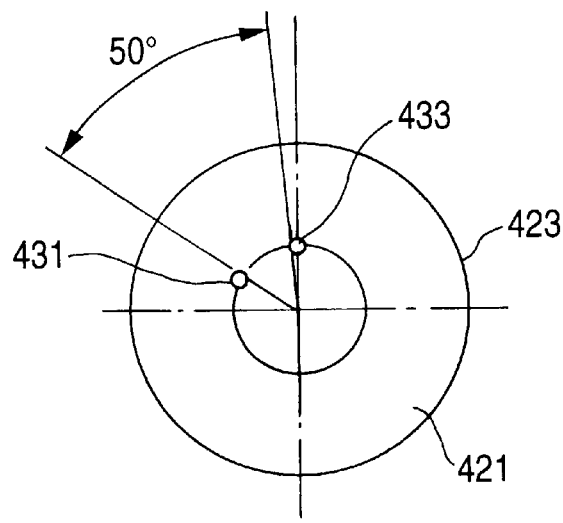
FIGS. 48A and 48B are plan views of the main portions of the lubricating apparatus shown in FIG. 47.
Figure 48B:
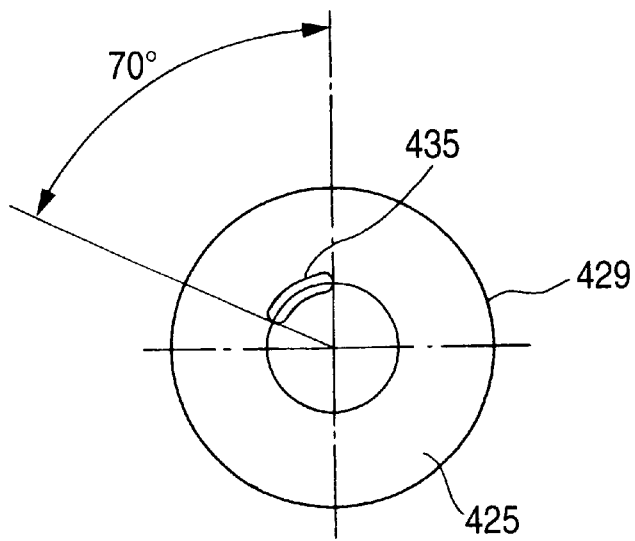

Here, FIG. 47 is a schematic view of the structure of a lubricating apparatus according to the first example of the fourth embodiment, and FIGS. 48A and 48B are plan views of the main portions of the lubricating apparatus shown in FIG. 47. By the way, in the present example, parts thereof equivalent to those shown in FIG. 46 are given the same designations and thus the duplicate description thereof is omitted here.

In the present example, a switch valve 407 includes a fixed member 423 having a fixed sliding contact surface 421, and a rotary member 429 which has a movable sliding contact surface 425 closely contactable with the fixed sliding contact surface 421 and rotates the movable sliding contact surface 425 in sliding contact with the fixed sliding contact surface 421 about an axial line 427 perpendicular to the fixed sliding contact surface 421. In the fixed sliding contact surface 421 of the fixed member 423, more specifically, on the circumference of the fixed sliding contact surface 421 with the axial line 427 as the center thereof, there are opened up a discharge hole 431 to be connected to a pump 403 and an oil feed hole 433 to be connected to a nozzle 413. In the movable sliding contact surface 425 of the rotary member 429, more specifically, on the circumference of the movable sliding contact surface 425 with the axial line 427 as the center thereof, there is formed an arc-shaped slit 435 having a center angle (in the present example, 70°) which is larger than at least a center angle (in the present example, 50°) formed between the discharge hole 431 and the oil feed hole 433.

The rotary member 429 can be rotated by a motor 437 which includes a transmission mechanism using a gear. The pump 403 is attached to a lubricating oil tank 439. On the pump 403, there is mounted a pressure switch 441 which detects a discharge oil pressure from the pump 403. Also, a controller 443 is connected to the motor 437, pump 403 and pressure switch 441. The controller 443 sends a drive signal to the pump 403; and, in case where it receives a detect signal from the pressure switch 441 when the discharge oil pressure is equal to or more than a given pressure, the controller 443 sends a one-rotation drive signal to the motor 437 and, after then, it sends a drive stop signal to the pump 403. Further, the controller 443 is able to repeat this series of operations at given time intervals. As the controller 443, there can be used a programmable sequencer or a personal computer.

In the present example, as the pump 403, there is used a pump of a piston type which can be driven by air pressure. However, as the pump 403, there can also be used an ordinary oil pressure pump.

In the present example, as a pump-side pipe 405, there is used a stainless steel pipe. However, this is not limitative but, for example, it is also possible to use a pressure-resisting tube which is formed of resin.

By the way, in FIG. 47, reference numeral 445 designates a spring for pressing the rotary member 429 against the fixed member 423, 447: a thrust bearing for supporting the rotation shaft of the rotary member 429, and 449, 451, 453: pipe joints, respectively.

The switch valve 407 is structured such that, when the close contact surfaces of the fixed sliding contact surface 421 and movable sliding contact surface 425 are matched to each other by the force of the spring 445, the oil pressure can be shut off and, when the discharge hole 431 and oil feed hole 433 of the fixed member 423 are superimposed on the slit 435 of the rotary member 429, the oil pressure can be transmitted to the nozzle side. Since the close contact surfaces of the fixed sliding contact surface 421 and movable sliding contact surface 425 are requested to shut off the oil pressure through their surface matching, the flatness thereof is set at 0.5 μm or less and the surface roughness thereof is set at 0.4 μm Ra or less. In order that the operation can be executed at a high speed, the discharge hole 431 and oil feed hole 433 are formed small in size, that is, they are respectively formed as a port having a hole diameter of 0.5 mm slightly larger than the diameter of the nozzle.

By the way, as the power for opening and closing the switch valve 407, instead of the motor, there can also be used an actuator of an oil pressure type, or an actuator of an air pressure type.

The switch valve 407 is structured such that the opening time t thereof can be controlled by controlling the rotation speed N (min$^{-1}$) of the rotary member 429.

$$\text{Opening time } t=\theta/360/(N/60) \tag{s}$$

where, θ expresses an angle at which the switch valve 407 operates. In the present example, θ=70−50=20°.

In the present example, N is set at 600 min$^{-1}$ and the opening time t is set at 5.6 ms.

As the nozzle-side pipe 409, there is used a stainless steel pipe which has an inside diameter of 1 mm and an outside diameter of 1.6 mm. Since this stainless steel pipe can be bent relatively freely, it can be effectively arranged in an actual spindle. Also, because this stainless steel pipe is little expanded when pressure is applied thereto, it is suitable as a pipe to be arranged in the present lubricating apparatus.

Using the lubricating apparatus manufactured in the above manner, the discharge conditions of the lubricating oil were confirmed. In this case, the lubricating oil was discharged 300 shots, the total weight of the lubricating oil discharged from the nozzle was measured, and the average discharge quantity and discharge speed per shot were found according to the specific gravity of the lubricating oil.

The discharge speed, as the average speed during the opening time of the switch valve 407, was found from (the discharge quantity)/(nozzle section area)/(opening time). The measurement was made using the nozzle diameter, pipe length and lubricating oil viscosity as parameters.

Figure 49:
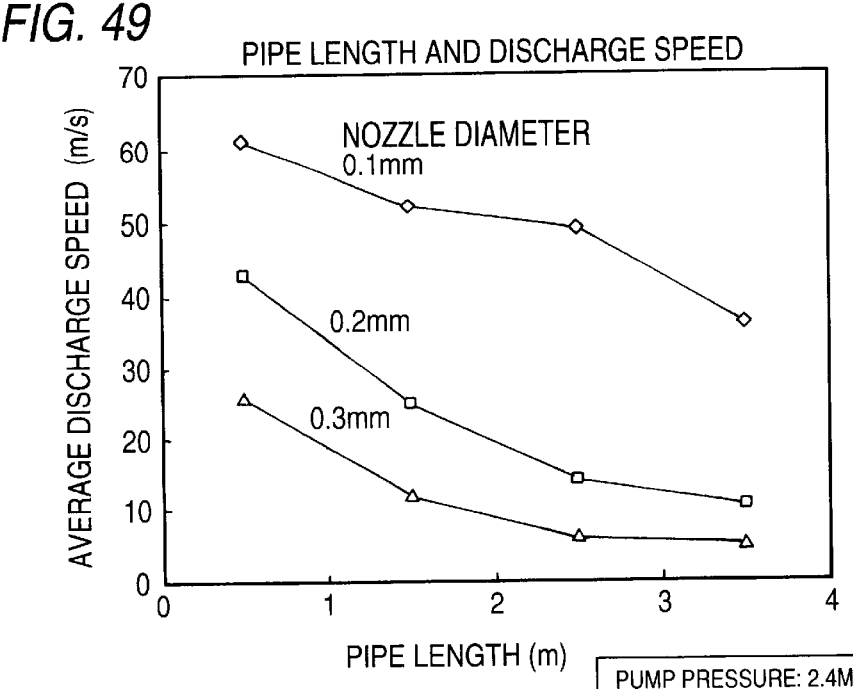
FIG. 49 is a graphical representation of the relationship of the discharge speed with the pipe length with the nozzle diameter as a parameter.
Figure 50:
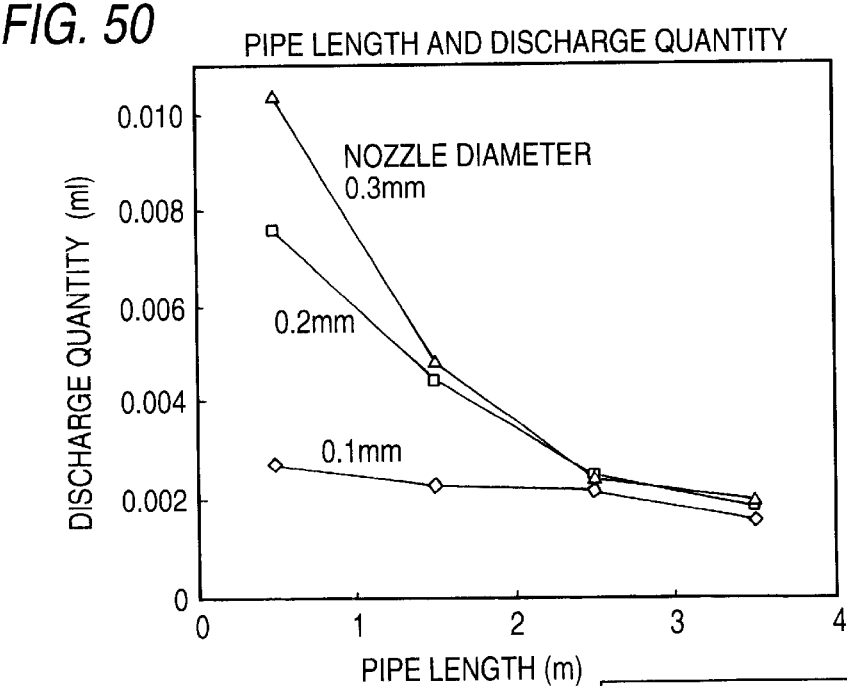
FIG. 50 is a graphical representation of the relationship of the discharge quantity with respect to the pipe length with the nozzle diameter as a parameter.
Figure 53:
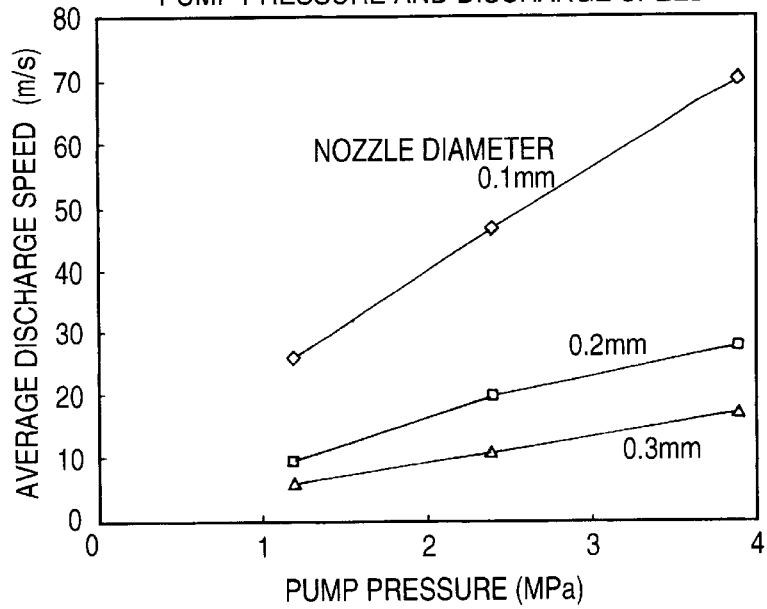
FIG. 53 is a graphical representation of the relationship between the pump pressure and the discharge speed with the nozzle diameter as a parameter.
Figure 54:
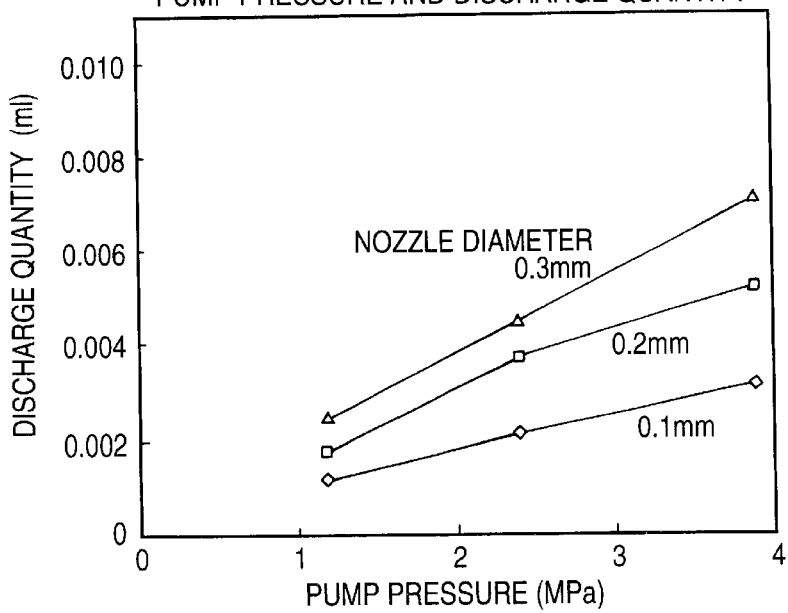
FIG. 54 is a graphical representation of the relationship between the pump pressure and the discharge quantity with the nozzle diameter as a parameter.

The results of the measurement are shown in FIGS. 49–54. Specifically, FIG. 49 is a graphical representation of the relationship of the discharge speed with respect to the pipe length with the nozzle diameter as a parameter; FIG. 50 is a graphical representation of the relationship of the discharge quantity with respect to the pipe length with the nozzle diameter as a parameter; FIG. 51 is a graphical representation of the relationship between the viscosity and discharge speed with the nozzle diameter as a parameter; FIG. 52 is a graphical representation of the relationship between the viscosity and discharge quantity with the nozzle diameter as a parameter; FIG. 53 is a graphical representation of the relationship between the pump pressure and discharge speed with the nozzle diameter as a parameter; and, FIG. 54 is a graphical representation of the relationship between the pump pressure and discharge quantity with the nozzle diameter as a parameter. By the way, as the lubricating oil, there were used three kinds of lubricating oil, VG10, VG22 and VG32, and the kinematic viscosity of the lubricating oil at the room temperature of 25° C. in the measurement was taken as the horizontal axis.

From the measurement results shown in FIGS. 49–54, it can be found that, by selecting the pressure, viscosity, pipe length and nozzle diameter properly, a sufficient discharge speed and a proper discharge quantity can be obtained. For example, the peripheral speed of the inner ring in dm·N= 3000000 is approx. 130 m/s and, in this case, the minimum necessary speed is 10% of the inner ring peripheral speed and thus it is equal to or more than 13 m/s.

Also, from the measurement results shown in FIGS. 49–54, it can also be found that, as the nozzle diameter decreases, the variations of the discharge quantity with respect to the pipe length, lubricating oil viscosity and pump pressure is small. That is, in the lubricating apparatus 401 according to the first example of the fourth embodiment, by reducing the nozzle diameter, stable oil discharge can be executed. This means that, in the above-mentioned expression (10), variations in the pressure loss Δp are small; and, practically, in case where the parameter L·d$^2$/D$^4$ relating to the pipe in the expression (10) is set 5×10$^{-4}$ (m$^{-1}$) or less, stable discharge speed and discharge quantity can be obtained.

Figure 55:
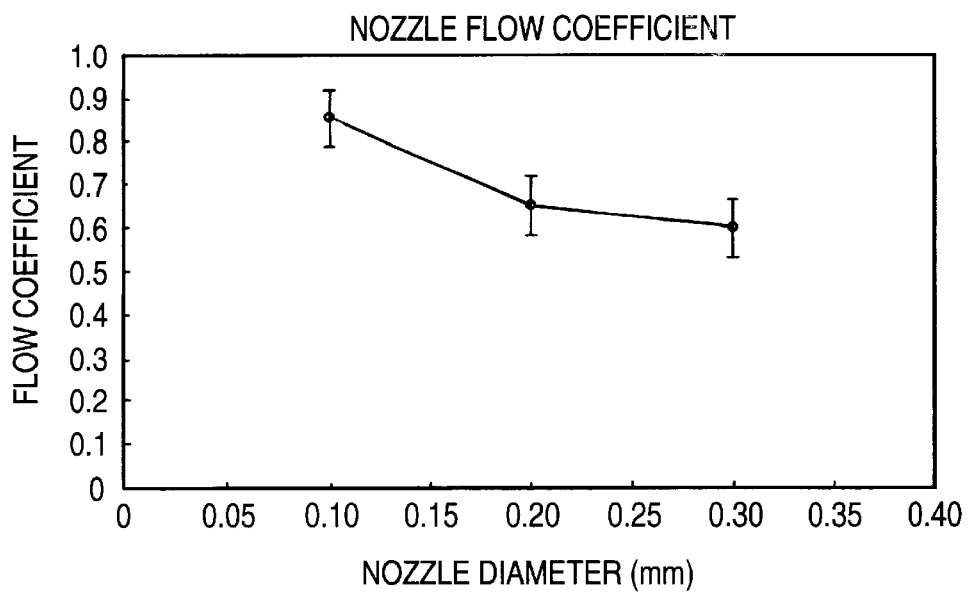
FIG. 55 is a graphical representation of the relationship between the flow coefficient and the nozzle diameter found from the measurement results shown in FIGS. 49–54.

Here, FIG. 55 is a graphical representation of the relationship between the flow coefficient, which is obtained from the measurement results shown in FIGS. 49–54, and the nozzle diameters. The flow coefficient makes it possible to calculate the flow speed. In case where the discharge speed found from the flow coefficient and the expression (8) exceeds 10–20% of the inner ring peripheral speed, stable lubrication can be realized.

Next, description will be given below of a lubricating apparatus according to a second example of the fourth embodiment.

Figure 56:
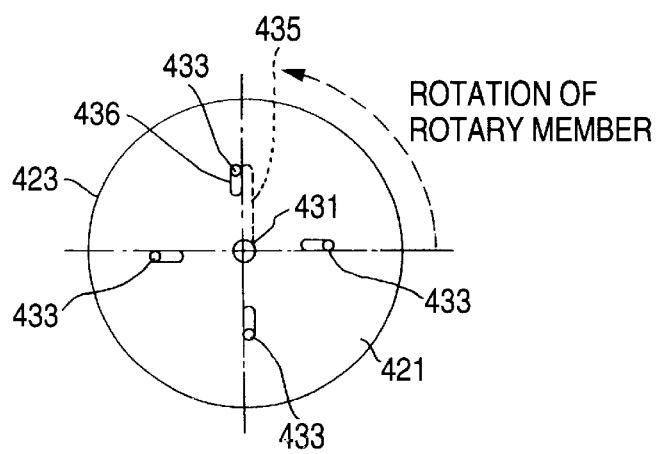
FIG. 56 is a plan view of the main portions of a lubricating apparatus according to a second example of the fourth embodiment.
Figure 57:
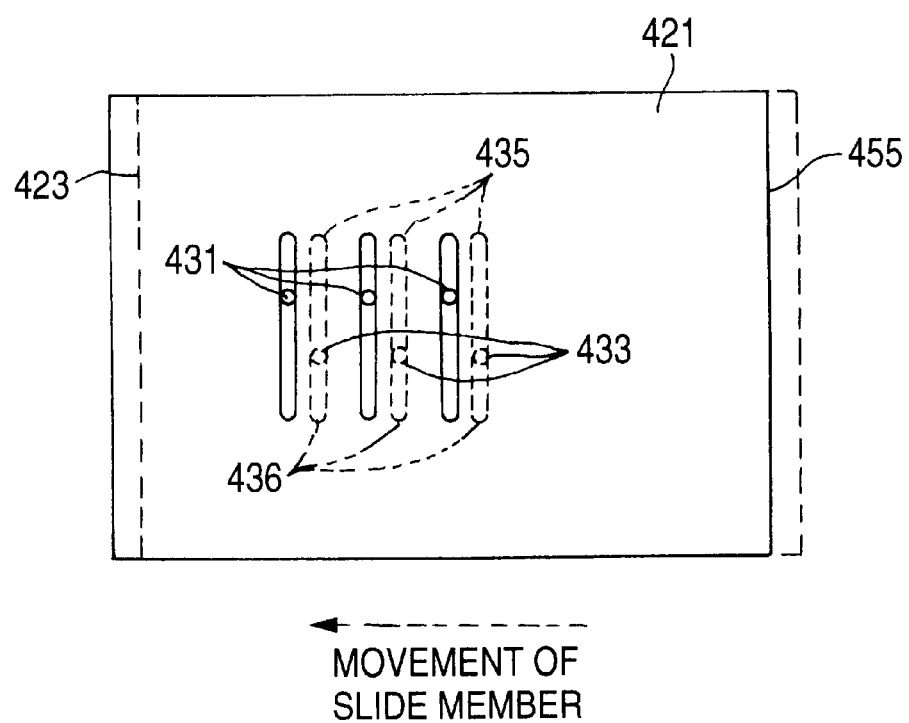
FIG. 57 is a plan view of the main portions of a lubricating apparatus according to a modification of the second example of the fourth embodiment.

Here, FIG. 56 is a plan view of the main portions of the lubricating apparatus according to the second example, and FIG. 57 is a plan view of the main portions of a lubricating apparatus according to a modification of the second example.

In the second example, the arrangement pattern of the discharge hole 431, oil feed hole 433 and slit 435 of the switch valve 407 in the previously described first example is changed.

That is, in the fixed sliding contact surface 421 of the fixed member 423, more specifically, on the circumference of the fixed sliding contact surface 421 with the axial line 427 as the center thereof, there are opened up a plurality of oil feed holes 423 to be connected to a nozzle 413; and, at the position of the axial line 427, there is formed a discharge hole 431 to be connected to a pump 403. In the movable sliding contact surface 425 of the rotary member 429, more specifically, there is formed a slit 435 which extends along the radial direction from the axial line 427 position up to the position of the oil feed hole 433. That is, in the present example, there is employed an arrangement which includes one input and four outputs; and, when the rotary member 429 is rotated once, four nozzles 413 sequentially discharge the lubricating oil.

Further, in the second example, in order to improve the excessive response of the switch valve 407, there is formed a slit 436 on the periphery of each of the oil feed holes 433 of the fixed member 423 and thus, when the rotary member 429 is rotated, the increment of the opening area of the switch valve 407 with respect to the increment of the rotation angle of the initial stage of the opening of the switch valve 407 can be increased. According to this structure, especially in case where the opening time of the switch valve 407 is reduced, an improvement effect can be provided.

Therefore, in the present example, in case where the rotary member 429 is rotated with respect to the fixed member 423 and the slit 435 formed in the movable sliding surface 425 of the rotary member 429 is matched to the oil feed hole 433 formed in the fixed sliding contact surface 421 of the fixed member 423, the switch valve 407 is opened (the oil pipe is released), whereby the lubricating oil from the pump is discharged from the nozzle for a given period of time. In this operation, since two or more units of the oil feed hole 433 are formed on the circumference, each time the rotary member 429 is rotated, the lubricating oil from the discharge hole 431 can be supplied to the respective oil feed holes 433; that is, in each rotation of the rotary member 429, the lubricating oil can be supplied to two or more bearings.

Also, in the present example, there can also be employed a structure of a type that, as shown in FIG. 57, uses a linear movement. In this structure, a switch valve 407 is composed a fixed member 423 having a fixed sliding contact surface 421 and a slide member 455 which has a movable sliding contact surface 425 closely contactable with the fixed sliding contact surface 421 and also allows the movable sliding contact surface 425 to reciprocate in the linear direction with respect to the fixed sliding contact surface 421 in sliding contact with the fixed sliding contact surface 421. And, in the fixed sliding contact surface 421 of the fixed member 423, there are opened up a plurality of (in the present structure, three) discharge holes 431 which are spaced from each other in the linear direction of the fixed member 423. The discharge hole 431 is formed within an oblong-shaped slit 436 which extends at right angles to the above-mentioned linear direction. Also, in the movable sliding contact surface 425 of the slide member 455, there are opened up a plurality of (in the present structure, three) oil feed holes 433 to be connected to the nozzle 413 in such a manner that they are formed in the linear direction at the same intervals of the discharge holes 431. The oil feed hole 433 is formed within an oblong-shaped slit 435 which extends at right angles to the above linear direction.

Therefore, the switch valve 407 has three inputs and three outputs. In the switch valve 407 according to the present modification, the fixed member 423 and slide member 455 are moved reciprocatingly in the linear direction while they are in sliding contact with each other; and, the plurality of discharge holes 431 formed in the fixed slide contact surface 421 of the fixed member 423 and the plurality of oil feed holes 433 formed in the movable sliding contact surface 425 of the slide member 455 are made to communicate or are shut off at the same time. In this case, the lubricating oil from the pump 403 can be discharged from the nozzle 413 for a given period of time. According to the present modification, since the slide member 455 is reciprocatingly moved in the linear direction in a sliding contact manner, as a drive source, a movable member of a solenoid or a linear drive device such as a cylinder can be used as it is.

Also, in the case of the switch valves respectively shown in FIGS. 56 and 57, in case where the thicknesses of their respective slits are changed, the oil supply quantities to the respective nozzles 413 can be changed. In a cylindrical roller bearing, in some cases, the necessary oil supply quantity thereof can be about ⅓ that of an angular bearing; and, such change of the oil supply quantity according to the second example is effective in such cases.

Next, description will be given below of a third example of the invention in which the lubricating apparatus discussed in the above first example is applied to an actually used spindle with reference to FIG. 58.

A spindle apparatus 461 is a spindle apparatus for use in a machine tool which is used to cool an outer cylinder; and, in the interior portion of the spindle apparatus 461, there is arranged a stainless-steel-made pressure resistant tube 463 flexible with respect to a bending action and having a diameter in the range of 1–3.2 mm (here, as an example, an outside diameter of 1.6 mm and an inside diameter of 1.0 mm). The pressure resistant tube 463 is connected to a nozzle frame 465. The stainless-steel-made pressure resistant tube 463 can be easily bent by hand, can be little expanded when pressure is applied thereto, and is suitable for supply of a fine quantity of lubricating oil.

The spindle apparatus 461 includes a spindle shaft 469, a plurality of (in the illustrated example, four) rolling bearings 471 for supporting the spindle shaft 469 in a freely rotatable manner, an inside housing 473 for covering the outside of the rolling bearings 471, and an outside housing 475 for covering the outside of the spindle apparatus 461. A switch valve 407, which is a lubricating oil supply source, is connected by the pressure-resistant tube 467 to the nozzle frame 465 disposed within the inside housing 473 through a communication hole 481 formed in the outside housing 475 along the axial direction thereof and an opening 479 formed in the inside housing 473.

The outside housing 475 includes an outer cylinder 477 for enclosing the outer peripheries of the inner housing 473 as well as a rear cover 485 fixed to the end face of the outer cylinder 477.

The rolling bearings 471 are arranged at given intervals in the axial direction of the spindle apparatus 461 in such a manner that the two sets of two rolling bearings 471 respectively share and support the front and rear sides of the spindle shaft 469; the outer rings of the rolling bearings 471 are respectively fixed to the inner peripheral surface of the inside housing 473; the outer ring of the front-most rolling bearing 471 is contacted with and secured to the front cover 487; and, the outer ring of the rear-most rolling bearing 471 is secured to the inner housing 473 through the outer ring cover 474 while it is elastically energized in the axial direction of the spindle apparatus 461 by a spring 489.

Also, the inner rings of the rolling bearings 471 are respectively fitted with the outer peripheral surface of the spindle shaft 469; and, in the front and rear groups of the rolling bearings 471, between the rolling bearings 471, there are interposed spacers for fixing the bearings 471 in the axial direction of the spindle apparatus 461.

Figure 58:
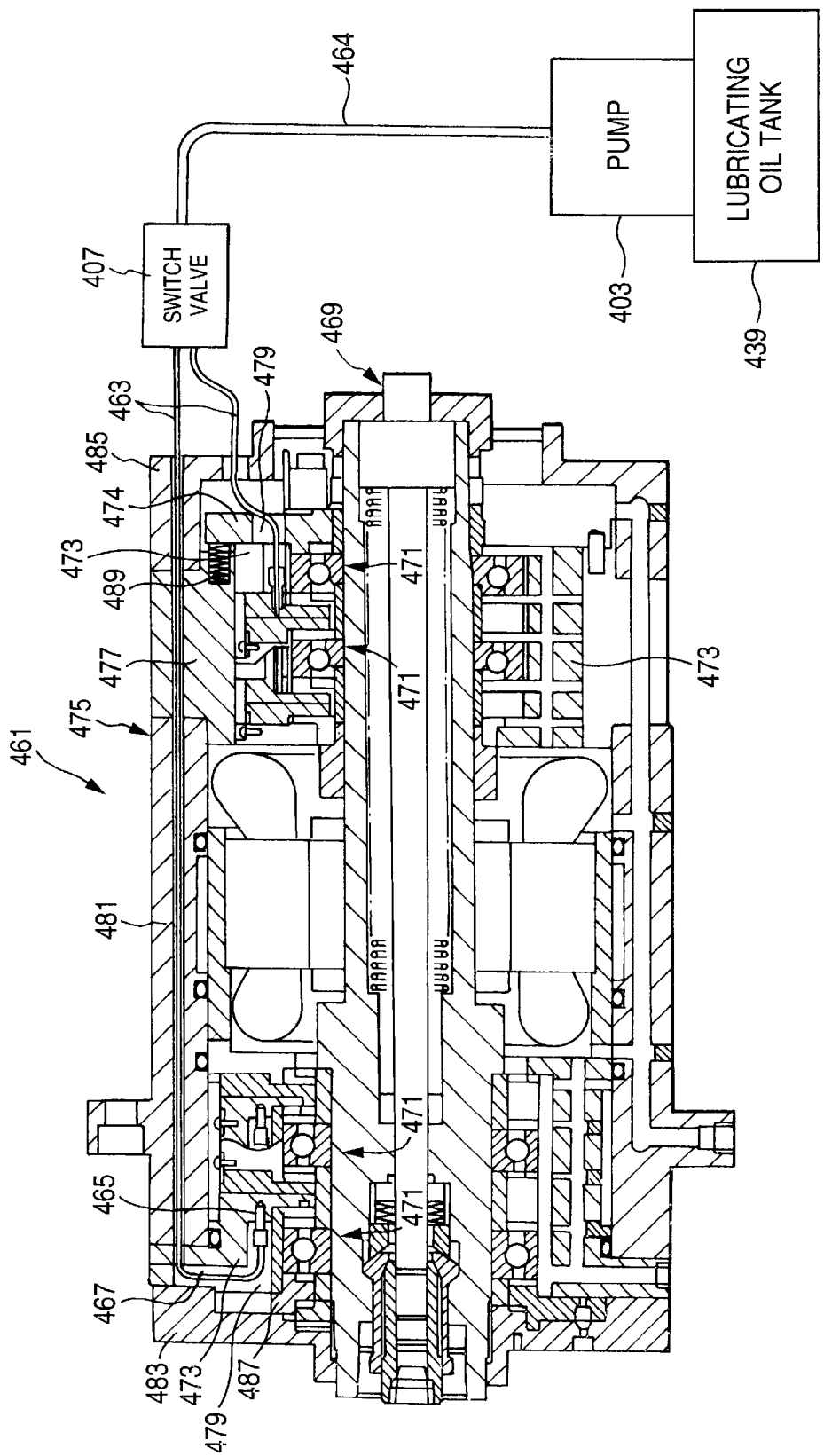
FIG. 58 is a plan view of a lubricating apparatus according to a third example of the fourth embodiment, showing a state in which it is applied to an actually used spindle.

Also, as shown in FIG. 58, in the outside diameter surface of the inside housing 473, there is formed a cooling groove and thus cooling oil supplied from a cooling unit (not shown) is allowed to circulate through the cooling groove, thereby being able to cool the spindle apparatus 461. That is, the present spindle apparatus 461 is structured such that it has a cooling function using a jacket cooling system. By the way, in the present example, the spindle shaft 469 is supported horizontally. However, this is not limited but, for example, in a case where the spindle apparatus is used in a machining center, the spindle shaft 469 can also be used in such a manner that it is supported vertically or obliquely.

As described above, since the lubricating apparatus having the switch valve 407, pump 403, and nozzle frame 465 is applied to the spindle apparatus 461 which is actually used, it is not necessary to use an expensive fine quantity lubricating pump using an electromagnet or a giant-magnetostrictive material, but a sufficient discharge speed can be obtained using the inexpensive pump 403. For this reason, in a spindle which is rotated at a high speed, stable lubricating characteristics such as enhanced seizure resistance and reduced torque variations can be realized. And, up to the intermediate portion of the pipe arrangement, a resin pipe 464 can be used and, therefore, the design freedom of the pipe arrangement can be enhanced, which makes it possible to apply the spindle apparatus 461 to various spindle systems.

Next, description will be given below of a lubricating apparatus according to a fourth example of the fourth embodiment with reference to FIGS. 59A and 59B.

Figure 59A:
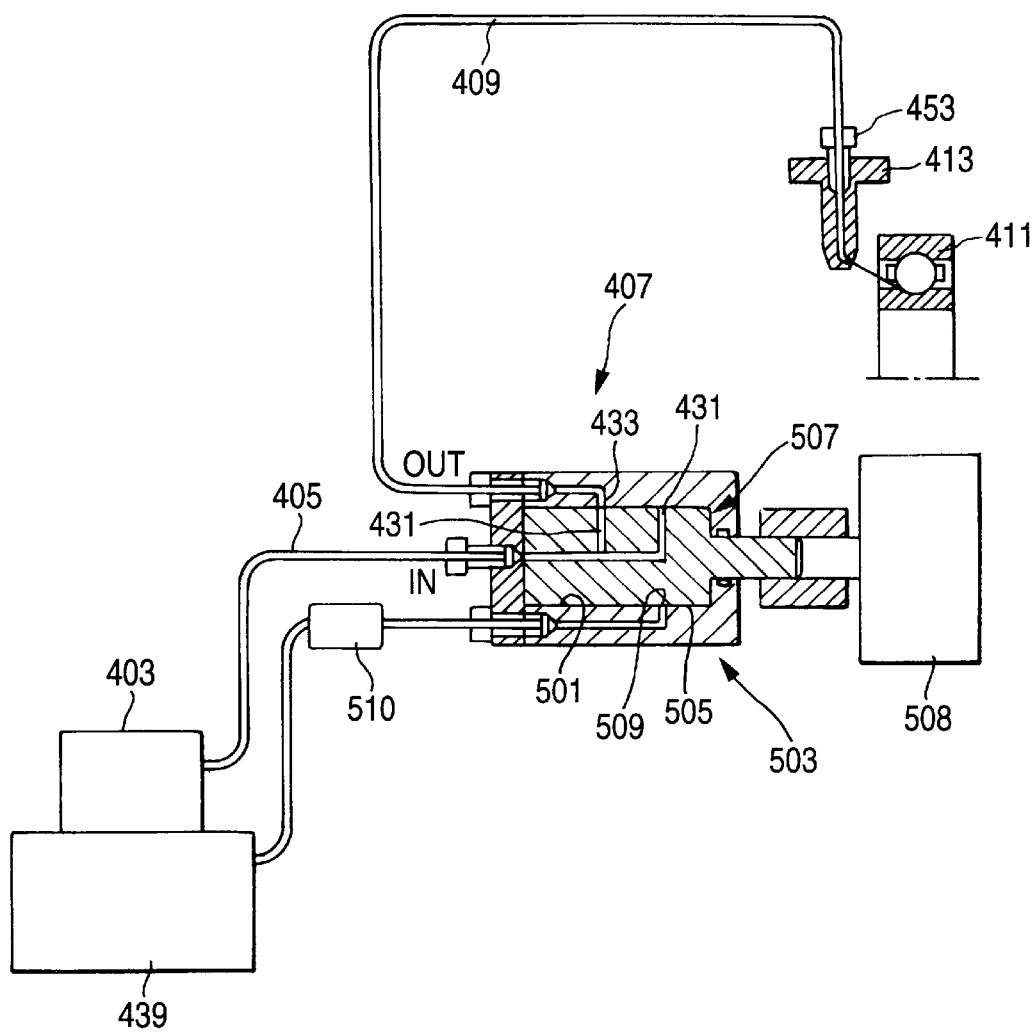
FIG. 59A is a plan view of the structure of a lubricating apparatus according to a fourth example of the fourth embodiment.

In the present example, as shown in FIG. 59A, a switch valve 407 includes a cylindrical-shaped stator 503 having a fixed sliding contact surface 501 on the inner peripheral surface thereof, and a rotor 507 which has a rotary sliding contact surface 505 formed on the outer peripheral surface thereof so as to be closely contacted with the fixed sliding contact surface 501 and also can be rotated while the rotary sliding contact surface 505 is in sliding contact with the fixed sliding contact 501. Also, as shown in FIG. 59B, in the fixed sliding contact surface 501 of the stator 503, more specifically, in the radial direction of the fixed sliding contact surface 501, there is opened up an oil feed hole 433 to be connected to a nozzle 413, while a plurality of oil feed holes 433 are formed at intervals in the circumferential direction of the stator 503. On the other hand, in the rotary sliding contact surface 505 of the rotor 507, more specifically, in the radial direction of the rotary sliding contact surface 505, there are opened up a plurality of discharge holes 431 to be connected to a pump 403, while the discharge holes 431 are formed at the same intervals as those of the oil feed holes 433 in the circumferential direction of the rotor 507.

In the present lubricating apparatus 401, the rotor 507 is driven and rotated in the interior portion of the stator 503 and, in case where the plurality of oil feed holes 433 formed in the fixed sliding contact surface 501 of the stator 503 are matched to the discharge holes 431 formed in the rotary sliding contact surface 505 of the rotor 507, the lubricating oil from the pump 403 can be discharged from the nozzle 413 for a given period of time. The stator 503 and rotor 507 can be structured in a movable fit manner, whereby high-speed switching with low torque can be executed easily. For example, it is possible to use a rotary solenoid 508 using a permanent magnet and an electromagnet. In this case, there can be obtained a high-speed response characteristic and, when compared with an ordinary motor, a drive circuit can be simplified, which makes it possible to reduce the cost of an actuator.

In the present example, in order that many outputs can be provided in the range of the operation angle of the rotor 507 up to 90°, the rotor 507 is structured in the form of a rotary valve which has one input and four outputs. The rotor 507 can be driven and rotated from a $\theta_1$ position to a $\theta_2$ position or from the $\theta_2$ position to the $\theta_1$ position. In case where the rotation angle from the initial position of the rotor 507 is in the position of approx. 40–50°, the discharge hole 431 and oil feed hole 433 are allowed to communicate with each other and thus the lubricating oil can be discharged from the nozzle 413. At the $\theta_1$ position or $\theta_2$ position, the discharge hole 431 and a relief port 509 are allowed to communicate with each other, so that the lubricating oil is returned through a relief valve 510 to a lubricating oil tank 439. Since the rotary valve is structured such that it seals the lubricating oil with a fitting clearance, the relief port 509 is formed so as to be able to prevent a slight quantity of lubricating oil from leaking to the oil feed hole 433. By the way, in case where the time to turn on the pump 403 is shortened, the leakage of the lubricating oil to the oil feed hole 433 is very small and, therefore, in this case, it is not necessary to form the relief port 509.

Figure 59B:
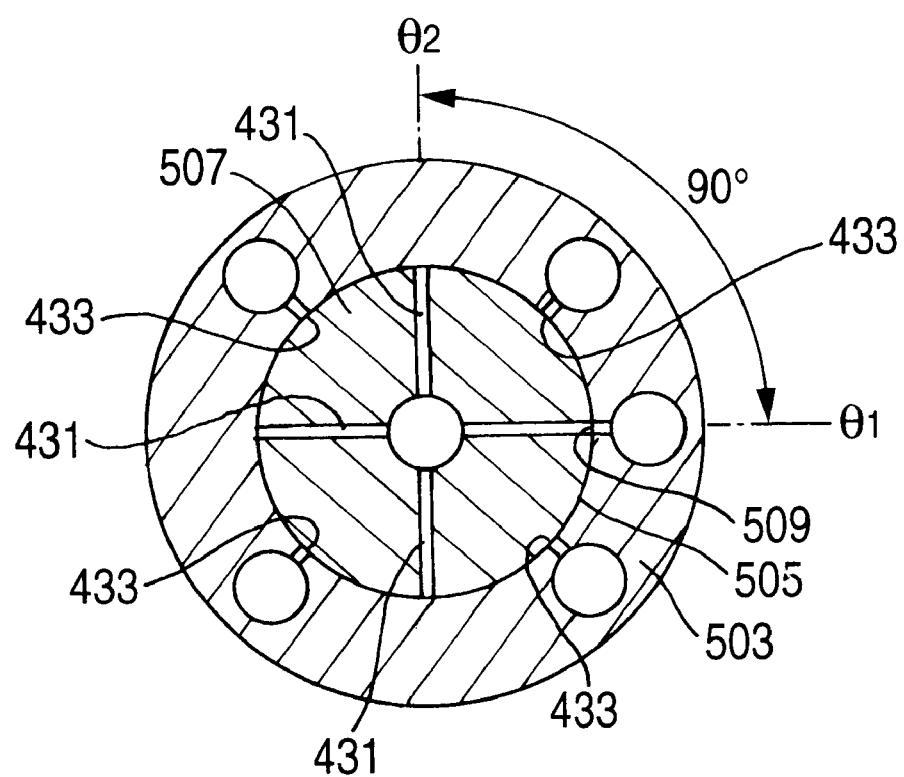
FIG. 59B is a plan view of the main portions of a switch valve used in the fourth example of the fourth embodiment.

In addition, as a modification of the fourth example, there is proposed a lubricating apparatus with a rotor and a stator shown in FIGS. 60A and 60B, that is different from those of FIGS. 59A and 59B, so that we refrain detailed explanation of the structure and operation thereof. Specifically, a discharge hole 504 connected to the pump 403 is formed in the stator 503, and the lubricating oil discharged from the discharge hole 504 is fed to the four oil feed holes 433 through an oil passage 506 formed in the rotor 507.

Next, description will be given below of a lubricating apparatus according to a fifth example of the fourth embodiment.

Figure 62A:
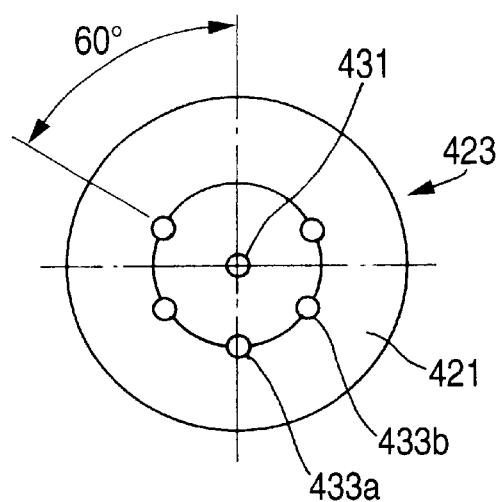
FIGS. 62A and 62B are plan views of a fixed member and a rotary member respectively forming a switch valve.
Figure 62B:
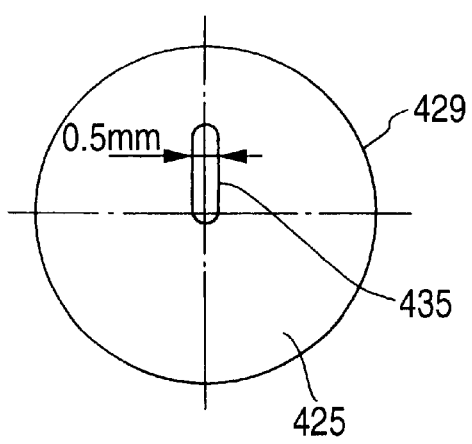
Figure 63:
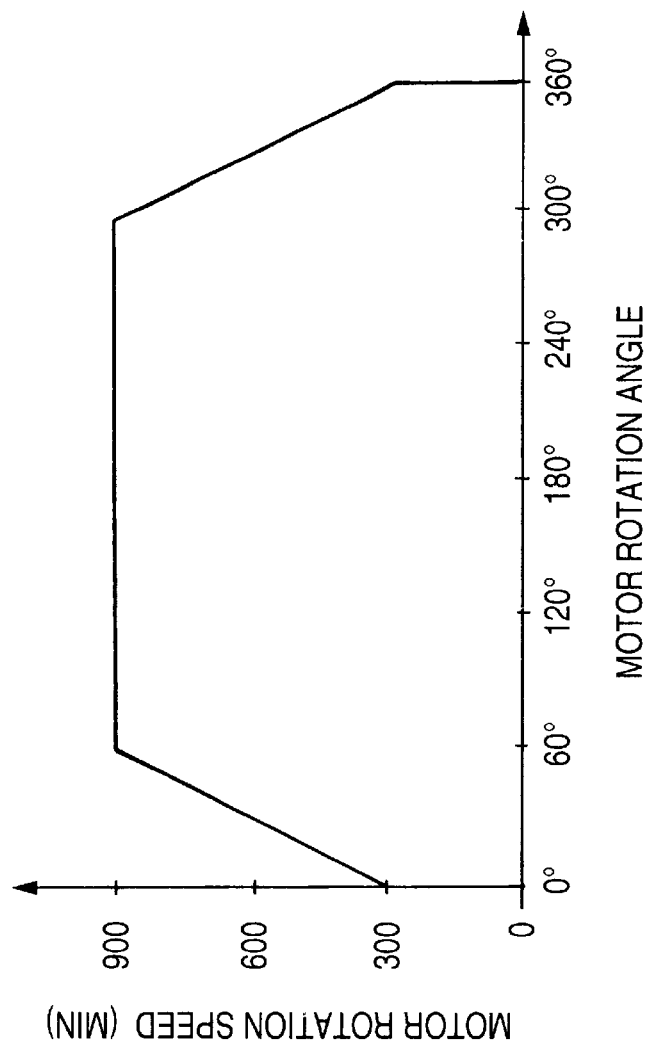
FIG. 63 is graphical representation of a speed instruction to be outputted from a controller to a motor.

FIG. 61 is a schematic view of the structure of a lubricating apparatus according to the fifth example, FIGS. 62A and 62B are schematic views of a fixed member and a rotary member employed in a switch valve, and FIG. 63 is a graphical representation of a speed instruction to be outputted to a motor from a controller.

In the fifth example, using a switch valve 407, lubricating oil is supplied to a spindle apparatus 462 which employs two ceramic-ball angular contact ball bearings 411 each having an inside diameter of 65 mm.

The two bearings 411 are disposed respectively on the two end sides (A row, B row) of the spindle apparatus 462 such that they are spaced from each other in the axial direction of the spindle apparatus, while a nozzles 413 is disposed on each of the bearings 411 in such a manner that the discharge port of the nozzle 413 faces the interior portion of the bearing 411.

Referring here to the structure of the switch valve 407, as the fixed member 423 thereof is shown in FIG. 62A and the rotary member 429 thereof is shown in FIG. 62B, the switch valve 407 uses the two outputs of a rotary valve having one input and five outputs. That is, in the central portion of the fixed member 423, there is formed a discharge hole 431 and, at given radius positions thereof, there are formed total of five oil feed holes 433 at the interval of 60°. On the other hand, in the rotary member 429, from the center thereof up to the above-mentioned radius position, there is formed a slit having a width of 0.5 mm in the radial direction of the rotary member 429. And, in case where the rotary member 429 is driven and rotated, the lubricating oil supplied from the discharge hole 431 of the fixed member 423 is introduced into the slit 435 of the rotary member 429; and, when the oil feed hole 433 is superimposed on the outside of the slit 435 in the radial direction thereof, the lubricating oil is fed from the oil feed hole 433.

A controller 443 increases the pressure of an oil pump 403 intermittently (in the present example, once a minute) and, after confirmation of the increased pressure, gives a motor 437 a speed instruction corresponding to the rotation angle of the motor 437 to thereby rotate the motor 437 once. That is, as shown in FIG. 63, in case where the rotation angle of the motor 437 is 0° (360°), the rotation speed of the motor 437 is set at 300 $min^{-1}$; for the rotation angle of 60°, the rotation speed is increased up to 900 $min^{-1}$; and, in case where the rotation angle is in the range of 60°–300°, the rotation speed of 900 $min^{-1}$ is maintained.

And, when the rotary member 429 rotates and the slit 435 of the rotary member 429 is superimposed on the oil feed hole 433, pressure is applied to the leading end portion of the nozzle connected to the oil feedhole 433 so that the lubricating oil can be discharged. According to our test, it is found that, in case where the discharge quantity per shot is 0.0014 ml, the discharge speed is 50 m/s.

Also, in the present example, in front of the switch valve 407, there is disposed a lubricating oil filter 470. As the lubricating filter 470, there can be used a glass-wool or quartz-wool filter of a small pressure loss or a sintered-material filter of the granularity of about 0.5 $\mu$m having a large flow capacity. Use of such filter 470 can prevent the fixed sliding contact surface 421 and movable sliding contact surface 425 from being roughened by foreign substances, which makes it possible to extend the life of the valve. In order to secure the sealing performance, preferably, the respective sliding contact surfaces 421, 425 may have a flatness deviation of 0.5-less than 1.0 $\mu$m and a surface roughness of less than 0.02 Ra.

Referring to the material of the respective sliding contact surfaces 421, 425, since the fixed member 423 is made of hardened steel such as tool steel (SK) and stainless steel (SUS), the high hardness of the fixed member 423 can prevent the sliding contact surfaces 421, 425 against wear. Also, in case where a nitriding treatment, a WC/C coating, or a DLC (diamond-like hard carbon) coating is applied to the sealing surface of the fixed member 423, the wear proof of the fixed member 423 can be enhanced further. Because a WC/C coated surface, or a DLC coated surface has a small coefficient of friction, the drive torque of the motor can be reduced. Also, as the material of the rotary member 429, there can be used similar material or, in order not to damage its mating surface, there can also be used resin such as PEEK (polyether ether-ketone) which is lower in hardness than the fixed member 423.

Figure 64A:
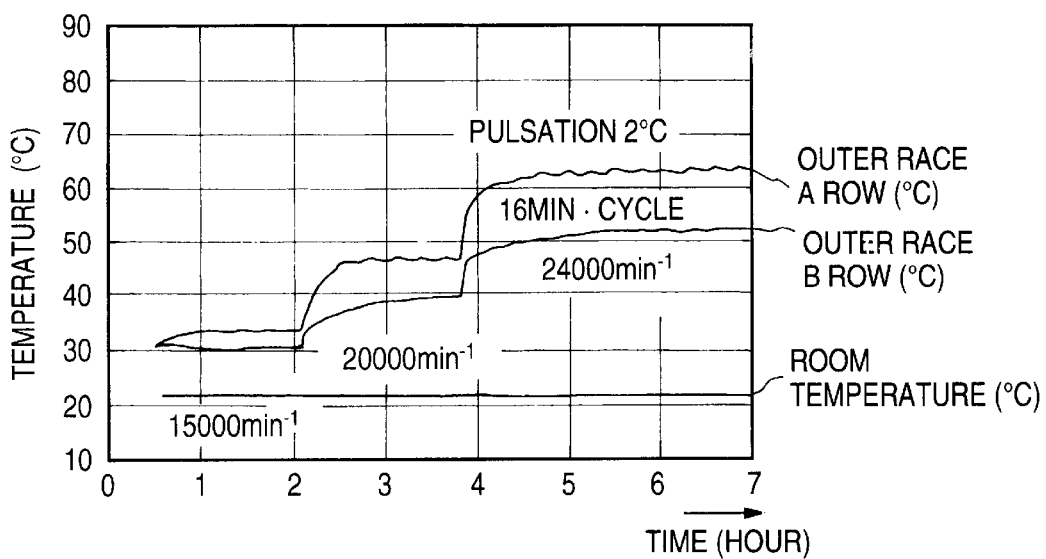
FIGS. 64A and 64B are graphical representations of the results of a test (temperature record chart) conducted on the rotation in the fifth example of the fourth embodiment.
Figure 64B:
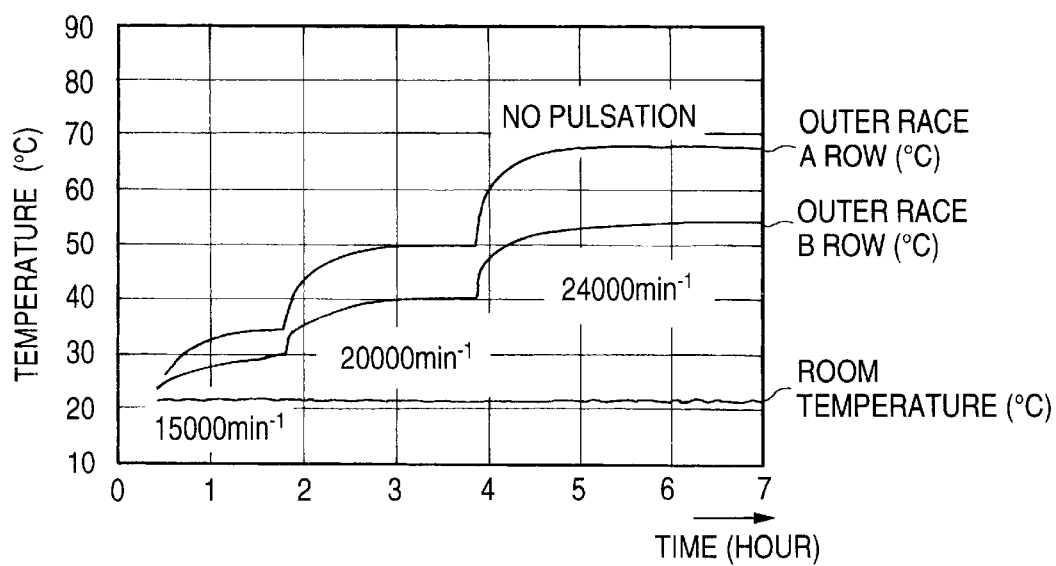

Now, FIGS. 64A and 64B are graphical representations of the results (temperature record chart) of a rotation test conducted on the fifth example; specifically, in the rotation test, the present example was compared with the conventional oil-air lubricating method. In the conventional oil-air lubricating method shown in FIG. 64A, a quantity of 0.03 ml of lubricating oil is discharged every 16 minutes, which causes the temperature to pulsate every 16 minutes. On the other hand, in the lubricating method according to the present example shown in FIG. 64B, since a discharge quantity per shot is 0.0014 ml, that is, very small, variations in the quantity of the lubricating oil within the bearing are reduced, which in turn reduces variations in the rolling resistance thereof. As a result of this, the temperature can be prevented against pulsation and thus stable rotation can be realized.

Figure 65:
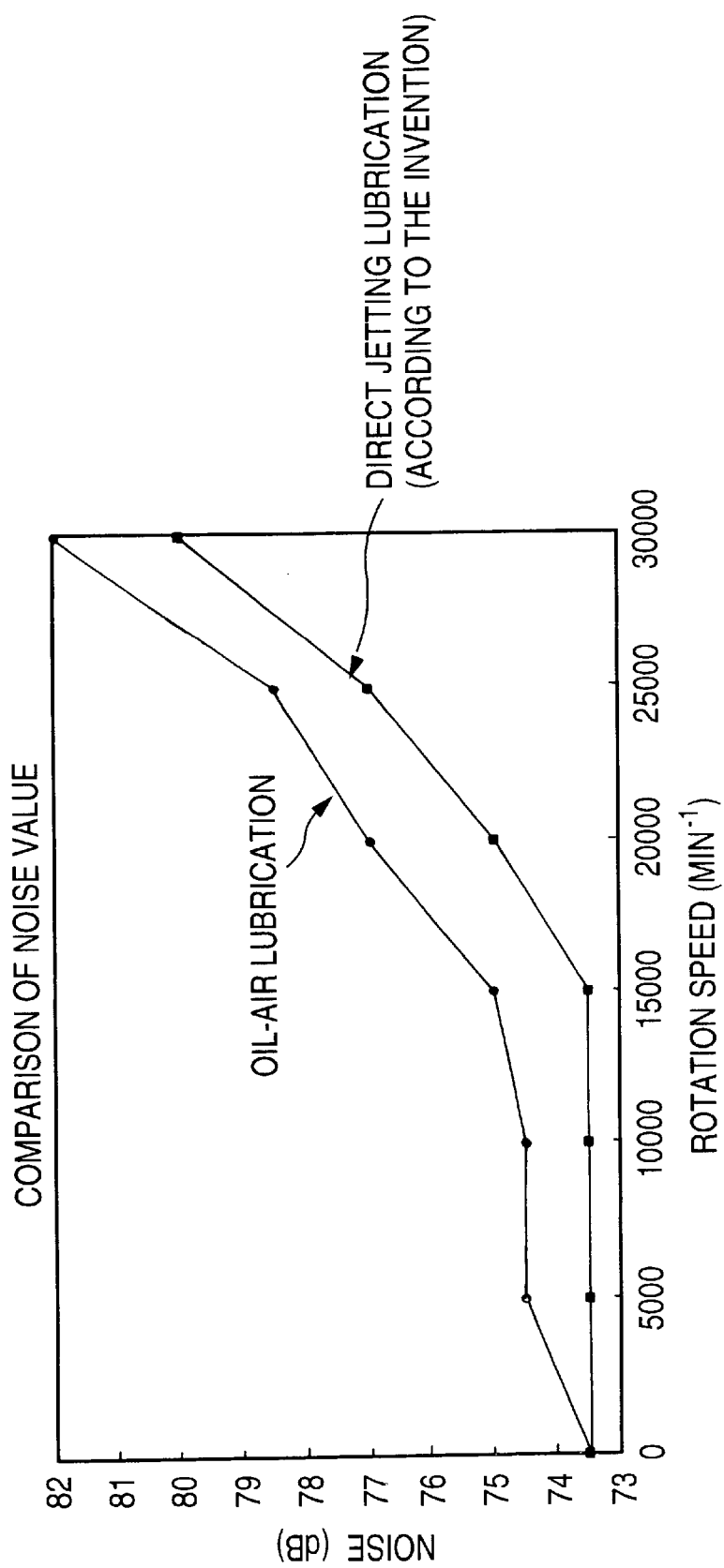
FIG. 65 is graphical representation of the results of measured noises generated from a spindle apparatus according to a conventional oil-air lubricating method and a spindle apparatus according to the lubricating method employed in the fifth example of the fourth embodiment.

Now, FIG. 65 is a graphical representation of the results of noises respectively generated from a spindle apparatus using the conventional oil-air lubricating method and a spindle apparatus using a lubricating method according to the present example, while the noises were respectively measured at a place 1 m before the spindle and were compared with each other. In the lubricating method according to the present example, since no air is sprayed onto the bearing, the generation of the whizzing noise could be eliminated, so that the noise value could be reduced.

By the way, in the present example, instead of a specific-purpose electromagnetic valve, there can also be used an ordinary electromagnetic valve having a high response characteristic such as a high-speed electromagnetic valve using a commercial poppet valve.

As has been described in detail heretofore, according to a lubricating apparatus of the fourth embodiment of the invention, as witch valve is interposed between oil pipes for connecting together a pump and a nozzle, the switch valve closes the oil pipes when the discharge oil pressure from the pump is less than a given pressure, and, when the discharge oil pressure from the pump is equal to or higher than the given pressure, the switch valve opens the oil pipes to thereby allow the oil supplied from the pump to be discharged from the nozzle for a given period of time. Thanks to this, without using an expensive fine quantity lubricating pump using an electromagnet or a giant-magnetostrictive material, there can be obtained a sufficient discharge speed using an inexpensive pump and, in a spindle of high-speed rotation, stable lubrication characteristics, that is, enhanced seizure resistance and reduced torque variations can be realized. And, it is also possible to eliminate the generation of the whizzing noises of the rolling bodies that raises a problem in the conventional oil-air and oil mist lubricating methods. Further, in the portion of the pipe that extends up to the switch valve, there can be used an o-ring or a resin-made pressure resisting tube, which can enhance the design freedom of the pipe arrangement.

Fifth Embodiment

Now, description will be given below in detail of a lubricating apparatus according to a fifth embodiment of the invention with reference to the accompanying drawings.

Figure 66:
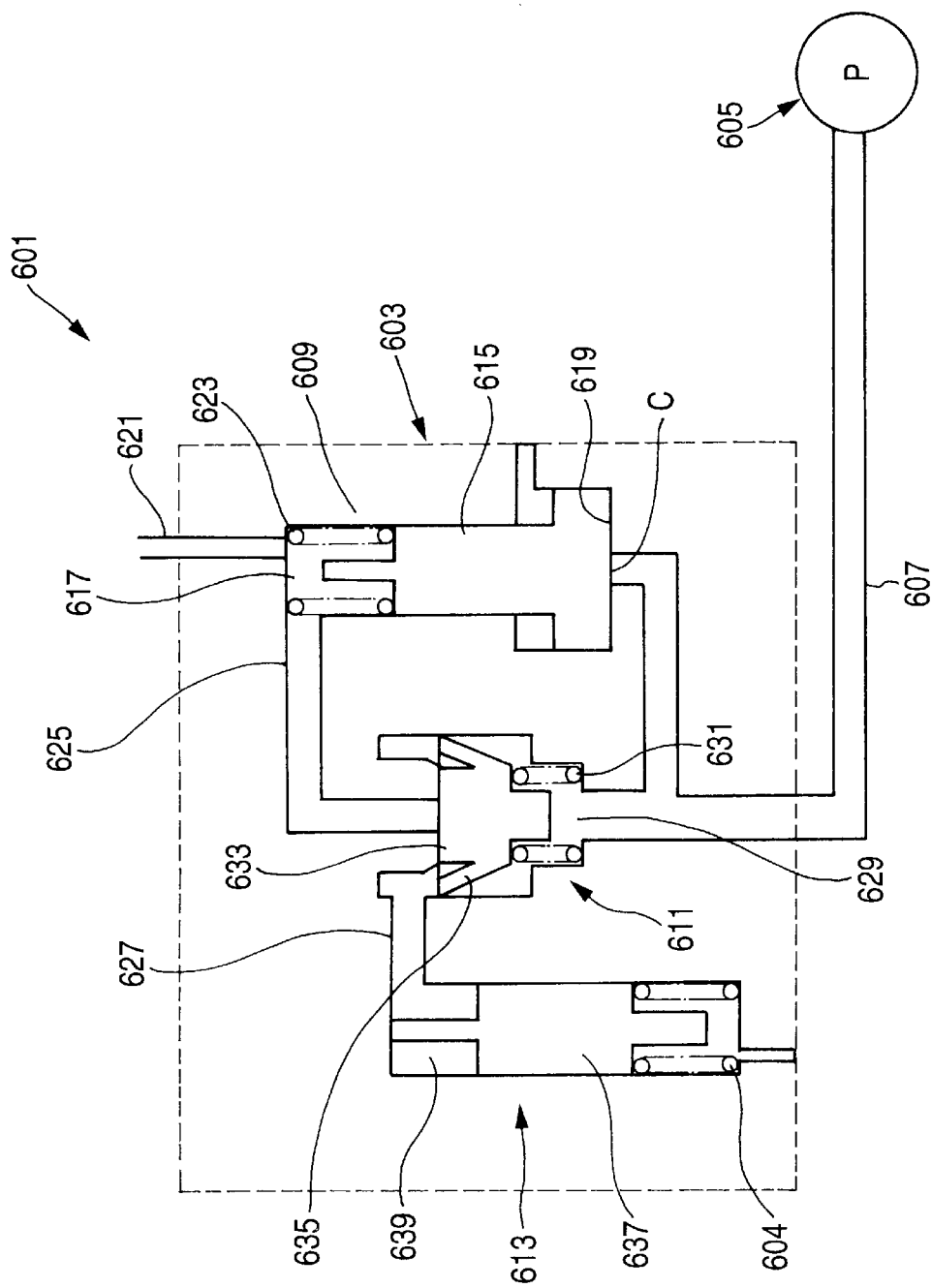
FIG. 66 is a schematic view of the principles of a lubricating apparatus according to a fifth embodiment of the invention.
Figure 67:
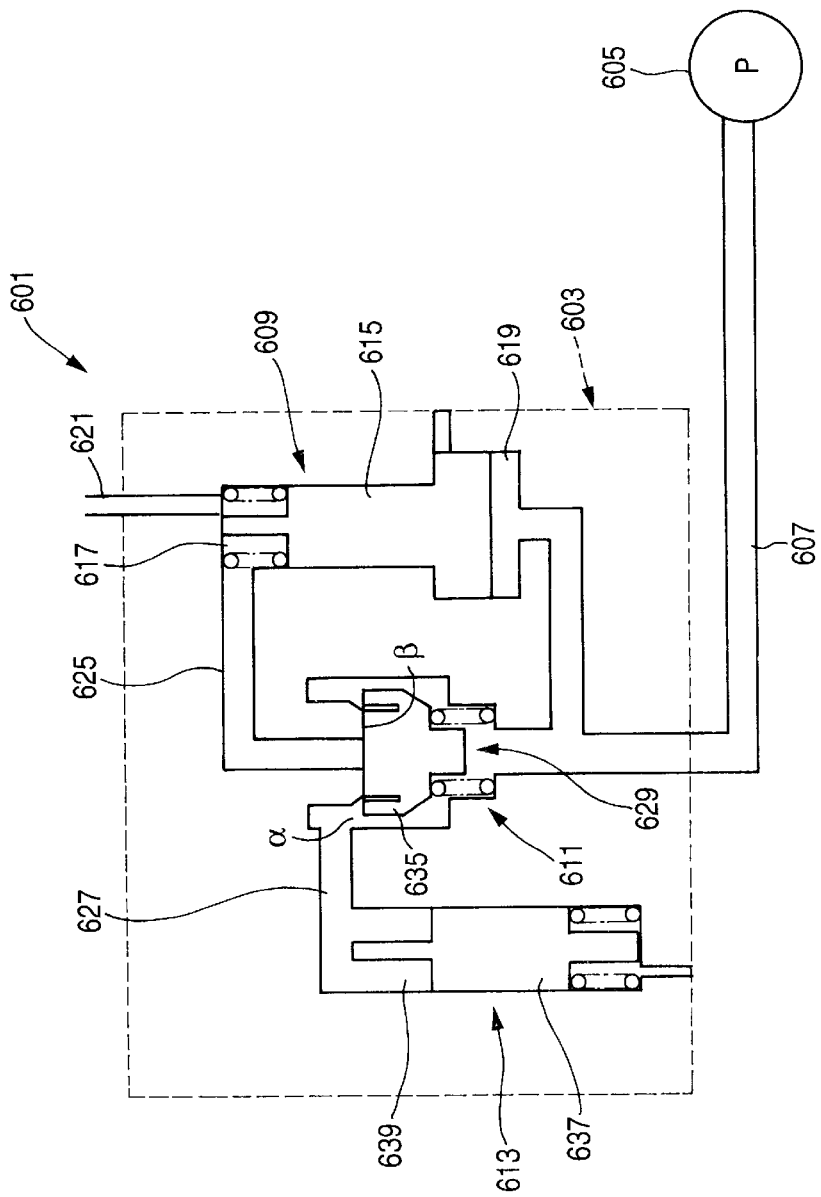
Figure 68:
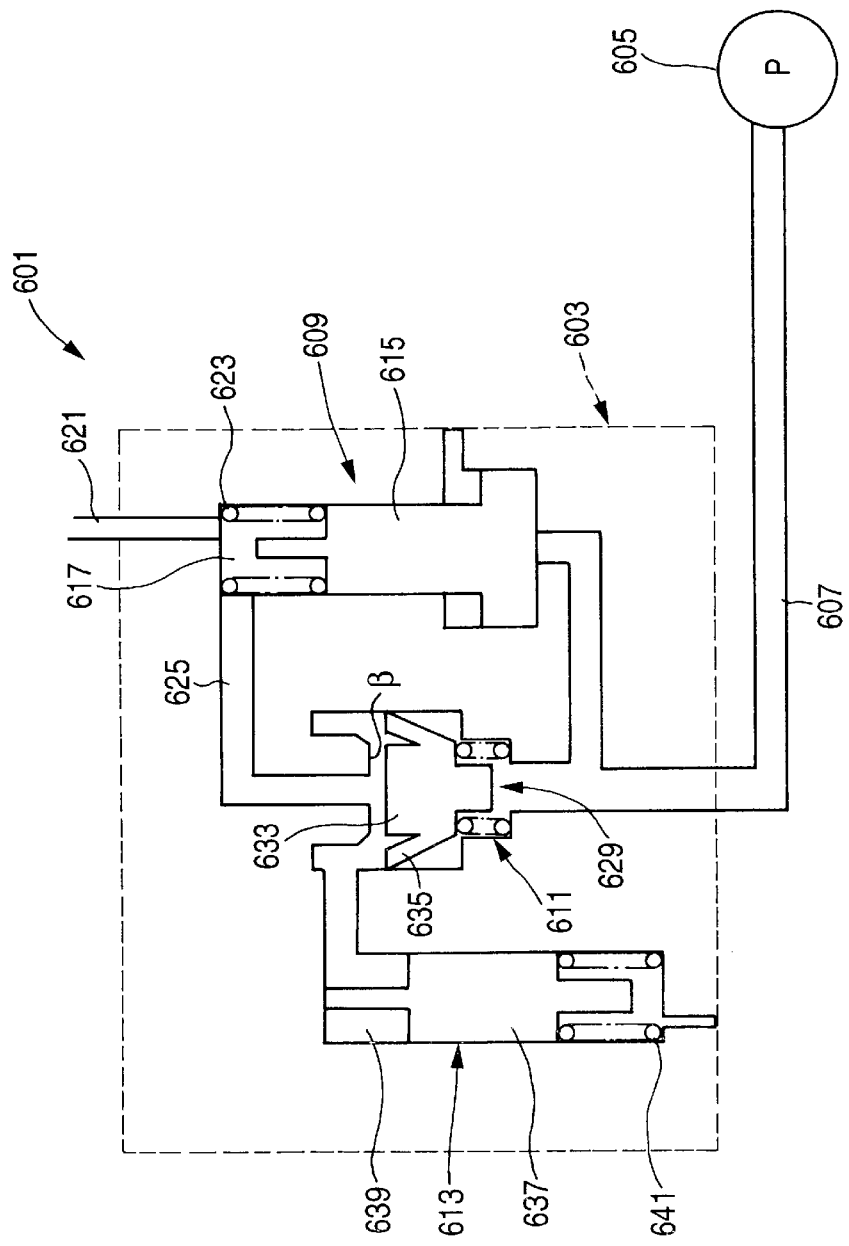
FIG. 68 is an explanatory view of the operation of the lubricating apparatus shown in FIG. 66, showing a state thereof when an oil pressure pump is off.

FIG. 66 is a schematic view of the principles of a lubricating apparatus according to the fifth embodiment of the invention; FIG. 67 is an explanatory view of the operation of the lubricating apparatus shown in FIG. 66, showing a state thereof in which a oil pressure pump is on; and, FIG. 68 is an explanatory view of the operation of the lubricating apparatus shown in FIG. 66, showing a state thereof in which the oil pressure pump is off.

A lubricating apparatus 601 according to the present embodiment is structured such that an oil pressure pump 605 is connected to a fixed quantity valve 603. The oil pressure pump 605 is connected to the fixed quantity valve 603 through a hydraulic main pipe 607 and, when in operation, can pressurize (ON) or depressurize (OFF) the oil to be discharged into the hydraulic main pipe 607.

The fixed quantity valve 603 is mainly composed of a discharge cylinder 609, a three-way valve 611 and an oil storage cylinder 613. In the interior portion of the discharge cylinder 609, there is mounted a discharge piston 615. On one-end side of the discharge piston 615 in the moving direction thereof, there is formed an oil supply chamber 617; and, on the other end side thereof, there is formed a hydraulic chamber 619. To the oil supply chamber 617, there is connected a discharge port 621, whereas the hydraulic main pipe 607 is connected to the hydraulic chamber 619. Also, the discharge piston 615 is normally energized by spring means 623 toward the hydraulic chamber 619 formed in the discharge cylinder 609.

The energizing force of the spring means 623 is set smaller than the moving force of the discharge piston 615 when the oil pressure from the oil pressure pump 605 is applied to the hydraulic chamber 619. That is, in case where the oil pressure pump 605 is on, the discharge piston 615 can be moved toward the oil supply chamber 617 side. Due to the movement of the discharge piston 615 toward the oil supply chamber 617 side, oil filled in the oil supply chamber 617 can be discharged from the discharge port 621 onto a bearing (not shown).

To the three-way valve 611, there are connected the hydraulic main pipe 607, an oil supply passage 625 to be connected to the oil supply chamber 617, and an oil storage passage 627 to be connected to the oil storage cylinder 613. In the present embodiment, the three-way valve 611 is structured such that an umbrella valve 629 is mounted in the interior portion thereof. The umbrella valve 629 is normally energized by spring means 631 in a direction to close the oil supply passage 625 and oil storage passage 627. The umbrella valve 629 includes an umbrella valve main body 633 and, on the outer periphery of the umbrella valve main body 633, there is disposed a flexible umbrella piece 635. The operation of the flexible umbrella piece 635 is as follows: that is, in a state that the umbrella valve main body 633 is energized by the spring means 631, when the oil pressure from the hydraulic main pipe 607 is applied to the flexible umbrella piece 635, the flexible umbrella piece 635 is reduced in diameter to thereby allow the hydraulic main pipe 607 and oil storage passage 627 to communicate with each other.

On the other hand, when the oil pressure from the hydraulic main pipe 607 disappears from the umbrella valve 629 and thus the umbrella valve 629 receives the oil pressure from the oil storage passage 627, the umbrella valve main body 633 is moved against the energizing force of the spring means 631 in a direction to move away from the oil supply passage 625 (a direction to open the oil supply passage 625). Also, at the then time, the flexible umbrella piece 635 is enlarged in diameter to thereby close the hydraulic main pipe 607. That is, the umbrella valve main body 633, which has closed the hydraulic main pipe 607, is moved in the direction to open the oil supply passage 625, whereby the oil storage passage 627 and oil supply passage 625 are allowed to communicate with each other.

An oil storage piston 637 is mounted in the interior portion of the oil storage cylinder 613. On one-end side of the oil storage cylinder 613 in the moving direction of the oil storage piston 637, there is formed an oil storage chamber 639. The oil storage chamber 639 is connected to the oil storage passage 627. The oil storage piston 637 is normally energized toward the oil storage chamber 639 side by spring means 641.

That is, the oil storage chamber 639 of the oil storage cylinder 613 can be made to communicate with the oil supply chamber 617 of the discharge cylinder 609 due to the flow passage switching operation by the three-way valve 611. Also, the oil storage chamber 639 and oil supply chamber 617 are formed such that they have the same internal capacity.

Next, description will be given below of the operation of the thus-structured lubricating apparatus 601.

Firstly, when the oil pressure from the oil pressure pump 605 is on, as shown in FIG. 67, the umbrella valve 629 is pressed against a β surface to thereby shut off the hydraulic main pipe 607 and oil supply passage 625 from each other. Also, the discharge piston 615 is moved toward the oil supply chamber 617 side (upper side in FIG. 67) due to the oil pressure from the hydraulic main pipe 607 to thereby allow the oil stored in the oil supply chamber 617 to be discharged from the discharge port 621.

At the same time, the flexible umbrella piece 635 of the umbrella valve 629 is reduced in diameter (closed up) to thereby open an α portion, the oil flows through the oil storage passage 627 into the oil storage cylinder 613 to press against the oil storage piston 637 downward in FIG. 67, and the oil is stored into the oil storage chamber 639 formed within the oil storage cylinder 613.

In this case, the quantity of oil stored into the oil storage chamber 639 becomes equal to the quantity of oil discharged from the oil supply chamber 617. When the oil pressure is switched off by the oil pressure pump 605, as shown in FIG. 68, the oil storage piston 637 is returned to its original position (a position on the upper side in FIG. 68) due to the spring means 641. Also, in case where the oil pressure is switched off, the flexible umbrella piece 635 of the umbrella valve 629 is enlarged in diameter to thereby close the α portion and, therefore, the oil, when the oil storage piston 637 returns to its original position, presses against the umbrella main body 633 slightly downward in FIG. 68 to thereby open the β surface, so that the oil moves through the oil supply passage 625 into the discharge cylinder 609.

The discharge cylinder 609 is returned to its original position (a position on the lower side in FIG. 68) due to the oil from the oil storage cylinder 613 as well as due to the energizing force of the spring means 623. In this manner, the oil to be discharged next is filled into the oil supply chamber 617 and thus preparation for the next discharge of oil is completed. From now on, similar operations are executed repeatedly so that a given quantity of oil is discharged from the discharge port 621.

According to the present lubricating apparatus 601, in the fixed quantity valve 603 using the umbrella valve 629, the discharge cylinder 609 and oil storage cylinder 613 are disposed separately and two pistons are used. Therefore, it is easy to reduce the diameters of the respective cylinders, so that a fine quantity of the order of 0.001 ml of oil can be discharged stably.

In the direct jet lubrication, not only a fine quantity of oil must be discharged but also the oil must be discharged at a high speed. For example, in order that a quantity of 0.003 ml of oil can be discharged from the nozzle at a discharge speed of 30 m/s, the operation of the piston must be executed for the below-mentioned time: that is, (discharge quantity)/(nozzle area)/(discharge speed)—13 ms.

In the conventional lubricating apparatus, since only one piston is used, the oil discharge pressure is always lower than the oil supply pressure due to the spring of the piston, which makes it difficult to discharge oil at a high speed. On the other hand, in the lubricating apparatus 601 according to the present embodiment, due to use of two pistons, the oil discharge pressure can be raised, so that the high-speed discharge of the oil is possible. For example, in case where the area of the C surface of the drive part of the discharge cylinder 609 shown in FIG. 66 is set larger than the area of the discharge part (oil pressurizing surface), the discharge piston 615 can be pushed with a large force and thus the discharge piston 615 can be moved at a high speed. This can realize the high-speed discharge of oil that has been difficult in the conventional lubricating apparatus.

Therefore, according to the lubricating apparatus 601, since the discharge cylinder 609 and oil storage cylinder 613 are disposed separately, when compared with the conventional lubricating apparatus in which oil is stored within a cylinder disposed on one end side of a piston and the oil is discharged on the opposite side of the piston, there are eliminated limits on the dimensions of a seal member and a return spring, thereby being able to facilitate the reduction of the diameters of the discharge cylinder 609 and oil storage cylinder 613. Also, use of two pistons makes it possible to set the oil operation area of the discharge piston 615 larger than the oil pressurizing area thereof; and, therefore, the discharge piston 615 can be pushed with a large force and thus a high-speed stroke can be realized. Thanks to this, discharge of a fine quantity of (of the order of 0.001 ml) of oil at a high speed can be realized using a low-cost and simple structure when compared with the lubricating apparatus which uses an electromagnet or a giant-magnetostrictive material.

Next, description will be given below of the results of a test conducted on the performance of a lubricating apparatus actually manufactured in such a manner that it employs, as a basic structure thereof, a structure based on the above-mentioned principles.

Figure 69:
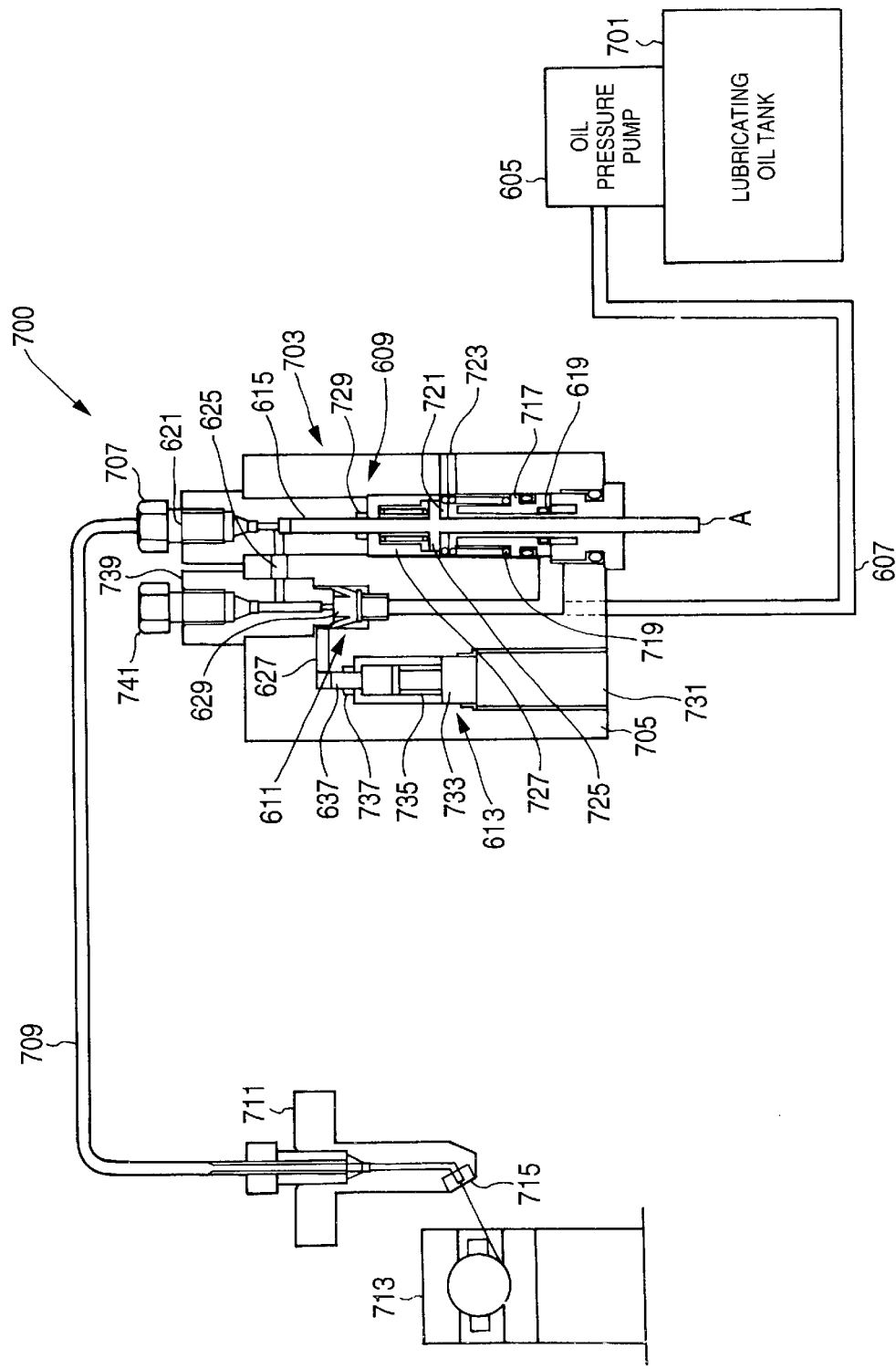
FIG. 69 is a schematic view of the structure of a lubricating apparatus according to the fifth embodiment of the invention.
Figure 70A:
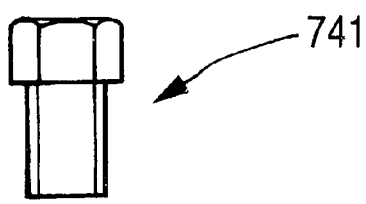
FIG. 70A is an explanatory view of a stop plug being a fitting.
Figure 70B:
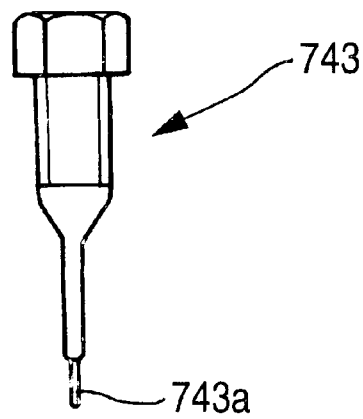
FIG. 70B is an explanatory view of an air bleeding plug being the fitting.
Figure 71:
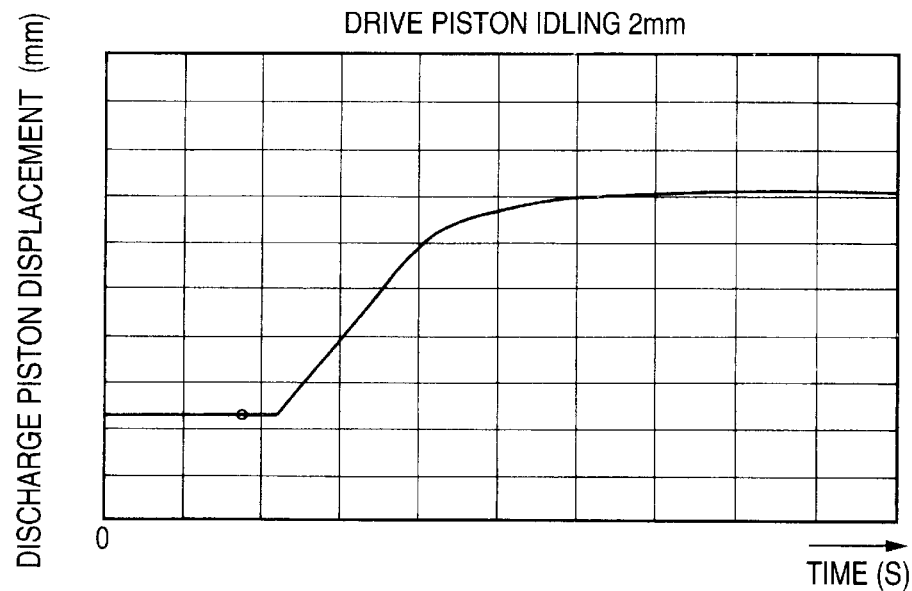
FIG. 71 is a graphical representation of the discharge piston displacement quantity per unit time in a lubricating apparatus including a drive piston having an idling section.
Figure 72:
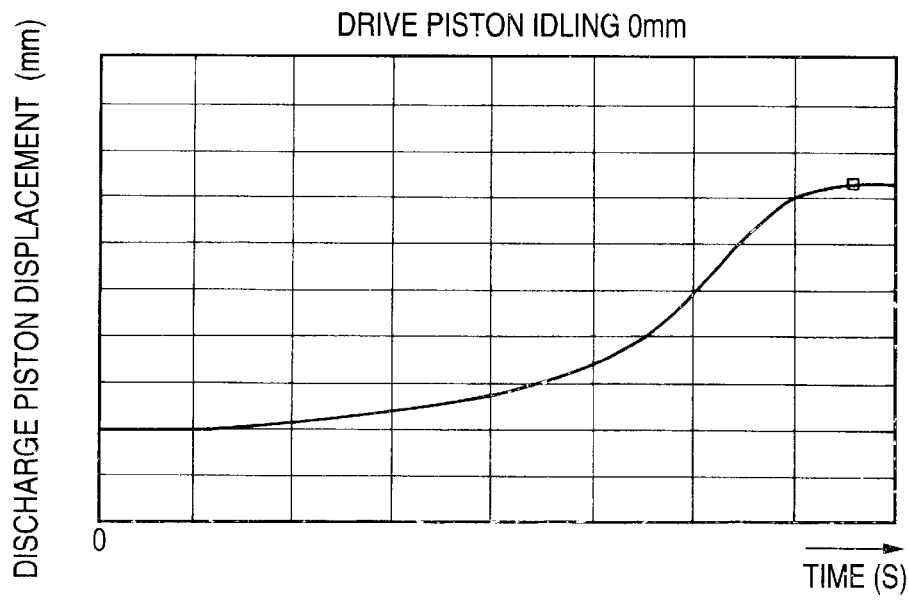
FIG. 72 is a graphical representation of the discharge piston displacement quantity per unit time in a lubricating apparatus including a drive piston having no idling section.

FIG. 69 is a schematic view of the structure of a lubricating apparatus according to the present embodiment. FIG. 70A is an explanatory view showing a stop plug being a fitting and FIG. 70B is an explanatory view showing an air bleeding plug being the fitting. FIG. 71 is a graphical representation of the displacement amounts of a discharge piston per unit time in a lubricating apparatus which includes a drive piston having an idling section. FIG. 72 is a graphical representation of the displacement amounts of a discharge piston per unit time in a lubricating apparatus which includes a drive piston having no idling section.

The structure of the lubricating apparatus 700 manufactured according to the present embodiment is basically the same as the structure of the previously described lubricating apparatus 601. Therefore, in the present embodiment, the same parts thereof as those employed in the lubricating apparatus 601 are given the same designations and thus the description thereof is omitted here.

An oil pressure pump 605 is annexed to a lubricating oil tank 701. The hydraulic main pipe 607 of the oil pressure pump 605 is connected to the housing 705 of a fixed quantity valve 703. To the discharge port 621 of a discharge cylinder 609, there is connected a discharge pipe 709 through a fitting 707. The discharge pipe 709 is made of a stainless steel pipe having an outside diameter of 1.6 mm and an inside diameter of 1 mm. On the leading end portion of the discharge pipe 609, there is disposed a nozzle frame 711, while the nozzle frame 711 is mounted in such a manner that a nozzle 715 is disposed opposed to a bearing 713.

On the hydraulic chamber 619 side of the discharge cylinder 609, there is mounted a drive piston 717 which can be moved by the oil of the hydraulic chamber 619 to thereby press and drive a discharge piston 615. The oil operation area of the drive piston 717 is set larger than the oil pressurizing area of the discharge piston 615. The drive piston 717 is energized by a drive piston return spring 719 in a direction to part away from the discharge piston 615. Between the discharge piston 615 and drive piston 717, there is formed an idling section 721. This idling section 721 is opened through an air bend 723 to the outside of the housing 705.

Oil from the hydraulic main pipe 607 connected to the housing 705 pressurizes the hydraulic chamber 619 side of the drive piston 717 and thus the drive piston 717 is moved toward the discharge piston 615 side; and, after the drive piston 717 moves through the idling section 721, it is butted against and contacted with the discharge piston 615. In FIG. 69, reference numeral 725 designates a suction stopper, 727: a discharge stopper, and 729: an O-ring, respectively.

On the other hand, an oil storage cylinder 613 is disposed in the housing 705. After an oil storage piston 637 is mounted into the oil storage cylinder 613, the oil storage cylinder 613 is sealed by a setscrew 731. In FIG. 69, reference numeral 733 designates a stop pin, 735: a piston sleeve, and 737: an O-ring, respectively.

On the housing 705, there is disposed an air bleeding joint 739 which is in communication with the three-way valve 611. A stop plug 741 or an air bleeding plug 743 shown in FIGS. 70A and 70B can be selectively engaged threadedly with the air deflation joint 739 in a removable manner. In case where the air deflation plug 743 is threadedly engaged with the air bleeding joint 739, the pin portion 743a of the air deflation plug 743 presses against the umbrella valve 629 downward in FIG. 69, thereby allowing the hydraulic main pipe 607 and oil supply passage 625 to communicate with each other.

The basic operation of the lubricating apparatus 700 is the same as the operation of the previously described lubricating apparatus 601. The discharge cylinder 609 and oil storage cylinder 613 respectively have the diameter of 2 mm and the stroke of them is 1 mm, while a theoretical discharge quantity is 0.0031 ml/shot. This is a small cylinder diameter that cannot be realized in the conventional fixed quantity valve, while such small cylinder diameter makes it possible to discharge a fine quantity of oil.

For realization of high-speed discharge of oil, in the present embodiment, there is used the drive piston 717. The oil operation area of the drive piston 717 is about ten times the oil pressurizing area of the discharge piston 615 and, therefore, the discharge piston 615 can be driven with a large force. Also, the stroke of the drive piston 717 is 3 mm. The front half section of the stroke, 2 mm, is the idling section 721, while the rear half section thereof, 1 mm, is a section where the drive piston 717 pushes the discharge piston 615. Therefore, due to the fact that the pressure of the oil pressure pump 605 can be raised sufficiently in the idling section 721 to thereby generate inertia in the drive piston 717, the discharge piston 615 can be moved at a high speed.

In the oil flow passage from the oil supply passage 625 to the nozzle frame 711, in order to be able to discharge a fine quantity of oil at a high speed, use of parts such as an O-ring which can be deformed greatly due to pressure is avoided as much as possible. The discharge cylinder 609 and air bleeding joint 739 are pressure inserted into the housing 705 without using any O-ring. Between the discharge port 621 and nozzle frame 711, there is used an SUS pipe which is deformed only slightly against pressure. In the discharge piston 615, there is used an O-ring. However, a fitting clearance between the discharge cylinder 609 and discharge piston 715 is set small, that is, of the order of 5 μm and the fitting portion is formed long, that is, approx. 10 mm, thereby reducing the deformation of the O-ring in the oil discharging operation.

The air bleeding joint 739 is used to bleed air within the portion of the pipe existing upstream of the oil supply passage 625. In order to be able to discharge a fine quantity of oil at a high speed, it is important to deflate air within the pipe completely. In the present lubricating apparatus 700, since the oil discharge quantity is very small, it is difficult to deflate air within the pipe only by repetition of normal dischargings. Here, provision of the air bleeding joint 739 can facilitate the deflation of air. That is, such an air deflation plug 743 as shown in FIG. 70B, which includes a fine pin portion 743a in the leading end thereof, is threadedly engaged with the air bleeding joint 739; and, after then, in case where the umbrella valve 629 is depressed downward in FIG. 69, when the oil pressure pump 605 is on, oil is allowed to flow into the oil supply passage 625, so that the air bleeding can be carried out simply. After the air bleeding is completed, the air bleeding plug 743 is replaced with the pin-less stop plug 741 and a normal operation is executed. By the way, air can also be bleeded from the air bleeding joint 739 by feeding oil using a hand-operated pump such as a syringe.

Also, for prevention of the poor air bleeding, no spring is used in the oil flow passage of the three-way valve 611 and in its following oil flow passages. In the conventional fixed quantity valve, since only one piston is provided, a spring must be disposed within oil. For this reason, air is easy to attach to the coil portion of the spring, which makes it difficult to deflate air completely. On the other hand, in the present lubricating apparatus 700, it is not necessary to use a coiled spring in the oil discharge passage at all, which makes it possible to employ a structure capable of deflating air from the fixed quantity valve completely: that is, the air deflation can be executed simply and positively.

The confirmed results of the dischargings in the present lubricating apparatus 700 are as follows:

Conditions

Oil pressure pump: Air pressure driven pump (discharge pressure=2 MPa)

Lubricating oil: VG 22

Nozzle diameter: 0.1 mm

Pipe; Inside diameter of 1 mm, length of 1 m

Discharge quantity measured result: 0.0022 ml/shot (average value of 50 shots)

Piston moving speed: 90 mm/s (MAX)

Discharge speed: approx. 27 m/s

The above discharge quantity was obtained in such a manner that the weights of 50 shots were measured and the average of the measured weights was regarded as the discharge quantity. The moving speed of the piston was obtained by measuring the A position of the discharge piston 615 shown in FIG. 69 using a displacement sensor. The discharge speed from the nozzle frame 711 can be found according an expression; that is, (the piston moving speed)× (piston area)/(nozzle area)×(discharge efficiency). Here, the discharge efficiency was obtained from (the measured discharge quantity)/(theoretical discharge quantity).

Referring to the displacement of the discharge piston 615, it was confirmed that the movement of the discharge piston 615 when the idling stroke of the drive piston 717 is set 2 mm as shown in FIG. 71 is faster than when the idling stroke is set 0 mm as shown in FIG. 72.

In lubrication of a rolling bearing, a discharge speed necessary for oil to reach the interior portion of the bearing is about 10% of the peripheral speed of the inner race of the bearing. Therefore, in the case of dm·N is 3000000 (where dm expresses the pitch circle diameter (unit is mm) of the bearing and N expresses the rotation speed (unit is min$^{-1}$) of the bearing, the inner ring peripheral speed at the high-speed rotation is 150 m/s. This shows that the bearing can be lubricated sufficiently at the discharge speed of the present lubricating apparatus 700 (15 m/s<approx. 27 m/s).

Also, in the present lubricating apparatus 700, in case where there is formed in front of the discharge port 621, a portion in which air and oil can be mixed together, it can also be used as a mixing valve in the oil-air lubricating method. In this case, oil can be discharged in a quantity which is about 1/10 of the conventional shot quantity in the range of 0.01–0.03 ml, thereby being able to prevent the pulsation of the bearing temperature that has been caused every shot interval in the conventional lubricating method. In case where the present lubricating apparatus 700 is used as a fixed quantity valve in the oil-air lubricating method, the drive piston 717 can be omitted, thereby being able to simplify the present structure into a structure in which the discharge piston 615 can be pushed directly with the oil pressure.

In the oil-air lubrication, preferably, in addition to the present structure, there may be disposed in front of the discharge port 621, a check valve for preventing air from flowing backward. In case where the present lubricating apparatus 700 is used in the oil-air lubricating method, it can be simplified further in structure; for example, the discharge piston 615 shown in FIG. 69 can be omitted and the oil supply passage 625 as it is can be used as the discharge port 621 (in this case, when the oil pressure is off, the oil storage piston 637 is returned due to the spring, which causes oil to be discharged).

As has been described heretofore in detail, according to the lubricating apparatus of the fifth embodiment, since the discharge cylinder and oil storage cylinder are disposed separately, when compared with the conventional lubricating apparatus in which oil is stored within the cylinder on one side end of a single piston and the oil is discharged on the opposite side, the limits on the dimensions of the seal member and return spring can be reduced, which can facilitate the reduction of the diameters of the discharge cylinder and oil storage cylinder. Also, due to provision of two pistons, the oil operation area of the discharge piston can be set larger than the oil pressurizing area, so that the discharge piston can be pushed with a large force and thus a high-speed stroke can be realized. As a result of this, using a low-cost and simple structure when compared with a lubricating apparatus using an electromagnet or a giant-magnetostrictive material, a fine quantity of the order of 0.001 ml of oil can be discharged at a high speed.

Sixth Embodiment

Now, description will be given below in detail of a spindle apparatus according to a sixth embodiment of the invention with reference to the accompanying drawings.

Figure 73:
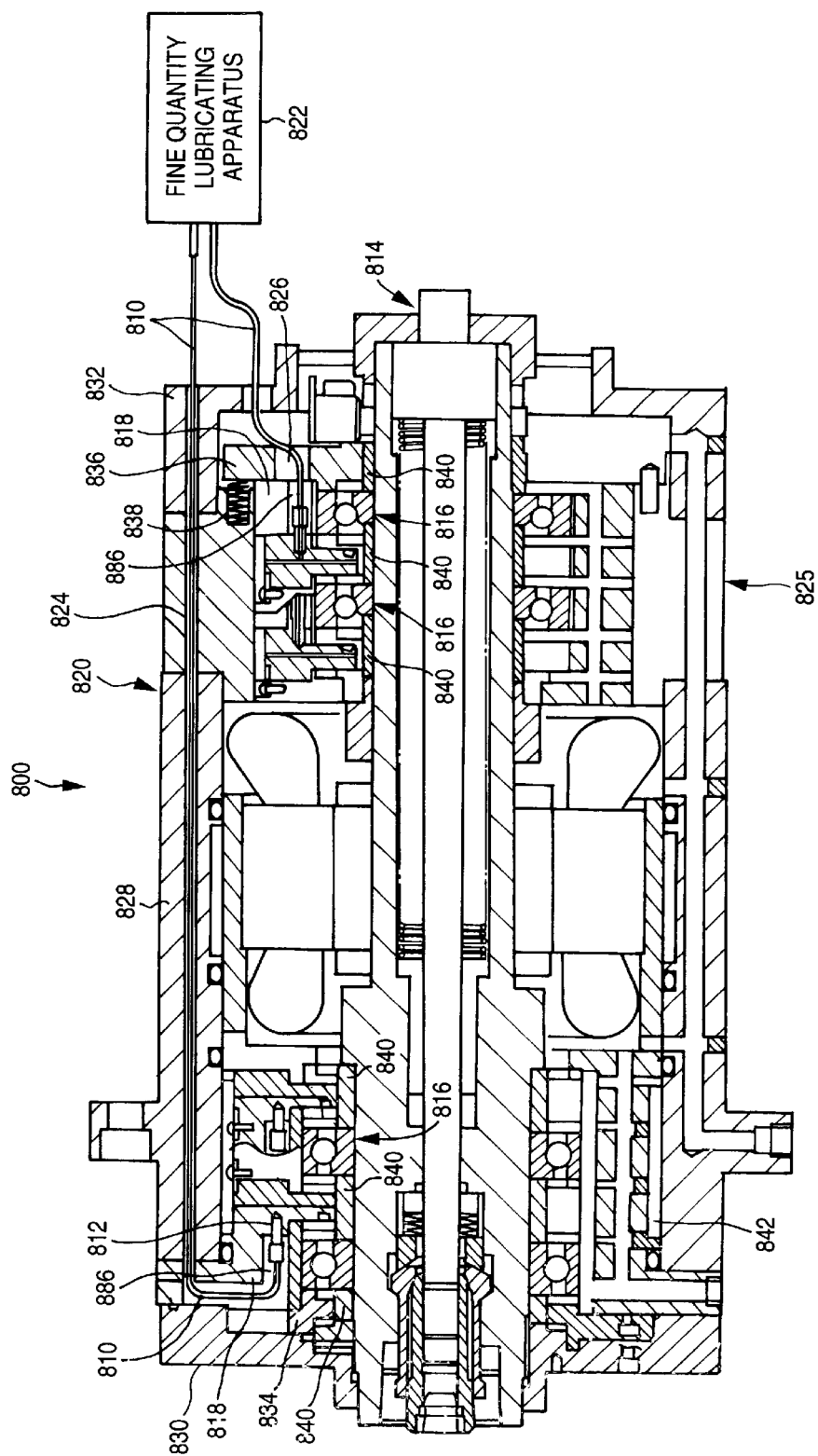
FIG. 73 is a schematic view of the structure of a spindle apparatus according to a sixth embodiment of the invention.

FIG. 73 is a schematic view of the structure of a first embodiment of a spindle apparatus according to the invention. A spindle apparatus 800 according to the sixth embodiment is a spindle apparatus for a machine tool of a jacket cooling type structured such that a pressure-resisting tube 810, which is made of stainless steel and has 1–3.2 mm (here, as an example, outside diameter of 1.6 mm and inside diameter of 1.0 mm) so as to be flexible against bending, is arranged in the spindle apparatus 800 and is connected to a nozzle frame 812. This stainless-steel-made pressure-resisting tube, especially bright annealed stainless tube 810, can be easily bent by hand and is little expanded against pressure, that is, this is a tube suitable for supply of a fine quantity of lubricating oil.

The spindle apparatus 800 comprises a spindle shaft 814, a plurality of (in the illustrated embodiment, four) rolling bearings 816 for supporting the spindle shaft 814 rotatably, an inner housing 818 for covering the outside of the rolling bearings 816, and an outer housing 820 for covering the outside of the spindle apparatus 800; and, in the spindle apparatus 800, a fine quantity lubricating apparatus 822 serving as a supply source of lubricating oil is connected by the pressure-resisting tube 810 up to the nozzle frame 812 disposed within the inner housing 818 through a communication hole 824 formed in the outer housing 820 along the axial direction thereof for supply of the lubricating oil and an opening 886 formed in the inner housing 818.

The outer housing 820 includes an outer cylinder 825 for enclosing the outer peripheries of the inner housing 818 and a rear cover 832 fixed to the end face of the outer cylinder 825.

The rolling bearings 816 are arranged at given intervals in the axial direction of the spindle shaft 814 to form themselves in front and rear groups of two so that the front and rear groups can share and support the front and rear sides of the spindle shaft 814. The outer rings of the respective rolling bearings 816 are respectively fixed to the inner peripheral surface of the inner housing 818. The outer ring of the front-most rolling bearing 816 is contacted with and secured to the front cover 834, whereas the outer ring of the rear-most rolling bearing 816 is secured to the outer ring cover 836 while it is elastically energized in the axial direction of the outer cylinder 828 by a spring 838.

Also, the inner rings of the rolling bearings 816 are respectively fitted with the outer peripheral surface of the spindle shaft 814 and, on the front and rear sides thereof, between the rolling bearings 616, there are interposed spacers for fixing the bearings 816 in the axial direction of the spindle shaft 814.

Also, as shown in FIG. 73, there is formed a cooling groove 842 in the outside diameter surface of the inner housing 818; and, by allowing cooling oil from a cooling unit (not shown) to circulate through the cooling groove, the outer housing 820 can be cooled. That is, the present spindle apparatus 800 has a cooling function using a jacket cooling system. By the way, in the present embodiment, the spindle shaft 814 is supported horizontally. However, this is not limitative but, for example, in the case of a spindle apparatus for use in a machining center, the spindle shaft 814 can be used in such a manner that it is supported vertically or obliquely.

Next, description will be given below of the fine quantity lubricating apparatus 822.

Figure 74:
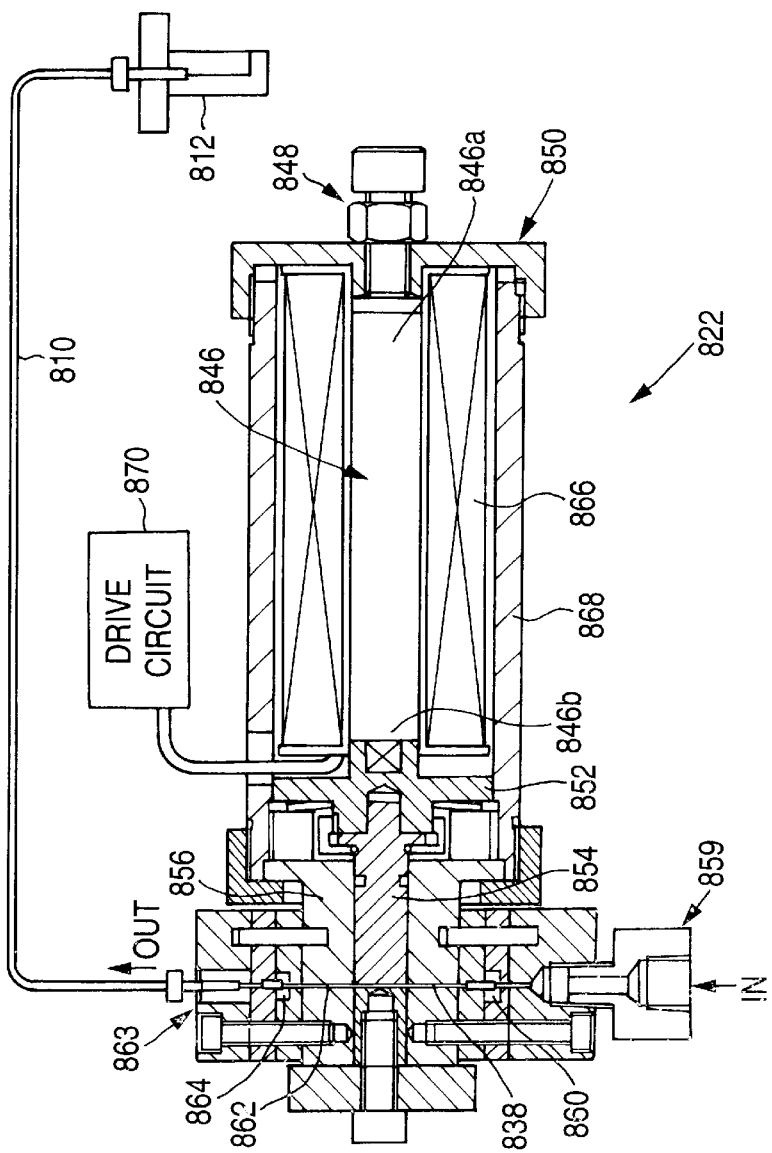
FIG. 74 is a schematic view of the structure of a fine quantity lubricating apparatus according to the sixth embodiment.

FIG. 74 is a schematic view of the structure of the fine quantity lubricating apparatus 822. As shown in FIG. 74, the fine quantity lubricating apparatus 822 includes a rod body 846 made of a giant-magnetostrictive element having a positive characteristic, while one end portion 846a of the rod body 846 in the axial direction thereof is fixed through a preload adjust mechanism 848 to a case 850. This rod body 846, when a magnetic field is applied thereto, can be expanded in the axial direction thereof due to a magnetostrictive phenomenon (Joule effect).

As the preload adjust mechanism 848, for example, there can be used a screw mechanism which, when it is rotated, is projected in the axial direction of the rod body 846 to thereby be able to press against the one end portion 846a of the rod body 846. On the other end portion 846b of the rod body 846 in the axial direction thereof, there is disposed a pressure transmission member 852 which energizes the rod body 846 toward the preload adjust mechanism 848 side to thereby transmit pressure without producing a clearance (play) in the rod body 846 in the axial direction thereof; and, the rod body 846 is connected to a piston 854 through this pressure transmission member 852. The piston 854 is slidably disposed in the interior portion of a cylinder 856, while the cylinder 856 and piston 854 cooperate together in forming a pump chamber.

In the cylinder 856, there is formed a suction flow passage 838 for supplying lubricating oil to the pump chamber and, in the intermediate portion of the suction flow passage 838 to a suction port 859, there is disposed a suction-side check valve 860 consisting of a check valve which prevents the lubricating oil from flowing out from the pump chamber.

Also, in the cylinder 856, there is formed a discharge flow passage 862 for discharging the lubricating oil jetted out from the pump chamber and, in the intermediate portion of the discharge flow passage 862 to a discharge port 863, there is disposed a discharge-side check valve 864 consisting of a check valve which prevents introduction of the lubricating oil into the pump chamber.

On the outer periphery of the rod body 846, there is disposed a coil 866 coaxially with the rod body 846 and, further, on the outside of the coil 866, there is disposed a yoke 868 which is formed of magnetic material and cooperates with the rod body 846 in forming a magnetic circuit. Also, to the coil 866, there is electrically connected a drive circuit 870 which outputs a current for generation of a magnetic field. In case where this current is applied to the coil 866, the rod body 846 receives a magnetic field generated from the coil 866 and is thereby expanded, with the result that the lubricating oil within the pump chamber, which has been supplied into the pump chamber through the suction flow passage 838 and stored there, is discharged from the discharge port 863 through the discharge flow passage 862. The thus discharged lubricating oil is jetted out from the nozzle frame 812 through the pressure-resisting tube 810. In this case, the discharge quantity of the lubricating oil per shot is a fine quantity in the range of 0.5–10 [$mm^3$] and the discharge pressure is 1 [MPa] or more, while the lubricating oil is jetted out intermittently.

Next, description will be given below of the nozzle frame 812.

Figure 75:
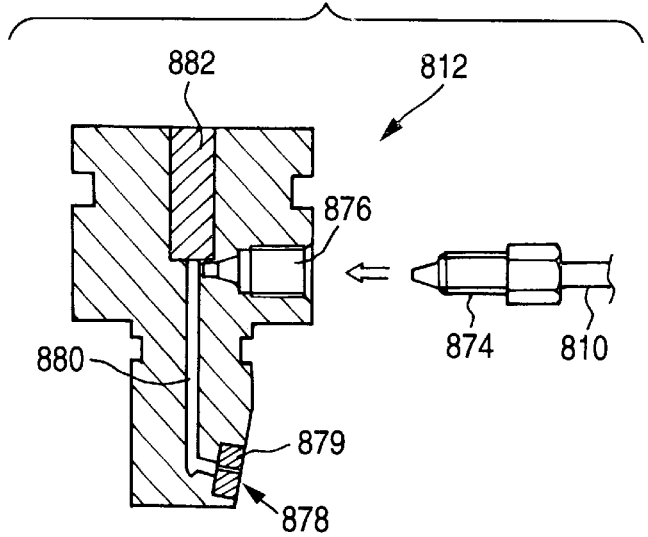
FIG. 75 is a section view of a nozzle frame according to the sixth embodiment.

FIG. 75 is a section view of the nozzle frame 812. The nozzle frame 812 includes a fixing hole 876 for connecting a joint 874 which is connected to a pressure-resisting tube, a discharge portion 878 for jetting out lubricating oil supplied thereto, and a flow passage 880 for connecting together the fixing hole 876 and discharge portion 878. In the illustrated embodiment, the joint 874 is connected to the side surface side of the nozzle frame 812 in such a manner that it is connected substantially at right angles to the flow passage 880. Also, on the side of the flow passage 880 where the joint 874 is connected, there is disposed a plug 882.

Figure 76A:
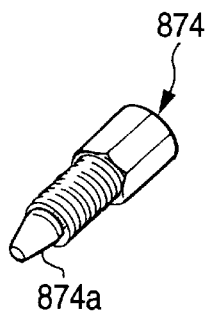
FIG. 76A is a perspective view of a joint formed of resin material such as PEEK resin.
Figure 76B:
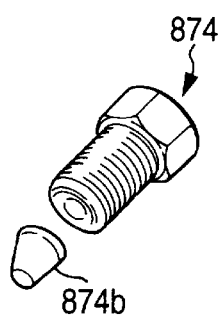
FIG. 76B is a perspective view of a joint formed of stainless steel.

As the joint 874, there can be used a joint which, as shown in FIG. 76A, is formed of resin material such as PEEK (polyether ether-ketone) material, or a joint which, as shown in FIG. 76B, is formed of stainless steel material. The PEEK-resin-made joint shown in FIG. 76A can be sealed by tightening it when the taper portion 874a of the joint formed in the leading end portion thereof is mounted into the nozzle frame 812. Also, on the leading end portion of the stainless-steel-made joint shown in FIG. 76B, there is mounted a taper piece 874b, the leading end portion of which is formed of elastic material such as stainless steel or PEEK resin; and, this joint can be sealed by tightening the taper piece 874b.

Also, a nozzle chip 879 having a nozzle diameter $d_n$ of 0.1 [mm] is pressure-inserted into a discharge portion 878.

Figure 77:
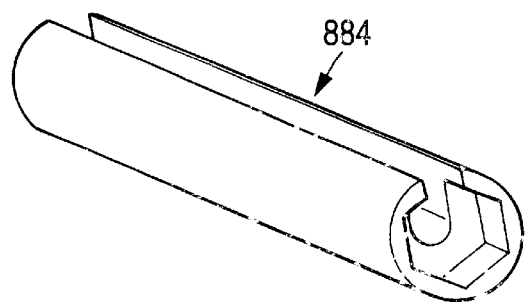
FIG. 77 is a perspective view of a tool for fixing a joint.

In assembling the joint 874 to the nozzle frame 812, even in case where the nozzle frame 812 is disposed at the deep position of the spindle apparatus 800, by using a joint fixing tool 884 shown in FIG. 77, the joint 874 can be threadedly engaged with the screw portion of the fixing hole 876 simply. That is, in the inner housing 818 of the spindle apparatus 800, there is formed an axial hole 886 having a diameter of 9 [mm] in such a manner that it penetrates through the inner housing 818 from the end face to the fixing hole 876 of the nozzle frame 812; and thus, in case where the tool 884 is inserted into the axial hole 886 and the joint 874 is then rotated, the joint 874 can be tightened or removed from the fixing hole 876.

Since the nozzle frame 812 is structured in the above-mentioned manner, it can prevent lubricating oil against leakage from the sealed portion of the joint and is free from deformation against pressure, so that there can be provided a pipe joint which is suitable for supply of a fine quantity of lubricating oil. Also, because the nozzle frame 812 has such a structure that allows the pipe to be connected at the final stage of the spindle assembly, the present nozzle frame is excellent in assembling efficiency.

Next, description will be given below of a pipe of the spindle apparatus 800.

When fine-quantity lubrication is executed using a pipe, the reduced discharge speed of the lubricating oil caused by a pressure loss raises a problem. In the case of the pressure loss of a pipe, an expression on the pipe passage friction of a laminar flow coincides well with the test results; and, where a lubricating oil flow speed in the leading end portion of a nozzle is expressed as v [m/s], the pipe pressure loss $\Delta p$ [Pa] due to the pipe passage friction can be expressed by the following expression (1):

$$\text{that is, } \Delta p = 32\mu \cdot L \cdot d_n^2 \cdot v / d^4 \quad (11)$$

where, $\mu$ expresses a lubricating oil viscosity coefficient [Pa·s], L: a pipe length [m], d: a pipe inside diameter [m], v: the discharge speed [m/s] of a nozzle, and $d_n$: a nozzle diameter [m], respectively.

In the expression (11), the influence of the pipe on the pressure loss $\Delta p$ is expressed as a parameter of $L \cdot d_n^2/d^4$ and this parameter is referred to as a pipe parameter. By reducing the pipe parameter, the pressure loss $\Delta p$ of the pipe can be controlled down to a low level. According to our experimental confirmation of the discharge state of the lubricating oil occurring when the pipe parameter is caused to vary, it is found that, in case where the condition expressed by the following expression (12) is satisfied, there can be obtained a sufficient discharge speed to be able to discharge a fine quantity of lubricating oil.

$$L \cdot d_n^2 / d^4 < 5 \times 10^4 \ [m^{-2}] \quad (12)$$

where, the pipe length L must satisfy the condition, $L > 0.5$ [m], because a pipe must be arranged in a spindle of the spindle apparatus 800.

Next, description will be given below of the compressibility of lubricating oil in the interior portion of a pipe and the expansion of the pipe.

As the volume of lubricating oil in a pipe increases, due to the compressibility of the lubricating oil, the discharge pressure of the fine quantity lubricating apparatus is unable to reach the leading end of the nozzle, which makes it impossible to supply a fine quantity of lubricating oil stably. Also, in case where the expansion of the pipe due to pressure is large, there arises a similar problem.

The compression amount of the lubricating oil and the expansion amount of the pipe depends on the average pressure in the pipe, and the volume $\Delta v_0$ [m³] of the lubricating oil to be compressed due to the average pressure p can be found according to the following expression (13):

$$\Delta v_o = \pi \cdot L \cdot d^2 \cdot p / (4K) \quad (13)$$

Also, the volume $\Delta v_p$ of the pipe to be expanded due to the average pressure p can be found according to the following expression (14) by using an expression on an ordinary thickness cylinder:

$$\Delta v_p = \pi \cdot L \cdot d^2 \cdot p \cdot \{(D^2+d^2)/(D^2-d^2)+v\}/(2E) \quad (14)$$

In case where the sum of $\Delta v_o$ and $\Delta v_p$ is equal to or less than the discharge quantity q, the influences of the compressibility of the lubricating oil and the pipe expansion are small. Generally, in the fine quantity lubricating oil supply, an average pressure in the pipe is on the order of 0.8–2.0 [MPa]. Especially, for the pipe pressure of 2.0 [MPa], in case where the sum of $\Delta v_o$ and $\Delta v_p$ is set equal to or less than the discharge quantity q, stable supply of a fine quantity of lubricating oil can be realized. That is, the sum of $\Delta v_o$ and $\Delta v_p$ maybe preferably set so as to satisfy the following expression (15):

$$L \cdot p \cdot \{\pi \cdot d^2/(4K) + \pi \cdot d^2 \cdot \{(D^2+d^2)/(D^2-d^2)+v\}/(2E)\} < q \ [m^3] \quad (15)$$

The reason why the average pressure in the pipe is on the order of 0.8–2.0 [MPa] is as follows. That is, generally, the discharge speed of lubricating oil necessary for lubrication of a rolling bearing is about 10–20% of the peripheral speed of the inner ring of the bearing. Also, in the case of the number of rotations of the bearing, the product (dm·n) of the diameter [mm] and rotation speed [min⁻¹] is in the range of 1000000–3500000; and, in order to realize such high-speed rotation, there is necessary a discharge speed of the order of 5–33 [m/s]. On the other hand, the discharge speed v of the lubricating oil is expressed by the following expression (16) as a function of the lubricating oil pressure $P_n$ [Pa] just before the nozzle.

$$v = C_d \cdot \sqrt{(2p_n/\rho)} \ [m/s] \quad (16)$$

where, $C_d$ expresses a nozzle flow coefficient and $\rho$ expresses a lubricating oil density [kg/m³]. As for the nozzle flow coefficient $C_d$, in a nozzle having a nozzle diameter of 0.3–0.08 [mm], $C_d$=0.70–0.95. In view of the necessary discharge speed, from the pressure just before the nozzle required by the expression (16) and from the pipe pressure loss $\Delta p$ required by the expression (11), the average pressure in the pipe provides 0.8–2.0 [MPa]. From this, the discharge pressure of the lubricating apparatus must be at least 1 [MPa].

Figure 78:
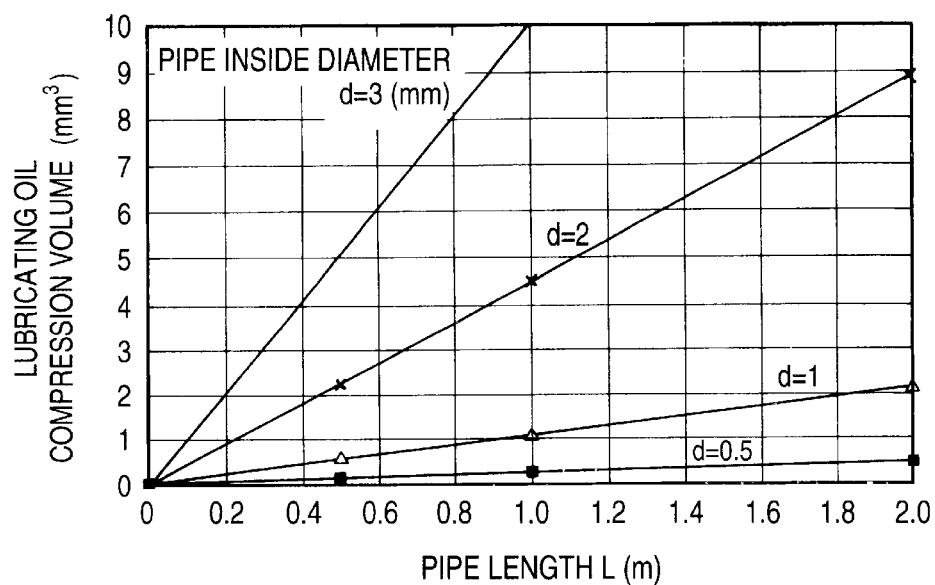
FIG. 78 is a graphical representation of the variations of the lubricating oil compression volume with respect to the lengths of pipes, while the relationship between them are plotted with respect to various inside diameters of the pipes.

In the expression (14), in case where the Young's modulus E of the material of the pipe is small, the pipe is easy to expand and the volume $\Delta v_p$ of the pipe is large. In the case of resin material having a Young's modulus E of less than 3 [GPa] being used as the material of the pipe, the expansion of the pipe is large, which makes it difficult to take a large pipe length L necessary for arrangement of the pipe in the spindle. This is shown by a graphical representation in FIG. 78. Specifically, FIG. 78 is a graphical representation in which the variations of the lubricating oil compression volume $\Delta v_p$ with respect to the pipe length L are plotted with respect to the inside diameter d of the pipe. According to FIG. 78, in case where the inside diameter d of the pipe exceeds 2.0 [mm], the lubricating oil volume in the pipe increases and the volume $\Delta v_p$ of the lubricating oil to be compressed increases. Therefore, it is necessary to set the pipe inside diameter d equal to or less than 2.0 [mm]. The lubricating oil to be used for supply of a fine quantity of lubricating oil is lubricating oil belonging to VG10–VG32, the volume elastic modulus K of such lubricating oil is approx. 1.4 [GPa].

Figure 79:
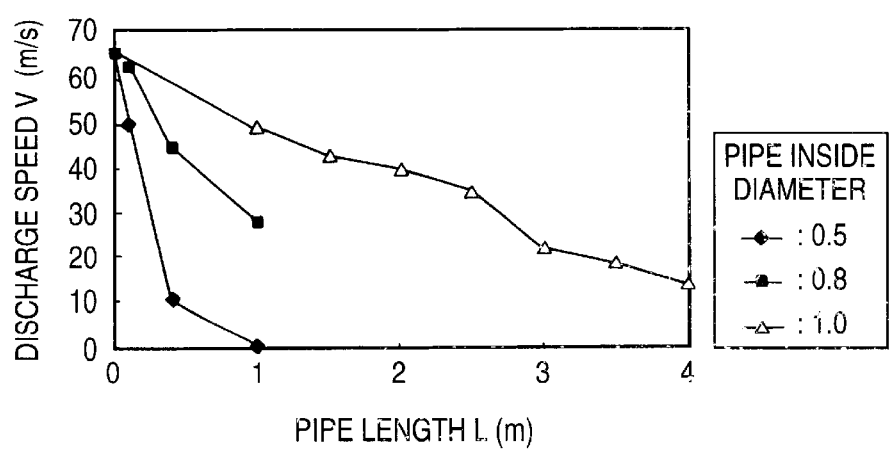
FIG. 79 is a graphical representation of the measured variations of the discharge speed of lubricating oil with respect to the pipe lengths, with the pipe inside diameters as a parameter.

FIG. 79 is a graphical representation of the measured results of the variations of the discharge speed v of the lubricating oil with respect to the pipe length L with the pipe inside diameter of 0.5–1.0 as a parameter. In this graphical representation, as the pipe length L increases and the pipe inside diameter decreases, the discharge speed v lowers. For example, in the case of the pipe inside diameter d being 0.5 [mm], when the pipe length L is 0.5 [m], the discharge speed v is several m/s, that is, a sufficient discharge speed cannot be obtained; and, thus, the pipe inside diameter d must be set at least 0.8 [mm]. Therefore, it is the necessary condition that the pipe inside diameter d is to be set in the range of 0.8 [mm] to 2.0 [mm]. Also, in accordance with this, the outside diameter D of the pipe, from its strength point of view, must be set in the range of 1.0 [mm]-3.2 [mm].

Figure 80:
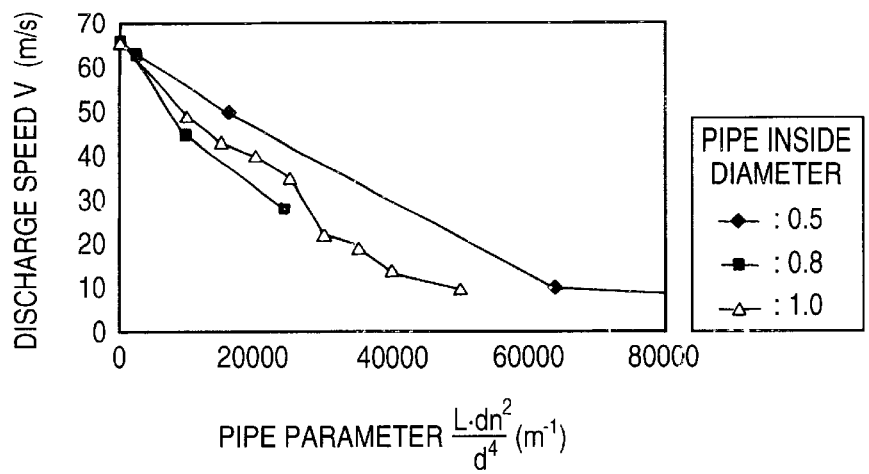
FIG. 80 is a graphical representation of the results shown in FIG. 79 with the pipe parameter $L \cdot d_n^2 / d^4$ shown in the abscissas axis thereof.

Now, FIG. 80 is a graphical representation of the results shown in FIG. 79, while the pipe parameter $L \cdot d_n^2/d^4$ is shown in the abscissas axis thereof. This graphical representation shows that the discharge speed varies in proportion to the pipe parameter, which means that the discharge speed is substantially determined by the pipe parameter. By using the pipe parameter of $5 \times 10^4$ or less, there can be obtained a discharge speed which is necessary for supply of a fine quantity of lubricating oil at a discharge speed v of 5–15 [m/s] or more.

Figure 81:
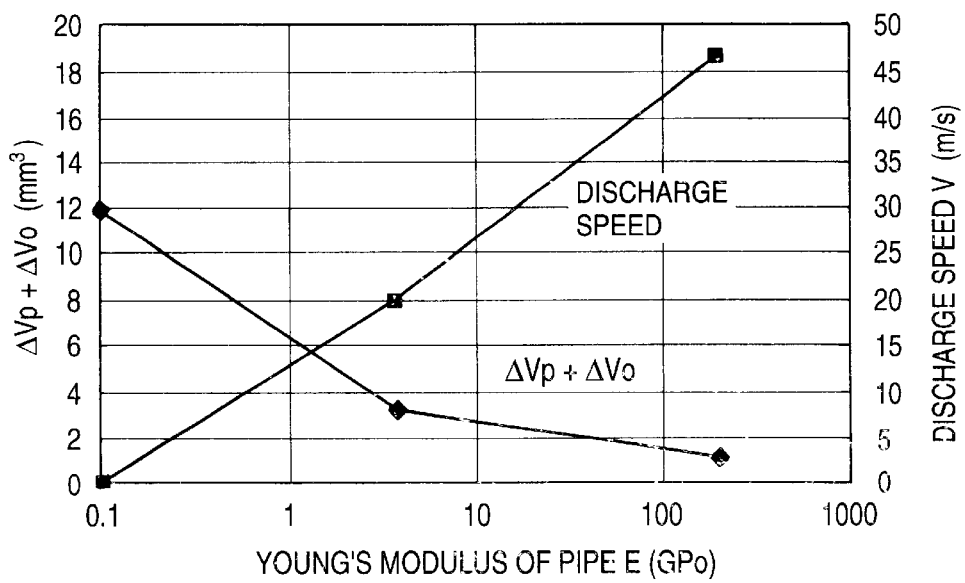
FIG. 81 is a graphical representation of the measured results of the variations of the discharge speed v occurring when the Young's modulus of the pipe is changed.

Now, FIG. 81 is a graphical representation of the measured results of the variations of the discharge speed v occurring when the Young's modulus of the pipe is changed. This graph shows the calculated results of $\Delta V_p + \Delta v_o$ and the measured results of the discharge speed v, where three kinds of pipes, that is, a pipe formed of stainless steel (Young's modulus $E \cong 190$ [GPa]), a pipe formed of PEEK resin ($E \cong 4$ [GPa]), and a pipe formed of polyurethane resin ($E \cong 0.1$ [GPa]) are used, the outside diameter D of each pipe is 1.6 [m], pipe inside diameter d is 1.0 [m], pipe length L is 1 [m], and the average pressure p in the above-mentioned expressions (13) and (14) is set to be 2 [MPa]. By the way, the discharge quantity q in the present embodiment is set at approx. 3 [m$^3$] and lubricating oil VG22 is used.

According to this graphical representation, in case where the Young's modulus E of the pipe is small, the expansion volume $\Delta v_p$ of the pipe increases and thus $\Delta V_p + \Delta v_o$ increases; and, in case where $\Delta V_p + \Delta v_o$ is equal to or more than 3 [mm$^3$], the discharge speed v lowers suddenly. Especially, in the case of polyurethane resin being used, the discharge speed v is substantially 0, which shows that material having a low elasticity modulus, specifically, a Young's modulus E of less than 3 [GPa] is not suitable for the material of a pipe for supply of a fine quantity of lubricating oil. On the other hand, in the case of a stainless-steel pipe having a Young's modulus E of the order of 190 [GPa], the expansion volume $\Delta V_p$ of the pipe is 0.01 [mm$^3$] or less by calculation and, therefore, the influence of the expansion of the pipe can be neglected. According to the spindle apparatus 800 of the present embodiment, even when it is applied as a spindle apparatus which has a cooling function using a jacket cooling system and also has a limited space for nozzle installation and pipe arrangement, in case where a nozzle and a pipe are installed in such a compact structure that the outside diameter of the pipe is set in the range of 1.0 [mm]-3.2 [mm], pipe inside diameter is set in the range of 0.8 [mm]-2.0 [mm], the Young's modulus of the material of the pipe is set at 3 [GPa] or more, and the pipe length L is set so as to satisfy the expressions (12) and (15) and L>0.5 [m], not only supply of a fine quantity of lubricating oil can be realized, but also generation of noises due to the whizzing sounds and poor lubrication due to the air curtain, which have been problems to be solved in the conventional oil-air lubricating apparatus, can be prevented.

Seventh Embodiment

Next, description will be given below of a seventh embodiment of a spindle apparatus according to the invention.

Figure 82:
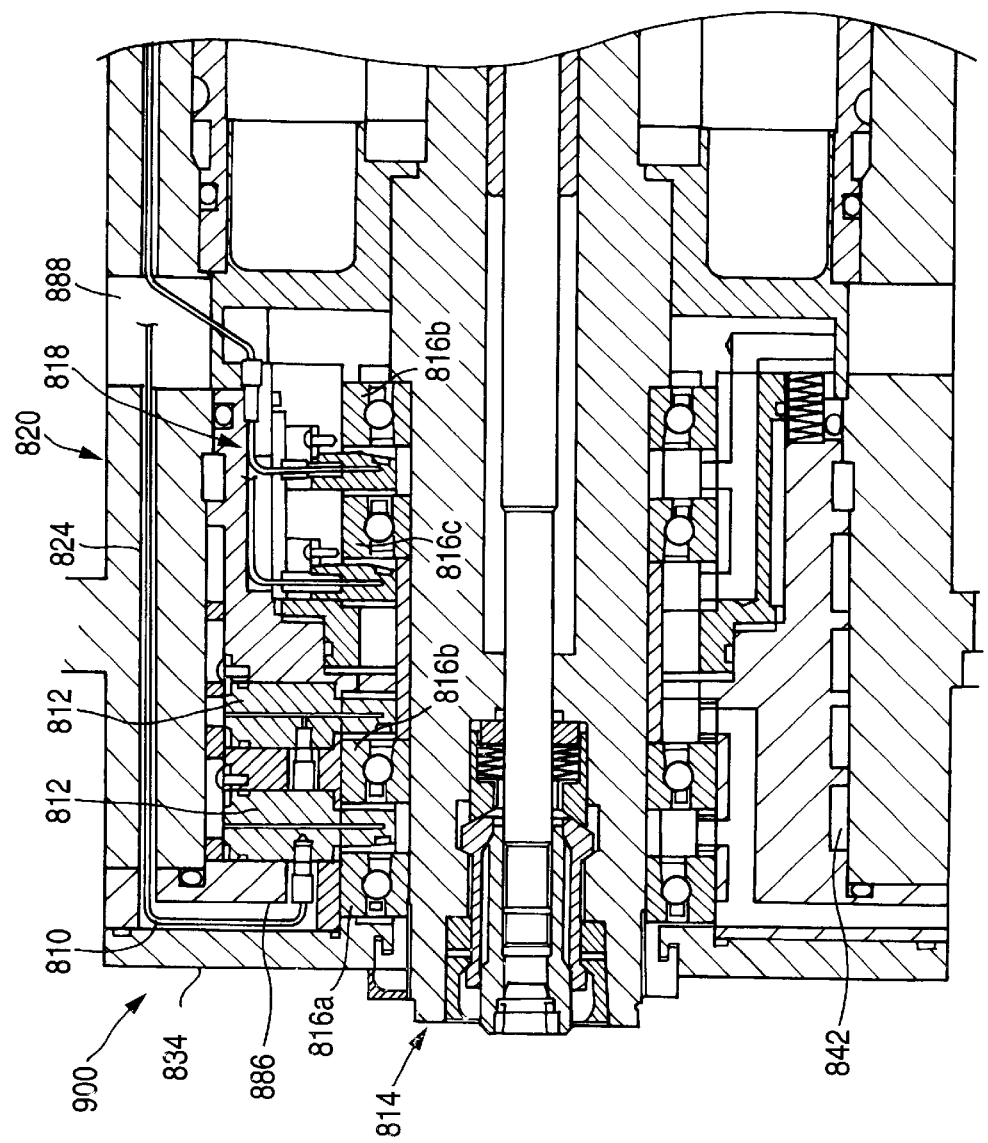
FIG. 82 is a partially enlarged section view of a spindle apparatus according to a seventh embodiment of the invention.

FIG. 82 is a partially enlarged section view of a spindle apparatus 900 according to the seventh embodiment of the invention. In FIG. 82, parts having the same functions as those shown in FIG. 73 are given the same designations and thus the description thereof is omitted here.

The spindle apparatus 900 according to the present embodiment is an example of a spindle structure including a four-row combination of bearings. As in the present embodiment, in a spindle including a multi-row combination of bearings, in some cases, it is difficult to arrange a pipe up to the respective nozzle frames 812 through an opening hole 886 which is an axial hole formed in a housing. In the case of the present embodiment, for space reasons, it is difficult that the opening hole 886 is opened up from the left end of an inner housing 818 and a pipe is arranged through the opening hole 886 up to rolling bearings 816c, 816d which are disposed on third and fourth rows when viewed from the left side of FIG. 82.

Figure 83:
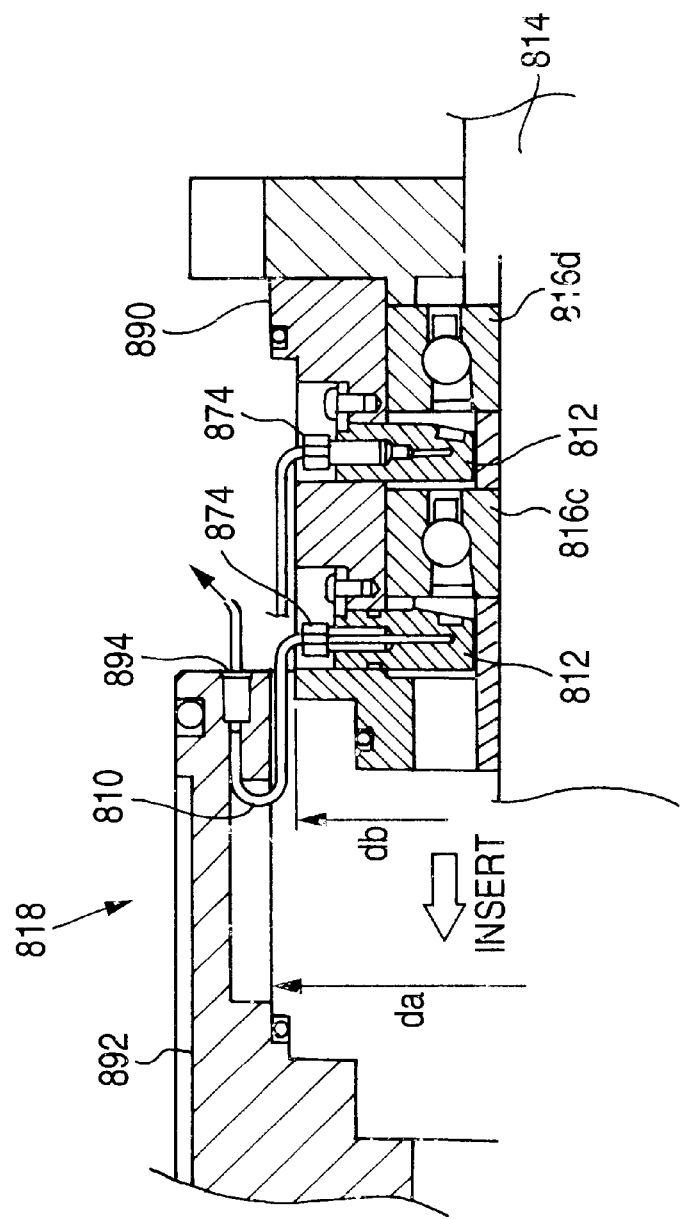
FIG. 83 is a section view of a housing according to the seventh embodiment, showing the state of assembly thereof.
Figure 84:
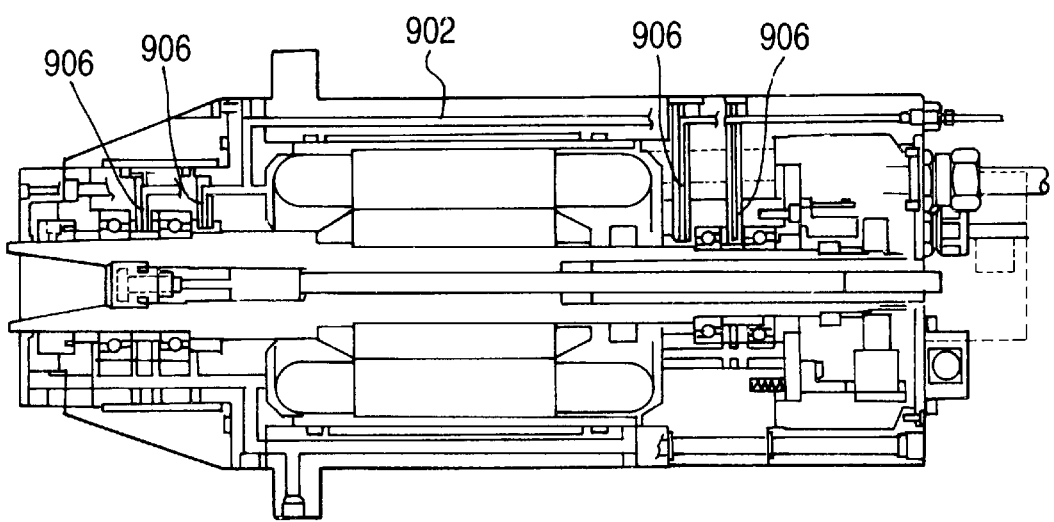
FIG. 84 is a schematic view of a conventional lubricating apparatus of an oil-air type using an air flow as a medium; and, FIG. 85A is a view explaining how the end faces of two housings are connected together.
Figure 85A:
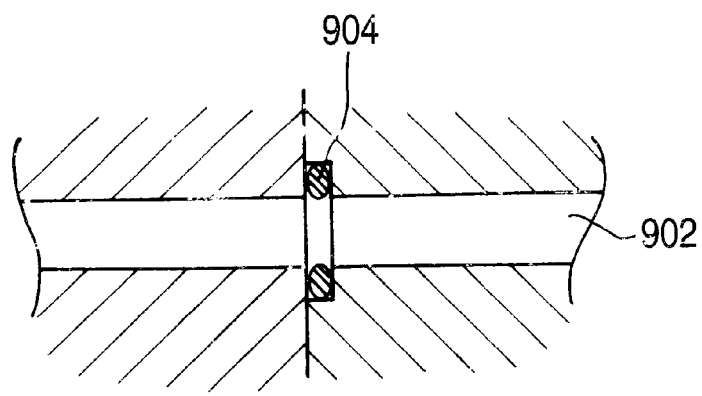
FIG. 85B is a view explaining how a nozzle frame and the pipe passages of the housings are connected together.
Figure 85B:
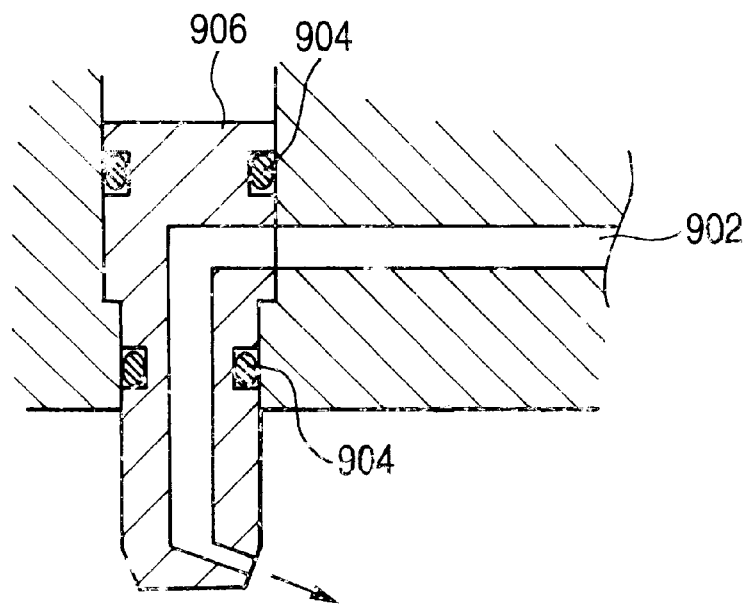

In view of this, in the present embodiment, as the state of assembly of the housing is shown in FIG. 83, the inner housing 818 includes a first inner housing 890 and a second inner housing 892. In the first inner housing 890, the outer rings of the rolling bearings 816 are to be fixed. In the second inner housing 892, the inner peripheral surface inside diameter $d_a$ of an insertion portion capable of storing the first inner housing 890 in the axial direction thereof is set larger than the outside diameter $d_b$ of the outer peripheral surface of the first inner housing 890 by at least a size equivalent to the diameter of a pressure-resisting tube 810.

When assembling the inner housing 818, firstly, a joint 874 is connected to the top portion of a nozzle frame 812 disposed on the rolling bearing 816 side of the first inner housing 890, and the pressure-resisting tube 810 is pulled out from an opening 894 formed in the second inner housing 892. The pulled-out pressure-resisting tube 810 is then taken out externally of the spindle apparatus 900 through an opening 888 (see FIG. 82) formed in an outer housing 820. In this manner, by connecting the joint 874 through the top portion of the nozzle frame 812, a pipe can be arranged even in case where the space of the housing in the axial direction is narrow. And, the first inner housing 890 is inserted into the insertion portion of the second inner housing 892 while sliding the first inner housing 890 in the axial direction thereof. At the then time, since the inside diameter $d_a$ of the second inner housing 892 is set larger than the outside diameter $d_b$ of the first inner housing 890, there is eliminated a possibility that the pressure-resisting tube 810 can be intervened between the first and second inner housings 890, 892, so that the first inner housing 890 can be inserted smoothly. Therefore, even in the deep and narrow space of the spindle apparatus, the pipe, that is, the pressure-resisting tube 810 can be arranged there while the spindle apparatus is structured so as to be easy to assemble.

Also, there can also be employed another structure in which a cut-out groove for arrangement of the pressure-resisting tube 810 is formed in the insertion portion of the second inner housing 892. In this case, when the first inner housing 890 is slided in the axial direction thereof, since the pressure-resisting tube 810 is stored into the cut-out groove, smooth insertion of the first inner housing 890 can be realized.

According to the spindle apparatus of the sixth and seventh embodiments, since, in order to be able to supply a fine quantity of lubricating oil to the spindle apparatus, a pipe for supply of lubricating oil is set so as to satisfy the given conditions. Therefore, even when the present invention is applied to a spindle apparatus which is narrow and limited in the space for nozzle installation and pipe arrangement, a nozzle and a pipe can be installed in a compact structure, so that a fine quantity of lubricating oil can be supplied accurately and stably and, at the same time, generation of noises due to the whizzing sounds and poor lubrication due to the air curtain, which have been problems to be solved in the conventional oil-air lubrication, can be prevented.

What is claimed is:

1. A spindle apparatus, comprising:

a spindle;

a rolling bearing for supporting the spindle; and a lubricating device operable to intermittently discharge a lubricant from a nozzle to the rolling bearing, the lubricating device discharging the lubricant at a predetermined speed sufficient for the lubricant to reach a surface of the rolling bearing to be lubricated while overcoming an air curtain caused by rotation of the rolling bearing, wherein the lubricating device pressurizes the lubricant supplied from the lubricating pump via the pipe, so that the Pressurized lubricant is injected from the nozzle by its own pressure without force of air.

2. A spindle apparatus as set forth in claim 1, wherein a discharge speed of the lubricant is 10 m/sec.–1000 m/sec. and a discharge quantity is 0.0005 ml/shot–0.01 ml/shot.

3. A spindle apparatus as set forth in claim 1, wherein a discharge quantity of the lubricant is 0.0005 ml/min–0.12 ml/min.

4. A spindle apparatus as set forth in claim 1, further comprising;

a rotation speed detector detecting the rotation speed of a rotating body, wherein the discharge quantity of the lubricant is adjusted in accordance with the detected rotation speed.

5. A spindle apparatus as set forth in claim 1, wherein the rolling bearing comprises at least two rolling bearings, and wherein the lubricating device further comprises a multi-distribution mechanism interposed between the lubricating pump and the nozzle, for distributively supplying the lubricant from the lubricating pump to the rolling bearings, respectively.

6. A spindle apparatus as set forth in claim 1, wherein the diameter of the nozzle is 0.08 mm–0.6 mm.

7. A spindle apparatus as set forth in claim 1, wherein the pipe is formed such that a ratio of the length L of the pipe to the inside diameter d thereof is $5 \text{ mm}^{-3} \leq L/d^4 \leq 12000 \text{ mm}^{-3}$.

8. A spindle apparatus as set forth in claim 7, wherein the pipe is formed such that a pipe parameter $(L \cdot d_n^2/d^4)$, which expresses the relationship between the length L of the pipe, a nozzle diameter $d_n$, and the pipe inside diameter d, is smaller than $5 \times 10^4 \text{ m}^{-1}$.

9. A spindle apparatus as set forth in claim 8, wherein the sum of the quantity of pipe expansion due to the pressure of lubricant in the interior portion of the pipe and the compression volume of the lubricant is equal to or less than the discharge quantity of the lubricant.

10. A spindle apparatus as set forth in claim 9, wherein a nozzle frame for jetting out the lubricant to the given positions of the interior portion of the spindle apparatus and the lubricating device are connected together by a pipe which satisfies the following conditions that:

(a) the pipe outside diameter D is $1.0 \times 10^{-3}$ m–$3.2 \times 10^{-3}$ m, (b) the pipe inside diameter d is $0.8 \times 10^{-3}$ m–$2.0 \times 10^{-3}$ m, (c) Young's modulus of the pipe material is 3 GPa or more, (d) the pipe length L is set to be L>0.5 m, (e) the nozzle diameter $d_n$ is $0.08 \times 10^{-3}$–$0.3 \times 10^{-3}$ m, and (f) $L \cdot p \cdot \{\rho \cdot d^2/(4K) + \pi \cdot d^2 \cdot \{(D^2 + d^2)/(D^2 - d^2) + v\}/(2E)\} < qm^3$, where, K: bulk modulus [Pa] of the lubricant v: Poisson's ratio of pipe material p: average pressure [Pa] in pipe q: discharge quantity [m$^3$]

E: Young's modulus of the pipe material.

11. A spindle apparatus as set forth in claim 1, further comprising:

the plurality of rolling bearings for rotatably supporting the spindle;

an inner housing for covering the outside of the rolling bearings, the inner housing having a nozzle frame disposed therein; and an outer housing for covering the outside of the spindle apparatus, wherein the pipe is arranged so as to extend from the lubricating device to the nozzle frame through a communication hole for supply of lubricant formed in the outer housing along the axial direction thereof and also through an opening formed in the inner housing.

12. The spindle apparatus as set forth in claim 1, wherein the lubricant discharged by the lubricating device is supplied from a lubricating pump via a pipe.

13. A spindle apparatus comprising:

a spindle:

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the lubricating device pressurizes the lubricant supplied from the lubricating pump via the pipe, so that the pressurized lubricant is injected from the nozzle by its own pressure without air, wherein the lubricating device includes:

the lubricating pump having a larger discharge quantity than that from the nozzle; and a switch valve interposed in the pipe for connecting the pump and the nozzle, the switch valve shutting off the pipe to stop the discharging of the lubricant from the nozzle when a discharge oil pressure from the pump is less than a predetermined pressure, the switch valve opening the pipe to allow the lubricant supplied from the pump to be discharged from the nozzle during a given period of time when the discharge oil pressure from the pump is equal to or more than the predetermined pressure, the switch valve repeatedly executing the series of operations.

14. A spindle apparatus as set forth in claim 13, wherein the opening time of the switch valve is set in the range of 0.1–50 ms.

15. A spindle apparatus as set forth in claim 13, wherein the lubricating device includes:

an actuator for driving the switch valve;

a pressure switch for detecting the discharge oil pressure of the pump; and a controller sending a drive signal to the pump, and on receiving a detect signal from the pressure switch issued when the discharge oil pressure is equal to or more than the predetermined pressure, sending a drive signal to the actuator, after then, sending a drive stop signal to the pump, the controller repeatedly executing the series of operations at given time intervals.

16. A spindle apparatus comprising:

a spindle:

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the lubricating device includes:

the lubricating pump having a larger discharge quantity than that from the nozzle; and a switch valve interposed in the pipe for connecting the pump and the nozzle, the switch valve shutting off the pipe to stop the discharging of the lubricant from the nozzle when a discharge oil pressure from the pump is less than a predetermined pressure, the switch valve opening the pipe to allow the lubricant supplied from the pump to be discharged from the nozzle during a given period of time when the discharge oil pressure from the pump is equal to or more than the predetermined pressure, the switch valve repeatedly executing the series of operations, wherein the switch valve includes:

a fixed member having a fixed sliding contact surface; and a rotary member having a movable sliding contact surface to be closely contactable with the fixed sliding contact surface, and rotating the movable sliding contact surface in sliding contact with the fixed sliding contact surface about an axial line perpendicular to the fixed sliding contact surface, and wherein on the circumference of the fixed sliding contact surface with the axial line as the center thereof, the fixed sliding contact surface of the fixed member defines a discharge hole to be connected to the pump and an oil feed hole to be connected to the nozzle, and wherein on the circumference of the movable sliding contact surface with the axial line as the center thereof, the movable sliding contact surface of the rotary member defines an arc-shaped slit having a center angle larger than at least a center angle formed between the discharge hole and oil feed hole.

17. A spindle apparatus comprising:

a spindle;

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the lubricating device includes:

the lubricating pump having a larger discharge quantity than that from the nozzle; and a switch valve interposed in the pipe for connecting the pump and the nozzle, the switch valve shutting off the pipe to stop the discharging of the lubricant from the nozzle when a discharge oil pressure from the pump is less than a predetermined pressure, the switch valve opening the pipe to allow the lubricant supplied from the pump to be discharged from the nozzle during a given period of time when the discharge oil pressure from the pump is equal to or more than the predetermined pressure, the switch valve repeatedly executing the series of operations, wherein the switch valve includes:

a fixed member having a fixed sliding contact surface; and a rotary member having a movable sliding contact surface to be closely contactable with the fixed sliding contact surface, and rotating the movable sliding contact surface in sliding contact with the fixed sliding contact surface about an axial line perpendicular to the fixed sliding contact surface, wherein the fixed sliding contact surface of the fixed member defines a plurality of oil feed holes to be connected to the nozzle on the circumference of the fixed sliding contact surface with the axial line as the center thereof and a discharge hole to be connected to the pump at the position of the axial line, and wherein the movable sliding contact surface of the rotary member defines a slit extending along the radial direction of the rotary member from the axial line position to the position of the oil feed hole.

18. A spindle apparatus comprising:

a spindle;

a rolling bearing for supporting the spindle; and a lubricating device operable to intermittently discharge a lubricant from a nozzle to the rolling bearing, the lubricating device discharging the lubricant supplied from a lubricating pump via a give at a predetermined speed sufficient for the lubricant to reach a surface of the rolling bearing to be lubricated while overcoming an air curtain caused by rotation of the rolling bearing, wherein the lubricating device includes:

the lubricating pump having a larger discharge quantity than that from the nozzle; and a switch valve interposed in the pipe for connecting the pump and the nozzle, the switch valve shutting off the pipe to stop the discharging of the lubricant from the nozzle when a discharge oil pressure from the pump is less than a predetermined pressure, the switch valve opening the pipe to allow the lubricant supplied from the pump to be discharged from the nozzle during a given period of time when the discharge oil pressure from the pump is equal to or more than the predetermined pressure, the switch valve repeatedly executing the series of operations, wherein the switch valve includes: a fixed member having a fixed sliding contact surface; and a slide member having a movable sliding contact surface to be closely contactable with the fixed sliding contact surface and reciprocating the movable sliding contact surface in a linear direction in sliding contact with the fixed sliding contact surface with respect to the fixed sliding contact surface, wherein the fixed sliding contact surface of the fixed member defines a plurality of discharge holes to be connected to the pump in such a manner as to be spaced from each other in the linear direction, and wherein the movable sliding contact surface of the slide member defines a plurality of oil feed holes to be connected to the nozzle in such a manner as to be arranged in the linear direction at the same intervals as the discharge holes.

19. A spindle apparatus comprising:

a spindle;

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the lubricating device includes:

the lubricating pump having a larger discharge quantity than that from the nozzle; and a switch valve interposed in the pipe for connecting the pump and the nozzle, the switch valve shutting off the pipe to stop the discharging of the lubricant from the nozzle when a discharge oil pressure from the pump is less than a predetermined pressure, the switch valve opening the pipe to allow the lubricant supplied from the pump to be discharged from the nozzle during a given period of time when the discharge oil pressure from the pump is equal to or more than the predetermined pressure, the switch valve repeatedly executing the series of operations, wherein the switch valve includes: a cylindrical-shaped stator having a fixed sliding contact surface on an inner surface thereof; and a rotor having a rotary sliding contact surface on an outer surface thereof to be closely contacted with the fixed sliding contact surface and rotating while the rotary sliding contact surface is in sliding contact with the fixed sliding contact surface, wherein the fixed sliding contact surface of the stator defines a plurality of oil feed holes to be connected to the nozzle in such a manner as to be spaced from each other around the inner surface of the stator, and wherein the rotary sliding contact surface of the rotor defines a discharge hole to be connected to the pump in such a manner as to be arranged around the outer periphery of the rotor at the same axial position as the oil feed holes.

20. A spindle apparatus comprising:

a spindle:

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the lubricating apparatus discharges a given quantity of lubricant in accordance with on and off of oil pressure applied thereto, and the lubricating apparatus comprises: a pump for switching on and off the pressure of oil to be discharged to a hydraulic main pipe;

a discharge cylinder having a discharge piston therein, the discharge cylinder defines an oil supply chamber formed on one end side of the discharge piston in the moving direction thereof and a hydraulic chamber formed on the other end side of the discharge piston, the oil supply chamber being connected to a discharge port for the pipe, the hydraulic chamber being connected to the hydraulic main pipe, the discharge piston being disposed so as to be energized toward the hydraulic chamber side by a spring;

a three-way valve connected to the hydraulic main pipe, an oil supply passage to be connected to the oil supply chamber, and an oil storage passage, for allowing the hydraulic main pipe and the oil storage passage to communicate with each other when the oil pressure is switched on and, on the other hand, when the oil pressure is switched off and the oil pressure from the oil storage passage is given to the three-way valve, for allowing the oil storage passage and the oil supply passage to communicate with each other; and, an oil storage cylinder having an oil storage piston therein, the oil storage cylinder defines an oil storage chamber formed on one end side of the oil storage piston in the moving direction thereof for connecting to the oil storage passage, the oil storage piston being disposed so as to be energized toward the oil storage chamber side by a spring.

21. A spindle apparatus as set forth in claim 20, wherein the lubricating device further comprises:

a drive piston disposed on the hydraulic chamber side of the discharge cylinder, the drive piston being movable by the oil of the hydraulic chamber to push and drive the discharge piston, wherein the oil operation area of the drive piston is larger than the oil pressurizing area of the discharge piston.

22. A spindle apparatus as set forth in claim 20, wherein the three-way valve includes an umbrella valve having an umbrella valve main body and a flexible umbrella piece disposed on the outer periphery of the umbrella valve main body, and wherein the umbrella valve is structured such that, when the oil pressure is switched on, the umbrella valve main body closes the oil supply passage and the flexible umbrella piece is reduced in diameter to thereby allow the hydraulic main pipe and oil storage passage to communicate with each other and, on the other hand, when the oil pressure is switched off and the umbrella valve receives the oil pressure from the oil storage passage, the umbrella valve main body is moved in a direction to open the oil supply passage and the flexible umbrella piece is enlarged in diameter to thereby allow only the oil storage passage and oil supply passage to communicate with each other.

23. A spindle apparatus as set forth in claim 22, wherein the three-way valve includes one of an air bleeding plug and a stop plug threadedly engaged with the three-way valve so as to be removed therefrom, for moving the umbrella valve in a direction to open the oil supply passage.

24. A spindle apparatus comprising:

a spindle;

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the rolling bearing comprises at least two rolling bearings, and wherein the lubricating device further comprises a multi-distribution mechanism interposed between the lubricating pump and the nozzle, for distributively supplying the lubricant from the lubricating pump to the rolling bearings, respectively, wherein the multi-distribution mechanism includes: a distribution housing having lubricant supply holes annularly disposed, the number of which corresponds to the number of distribution, and a center flow passage formed in the center of the annularly disposed lubricant supply holes;

a rotor valve rotatably contactable with the distribution housing to bring a flow passage into communication with the lubricant supply holes sequentially, the rotor valve having a groove serving as the flow passage and extending from the center of rotation thereof up to a diameter position larger than a pitch circle diameter at the positions of the lubricant supply holes; and a motor for rotating the rotor valve.

25. A spindle apparatus as set forth in claim 24, wherein the distribution housing includes longitudinal holes in the radial direction thereof, the number of which corresponds to the number of distributions, and the lubricant supply holes respectively extend in the thrust direction thereof to be in phase with and penetrate through the longitudinal holes.

26. A spindle apparatus as set forth in claim 24, wherein the lubricant supply holes of the distribution housing are formed so as to be communicated with the groove formed in the rotor valve from an oblique direction with respect to the axial direction of the distribution housing.

27. A spindle apparatus comprising:

a spindle;

a rolling bearing for supporting the spindle; and a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing, wherein the rolling bearing comprises at least two rolling bearings, and wherein the lubricating device further comprises a multi-distribution mechanism interposed between the lubricating pump and the nozzle, for distributively supplying the lubricant from the lubricating pump to the rolling bearings, respectively, wherein the multi-distribution mechanism comprises: a distribution housing having lubricant supply holes, the number of which corresponds to the distribution number;

a rotor valve rotatably contactable with the distribution housing to bring a flow passage into communication with the lubricant supply holes sequentially;

a shaft for rotationally driving the rotor valve;

a spring member for energizing the shaft toward the rotor valve side; and a thrust bearing for supporting the shaft in a freely rotatable manner.

28. A spindle apparatus comprising:

a spindle:

a plurality of rolling bearings for rotatably supporting the spindle;

a lubricating device operable to intermittently discharge a lubricant from a nozzle to the rolling bearing, the lubricating device discharging the lubricant supplied from a lubricating pump via a pipe at a predetermined speed sufficient for the lubricant to reach a surface of the rolling bearing to be lubricated while overcoming an air curtain caused by rotation of the rolling bearing;

an inner housing for covering the outside of the rolling bearings, the inner housing having a nozzle frame disposed therein; and an outer housing for covering the outside of the spindle apparatus, wherein the pipe is arranged so as to extend from the lubricating device to the nozzle frame through a communication hole for supply of lubricant formed in the outer housing along the axial direction thereof and also through an opening formed in the inner housing, wherein the inner housing comprises:

a first inner housing to which the outer rings of the rolling bearings are to be fixed; and a second inner housing including an insertion portion for storing therein the first inner housing in the axial direction thereof, wherein the inside diameter of the insertion portion of the second inner housing is set larger than the outside diameter of the first inner housing.

29. A spindle apparatus as set forth in claim 28, wherein a cut-out groove for arrangement of the pipe is formed in the insertion portion of the second inner housing, whereby when the first housing is slid in the axial direction, the pipe is stored in the cut-out groove.

* * * * *

UNITED STATES PATENT AND TRADEMARK OFFICE
CERTIFICATE OF CORRECTION

PATENT NO. : 6,623,251 B2
DATED : September 23, 2003
INVENTOR(S) : Sumio Sugita et al.

It is certified that error appears in the above-identified patent and that said Letters Patent is hereby corrected as shown below:

<u>Title page,</u>
Item [75], should read as follows:
-- [75]  Inventors:  Sumio Sugita, Kanagawa (JP);
   Taikou Nawamoto, Kanagawa (JP);
   Kenichi Sugiyama, Kanagawa (JP);
   Satoshi Dairokuno, Kanagawa (JP);
   Yukiyoshi Okazaki, Kanagawa (JP) --

Signed and Sealed this

Seventeenth Day of February, 2004

JON W. DUDAS
*Acting Director of the United States Patent and Trademark Office*